(12) United States Patent
Shirai et al.

(10) Patent No.: US 6,305,506 B1
(45) Date of Patent: Oct. 23, 2001

(54) BRAKING SYSTEM INCLUDING MOTOR-DRIVEN DISC BRAKE EQUIPPED WITH SELF-SERVO MECHANISM

(75) Inventors: Kenji Shirai, Mishima; Ryoichi Kurasako, Gotenba; Yasunori Yoshino; Kazuhiko Imai, both of Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/284,002

(22) PCT Filed: Sep. 26, 1997

(86) PCT No.: PCT/JP97/03457

§ 371 Date: Apr. 2, 1999

§ 102(e) Date: Apr. 2, 1999

(87) PCT Pub. No.: WO98/14715

PCT Pub. Date: Apr. 9, 1998

(30) Foreign Application Priority Data

| Oct. 3, 1996 | (JP) | 8-262965 |
| Jan. 20, 1997 | (JP) | 9-7554 |
| Mar. 31, 1997 | (JP) | 9-80588 |
| Apr. 11, 1997 | (JP) | 9-93970 |
| Sep. 8, 1997 | (JP) | 9-242679 |

(51) Int. Cl.⁷ ................................... F16D 55/46
(52) U.S. Cl. .................. 188/72.2; 188/72.3; 188/70 B; 188/136; 188/24.14; 188/24.15
(58) Field of Search ............... 188/72.7, 72.3, 188/72.2, 70 B, 72.8, 342, 135, 136, 24.14, 24.15, 24.16

(56) References Cited

U.S. PATENT DOCUMENTS 3,708,040 * 1/1973 Hollnagel ........................ 188/72.2
3,827,535 * 8/1974 Hoffman et al. ................. 188/138
3,837,438 * 9/1974 Hollnagel ........................ 188/72.2

(List continued on next page.)

FOREIGN PATENT DOCUMENTS

| 40 13 497 A | 2/1992 | (DE) . |
| 0 296 703 A | 12/1988 | (EP) . |
| 50-7698 | 3/1975 | (JP) . |
| 55-109140 | 8/1980 | (JP) . |
| 63-266228 | 2/1988 | (JP) . |
| 2-57731 | 2/1990 | (JP) . |
| 3-84227 | 4/1991 | (JP) . |
| 4-337124 | 11/1992 | (JP) . |

(List continued on next page.)

OTHER PUBLICATIONS

SAE Paper 980600, "Modeling and Control of an Electro-mechanical Disk Brake,", 1998, pp. 177–189.
ATZ Automobiltechnische Zeitschrift 98 (1996) "Advanced Brake System with Highest Flexibility" pp. 328–333.
D. Sherman, Automotive Industries, "Stable as She Goes", May 1995, pp. 62–64.

(List continued on next page.)

Primary Examiner—Robert J. Oberleitner
Assistant Examiner—Ben Pezzlo
(74) Attorney, Agent, or Firm—Kenyon & Kenyon

(57) ABSTRACT

Electrically operated braking system with a motor-driven disc brake including an electric motor for braking an automotive vehicle wheel, and a motor control device controlling the electric motor, the disc brake further including a disc rotor having a friction surface, a friction pad movable for contact with the friction surface to restrict rotation of the disc rotor, a pad support mechanism for supporting the friction pad movably in a direction intersecting the friction surface, a pad pressing mechanism including the electric motor and a pressing member, the electric motor producing a drive force for moving the pressing member to force the friction pad against the disc rotor, and a self-servo mechanism for providing a self-servo effect of boosting a friction force generated between the friction surface and the friction pad, on the basis of the friction force.

23 Claims, 65 Drawing Sheets

U.S. PATENT DOCUMENTS

| | | | |
|---|---|---|---|
| 3,860,094 | * | 1/1975 | Brenton .................................. 188/24 |
| 3,993,173 | * | 11/1976 | Hoffman ............................. 188/138 |
| 4,444,296 | * | 4/1984 | Marianu .............................. 188/72.2 |
| 4,591,028 | * | 5/1986 | Hagiwara et al. ................... 188/72.2 |
| 4,716,994 | * | 1/1988 | Iwamoto ............................. 188/72.2 |
| 4,724,934 | * | 2/1988 | Howell ............................. 188/73.45 |
| 4,852,699 | * | 8/1989 | Karnopp et al. .................... 188/72.2 |
| 4,974,704 | * | 12/1990 | Miller et al. ....................... 188/24.14 |
| 5,121,018 | * | 6/1992 | Oldakowski ........................... 310/77 |
| 5,219,048 | * | 6/1993 | Shaw et al. ......................... 188/72.1 |
| 5,427,441 | * | 6/1995 | Otsu .................................... 303/100 |
| 5,448,118 | * | 9/1995 | Nakamura et al. .................... 310/54 |
| 5,775,782 | * | 7/1998 | Akita et al. ............................ 303/10 |
| 5,788,023 | * | 8/1998 | Schoner et al. .................... 188/72.2 |
| 5,829,557 | * | 11/1998 | Halasy-Wimmer et al. ........ 188/162 |
| 5,921,354 | * | 7/1999 | Evans ................................. 188/73.2 |
| 5,924,777 | * | 7/1999 | Kamikado ........................... 303/150 |
| 5,971,110 | * | 10/1999 | Martin ................................ 188/72.2 |
| 6,098,762 | * | 8/2000 | Reimann et al. ................... 188/72.5 |
| 6,098,763 | * | 8/2000 | Holding ............................... 188/158 |

FOREIGN PATENT DOCUMENTS

| | | |
|---|---|---|
| 5-22234 | 3/1993 | (JP) . |
| 5-60157 | 3/1993 | (JP) . |
| 7-224866 | 8/1995 | (JP) . |
| 8-248980 | 1/1996 | (JP) . |
| 9-14308 | 1/1997 | (JP) . |
| WO 96/03301 | 2/1996 | (WO) . |

OTHER PUBLICATIONS

R.L. Wells et al., SAE Paper 93ME115, "Electric Brake System for Passenger Vehicles–Ready for Production", pp. 349–356.

D.E. Schenk et al., Institution of Mechanical Engineer 950762, "Intelligent Braking for Current and Future Vehicles", pp. 43–46.

Patent Abstracts of Japan JP–A–8–121509.

Patent Abstracts of Japan JP–A–8–284980.

Patent Abstracts of Japan JP–A–5–32191.

* cited by examiner

BRAKING SYSTEM INCLUDING MOTOR-DRIVEN DISC BRAKE EQUIPPED WITH SELF-SERVO MECHANISM

TECHNICAL FIELD

The present invention relates in general to an electrically operated braking system having a motor-driven disc brake activated by an electric motor for braking a wheel of an automotive vehicle. More particularly, this invention is concerned with improvements in techniques for enabling the motor-driven disc brake to produce an increased wheel braking force, without increasing a drive force or torque to be generated by the electric motor.

BACKGROUND ART

In such an electrically operated braking system, there has been a need or desire to increase the wheel braking force for a given drive force or torque generated by an electric motor used for the disc brake. JP-U-5-22234 proposes a conventional braking system, which is arranged in an attempt to meet the above-indicated need. In this conventional braking system, a boosting mechanism is provided between an electric motor and friction pads of a disc brake, so that the drive force generated by the motor is boosted by the boosting mechanism before it is transmitted to the friction pads. For producing a relatively large wheel braking force, however, the motor and the boosting mechanism in this conventional braking system are subject to a comparatively large load, and therefore tend to have relatively large sizes, leading to an accordingly increased size of the motor-driven disc brake.

DISCLOSURE OF INVENTION

It is therefore an object of the present invention to provide an electrically operated braking system wherein a motor-driven disc brake for braking a vehicle wheel is capable of producing a sufficiently large wheel braking force without increasing a nominal capacity of an electric motor, by effectively utilizing a friction force generated by a friction pad and a disc rotor upon braking of the wheel, while avoiding an increase in size of the disc brake.

The above object may be achieved by any one of the following features of the present invention, which are numbered like the appended claims, so as to show possible combinations of the features:

(1) An electrically operated braking system comprising a motor-driven disc brake including an electric motor as a drive source for braking a wheel of an automotive vehicle, and a motor control device for controlling the electric motor, the motor-driven disc brake further including: (a) a disc rotor having a friction surface and rotating with the wheel; (b) a friction pad movable for contact with the friction surface to restrict rotation of the disc rotor; (c) a pad support mechanism for supporting the friction pad such that the friction pad is movable in a direction intersecting the friction surface; (d) a pad pressing mechanism comprising the electric motor and a pressing member, the electric motor producing a drive force for moving the pressing member to force the friction pad against the friction surface of the disc rotor; and (e) a self-servo mechanism for providing a self-servo effect of boosting a friction force generated between the friction surface and the friction pad, on the basis of the friction force.

In the braking system of the present invention, the self-servo mechanism is adapted to boost the friction force and apply the boosted friction force to the friction pad. The friction force thus boosted by the self-servo mechanism with a given drive force of the electric motor is larger than the friction force which is generated with the same drive force of the electric motor when the self-servo mechanism is not provided. In this braking system, therefore, the load acting on the electric motor is reduced, and the size and capacity of the motor are accordingly reduced, as compared with those of the motor in the conventional braking system wherein only the drive force of the motor is used to press the friction pad against the disc rotor, without utilizing a self-servo effect of the friction pad based on the friction force generated by the motor. Accordingly, the motor-drive disc brake can be made small-sized and comparatively easily installed on the vehicle body.

The present electrically operated braking system can be used as an ordinary brake for braking a running vehicle. In this case, the braking system may be adapted to effect automatic control of braking forces to be applied to vehicle wheels, such as anti-lock and traction controls.

The electric motor used in the present braking system may be a wound-rotor type motor, or an ultrasonic motor. The holding torque produced by the ultrasonic motor in its non-energized off state is larger than that produced by the wound-rotor type motor. In this respect, the braking system using the ultrasonic motor can be suitably used as a parking brake. In this case, the braking force required for holding the parked vehicle stationary can be obtained with a comparatively small amount of electric power consumption.

The motor-driven disc brake may use a pair of friction pads which are disposed on the opposite sides of the disc rotor and which are forced against the opposite friction surfaces of the disc rotor. In this case, the self-servo mechanism may be adapted to use the friction force between the disc rotor and one of the two friction pads, for providing the self-servo effect with respect to either the above-indicated one friction pad or the other friction pad.

(2) An electrically operated braking system according to the feature (1), wherein said pad pressing mechanism includes a first pressing device for generating a first pressing force for pressing the friction pad against the disc rotor based on the drive force of the electric motor, and the self-servo mechanism includes a second pressing device for generating a second pressing force for pressing the friction pad against the disc rotor based on the friction force which is generated between the friction pad and the disc rotor based on the first pressing force.

In the above braking system, the first and second pressing forces may be transmitted to the friction pad through respective different paths or a single path.

(3) An electrically operated braking system according to the feature (1) or (2), wherein the motor-driven disc brake includes a pair of friction pads disposed on the opposite sides of the disc rotor, respectively, and the pad pressing mechanism and the self-servo mechanism include a lever corresponding to each of at least one of the friction pads, the lever including (a) a first connecting portion at which the lever is connected to a stationary member such that the lever is pivotable about a first axis perpendicular to an axis of rotation of the disc rotor, (b) a first bearing portion which receives the friction force generated between the corresponding one of the friction pads and the disc rotor when the vehicle is running in a predetermined first direction which is one of a forward and a reverse running direction of the vehicle, (c) an engaging portion which is engageable with a back surface of the above-indicated corresponding friction pad, and wherein the first connecting portion, the first bearing portion and the engaging portion are positioned relative to each other such that the friction force received by the first bearing portion from the above-indicated corresponding friction pad causes a moment to act on the lever in a direction that causes the engaging portion to approach the disc rotor.

In the above braking system, the lever constitutes a major part of the self-servo mechanism.

In one form of this braking system, the first bearing portion (effort point), the relative position (lever ratio) of the first connecting portion (fulcrum) and the engaging portion (load point) is determined so that the friction force generated between the friction pad and the disc rotor is boosted and transmitted to the friction pad. According to this arrangement, the self-servo mechanism achieves an effective self-servo function to boost the friction force. In another form, the level has an input portion at which the drive force of the electric motor is received. In this case, the single lever permits the first and second pressing forces to be transmitted to the friction pad, and the motor-driven disc brake can be small-sized, as compared with the disc brake wherein two levers are used for transmitting the first and second pressing forces, respectively.

(4) An electrically operated braking system according to the feature (3), wherein the pad pressing mechanism and the self-servo mechanism include the above-indicated lever for each of the pair of friction pads, and a pair of links connecting the two levers disposed on the opposite sides of the disc rotor, the pair of links being connected to each other such that the links are pivotable about a second axis parallel to the above-indicated first axis, each of the links including (d) a second connecting portion connected to the corresponding one of the levers such that the link is pivotable about a third axis parallel to the second axis, and (e) a second bearing portion which receives the friction force generated between the above-indicated corresponding friction pad and the disc rotor when the vehicle is running in a second direction opposite to the above-indicated first direction, and wherein the second connecting portion, the second bearing portion, the first connecting portion and the engaging portion are positioned relative to each other the friction force received by the second bearing portion from the corresponding friction pad causes a moment to act on the corresponding lever in a direction that causes the engaging portion to approach the disc rotor.

In the above braking system, the self-servo mechanism is able to achieve the self-servo function during running of the vehicle in not only the forward direction but also the reverse direction. Thus, the braking system provides a sufficient wheel braking force irrespective of the running direction of the vehicle.

(5) An electrically operated braking system according to any one of the features (1)–(4), wherein the motor-driven disc brake further includes self-servo effect inhibiting mechanism for inhibiting the self-servo mechanism from providing the self-servo effect while a braking force between the wheel and a road surface is smaller than a predetermined first value.

The self-servo effect is advantageous in that the friction force eventually generated between the friction pad and the disc rotor is larger than the drive force of the electric motor. At the same time, the self-servo effect has a disadvantage. That is, the boosting ratio (gain) of the drive force of the electric motor, which is a ratio of the eventual friction force to the drive force, tends to be excessively large, and the actual wheel braking force tends to be excessively responsive to the drive force of the electric motor. Further, the eventual friction force tends to increase non-linearly with an increase in the drive force. It is also noted that the self-servo effect is likely to be influenced by a change in the friction coefficient of the friction pad. This disadvantage of the self-servo effect leads to instability in the braking effect provided by the disc brake. On the other hand, the need for the self-servo effect varies depending upon the braking condition. Namely, the need for the self-servo effect is relatively low during application of a normal or ordinary brake to the vehicle, and is relatively high during application of an abrupt brake. In addition, the normal brake application requires high stability in the braking effect, while on the other hand the abrupt brake application requires a maximum braking effect to provide a sufficiently large wheel braking force.

In the light of the above, the braking system according to the above feature (5) is adapted to selectively provide the self-servo effect only when this effect is needed.

That is, the disc brake includes the self-servo effect inhibiting mechanism which is adapted to inhibit the self-servo mechanism from providing the self-servo effect as long as the wheel braking force between the wheel and the road surface is smaller than the predetermined first threshold value.

In the above arrangement, the self-servo effect is not provided when it is not required, for example, upon normal brake application in which the required wheel braking force is relatively small. Accordingly, the present arrangement assures high stability in the braking effect during the normal brake application. Upon abrupt brake application in which the required wheel braking force is relatively large, on the other hand, the self-servo effect is provided to increase the braking effect with a wheel braking force larger than the drive force of the electric motor.

The first threshold valve may be an upper limit of a normal range of the wheel braking force. The normal range is defined as a range within which the wheel braking force is expected to fall during normal braking application (with a normal brake operating force). Alternatively, the first threshold value may be the wheel braking force which is expected to be produced when the vehicle deceleration is in a range of 0.5–0.6 G.

The self-servo effect may be provided by utilizing a dragging movement of the friction pad with the disc rotor due to the frictional contact therebetween. In this case, self-servo effect inhibiting mechanism may be adapted to either mechanically or electrically inhibit the dragging movement of the friction pad with the disc rotor.

(6) An electrically operated braking system according to the feature (5), wherein the self-servo mechanism provides the self-servo effect by utilizing a movement of the friction pad with the disc rotor due to the friction force therebetween, and the self-servo effect inhibiting mechanism includes an elastic member whose elastic force inhibits the movement of the friction pad with the disc rotor.

(7) An electrically operated braking system according to the feature (6), wherein the self-servo mechanism provides the self-servo effect such that the self-servo effect changes with an amount of the movement of the friction pad with the disc rotor, and the elastic force of said elastic member increases non-linearly with an increase in an amount of elastic deformation of the elastic member.

The elastic member may be adapted to produce a predetermined constant elastic force irrespective of a change in the amount of elastic deformation. In this case, the predetermined constant elastic force determines the moment at which the movement of the friction pad with the disc rotor is permitted, that is, the moment of initiation of the self-servo effect. Alternatively, the elastic member may be adapted such that the elastic force increases with an increase in the amount of elastic deformation. In this case, the elastic member makes it possible to control not only the moment of initiation of the self-servo effect, but also the rate of increase of the self-servo effect (i.e., boosting ratio of the drive force of the electric motor). By suitably determining the relationship between the elastic force and the amount of elastic deformation of the elastic member, that is, by optimizing the elastic coefficient of the elastic member, the elastic member can achieve the following two functions: (a) to permit the initiation of the self-servo effect when the friction force is relatively small, and (b) to prevent an excessive rise of the rate of increase of the self-servo effect after the initiation of the self-servo effect. The first function (a) may be achieved by reducing the force to be transmitted from the elastic member to the friction pad, to permit the movement of the friction pad with the disc rotor when the friction force is relatively small. The second function (b) may be achieved by increasing the force to be transmitted from the elastic member to the friction pad, to restrict an increase in the speed of movement of the friction pad with the disc rotor.

In the braking system according to the feature (7) developed in the light of the above, the elastic member is arranged such that the elastic force increases with an increase in the amount of elastic deformation. In this braking system, not only the moment of initiation of the self-servo effect but also the rate of increase of the self-servo effect can be controlled as desired. The rate of decrease of the self-servo effect may also be controlled.

The self-servo mechanism may be provided by the friction pad which functions as a wedge to provide the self-servo effect. In this case, the elastic force of the elastic member to be applied to the friction pad may be constant irrespective of a change in the amount of elastic deformation of the elastic member. In this instance, the rate of decrease of the wheel braking force may be excessively high upon releasing of the brake (brake operating member), for the reason which will be apparent from the detailed description of the preferred embodiments of this invention. The braking device according to the feature (7) is effective to not only facilitate the initiation of the self-servo effect, but also prevent the excessively high rate of decrease of the wheel braking force by increasing the elastic force of the elastic member.

(8) An electrically operated braking system according to the feature (7), wherein the elastic force of the elastic member increases linearly with an increase in the amount of elastic deformation.

(9) An electrically operated braking system according to the feature (5), wherein the self-servo mechanism provides the self-servo effect by utilizing a movement of the friction pad with the disc rotor due to the friction force therebetween, such that the self-servo effect changes with an amount of the movement of the friction pad, and the self-servo effect inhibiting mechanism includes an elastic member whose elastic force inhibits the movement of the friction pad with the disc rotor, the elastic force increasing non-linearly with an increase in an amount of elastic deformation of the elastic member.

In the above braking system, the elastic member can achieve various functions including those achieved by the elastic member according to the feature (8).

(10) An electrically operated braking system according to the feature (9), wherein a rate of increase of the elastic force of the elastic member with the amount of elastic deformation is higher when the amount of elastic deformation is relatively large than when the amount of elastic deformation is relatively small.

The above-indicated rate of increase of the elastic force with the amount of elastic deformation represents the elastic coefficient of the elastic member. In the above braking system, the elastic coefficient is higher when the amount of elastic deformation is relatively large than when the amount of elastic deformation is relatively small. This arrangement not only facilitates the initiation of the self-servo effect but also prevents an excessive rise of the rate of increase of the self-servo effect during activation of the self-servo mechanism. Where the self-servo mechanism utilizes the wedge effect of the friction pad, the present arrangement is also effective to prevent an early excessive increase in the rate of decrease of the self-servo effect.

(11) An electrically operated braking system according to any one of the features (1) through (10), wherein the motor-driven disc brake further includes a mechanism for mechanically controlling a rate of change of the self-servo effect of the self-servo mechanism with a change in the drive force of the electric motor.

While the rate of change of the self-servo effect tends to be excessively high, the mechanism used in the above braking system is adapted to mechanically control the rate of change of the self-servo effect. This mechanism is effective to prevent an excessively high rate of increase of the self-servo effect.

In one form of the mechanism for mechanically controlling the rate of change of the self-servo effect, the elastic coefficient of the elastic member is optimized so as to suitably control the rate of increase of the self-servo effect. In another form of the mechanism, the contact surface of the friction pad which contacts the pressing member of the pad pressing mechanism is inclined with respect to the friction surface of the disc rotor, and the angle of inclination of this contact surface with respect to the friction surface is optimized so as to suitably control the rate of increase of the self-servo effect. In a further form of the mechanism, the elastic coefficient of the elastic member is optimized so as to suitably control the rate of decrease of the self-servo effect.

(12) An electrically operated braking system according to any one of the features (1) through (11), wherein the pad support mechanism includes a stationary member having a pair of portions for supporting the friction pad at opposite end portions thereof which are opposite to each other in a rotating direction of the disc rotor, and the elastic member having opposite end portions one of which is associated with one of the opposite end portions of the friction pad toward which the friction pad is moved with the disc rotor during forward running of the automotive vehicle, the other of the opposite end portions of the elastic member being associated with one of the pair of portions of the stationary member which is nearer to the above-indicated one end portion of the friction pad than to the other end portion.

In the above braking system, the stationary member may be a mounting bracket fixed to the body of the automotive vehicle, and the pair of portions may be a pair of bearing portions which receive forces from the respective opposite end portions of the friction pad based on the friction force between the friction pad and the disc rotor when the vehicle is running in the forward and reverse (rearward) directions, respectively. The end portions of the friction pads are opposite to each other in the rotating direction of the disc rotor.

(13) An electrically operated braking system according to any one of the features (1) through (11), wherein the pad support mechanism includes a stationary member having a pair of portions for supporting the friction pad at opposite end portions thereof which are opposite to each other in a rotating direction of the disc rotor, and the elastic member having opposite end portions one of which is associated with one of the opposite end portions of the friction pad toward which the friction pad is moved with the disc rotor during forward running of the automotive vehicle, the other of the opposite end portions of the elastic member being associated with one of the pair of portions of the stationary member which is remote from the above-indicated one end portion of the friction pad.

In the above braking system, one of the opposite end portions of the elastic member is associated with the friction pad while the other end portion of the elastic member is associated with the stationary member, as in the braking system according to the feature (12). However, the elastic member in this braking system can be more easily installed in the motor-driven disc brake, because the above-indicated end portion of the elastic member is differently associated with the stationary member.

Described in detail, the braking system according to the feature (12) is arranged such that the above-indicated one end portion of the elastic member is associated with one of the opposite end portions of the friction pad toward which the friction pad is moved with the disc rotor during the forward running of the vehicle, while the other end portion of the elastic member is associated with one of the pair of portions of the stationary member which is nearer to the above-indicated one end portion of the friction pad. In this arrangement, the distance between the opposite end portions of the elastic member is comparatively small. Where the elastic member is formed from a rod or sheet, the elastic member is required to U-shaped with a pair of arms opposed to each other with a relatively small spacing, so as to permit a sufficient amount of elastic compression of the elastic member. The U-shaped elastic member requires a relatively large space for installation in the disc brake, whereby the size of the disc brake is likely to be increased.

In the braking system according to the feature (13), one of the end portions of the elastic member is associated with the end portion of the friction pad toward which the friction pad is moved with the disc rotor, as in the preceding braking system. However, the other end portion of the elastic member is associated with one of the pair of portions of the stationary member which is remote from the above-indicated one end portion of the friction pad. In this arrangement, the distance between the opposite end portions of the elastic member is comparatively long, and therefore the rod or sheet of the elastic member is not required to be U-shaped to provide the sufficient amount of elastic deformation. Therefore, the elastic member in the form of the rod or sheet requires a relatively small space for installation in the disc brake, which space is available without increasing the size of the disc brake. In other words, the space normally available in a disc brake can be utilized for installing the elastic member.

In the braking system according to the above feature (13), the elastic member can be comparatively easily installed in the disc brake. The elastic member may take the form of a rod or sheet whose major part extends along a straight line or a curve or arc. Alternatively, the major part of the elastic member in the form of a rod or sheet may be corrugated and extend generally along a straight line or an arc.

(14) An electrically operated braking system according to the feature (13), wherein the disc brake includes a pair of friction pads disposed on opposite sides of the disc rotor, respectively, and the pad pressing mechanism includes (a) a caliper which extends over a periphery of the disc rotor and engages said pair of friction pads and which is movable in the direction intersecting the friction surface of the disc rotor, the caliper comprising a reaction portion engageable with one of the friction pads, and a presser portion for pressing the other of the friction pads against the friction surface, and (b) a presser rod which is supported by the presser portion such that the presser rod is movable by the drive force of the electric motor in the direction intersecting the friction surface, the caliper functioning as the pressing member for the above-indicated one of the friction pads, while the presser rod functioning as the pressing member for the other of the friction pads, and wherein the stationary member includes a bridging portion connecting the above-indicted pair of portions, the elastic member extending substantially in parallel with the bridging portion.

Generally, a stationary member for supporting a pair of friction pads in a disc brake has a bridging portion. In this type of disc brake, the elastic member according to the feature (13) can be disposed substantially in parallel with the bridging portion of the stationary member.

However, the bridging portion of the stationary member is not essential, and may be replaced by the elastic member. In this case, the space required for the elastic member is further saved.

(15) An electrically operated braking system according to any one of the features (1) through (14), wherein the motor-driven disc brake further includes an excessive self-servo effect inhibiting mechanism for inhibiting an increase of the self-servo effect of the self-servo mechanism after a braking force between the wheel and a road surface exceeds a predetermined second value.

In the electrically operated braking system having the self-servo function according to the principle of the present invention, the friction force generated between the friction pad and the disc rotor is boosted by this friction force per se. To prevent an excessive increase of the self-servo effect, however, it is desirable to positively or mechanically limit the degree of the self-servo effect at an appropriate point of time after the initiation of the self-servo effect. In the disc brake of the type adapted to provide the self-servo effect by utilizing the wedge effect of the friction pad, for instance, the friction pad may be squeezed by and between the disc rotor and the pressing member with an excessively large force (friction force) due to an excessive increase of the self-servo effect, resulting in a sticking tendency of the pressing member to the friction pad, which leads to a possibility that the friction pad cannot be rapidly or smoothly returned to the non-operated position upon releasing of the brake application.

In the light of the above fact, the braking system according to the feature (15) was developed in an effort to prevent an excessive increase of the self-servo effect.

In this braking system, the excessive self-servo effect inhibiting mechanism is provided to inhibit an increase of the self-servo effect after the braking force between the wheel and the road surface exceeds the predetermined second threshold value.

According to the above feature (15) of this invention, the self-servo mechanism is prevented from increasing the self-servo effect beyond a given upper limit. As a result, the tendency of sticking of the pressing member to the friction pad can be prevented even where the self-servo effect is provided by the wedge effect of the friction pad. Thus, the present braking system does not suffer from the problem that the friction pad cannot be rapidly returned to the non-operated position upon releasing of the brake operating member.

The phrase "inhibiting an increase of the self-servo effect" is interpreted to mean complete inhibition of the increase of the self-servo effect, or partial inhibition and partial allowance of the increase of the self-servo effect.

The excessive self-servo effect inhibiting means may be adapted to inhibit a further movement of the friction pad with the disc rotor, to thereby inhibit a further increase of the self-servo effect. In this form of the invention, the further movement of the friction ad with the disc rotor may be either mechanically inhibited or electrically inhibited.

(16) An electrically operated braking system according to the feature (15), wherein said self-servo mechanism provides the self-servo effect by utilizing a movement of the friction pad with the disc rotor due to the friction force therebetween, such that the self-servo effect changes with an amount of the movement of the friction pad, and wherein the excessive self-servo effect inhibiting mechanism includes a stationary stop for abutting contact with the friction pad to thereby inhibit the movement of the friction pad with the disc rotor.

In the above braking system, the stationary stop may be provided on a mounting bracket fixed to the vehicle body.

(17) An electrically operated braking system according to any one of the features (1) through (16), wherein the motor-driven disc brake further includes temperature rise restricting means for restricting a rise of a temperature of the electric motor.

In the electrically operated braking system wherein the electric motor is used as the drive source, the temperature of the electric motor may rise due to heat generated by the friction between the friction pad and the disc rotor, or due to heat generated by a coil of the motor per se. The temperature rise of the motor (in particular, of its coil) may cause operating instability of the motor.

In the light of the above fact, the braking system according to the feature (17) was developed to improve the operating stability or reliability of the system.

That is, the temperature rise restricting means is provided for restricting a rise of the temperature of the electric motor.

In this braking system, the operating stability of the motor is not deteriorated due to the temperature rise of the motor, so that the operating reliability of the system is improved even though the electric motor is used as the drive source.

(18) An electrically operated braking system according to the feature (17), wherein the temperature rise restricting means is provided in a power transmission path between the electric motor and the friction pad, to restrict a transfer of friction heat generated between the friction pad and the disc rotor, to the electric motor through the power transmission path.

In the above braking system, the temperature rise restricting means is relatively simple in construction for restricting the heat transfer to the motor to restrict the temperature rise of the motor.

(19) An electrically operated braking system according to the feature (18), wherein the self-servo mechanism includes means for positively allowing the friction pad to be moved with the disc rotor due to the friction force between the friction surface and the friction pad, for thereby enabling the friction pad to function as a wedge between the disc rotor and the pressing member, to provide the self-servo effect of boosting the friction force.

In the above braking system, a pair of friction pads may be disposed on the opposite sides of the disc rotor. In this case, the electric motor is provided on one of the opposite sides of the disc rotor to move the pressing member for pressing the corresponding one of the friction pads against the disc rotor. In this arrangement, the term "pressing member" is interpreted to mean a member for transmitting the drive force of the motor to the above-indicated one friction pad. However, the term may be interpreted to mean not only the member for transmitting the drive force to the above-indicated one friction pad, but also a member for transmitting the drive force to the other friction pad.

(20) An electrically operated braking system according to the feature (19), wherein the motor-driven disc brake further includes friction resistance reducing means for reducing a friction between the friction pad and the pressing member.

In the above braking system, the friction resistance reducing means is provided for reducing the friction between the friction pad and the pressing member.

The friction resistance reducing means is effective to avoid a problem that the movement of the friction pad with the disc rotor is disturbed by the friction between the friction pad and the pressing member. Accordingly, the friction resistance reducing means permits the servo-effect mechanism to operate in an efficient fashion.

In one form of the braking system according to the above feature (20), the friction resistance reducing means includes a thrust bearing mechanism provided between and in contact with the friction pad and the pressing member. The thrust bearing mechanism may incorporate at least one rolling element such as balls or rollers which are held in rolling contact with the friction pad and the pressing member. In another form of the same braking system, the friction resistance reducing means includes a material which has a relatively low friction coefficient and which is provided on at least one of the two contacting surfaces of the friction pad and the pressing member. Alternatively, the friction resistance reducing means may be provided by forming a plurality of substantially parallel grooves or protrusions on at least one of the two contacting surfaces.

(21) An electrically operated braking system according to the feature (19) or (20), wherein the self-servo mechanism includes the friction pad which has a slant surface for contact with the pressing member, and the slant surface is inclined with respect to the friction surface of the disc rotor such that a distance between the slant surface and the friction surface of the disc rotor increases in a direction in which the friction pad is moved with the disc rotor due to the friction force therebetween.

In the above braking system, the friction pad has a slant surface which is inclined with respect to the friction surface of the disc rotor. In other words, the surface of the friction pad for contact with the pressing member is inclined with respect to the friction surface of the disc rotor. This contact surface of the friction pad can be inclined with respect to the friction surface by providing the friction pad with a slant surface which may or may not contact the pressing member, that is, a slant surface which contacts either the pressing member or the friction surface of the disc rotor. This aspect will be described in the case of the friction pad which consists of a friction member having a front surface for contact with the disc rotor and a backing plate secured to a back surface of the friction member.

In the above case, the backing plate of the friction pad has a back surface for contact with the pressing member, and this back surface is the above-indicated contact surface of the friction pad with respect to the pressing member. In this case, the back surface of the backing plate is inclined with respect to the friction surface of the disc rotor where the friction member has a constant thickness in the direction of movement of the friction pad with the disc rotor, while the backing plate has a thickness which continuously changes in the above-indicated direction. According to this arrangement, the back surface or contact surface of the backing plate is inclined with respect to the front and back surfaces of the friction member, and functions as the slant surface inclined with respect to the friction surface of the disc rotor. In this case, the back surface of the backing plate is recognized as an inclined surface of the friction pad, which is inclined with respect to the friction surface.

Alternatively, the front surface of the friction member is inclined with respect to the friction surface of the disc rotor where the backing plate has a constant thickness in the direction of movement of the friction pad while the friction member has a thickness which continuously changes in the above direction of movement. According to this arrangement, the front surface of the friction member is inclined with respect to the back surface of the backing plate, and is recognized as an inclined surface of the friction pad but is not inclined with respect to the friction surface of the disc rotor. In this case, too, the back surface of the backing plate which contacts the pressing member functions as the slant surface inclined with respect to the friction surface. Thus, the backing plate has the slant surface inclined with respect to the friction surface of the disc rotor, irrespective of whether the friction member or the backing plate has the continuously changing thickness.

(22) An electrically operated braking system according to the feature (19) or (20), wherein the self-servo mechanism includes the friction pad which has a slant surface for contact with the pressing member, the slant surface having an inclination with respect to the friction surface, an angle of the inclination of the slant surface changing in a direction in which the friction pad is moved with the disc rotor due to the friction force therebetween.

In the wedge type self-servo mechanism, the above-indicated slant surface of the friction pad has a constant angle of inclination with respect to the friction surface of the disc rotor over the entire length of the friction pad in the above-indicated direction of movement thereof. The friction pad can be comparatively easily moved with the disc rotor when the slant surface has a comparatively small angle of inclination with respect to the friction surface. That is, the force that should be overcome for the friction pad to move with the disc rotor is relatively small when the angle of inclination of the slant surface is relatively small. It is also noted that the rate of increase of the friction force between the friction pad and the disc rotor, namely, the rate of increase of the wheel braking force increases with an increase in the inclination angle of the slant surface of the friction pad, in the wedge type self-servo mechanism. In other words, the rate of increase of the self-servo effect increases with an increase in the inclination angle. Therefore, where the inclination angle is constant and relatively large, the movement of the friction pad with the disc rotor cannot be easily or smoothly initiated, and the self-servo effect cannot be easily initiated. In addition, the relatively large inclination angle causes an excessively high rate of increase of the self-servo effect. Thus, the constant inclination angle of the slant surface of the friction pad makes it difficult to achieve the two objectives, that is, easy initiation of the self-servo effect, and prevention of an excessively high rate of increase of the self-servo effect.

In view of the above, the braking system according to the feature (22) was developed in an effort to achieve the above-indicted to objectives.

In this braking system, the angle of inclination of the slant surface of the friction pad with respect to the friction surface of the disc rotor changes in the direction of the movement of the friction pad with the disc rotor.

According to the above arrangement, the slant surface may have different angles of inclination at different portions thereof. These portions include a portion influencing the moment of initiation of the self-servo effect, a portion substantially influencing the continuation of the self-servo effect, and a portion influencing the prevention of an excessively high rate of increase of the self-servo effect. Accordingly, the present arrangement makes it possible to achieve the above-indicated two objectives at the same time, namely, easy initiation of the self-servo effect, and prevention of the excessively rapid increase of the self-servo effect.

In the braking system according to the feature (22), the entire area or a selected area of the surface of the friction pad for contact with the pressing member is inclined with respect to the friction surface of the disc rotor. Where the slant surface having a changing angle of inclination is provided by the entire area of the contact surface of the friction pad, the slant surface may consist of a single curved surface, a plurality of mutually connected curved surfaces, or a plurality of mutually connected straight surfaces. For instance, the slant surface consists of a single part-cylindrical surface, a plurality of mutually connected part-cylindrical surfaces, or a plurality of connected straight surfaces which are inclined with respect to each other. Where the selected area of the contact surface of the friction pad is inclined, the other area is parallel to the friction surface of the disc rotor and which is inclined with respect to the slant surface. In this case, the selected area may consist of a single straight surface, since the non-inclined area which is inclined by 0° with respect to the friction surface cooperates with this single straight surface to provide the slant surface having two different angles of inclination with respect to the friction surface of the disc rotor.

The slant surface of the friction pad according to the above feature (22) may be considered to function as the mechanism for mechanically controlling a rate of change of the self-servo effect of the self-servo mechanism with a change in the drive force of the electric motor, according to the feature (11) described above.

(23) An electrically operated braking system according to claim (22), wherein said slant surface has a first portion, a second portion whose angle of inclination with respect to the friction surface of the disc rotor is larger than that of the first portion, and a third portion whose angle of inclination is smaller than that of the second portion, the first, second and third portions being arranged in a direction opposite to the direction of movement of the disc rotor with the disc rotor.

In the braking system according to the above feature (23), the pressing member comes into contact with the first, second and third portions of the slant surface as the friction force between the friction pad and the disc rotor increases. The first portion is formed to permit the initiation of the self-servo effect. That is, the angle of inclination of the first portion is made smaller than that of the second portion, to facilitate the initiation of the movement of the friction pad with the disc rotor, to permit the initiation of the self-servo effect. Further, the second portion whose angle of inclination is larger than that of the first portion assures a sufficient degree of the self-servo effect, and the third portion whose angle of inclination is smaller than that of the second portion prevents an excessively high rate of increase of the self-servo effect.

The angle of inclination of the first portion may be zero, and the angle of inclination of the third portion may be equal to that of the first portion or may be zero.

(24) An electrically operated braking system according to any one of the features (9), (10) and (19) through (24), wherein the motor-driven disc brake includes a pair of friction pads disposed on opposite sides of the disc rotor, respectively, one of the friction pads being movable with the disc rotor due to the friction force therebetween, while the other of the friction pads being immovable with the disc rotor due to the friction force, and wherein the pad pressing mechanism includes a caliper extending over a periphery of the disc rotor and movable in the direction intersecting the friction surface, the caliper comprising a reaction portion engageable with the above-indicated other of the friction pads, and a presser portion for pressing the above-indicated one of the friction pads against the friction surface, the pad pressing mechanism further including a presser rod which is supported by the presser portion such that the presser rod is movable by the drive force of the electric motor in the direction intersecting the friction surface, the caliper functioning as the pressing member for the above-indicated other of the friction pads, while the presser rod functioning as the pressing member for the above-indicated one of the friction pads.

(25) An electrically operated braking system according to any one of the features (9), (10) and (19) through (24), wherein the motor-driven disc brake includes a pair of friction pads disposed on opposite sides of the disc rotor, respectively, one of the friction pads being movable with the disc rotor due to the friction force therebetween, while the other of the friction pads being immovable with the disc rotor due to the friction force, and wherein the pad pressing mechanism includes a caliper extending over a periphery of the disc rotor and movable in the direction intersecting the friction surface, the caliper comprising a reaction portion engageable with the one of the friction pads, and a presser portion for pressing the above-indicated other of the friction pads against the friction surface, the pad pressing mechanism further including a presser rod which is supported by the presser portion such that the presser rod is movable by the drive force of the electric motor in the direction intersecting the friction surface, the caliper functioning as the pressing member for the above-indicated one of the friction pads, while the presser rod functioning as the pressing member for the other of the friction pads.

In the wedge type self-servo mechanism, the presser rod may be adapted to contact the above-indicated one friction pad which is movable with the disc rotor, as in the braking system according to the feature (24). However, the movement of this one friction pad with the disc rotor causes the same friction pad to slide on the presser rod. This sliding movement may cause generation of a force which disturbs smooth operation of the presser rod or undesired deformation of the presser rod.

In the braking system according to the above feature (25) wherein the presser rod is adapted to contact the other friction pad which is immovable with the disc rotor, there does not arise such a sliding movement of this other friction pad relative to the presser member during activation of the self-servo effect. In this respect, the braking system according to the feature (25) assures normal operation of the self-servo mechanism.

(26) An electrically operated braking system according to claim 1, wherein the electric motor has a non-energized off state, a first energized state for forward rotation thereof, and a second energized state for reverse rotation thereof, and the pressing member is moved to press the friction pad toward the friction surface of the disc rotor when the electric motor is placed in the first energized state, and wherein the motor control device controls the electric motor such that an actual value of a pressing force by which the friction pad is forced against the friction surface is equal to a desired value, the electrically operated braking system further comprising insufficient increase preventing means for preventing a shortage of increase of the actual value of the pressing force by locking the pressing member against a reaction force transferred from the friction pad to the pressing member, when the actual value is required to be increased during operation of the self-servo mechanism.

While the pad pressing mechanism is in operation with the electric motor being placed in the first energized state, the self-servo effect provided by the self-servo mechanism is theoretically increased at a predetermined rate, and the actual pressing force of the friction pad is theoretically increased at a predetermined rate. However, the present inventors found a phenomenon that the self-servo effect and the actual pressing force of the friction pad will not be increased after the self-servo effect and the actual pressing force has been increased to given values.

The above phenomenon is considered to arise for the following reason:

An increase in the actual pressing force of the friction pad will cause an increase in the reaction force which the electric motor receives from the friction pad through the pressing member. On the other hand, the drive torque that can be produced by the electric motor is limited. Accordingly, when the reaction force received from the friction member becomes larger than the upper limit of the drive torque of the motor, the motor is operated in the reverse direction by the reaction force of the friction pad, and the pressing member is moved in the direction away from the friction pad, so that the self-servo effect and the actual pressing force will no longer be increased. In other words, the motor is operated in the reverse direction after the self-servo effect has increased to a given upper limit and the reaction force of the friction pad has consequently increased to a given upper limit. Therefore, the reverse operation of the motor does not permit the self-servo effect and the actual pressing force to be increased after they have exceeded the given limits.

The present also found a characteristic of the self-servo mechanism that the friction pad can function as a wedge for increasing the actual pressing force while the pressing member is held in the same position, that is, even while the pressing member is not able to continue to advance the friction pad toward the disc rotor.

In the light of this finding of the characteristic of the self-servo mechanism, the braking system according to the above feature (26) was developed in an effort to solve the problem that the actual pressing force of the friction pad acting on the disc rotor can no longer be increased by the self-servo effect of the friction pad.

In this braking system, the insufficient increase preventing means is provided to prevent the shortage of increase (insufficient rate of increase) of the actual pressing force when the actual pressing force is required to be increased during operation of the self-servo mechanism.

The motor control device may be adapted to control the electric motor in an open-loop control fashion according to an input command signal, or in a closed-loop control fashion on the basis of the detected actual pressing force as compared with a value represented by the input command signal.

The insufficient increase preventing means may be adapted to lock the pressing member by suitable mechanical means or by suitable electromagnetic or electrical means.

(27) An electrically operated braking system according to the feature (26), wherein the electric motor consists of an ultrasonic motor, and the motor control device comprises de-energizing means for de-energizing the ultrasonic motor for thereby enabling the ultrasonic motor to produce a holding torque for locking the presser member, the insufficient increase preventing means comprising the de-energizing means.

The ultrasonic motor has a known characteristic that the holding torque produced when the motor is off or de-energized is larger than the drive torque produced when it is energized.

The present inventors found that this characteristic of the ultrasonic motor can be combined with the characteristic of the self-servo mechanism that the actual pressing force of the friction pad is increased by the wedge effect of the friction pad if the pressing member can be held at the same position, that is, if the motor can be maintained at the same angular or rotary position.

The braking system according to the feature (27) was developed in the light of the above-indicated combination of the characteristics of the ultrasonic motor and the self-servo mechanism. In this braking system, the motor control device comprises the de-energizing means for turning off the ultrasonic motor for thereby enabling the motor to produce the holding torque for locking the pressing member, when it is required to increase the actual pressing force.

In the braking system according to the feature (27), the actual pressing force which has been increased to the upper limit by the drive torque of the ultrasonic motor is further increased by utilizing the holding torque of the ultrasonic motor, so that the wheel braking force can be increased to a value which is larger than the maximum drive torque of the ultrasonic motor. Hence, the required size and weight of the ultrasonic motor can be reduced, whereby the required size and weight of the disc brake can be accordingly reduced.

Since the actual pressing force of the friction pad is increased by holding the ultrasonic motor in its de-energized off state for a given period of time, the required amount of power consumption can be reduced.

The ultrasonic motor may be of travelling-wave (progressive-wave) type or standing-wave type.

(28) An electrically operated braking system according to the feature (27), wherein the de-energizing means comprises means for de-energizing the ultrasonic motor when an amount of increase of the actual value of the pressing force is smaller than a predetermined first threshold while the ultrasonic motor is placed in the first energized state.

In the above braking system, the ultrasonic motor is placed in the de-energized off state when the amount of increase of the actual pressing force becomes smaller than the predetermined first threshold while the motor is in the first energized state. This arrangement is effective to prevent unnecessary de-energization of the ultrasonic motor, by permitting the de-energization only when the amount of increase of the actual pressing force is detected to be smaller than the threshold value.

The predetermined first threshold value may be a normal value of the amount of increase of the actual pressing force, which is expected while the ultrasonic motor is placed in the first energized state and while the drive torque produced by the motor is not smaller than the reaction force received from the friction pad. The first threshold value may be smaller than this normal value, for instance, zero. Where the first threshold value is zero, the ultrasonic motor is de-energized when the actual pressing force begins to be reduced.

(29) An electrically operated braking system according to the feature (28), wherein said insufficient increase preventing means includes (a) a sensor for detecting a value relating to the actual pressing force, and (b) increase amount detecting means for obtaining an amount of increase of the actual pressing force on the basis of an output signal of the sensor.

In the above braking system, the moment of transition of the ultrasonic motor from the first energized state to the non-energized state is determined on the basis of the output signal of the sensor, so that the moment of transition can be controlled with high accuracy in relation to the actual pressing force of the friction pad.

The sensor may be adapted to directly detect the actual pressing force, or any other parameters which reflect or relate to the actual pressing force. These parameters include the friction force between the friction pad and the disc rotor, the wheel braking force, and the deceleration value of the vehicle.

(30) An electrically operated braking system according to the feature (29), wherein the motor control device further includes first control means for placing the ultrasonic motor in the first energized state after the motor is placed in the de-energized off state by the insufficient increase preventing means, when the amount of increase of the actual pressing force becomes smaller than a predetermined second threshold.

The actual pressing force may not be increased as desired even after the ultrasonic motor is de-energized with the amount of the actual pressing force becoming smaller than the first threshold. For the actual pressing force to be increased by utilizing the holding torque of the ultrasonic motor, a clearance should not exist between the pressing member and the friction pad. However, such a clearance may exist for some reason or other. To deal with this case, the ultrasonic motor is brought back to the first energized state from the de-energized state when the amount of increase of the actual pressing force becomes smaller than the second threshold after the motor is once placed in the de-energized state by the insufficient increase preventing means. According to this arrangement, a clearance if it exists between the friction pad and the pressing member is eliminated by the advancing movement of the pressing member by the forward operation of the ultrasonic motor placed in the first energized state, so that the actual pressing force can be increased as needed.

Accordingly, the braking system according to the feature (30) assures adequate operation of the self-servo mechanism.

The second threshold value may be a normal value of the amount of increase of the actual pressing force, which is expected while the self-servo mechanism is normally operating. The second threshold value may be smaller than this normal value, for example, zero. The second threshold value may be equal to or different from the first threshold value.

(31) An electrically operated braking system according to the feature (29), wherein the motor control device further includes second control means for placing the ultrasonic motor in the first energized state after the motor is placed in the de-energized off state by the insufficient increase preventing means, when a predetermined time has passed after the ultrasonic motor is placed in the de-energized state, irrespective of the amount of increase of the actual pressing force after the motor is placed in the de-energized state.

In the above braking system, the ultrasonic motor is brought back to the first energized state when the predetermined time has passed after the motor is once placed in the de-energized state with the amount of increase of the actual pressing force becoming smaller than the first threshold. In this arrangement, too, a clearance if it exists between the friction pad and the pressing member after the motor is once de-energized is eliminated, so that the self-servo mechanism can operate to achieve the desired self-servo effect.

In the present braking system, the ultrasonic motor is returned to the first energized state irrespective of the amount of increase of the actual pressing force after the motor is once de-energized with the amount of increase of the actual pressing force becoming smaller than the first threshold. Therefore, the braking system does not require a device for detecting the amount of increase of the actual pressing force, which device is required in the system according to the feature (30). Consequently, the braking system is simplified, in particular, in the software for controlling the ultrasonic motor.

In this braking system, the ultrasonic motor is brought to the first energized state even where the motor is required to be kept in the de-energized state for increasing the actual pressing force. In this case, the amount of increase of the actual pressing force becomes smaller than the predetermined first threshold, so that the motor is de-energized by the insufficient increase preventing means, for enabling the motor to produce the holding force for locking the presser member to thereby increase the actual pressing force. Therefore, there arises no problem in this case.

The predetermined time used by the second control means may be a cycle time or control period of a control routine which is executed by a computer of the motor control device to control the ultrasonic motor for activating the pad pressing mechanism. The cycle time or control period may be a predetermined constant value or a variable. In this case, the motor control means may be adapted such that if the motor is de-energized by the first control means in a given cycle of execution of the control routine as a result of the amount of increase of the actual pressing force being reduced below the predetermined first threshold, the second control means places the motor in the first energized state in the next cycle of execution of the control routine.

(32) An electrically operated braking system according to the feature (27), wherein the de-energizing means comprises means for de-energizing the ultrasonic motor depending upon whether an operation of the self-servo mechanism has been initiated.

In the above braking system, the ultrasonic motor is de-energized irrespective of whether the amount of increase of the actual pressing force is smaller than the predetermined first threshold while the motor is placed in the first energized state.

In this braking system, the motor can be de-energized to produce the holding torque, before the amount of increase of the actual pressing force is reduced below the first threshold while the motor is in the first energized state.

(33) An electrically operated braking system according to the feature (32), wherein the means for de-energizing the ultrasonic motor depending upon an operation of the self-servo mechanism has been initiated comprises a sensor for detecting a value relating to the actual value of the pressing force, and self-servo effect monitoring means for determining, on the basis of an output signal of the sensor, that the operation of the self-servo mechanism has been initiated, if each of at least one predetermined condition is satisfied, the above-indicated at least one predetermined condition including a condition that the amount of increase of the actual value of the pressing force exceeds a predetermined third threshold while the ultrasonic motor is placed in the first energized state.

The braking system according to the feature (33) was developed based on a finding that the amount or rate of increase of the actual pressing force is larger or higher when the self-servo mechanism is in operation than when the self-servo mechanism is not in operation. In this braking system, the self-servo effect monitoring means determines that the operation of the self-servo mechanism has been initiated, when all of the predetermined condition or conditions is satisfied. This predetermined condition includes the condition that the amount of increase of the actual pressing force while the motor is in the first energized state is larger than the predetermined third threshold. Therefore, the motor is de-energized when this condition is satisfied together with the other predetermined condition or conditions if any.

The third threshold value may be a normal value of the amount of increase of the actual pressing force, which is expected while the self-servo mechanism is in operation. The third threshold value may be smaller than this normal value.

(34) An electrically operated braking system according to the feature (33), wherein the above-indicated at least one predetermined condition further includes a condition that the actual pressing force exceeds a predetermined reference value.

The disc brake having the self-servo effect inhibiting mechanism according to the feature (5) described above may be designed to initiate the operation of the self-servo mechanism when the actual pressing force becomes larger than a predetermined limit. In this case, the above-indicated predetermined reference value used according to the above feature (34) may be equal to or larger than the predetermined limit.

The braking system according to the feature (34) permits higher accuracy of detection of the initiation of the self-servo effect, than in the case where the initiation of the operation of the self-servo mechanism is determined when the amount of increase of the actual pressing force exceeds the predetermined third threshold while the ultrasonic motor is in the first energized state.

(35) An electrically operated braking system according to the feature (26), wherein the insufficient increase preventing means includes a torque transmission mechanism provided between the electric motor and the pressing member, so as to permit a torque to be transmitted from the motor to the pressing member and inhibit the torque from being transmitted from the pressing member to the motor, for thereby locking the pressing member.

In this braking system, the reaction force received by the pressing member from the friction pad cannot would not be transferred to the motor through the torque transmission mechanism even if the reaction force became larger than the drive torque of the motor. In this arrangement wherein the torque transmission mechanism is adapted to lock the pressing member against the reaction force from the friction pad, the motor is prevented from being operated in the reverse direction by the reaction force.

The electric motor in the braking system according to the feature (35) may be an ultrasonic motor, a DC motor or any other motor.

(36) An electrically operated braking system according to the feature (35), wherein the pad pressing mechanism includes a motion converting mechanism comprising a rotatable member which is disposed between the electric motor and the pressing member and which is rotated by the electric motor, and a linearly movable member which is linearly movable with the pressing member, the rotatable and linearly movable members being operatively connected to each other such that a rotary motion of the rotatable member is converted into a linear motion of the linearly movable member, and wherein the torque transmission mechanism is disposed between the electric motor and the rotatable member, to permit the torque to be transmitted from the electric motor to the rotatable member and inhibit the torque from being transmitted from the rotatable member to the electric motor.

(37) An electrically operated braking system according to the feature (35) or (36), wherein the pad pressing mechanism includes a rotatable member which is disposed between the electric motor and the pressing member and which is rotated by the electric motor, and a linearly movable member which is linearly movable with the pressing member, the rotatable member and linearly movable members being operatively connected to each other such that a rotary motion of the rotatable member is converted into a linear motion of the linearly movable member, and wherein the torque transmission mechanism comprises a worm which is disposed between the electric motor and the rotatable member and which is rotated by the electric motor and a worm wheel which is rotated by the worm.

In the braking system according to the feature (37), the torque transmission mechanism is simple in construction using the worm and the worm wheel.

(38) An electrically operated braking system according to any one of the features (35) through (37), wherein the motor control device includes reverse torque transmission inhibiting means for placing the electric motor in the non-energized state while the transmission of the torque from the rotatable member to the electric motor is inhibited by the transmission mechanism.

In the braking system according to the feature (38), the electric motor is placed in the non-energized state while the transmission of the torque from the rotatable member to the electric motor is inhibited by the torque transmission mechanism, that is, while it is not necessary to place the electric motor in the energized state.

(39) An electrically operated braking system according to the feature (38), wherein the reverse torque transmission inhibiting means includes self-servo effect inhibition control means for placing the electric motor in the non-energized state when the operation of the self-servo mechanism is initiated.

In the braking system according to the feature (39), the electric motor is de-energized when the self-servo mechanism is in operation. In this respect, it is noted that the operation of the self-servo mechanism results in a high possibility that the transmission of the torque in the reverse direction from the pressing member toward the electric motor is inhibited by the torque transmission mechanism, that is, a high possibility that the energization of the electric motor is not needed. Therefore, the self-servo effect inhibition control means according to the feature (39) is effective to prevent unnecessary consumption of electric power by the electric motor.

(40) An electrically operated braking system according to the feature (39), wherein the self-servo effect initiation control means comprises (a) a sensor for detecting a value relating to the actual pressing force of the friction pad, (b) self-servo effect monitoring means for determining, on the basis of an output signal of the sensor, that the operation of the self-servo mechanism has been initiated, if each of at least one predetermined condition is satisfied, the above-indicated at least one predetermined condition including a condition that the amount of increase of the actual value of the pressing force exceeds a predetermined second threshold while the ultrasonic motor is placed in the first energized state.

(41) An electrically operated braking system according to any one of the features (1) through (40), wherein the motor control device comprises (a) at least one information sensor including at least one of an operation information for obtaining information relating to manipulation of the vehicle by an operator of the vehicle, a vehicle state sensor for obtaining information relating to a running state of the vehicle, and a wheel state sensor for obtaining information relating to a state of the wheel of the vehicle, and (b) pressing force determining means for determining a desired value of the pressing force of the friction pad on the basis of an output signal of each of the above-indicated at least one information sensor, and (c) a controller for controlling the electric motor such that an actual value of the pressing force coincides with the desired value determined by the pressing force determining means.

(42) An electrically operated braking system according to any one of the features (1) through (41), wherein the motor control device comprises (a) a primary brake control device for controlling the electric motor to operate the motor-driven disc brake as a primary brake of the vehicle upon operation of a primary brake operating member, and (b) a parking brake control device for controlling the electric motor to operate the motor-driven disc brake as a parking brake of the vehicle upon operation of a parking brake operating member.

(43) An electrically operated braking system according to the feature (42), wherein the primary brake control control device comprises (a) at least one information sensor including at least one of an operation information for obtaining information relating to manipulation of the vehicle by an operator of the vehicle, a vehicle state sensor for obtaining information relating to a running state of the vehicle, and a wheel state sensor for obtaining information relating to a state of the wheel of the vehicle, and (b) pressing force determining means for determining a desired value of the pressing force of the friction pad on the basis of an output signal of each of the above-indicated at least one information sensor, and (c) a primary brake controller for controlling the electric motor such that an actual value of the pressing force coincides with the desired value determined by the pressing force determining means.

(44) An electrically operated braking system according to the feature (42), wherein the parking brake control device comprises (a) a parking brake sensor for detecting an operation of the parking brake operating member for holding the vehicle stationary, (b) a pressing force determining means for determining a desired value of the pressing force of the friction pad on the basis of an output signal of the parking brake sensor sensor, and (c) a parking brake controller for controlling the electric motor such that an actual value of the pressing force coincides with the desired value determined by the pressing force determining means.

(45) An electrically operated braking system according to any one of the features (1) through (44), further comprising a pressing force sensor for directly detecting an actual value of the pressing force of the friction pad generated by the electric motor, and wherein the motor control device includes retracted position control means connected to the pressing force sensor, for controlling a retracted position of the pressing member which is spaced from the friction pad, when the disc brake is not in operation, the retracted position control means including (a) means for determining, on the basis of an output signal of the pressing force sensor, a position at which pressing of the friction pad by the pressing member is initiated or terminated, (b) means for energizing the electric motor to retract the pressing member by a predetermined distance from the determined position in a direction away from the friction pad, and (c) de-energizing the electric motor when the pressing member is retracted to the determined position.

(46) An electrically operated braking system comprising:
a motor-driven disc brake including (a) an electric motor as a drive force for braking a wheel of an automotive vehicle, (b) a disc rotor having a friction surface and rotating with the wheel, (c) a friction pad movable for contact with the friction surface to restrict rotation of the disc rotor, (d) a pad support mechanism for supporting the friction pad such that the friction pad is movable in a direction intersecting the friction surface of the disc rotor, (e) a pad pressing mechanism comprising the electric motor and a pressing member, the electric motor producing a drive force for moving the pressing member to force the friction pad against the friction surface of the disc rotor, and wherein the electric motor has a non-energized off state, a first energized state for forward rotation thereof, and a second energized state for reverse rotation thereof, the pressing member being moved to press the friction pad toward the friction surface of the disc rotor when the electric motor is placed in the first energized state;
a pressing force sensor for directly detecting an actual value of a pressing force by which the friction pad is forced against the friction surface by the pressing member; and
a motor control device connected to the electric motor and the pressing force sensor, for controlling the electric motor on the basis of an output signal of the pressing force sensor such that the actual value of the pressing force represented by the output signal is equal to a desired value,
and wherein the motor control device includes retracted position control means connected to the pressing force sensor, for controlling a retracted position of the pressing member which is spaced from the friction pad, when the disc brake is not in operation, the retracted position control means including (i) means for determining, on the basis of the output signal of the pressing force sensor, a position at which pressing of the friction pad by the pressing member is initiated or terminated, (ii) means for energizing the electric motor to retract the pressing member by a predetermined distance from the determined position in a direction away from the friction pad, and (iii) de-energizing the electric motor when the pressing member is retracted to the determined position.

In the braking system according to the feature (46), the retracted position of the pressing member when the disc brake is not in operation is controlled depending upon the actual thickness of the friction pad. This arrangement prevents the friction pad from being located so close to the disc rotor as to cause dragging of the friction pad with the disc rotor when the disc brake is not in operation, and also prevents an excessively large amount of gap between the friction pad and the disc rotor when the disc brake is not in operation. When the gap between the friction pad and the disc brake is excessively large, the disc brake suffers from a delay in providing a braking effect.

In the above braking system, the pressing force sensor for detecting the actual value of the pressing force is used to detect the position of the pressing member. Thus, the braking system does not require two sensors for detecting the actual pressing force and the position of the pressing member, respectively.

Further, the retracted position of the pressing member is determined depending upon its position at which the pressing of the friction pad by the pressing member is initiated or terminated, that is, depending upon the position at which the pressing member comes into abutting contact with the friction pad or is moved apart from the friction pad. This arrangement permits accurate determination of the retracted position of the pressing member without an influence by a variation in the amount of elastic deformation of the friction pad, contrary to an arrangement wherein the retracted position is determined depending upon the position of the pressing member at which the pressing member is fully advanced to press the friction pad against the disc rotor with the maximum pressing force.

(47) An electrically operated braking system comprising a motor-driven disc brake according to any one of the features (1) through (46), a braking force sensor for detecting a braking force generated by the disc brake to brake the wheel of the vehicle, and a motor control device for controlling the electric motor on the basis of the braking force detected by the braking force sensor, such that an actual value of the braking force is equal to a desired value.

In an electrically operated braking system using an electric motor as a drive source, it is desirable to control the electric motor on the basis of the wheel braking force based on the actual friction force generated between the friction pad and the disc rotor, so that the wheel braking force can be accurately controlled irrespective of a variation in the coefficient of friction between the friction pad and the disc rotor.

In view of the above desirability, the braking system according to the feature (47) was developed in an effort to control the actual wheel braking force to the desired value in a feedback fashion, irrespective of a variation in the friction coefficient of the friction pad and the disc rotor.

In the braking system according to the feature (47), the electric motor is controlled while monitoring the actual wheel braking force, so that the actual wheel braking force is controlled to coincide with the desired value, irrespective of the variation in the friction coefficient of the friction pad and the disc rotor.

For example, the braking force sensor is adapted to detect an amount of strain or deformation of a selected member of the disc brake, which amount is relatively accurately proportional to the actual wheel braking force.

The motor control device may be adapted to feedback control the electric motor on the basis of the actual wheel braking force during operation of the disc brake, irrespective of whether the self-servo mechanism is in operation or not. Alternatively, the motor control device may be adapted to effect the feedback control of the motor only while the self-servo mechanism is in operation, or only while the self-servo mechanism is not in operation.

(48) A motor-driven disc brake comprising: a disc rotor having a friction surface and rotating with a wheel of an automotive vehicle; a friction pad movable for contact with the friction surface of the disc rotor to restrict rotation of the disc rotor; and a pad pressing mechanism including an electric motor whose drive force is transmitted to the friction pad to force the friction pad against the disc rotor, and wherein the pad pressing mechanism further includes a lever comprising (a) a connecting portion at which the lever is connected to a stationary member, pivotally about an axis intersecting an axis of rotation of the disc rotor, (b) an input portion at which the lever receives the drive force of the electric motor, and (c) an engaging portion which engages a back surface of the friction pad to transmit the drive force to the friction pad, wherein the connecting portion, the input portion and the engaging portion are positioned relative to each other such that the drive force received from the electric motor is boosted by the lever, so that the boosted drive force is applied to the friction pad.

In the motor-driven disc brake according to the feature (48), there is provided a simple boosting mechanism including the lever between the electric motor and the friction pad. This simple boosting mechanism whose major part is constituted by the lever permits the disc brake to produce a wheel braking force which is sufficiently larger than the drive force produced by the electric motor.

The above disc brake may include the temperature rise restricting means according to the features (17) and (18).

(49) An electrically operated braking system according to any one of the features (1) through (47), wherein the electric motor includes a stator, a rotor and a motor housing in which the stator and the rotor are accommodated, and the pad pressing mechanism includes: (a) a rotatable member rotatable about an axis thereof by the electric motor; (b) a linearly movable member disposed rearwardly of the pressing member such that the linearly movable member is movable in the direction intersecting the friction surface of the disc rotor; (c) a motion converting mechanism for converting a rotary motion of the rotatable member into a linear motion of the linearly movable member, to move the pressing member for forcing the friction pad against the friction surface; (d) a caliper including a portion functioning as the motor housing, and supporting the linearly movable member such that the linearly movable member is linearly movable; and (e) a rotary support mechanism for supporting the rotatable member rotatably relative to the caliper, the rotary support mechanism enabling the caliper to receive as a thrust load a reaction force from the rotatable member while the friction pad is forced against the friction surface.

In the braking system according to the above feature (49), the electric motor may be an ultrasonic motor or a wound-rotor type motor.

The linearly movable member may be adapted to be engageable directly with the back surface of the friction pad, or adapted to move another member (e.g., presser rod as described below) which is engageable with the back surface of the friction pad.

The caliper may consist of a body portion (which may include a presser portion, a reaction portion and a connecting portion, as described below) and the housing portion which functions as the motor housing. These body and housing portions may be separate parts which are bolted or screwed to each other or otherwise fixed to each other to provide the caliper. Alternatively, the caliper is a one-piece structure consisting of the body and housing portions which are formed integrally with each other. The caliper may be a floating or fixed type. In the disc brake using the floating caliper, the disc rotor generally has opposite friction surfaces against which two friction pads are forced by the above-indicated the pressing member and the caliper, respectively. Described more specifically, the reaction force which one of the friction pads receives from the disc rotor is transmitted by the caliper to the other friction pad.

(50) An electrically operated braking system according to the feature (49), wherein the rotary support mechanism includes a support structure for reducing an influence of at least one of a first reaction force and a second reaction force upon at least one of the rotatable member and the electric motor, the first reaction force being received as an offset load by the rotatable member from the linearly movable member during an operation of the motor-driven disc brake, and the second reaction force being received by the caliper from the rotatable member during the operation of the motor-driven disc brake.

A braking system against which the braking system according to the above feature (50) was developed to provide an improvement is disclosed in JP-A-8-284980. In this braking system disclosed in this publication, the rotary support mechanism includes one radial bearing and one thrust bearing for supporting the rotatable member rotatably relative to the caliper. These radial and thrust bearings receive a radial load and a thrust load of the rotatable member, respectively. The thrust bearing is disposed between the rotatable member and the housing portion of the caliper which functions as the motor housing. Further, the body portion of the caliper which is relatively near the friction pad, and the housing portion of the caliper are separate parts which are screwed to each other.

When the braking system of the above-identified publication is in operation, the disc brake is likely to be influenced by a first reaction force received as an offset load by the rotatable member from the linearly movable member, and a second reaction force received by the caliper from the rotatable member.

Described in detail, a reaction force is transferred from the friction pad directly to the linearly movable member, or indirectly to the linearly movable member through the pressing member such as a presser rod. At the same time, a reaction force is transferred from the linearly movable member to the rotatable member, while a reaction force is transferred from the rotatable member to the caliper.

On the other hand, a mounting bracket is generally provided being fixed to the vehicle body in a cantilever form, and a friction force generated between the disc rotor and the friction pad causes a moment to act on the mounting bracket, thereby causing displacement of the mounting bracket and resulting displacement of the caliper. It is also noted that the caliper is not completely symmetrical with respect to a line parallel to the direction in which it receives the reaction force from the friction pad, so that a pressing force by which the friction pad is forced against the disc rotor causes a moment to act on the mounting bracket, causing elastic deformation of the caliper. In some case, the accuracy of relative positioning of the friction pad, linearly movable member, rotatable member and caliper is not sufficiently high.

For the above reasons, the line of action of the reaction force which is received by the linearly movable member from the friction pad tends to be offset, misaligned or inclined with respect to the nominal axis of the linearly movable member, whereby the line of action of the reaction force which is received by the rotatable member from the linearly movable member is also inclined with respect to the nominal axis of rotation of the rotatable member. Even though the line of action of the reaction force from the friction pad is not inclined with respect to the nominal axis of the linearly movable member, the line of action of the reaction force from the linearly movable member is inclined with respect to the axial of rotation of the rotatable member.

Thus, the reaction force from the linearly movable member acts on the rotatable member as an offset load whose line of action is offset from or inclined with respect to the nominal axis of the rotatable member.

In the braking system disclosed in the above-identified publication, however, only one radial bearing is provided between the rotatable member and the caliper, so that an offset load acting on the rotatable member tends to cause the axis of the rotatable member to be inclined with respect to the caliper. The inclination of the axis of the rotatable member results in an increase in a resistance to rotation of the rotatable member, namely, unstable rotation of the rotatable member.

In the braking system of the above-identified publication, the disc brake uses an ultrasonic motor having a stator fixed to the motor housing, and a rotor coaxially connected to the rotatable member for rotation therewith. In this arrangement, an inclination of the axis of rotation of the rotatable member with respect to the caliper (including the housing portion) causes an inclination of the axis of the rotor, leading to uneven distribution of contact pressure between the rotor and the stator in their circumferential direction. Consequently, the inclination of the rotatable member may cause abnormal transmission of the oscillation of the stator to the rotor, resulting in significant reduction in the drive torque produced by the ultrasonic motor. This problem is not limited to the ultrasonic motor, and may be encountered in an electric motor of the type in which the stator and the rotor are disposed with an air gap left therebetween.

It will be understood from the foregoing explanation that the disc brake disclosed in the publication JP-A-8-284980 suffers from the problem that the rotating resistance of the rotatable member is undesirably increased by its inclination with respect to the caliper due to the reaction force (first reaction force) received from the linearly movable member. This disc brake also suffers from the problem that the drive torque of the electric motor is undesirably reduced by the inclination of the rotor with respect to the stator.

In a motor-driven disc brake, it is generally desired that the friction force of the friction pad, namely, the braking force be highly responsive to an operation of the electric motor during an operation of the disc brake in an anti-lock or traction control fashion or for abrupt brake application to the vehicle. To meet this desire, that is, to improve the response of the braking force, it is considered to increase the rigidity of the caliper for minimizing its deformation due to the reaction force acting thereon, as well as to improve the operating response of the electric motor.

In the disc brake of the above-identified publication, however, the reaction force from the rotatable member acts on the motor housing through the thrust bearing, and the reaction force from the motor housing acts on the body portion of the caliper. Further, since the body portion and the housing portion of of the caliper are fixed to each other by screws or bolts by other fastening means, the reaction force is transmitted from the motor housing to the body portion of the caliper through the fastening means. Therefore, it is required to improve not only the rigidity of the body portion of the caliper but also the rigidity of the housing portion of the caliper, in order to improve the response of the disc brake. To increase the rigidity of the housing portion of the caliper, that is, the rigidity of the motor housing, the motor housing must be made of a steel material with a sufficiently large wall thickness. Accordingly, the size and weight of the motor housing tend to be increased, leading to increased size and weight of the disc brake as a whole. To improve the operating response of the disc brake, it is also required to minimize the amount of elongation of the fastening means for fastening the body and housing portions of the caliper.

It will be understood from the above description that the braking system disclosed in the above-identified publication suffers from a relatively large load acting on the motor housing, due to the reaction force (second reaction force) which is received by the body portion of the caliper through the motor housing from the rotatable member while the disc brake is in operation. Accordingly, the rigidity of the motor housing which is a part of the electric motor should be increased.

In the light of the above problem, the braking system according to the above feature (50) was developed in an effort to improve the rotary support mechanism for supporting the rotatable member of the motor-driven disc brake.

In the disc brake of the braking system according to the feature (50), the rotary support mechanism includes the support structure which is adapted to reduce an influence of one or both of the first reaction force and the second reaction force upon one or both of the rotatable member and the electric motor. The first and second reaction forces are generated during operation of the motor-drive disc brake, such that the first reaction force is received as an offset load by the rotatable member from the linearly movable member, while the second reaction force is received by the caliper from the rotatable member.

In this braking system, the operating response of the disc brake is improved even in the presence of the reaction force from the friction pad, owing to the support structure is effective to reduce the influence of the reaction force upon the rotatable member and/or the electric motor.

(51) An electrically operated braking system according to the feature (50), wherein the support structure includes a first structure for restricting an inclination of the axis of the rotatable member by the first reaction force during the operation of the motor-driven disc brake.

In this braking system, an increase in the rotating resistance of the rotatable member is prevented by the first structure of the support structure which is adapted to restrict the inclination of the rotation axis of the rotatable member by the first reaction force.

(52) An electrically operated braking system according to the feature (51), wherein the rotatable member is coaxially fixed to the rotor for rotation therewith, and the first structure includes a structure for restricting the inclination of the axis of the rotatable member to thereby restrict an inclination of an axis of the rotor with respect to an axis of the stator.

In this braking system, the inclination of the rotatable member with respect to the caliper (including the portion functioning as the motor housing) is restricted, and the inclination of the rotor with respect to the stator is restricted.

(53) An electrically operated braking system according to the feature (51) or (52), wherein the first structure includes a plurality of radial bearings for rotatably supporting the rotatable member, the radial bearings being spaced apart from each other in an axial direction of the rotatable member and receiving a radial load from the rotatable member.

In the braking system, the inclination of the rotatable member is restricted by the radial bearings of the first structure, which is relatively simple in construction.

(54) An electrically operated braking system according to the feature (53), wherein the structure of the first structure includes a plurality of bearings which rotatably support the rotatable member so as to receive a radial load from at least the rotatable member and which are spaced apart from each other in the axial direction of the rotatable member.

(55) An electrically operated braking system according to the feature (54), wherein the rotor is coaxially connected to the rotatable member for rotation therewith, and the rotatable member includes two axial portions one of which is located on one side of the rotor which is nearer to the friction pad and the other of which is located on the other side of the rotor which is remote from the friction pad.

(56) An electrically operated braking system according to the feature (55), wherein each of the plurality of bearings is mounted on either one of the two axial portions of the rotatable member.

(57) An electrically operated braking system according to the feature (55), wherein at least one of the plurality of bearings is mounted on the above-indicated one of the two axial portions of the rotatable member, and the rest of the plurality of bearings is mounted on the other axial portion.

(58) An electrically operated braking system according to any one of the features (54) through (57), wherein the plurality of bearings includes two bearings disposed adjacent to opposite ends of the rotatable member, respectively.

(59) An electrically operated braking system according to any one of the features (54) through (58), wherein the plurality of bearings include at least one radial bearing which rotatably supports the rotatable member and which receives the radial load from the rotatable member, and at least one radial thrust bearing which rotatably supports the rotatable member and which receives the radial load and the thrust load from the rotatable member.

In this braking system, the use of the at least one radial thrust bearing each receiving both the radial and thrust loads makes it possible to reduce the number of the bearings required.

(60) An electrically operated braking system according to according to any one of the features (50) through (59), wherein the support structure includes a second structure for inhibiting the second reaction force from being transmitted to the electric motor.

In this braking system, the second reaction force is not transmitted from the rotatable member to the electric motor, so that the operating response of the disc brake can be improved without having to increase the rigidity of the motor housing and the rigidity of the fastening means for connecting the body portion of the caliper and the portion of the caliper which functions as the motor housing.

(61) An electrically operated braking system according to the feature (60), wherein the rotatable member has a first surface which faces in an axial direction of the rotatable member from the friction pad toward the rotatable member and which transmits the second reaction force to the caliper, and the caliper has a second surface formed at a portion thereof between the portion thereof functioning as the motor housing and a portion thereof corresponding to the first surface, the second surface being opposed to the first surface in the axial direction of the rotatable member and receiving the second reaction force from the first surface, the second structure including the first and second surfaces and a bearing which is interposed between the first and second surfaces and between the rotatable member and the caliper such that the bearing rotatably supports the rotatable member so as to receive at least a thrust load from the rotatable member.

In this braking system, the operating response of the disc brake can be improved with a simple arrangement of the rotatable member and the caliper.

(62) An electrically operated braking system according to the feature (61), wherein the first surface of the rotatable member faces in a backward direction from the friction pad toward the rotatable member, while the second surface of the caliper faces in a frontward direction from the rotatable member toward the friction pad and is opposed to the first surface.

(63) An electrically operated braking system according to any one of the features (60) through (62), wherein the caliper includes a front portion which is located on one side of the second surface nearer to the friction pad and which consists of an integrally formed one-piece section.

In this braking system, the rigidity of the caliper can be easily made higher than that of the caliper whose front portion consists of two or more parts bolted or screwed to each other. Accordingly, the operating response of the disc brake can be improved.

(64) An electrically operated braking system according to any one of the features (49) through (63), wherein the electric motor is an ultrasonic motor including a stator adapted to generate a surface wave upon application of an ultrasonic oscillation thereto, and a rotor which is rotated with a friction force between the rotor and the stator.

In this braking system, the ultrasonic motor may be of a travelling-wave type or a standing-wave type.

(65) An electrically operated braking system according to the feature (50), wherein the support structure includes the first structure according to any one of the features (51) through (59), and the second structure according to any one of the features (60) through (63).

In this braking system, the support structure is effective to restrict not only an increase in the rotating resistance of the rotatable member during operation of the disc brake, but also a decrease in the drive torque of the electric motor, and is also effective to improve the operating response of the disc brake without having to increase the rigidity of the motor housing.

BRIEF DESCRIPTION OF DRAWINGS

The above and optional objects, features, advantages and technical and industrial significance of this invention will be better understood by reading the following detailed description of presently preferred embodiments of the invention, when considered in connection with the accompanying drawings, in which.

BEST MODE FOR CARRYING OUT THE INVENTION

Figure 1:
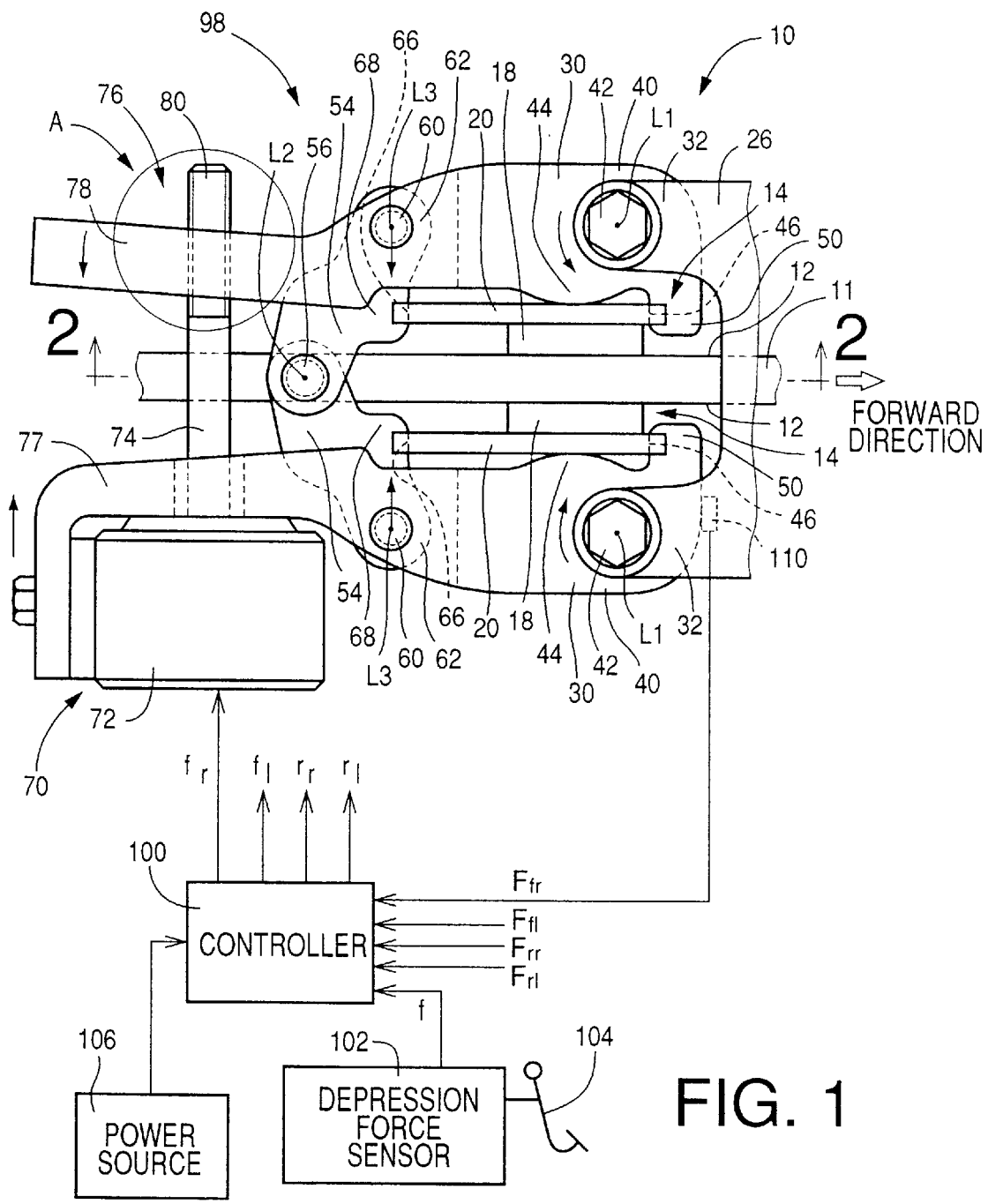
FIG. 1 is a view schematically showing an electrically operated braking system constructed according to a first embodiment of this invention, including a plan view of a motor-driven disc brake in the system.

Referring first to FIG. 1, there is shown an electrically operated braking system constructed according to a first embodiment of the present invention, for use on a 4-wheel automotive vehicle. The braking system has four motor-driven disc brakes for braking respective four wheels of the vehicle. In FIG. 1, only one of these four motor-driven disc brakes is shown generally at 10.

The disc brake 10 has a disc rotor 11 functioning as a rotary member which is rotated with the wheel to be braked. The disc rotor 11 has opposite friction surfaces 12, 12, while the disc brake 10 includes a pair of friction pads 14, 14 disposed opposite to the respective friction surfaces 12, 12 of the rotor 11. Each of these two friction pads 14 has a friction member 18, and a backing plate 20 which is fixed to the back surface of the friction member 18 and which is made of a steel material.

Adjacent to the disc rotor 11, there is disposed a mounting member in the form of an anchor member 26 secured to the body of the vehicle, such that the anchor member 26 extends over the periphery of the disc rotor 11 in the direction of an axis of the disc rotor 11, namely, in the vertical direction as seen in FIG. 1. To the opposite ends of the anchor member 26, there are pivotally connected a pair of levers 30, 30, such that the disc rotor 11 and the two friction pads 14, 14 are interposed between the two levers 30.

Figure 2:
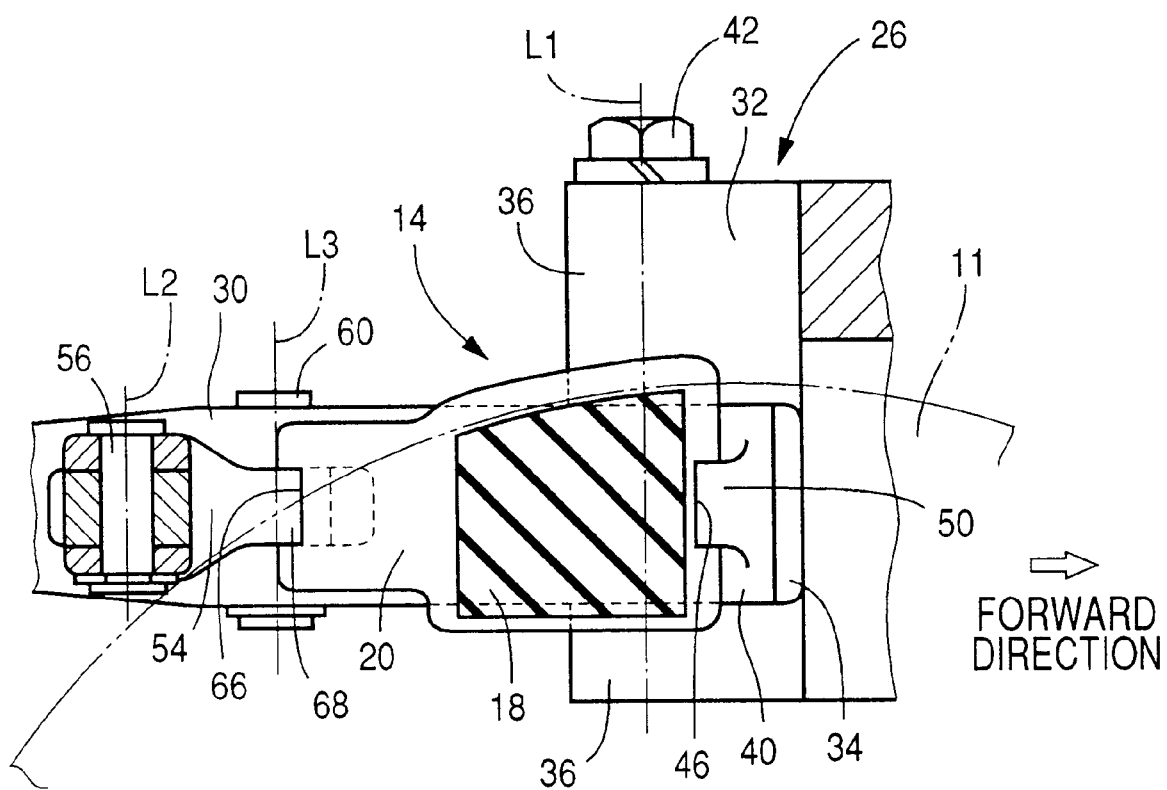
FIG. 2 is a cross sectional view taken along line 2—2 of FIG. 1.

Each lever 30 has a front end portion (right end portion as seen in FIG. 1) at which the lever 30 is connected to the anchor member 26 pivotally about a first axis L1 as also indicated in FIG. 2, which is perpendicular to the axis of the disc rotor 11. Described in detail, the anchor member 26 has a pair of connecting portions 32, 32 formed at its opposite ends such that the connecting portions 32 are located on the opposite sides of the disc rotor 11 so as to face the respective friction surfaces 12, 12. As shown in FIG. 2, each of the connecting portions 32 is formed as a pair of extensions 36 extending in the rearward direction of the vehicle, with a space 34 left therebetween. The front end portion of the lever 30 has a first connecting portion 40 which is accommodated in the space 34 with small amounts of clearances to the extensions 36, 36. A connecting member in the form of a screw 42 extends through the extensions 36, 36 and the first connecting portion 40, so that the lever 30 is pivotable about the axis L1 of screw 42 relative to the connecting portion 32.

Each lever 30 has an engaging portion 44 at an intermediate part thereof, as shown in FIG. 1. The engaging portion 44 engages the back surface of the backing plate 20 of the corresponding friction pad 14. The lever 30 also has a first bearing portion 50 at its front end portion. As shown in FIG. 2, this first bearing portion 50 engages an engaging cutout 46 formed in the front end face of the backing plate 20 which faces in the forward direction of the vehicle. The first bearing portion 50 has an end face which faces in the rearward direction of the vehicle and which engages the bottom surface of the cutout 46.

As shown in FIG. 1, the two levers 30 are connected to each other by a pair of links 54, 54 at their intermediate parts between the engaging portion 44 and the rear end portions (left end portions as seen in FIG. 1). The two links 54 are connected at their ends to each other by a pin 56 pivotally about a second axis L2 (axis of the pin 56) which is parallel to the first axis L1 (axis of the screw 42). The two links 54 are further connected, at their other ends remote from the pin 56, to second connecting portions 62 of the levers 30 by respective pins 60, pivotally about third axes L3 (axes of the pins 60) which are parallel to the second axis L2. Each of the two links 54 has a second bearing portion 68 which engages an engaging cutout 66 formed in the rear end face of the backing plate 20 which faces in the rearward direction of the vehicle, as shown in FIG. 2. The second bearing portion 68 has an end face which faces in the forward direction of the vehicle and which engages the bottom surface of the cutout 66. The function of these links 54 will be described.

Thus, each friction pad 14 is supported at its front end by engagement with the first bearing portion 50 of the lever 30, and at its rear end by engagement with the second bearing portion 68 of the link 54, such that the friction pad 14 is movable toward and away from the corresponding friction surface 12 of the disc rotor 11.

A first pressing device 70 is associated with the rear end portions of the levers 30, 30. The first pressing device 70 includes an electric motor in the form of a ultrasonic motor 72, and a motion converting mechanism 76 for converting a rotary motion of a rotary shaft 74 of the ultrasonic motor 72 into a linear motion.

The ultrasonic motor 72 has a stator and a rotor. In operation, the stator produces a surface wave upon application of a ultrasonic vibration thereto, and the rotor is rotated with a friction force acting between the stator and the rotor, as well known in the art. The rotor is forced against the stator by suitable biasing means, so that a suitable amount of friction force acts between the stator and the rotor. Even when no voltage is applied to the ultrasonic motor 72, a certain amount of friction force exists between the stator and the rotor. The ultrasonic motor 72 is attached to an input portion 77 provided at the rear end portion of one of the two levers 30, that is, to the input portion 77 of the lower lever 30 as seen in FIG. 1, while the motion converting mechanism 76 is connected to an input portion 78 provided at the rear end portion of the other lever 30 (upper lever 30).

Figure 3:
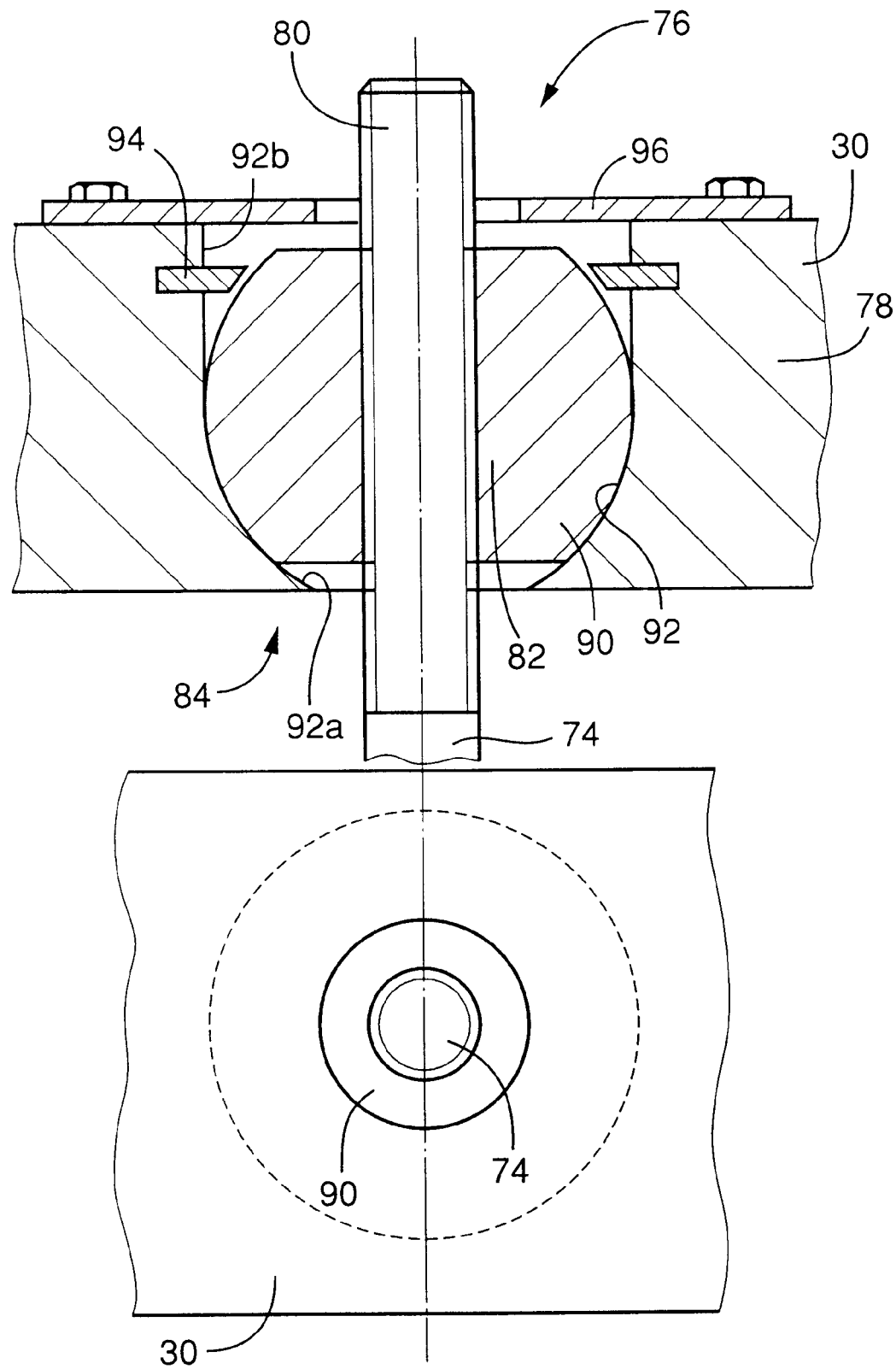
FIG. 3 is an enlarged plan view and an enlarged elevational view in cross section of a portion of the disc brake indicated by a circle A in FIG. 1.

As shown in FIG. 3, the motion converting mechanism 76 is a screw mechanism including an externally threaded member 80 rotating with the rotary shaft 74 of the ultrasonic motor 72, and an internally threaded member 82 which engages the externally threaded member 80. The internally threaded member 82 takes the form of a ball 90 accommodated in the rear end portion of the upper lever 30. The ball 90 is slidably fitted within a receptacle 92 formed in the rear end portion of the upper lever 30, and cooperates with the receptacle 92 to provide a ball joint 84. When the externally threaded member 80 is moved relative to the ball joint 84 by rotation of the rotary shaft 74, the rear end portions of the two levers 30, 30 are moved relative to each other, and the levers 30, 30 are pivoted relative to each other about the axes L1. The receptacle 92 is partially defined by a spherical surface 92a formed in the upper lever 30, more precisely, in a part of the rear portion of the upper lever 30, which is on the side of the other or lower lever 30. The spherical surface 92a terminates into an access opening 92b which is open on the other side of the upper lever 30 and through which the ball 90 is moved into the receptacle 92. The upper lever 30 has removal preventing means in the form of a C-ring 94 for preventing the ball 90 from being removed out of the receptacle 92. The opening 92b is closed by a cover 96, which cooperates with the outer surface of the ball 90 and the inner surface of the receptacle 92 to define a space, which is filled with a grease, for assuring a smooth sliding movement of the ball 90 relative to the inner surface of the receptacle 92.

In the present first embodiment of the electrically operated braking system, a rotary motion of the rotary shaft 74 of the ultrasonic motor 72 in one of opposite directions will cause the rear end portions of the pair of levers 30 to be moved toward each other, so that the engaging portions 44, 44 of the two levers 30 are moved toward each other, whereby the friction pads 14 are forced against the opposite friction surfaces 12 of the disc rotor 11. As a result, the disc rotor 11 is braked with friction forces generated between the friction pads 14 and the friction surfaces 12 of the disc rotor 11, whereby the wheel of the automotive vehicle is braked by the disc brake 10.

When the ultrasonic motor 72 is operated in the reverse direction in the above-indicated condition, the two levers 30 are pivoted relative to each other such that their rear end portions are moved away from each other, whereby the engaging portions 44 are moved away from each other. As a result, the friction pads 14 are moved away from the friction surfaces 12 of the disc rotor 11, and the braking force acting on the wheel is reduced or zeroed.

When the wheel is braked by activation of the disc brake 10 during running of the vehicle in the forward direction, friction forces act on the friction pads 14 in the forward direction of the vehicle, and are transmitted to the first bearing portions 50 of the levers 30, so that moments act on the levers 30 so as to pivot the levers 30 about the first axes L1 in the opposite directions for moving the engaging portions 44 toward each other and the friction surfaces 12 of the disc rotor 11. When the wheel is braked during running of the vehicle in the rearward direction, friction forces act on the friction pads 14 in the rearward direction of the vehicle, and are transmitted to the second bearing portions 68 of the links 54, so that moments act on the links 54 so as to pivot the links 54 about the second axis L2 (about the pin 56) in the opposite directions for moving the pins 60 toward each other, whereby moments acts on the levers 30 so as to pivot the levers 30 about the first axes L1 in the opposite direction for moving the engaging portions 44 toward each other and the friction surfaces 12 of the disc rotor 11.

Thus, the moment acts on each lever 30 in the direction for moving the engaging portion 44 toward the disc rotor 11 upon braking of the wheel during running of the vehicle, irrespective of the vehicle running direction (either forward or rearward direction). As a result, the friction pad 14 is forced against the friction surface 12 of the disc rotor 11 by the engaging portion 44, by a second pressing force based on the friction force between the friction pad 14 and the friction surface 12. Thus, a first pressing force based on the drive force of the ultrasonic motor 72 is boosted. This boosting of the pressing force is referred to as "self-servo effect".

In the present first embodiment, the pair of levers 30, 30 and the pair of links 54, 54 cooperate to constitute a second pressing device 98, and the pair of levers 30, 30 also function as a part of the first pressing device 70.

It will be understood from the above explanation of the present embodiment that the two first bearing portions 50 of the pair of levers 30, 30 and the two second bearing portions 68 of the pair of links 54, 54 cooperate to constitute a pad support mechanism for supporting the friction pads 14. It will also be understood that the levers 30 function as a pressing member for pressing the friction pads 14 against the disc rotor 11, and the ultrasonic motor 72, levers 30 and motion converting mechanism 76 cooperate to constitute a pad pressing mechanism for pressing the friction pads 14 against the disc rotor 11, while the second pressing device 98 functions as a self-servo mechanism for boosting the force generated by the first pressing device 70.

Figure 4:
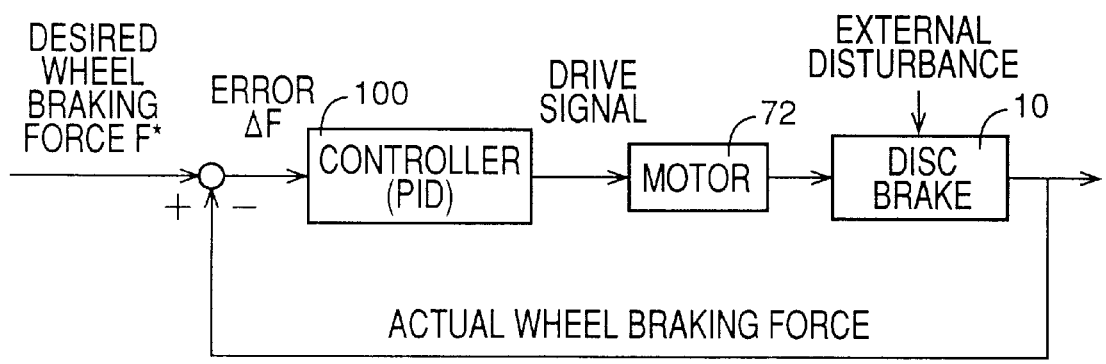
FIG. 4 is a block diagram schematically showing an operation of a controller shown in FIG. 1, for controlling the disc brake.

The ultrasonic motor 72 is controlled by a motor control device in the form of a controller 100, which is adapted to control the ultrasonic motor 72 of the disc brake 10 for each wheel such that a detected actual braking force F acting on the wheel coincides with a desired value F* which corresponds to a brake operating amount f. This control of the ultrasonic motor 72 by the controller 100 is effected in a feedback fashion as indicated in FIG. 4.

For the controller 100 to effect this feedback control of the ultrasonic motor 72, there is provided a brake operating amount sensor in the form of a depression force sensor 102 connected to the controller 100, as shown in FIG. 1. This depression force sensor 102 is adapted to detect a depression force f acting on a brake pedal 104 as a brake operating member when the brake pedal 104 is depressed by the vehicle operator. An output signal of the depression force sensor 102 represents the depression force f. Also connected to the controller 100 is a power supply 106 for energizing the ultrasonic motor 72. The power supply 106 may be a battery provided on the vehicle. To the controller 100, there are also connected braking force sensors 110 for detecting the actual braking forces F acting the respective wheels of the vehicle. For instance, each of these braking force sensors 110 uses a strain gage attached to s suitable member (e.g., lever 30) of the disc brake 10 which is subject to a strain proportional to the braking force F acting on the wheel.

Figure 5:
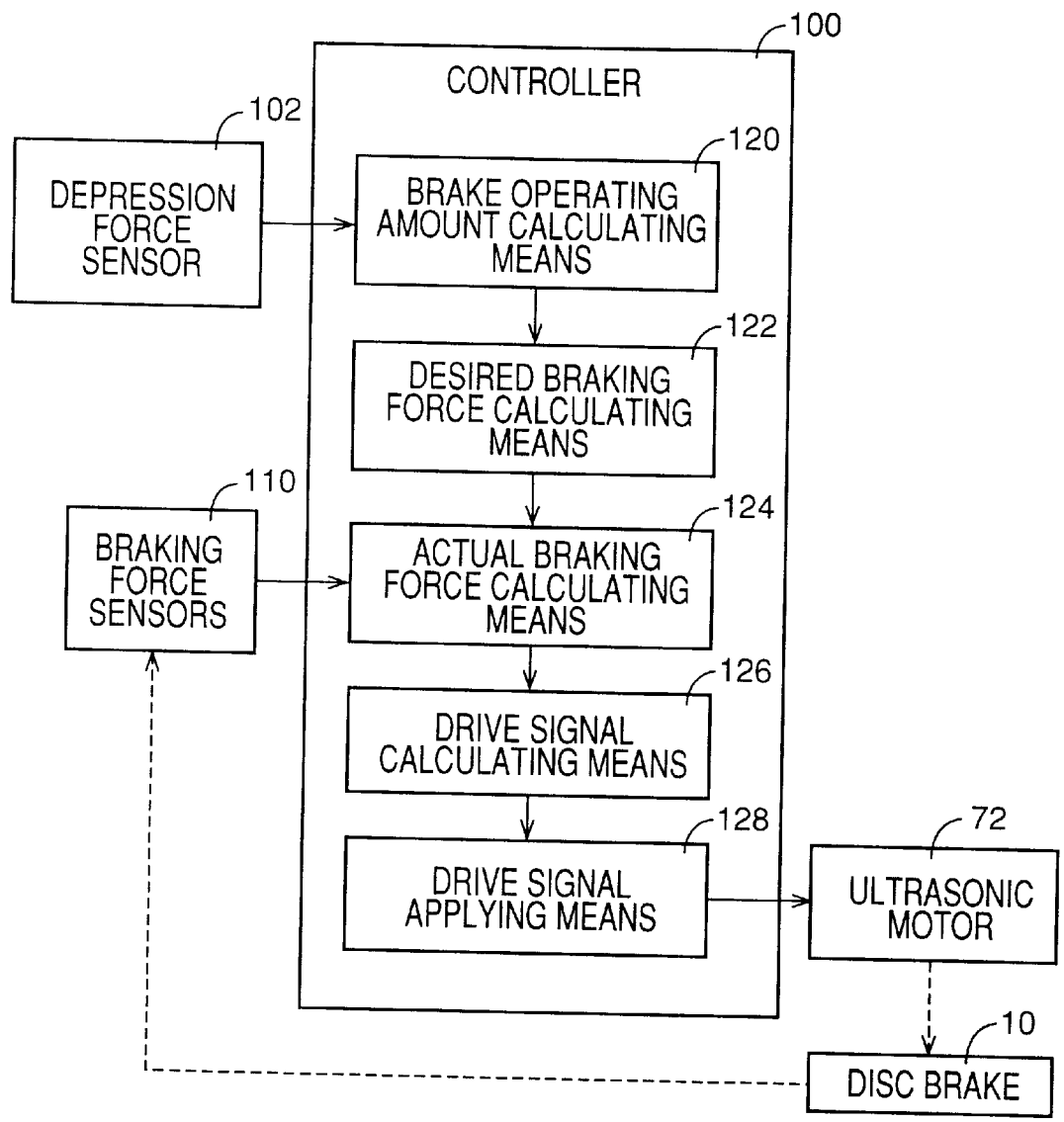
FIG. 5 is a block diagram indicating various functional means of the controller of FIG. 1.

Referring to the block diagram of FIG. 5, there will be described functional means of the controller 100. The controller 100 incorporates (a) brake operating amount calculating means 120, (b) desired braking force calculating means 122, (c) actual braking force calculating means 124, (d) drive signal calculating means 126, and (e) drive signal applying means 128. The brake operating amount calculating means 120 is adapted to calculate, as the operating amount of the brake pedal 104, the depression force f on the basis of the output signal of the depression force sensor 102. The desired braking force calculating means 122 is adapted to calculate the desired braking force F* (desired value F* of the braking force F) on the basis of the depression force f calculated as the brake operating amount. The actual braking force calculating means 124 is adapted to calculate the actual braking force F acting on each vehicle wheel, on the basis of the output signals of the braking force sensors 110. The drive signal calculating means 126 is adapted to calculate a drive signal for energizing the ultrasonic motor 72, on the basis of an error $\Delta F$ between the calculated actual and desired braking forces F and F*, so that the actual braking force F coincides with the desired braking force F*. The drive signal applying means 128 is adapted to apply the calculated drive signal to the ultrasonic motor 72 of the disc brake 10 for wheel wheel.

The controller 100 is principally constituted by a computer including a central processing unit (CPU), a read-only memory (ROM) and a random-access memory (RAM). The CPU is adapted to execute a brake control routine illustrated in the flow chart of FIG. 6, according to a program stored in the ROM functioning as a data storage medium, while utilizing a temporary data storage function of the RAM.

Figure 6:
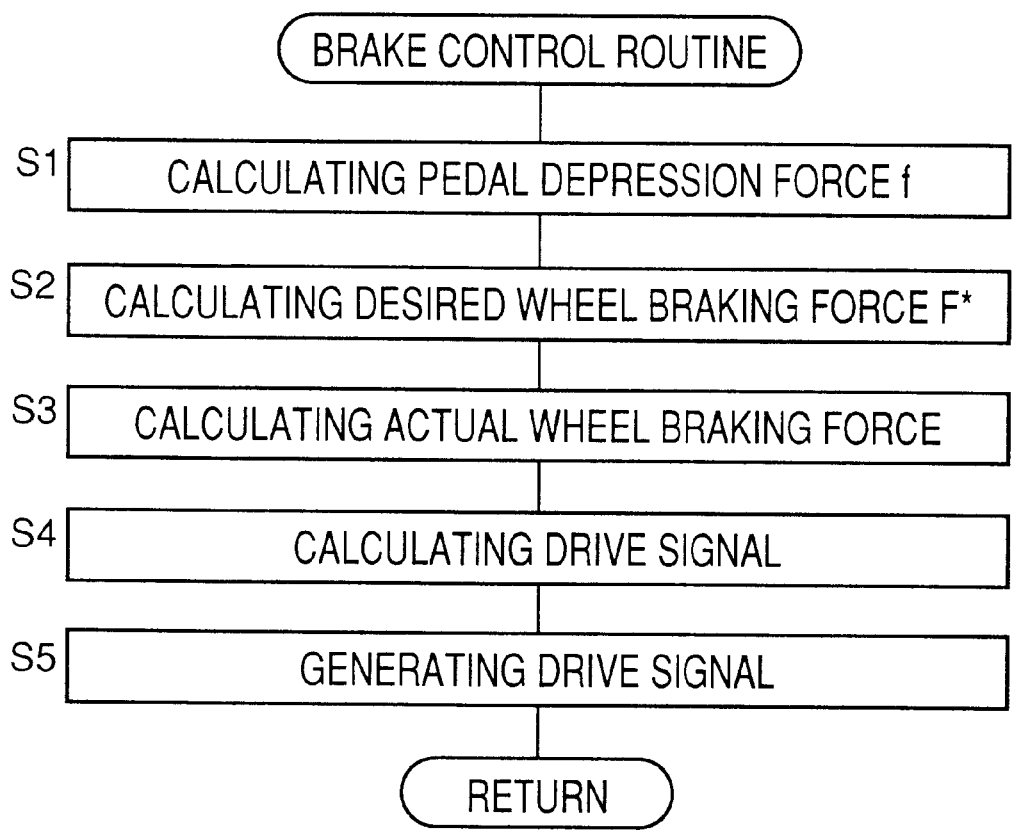
FIG. 6 is a flow chart illustrating a brake control routine executed by a computer of the controller of FIG. 1.
Figure 7:
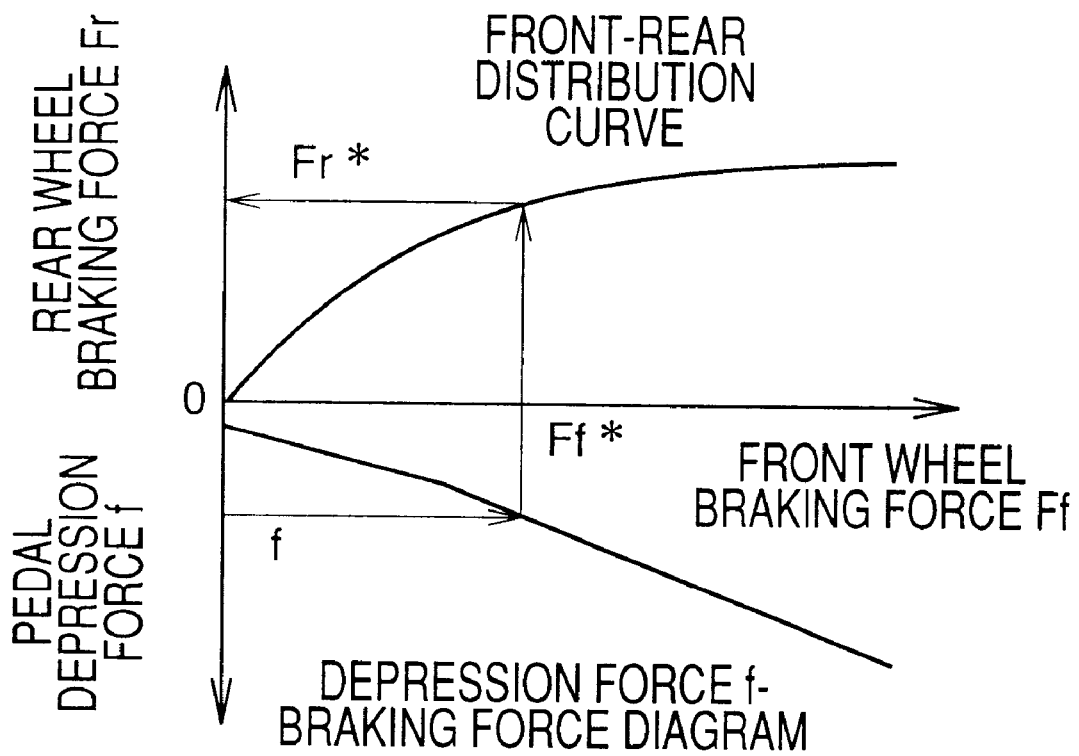
FIG. 7 is a graph indicating a relationship among a brake pedal depression force f and front and rear wheel braking forces Ff, Fr in the first embodiment of FIG. 1.

The brake control routine of FIG. 6 is started when an ignition switch of an engine of the vehicle is turned on, and repeatedly executed with a predetermined cycle time. The routine is initiated with step S1 in which the brake pedal depression force f is calculated on the basis of the output signal of the depression force sensor 102. Step S1 is followed by step S2 to calculate the desired braking force F* for each wheel on the basis of the calculated depression force f, and according to a predetermined relationship between the depression force f and desired total front and rear braking forces Ff*, Fr*. The desired total front braking force Ff* is a desired sum of the braking forces of the front right and left wheels, while the desired total rear braking force Fr* is a desired sum of the braking forces of the rear right and left wheels. The above-indicated relationship, an example of which is indicated in the graph of FIG. 7, is represented by a table, data map or functional equation stored in the ROM of the controller 100. Initially, the desired total front braking force Ff* is obtained on the basis of the depression force f and according to the predetermined relationship, and a half value of the obtained desired total front braking force Ff* is obtained as a desired front right braking force Ffr* and a desired front left braking force Ffl*. Then, the desired total rear braking force Fr* is obtained on the basis of the depression force f and according to the predetermined relationship, and a half value of the obtained desired total rear braking force Fr* is obtained as a desired rear right braking force Frr* and a desired rear left braking force Frl*.

Then, the control flow goes to step S3 to calculate the actual braking force Ffl, Ffr, Frl, Frr acting on each wheel, on the basis of the output signal of the corresponding braking force sensor 110. Step S3 is followed by step S4 to calculate the drive signal for energizing the ultrasonic motor 72, on the basis of the error $\Delta F$ between the calculated actual and desired braking forces F and F*, so that the drive signal permits the ultrasonic motor 72 to be energized so that the actual braking force F acting on each wheel coincides with the desired value F*. For instance, the drive signal to be applied to the ultrasonic motor 72 may be calculated according to the following PID equation:

$$K \cdot [\Delta F = (t/Ti) \cdot \Sigma \Delta F + (Td/t) \cdot \Delta \Delta F]$$

where,
K: proportional coefficient (constant)
$\Delta F$: error=F*−F
t: sampling time (cycle time of the routine of FIG. 6)
Ti: integration time (constant)
Td: differentiation time (constant)
$\Delta \Delta F$: time derivative of error $\Delta F$ Then, the control flow goes to step S5 in which the calculated drive signal is applied to the ultrasonic motor 72 of the motor-driven disc brake 10 for each wheel. Thus, one cycle of execution of the brake control routine of FIG. 6 is completed.

The present embodiment of the electrically operated braking system including the motor-driven disc brake 10 and the controller 100 has the following advantages:

Since it is not necessary to use a working fluid for braking the wheel, it is not necessary to use hydraulic or pneumatic components such as a master cylinder, a brake booster, brake tubes and hoses, a proportioning valve, solenoid-operated valves, a pump and a reservoir. Accordingly, the present braking system can be assembled with improved efficiency, and can be made compact with reduced size and weight, leading to a reduced weight of the vehicle and an increased space for passengers. Further, it is not required to replace the working fluid and effect air breathing of the hydraulic system, leading to increased ease of maintenance of the braking system. In addition, the present braking system permits free setting of a relationship between the operating force acting on the brake operating member (brake pedal 104) and the operating stroke of the brake operating member. In this respect, it is noted that if a master cylinder was used for operating the disc brake 10, the diameter of a piston of the master cylinder would determine the relationship between the brake operating force and stroke and provide substantially no freedom in setting this relationship.

The present embodiment has a further advantage. That is, the disc brake 10 has a comparatively small number of components used in a power transmission path from the ultrasonic motor 72 to the friction pads 14, since the levers 30 constitute a major portion of the power transmission path. Accordingly, the power transmission path is simple in construction, and permits a high response of the actual braking force F to a change in the desired value F*. Moreover, the self-servo effect provides a further improvement in the control response of the braking force. In addition, the disc brake 10 may be suitably used as a friction brake in an electric motor vehicle or a hybrid vehicle. Namely, the friction brake 10 may be adequately controlled even when the disc brake 10 is operated during regenerative braking of the wheels by a motor-generator of the electric vehicle. Described more specifically, the braking force acting on a wheel upon activation of the friction brake by operation of the brake pedal during the regenerative braking consists of a first braking force component generated by the friction brake and a second braking force component generated by the regenerative brake. Since the first braking force component can be controlled as needed by controlling the ultrasonic motor 72, the total braking force acting on the wheel can be adequately controlled to a value accurately corresponding to the operating amount of the brake pedal, even though the second braking force component varies with the rotating speed of the wheel. Thus, the present electrically operated braking system including the disc brake 10 activated by the ultrasonic motor 72 facilitates coordination of the friction brake with the regenerative brake in an electric or hybrid vehicle.

Figure 8:
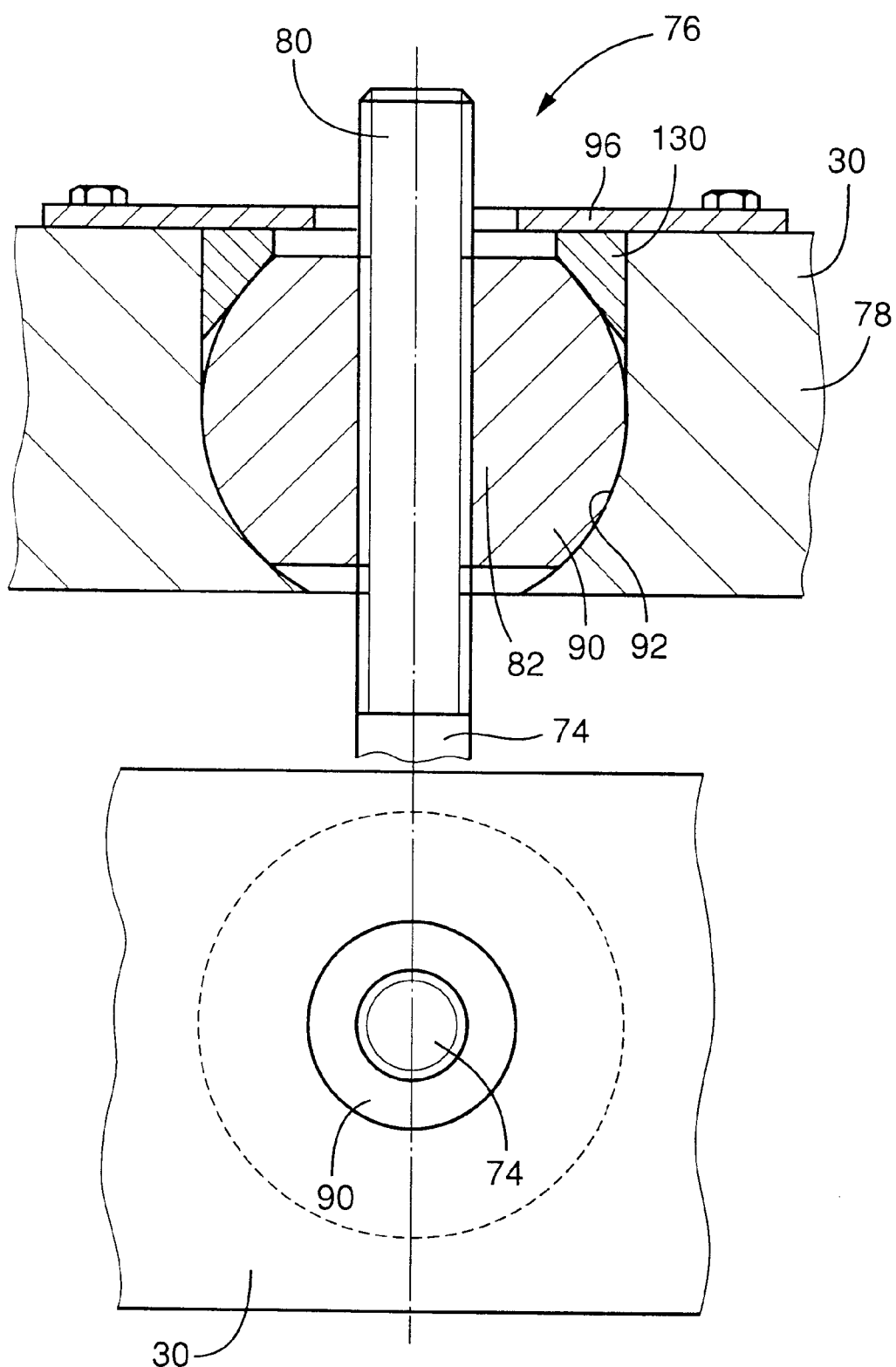
FIG. 8 is an enlarged plan view and an enlarged elevational view in cross section of the portion of a disc brake according to one modification of the first embodiment, which portion corresponds to that of FIG. 3.

Various changes and modifications may be made in the present embodiment. While the C-ring 94 is used in the motion converting mechanism 76 of FIG. 3 to prevent the removal of the ball 90 out of the receptacle 92, the C-ring 94 may be replaced by a retainer ring 130 as shown in FIG. 8, which is shaped to have an increased surface area in sliding contact with the ball 90 and reduce a spacing between the ball 90 and the cover 96. The retainer ring 130 may be made of a synthetic resin, such as nylon having a high self-lubricating property, for reducing the sliding resistance of the ball 90. The retainer ring 130 may be slidably fitted in the receptacle 92 and forced against the ball 90 under a biasing force generated by the cover 96 made of an elastic material, so that the retainer ring 130 and the elastic cover 96 cooperate with the lever 30 to elastically hold the ball 90 within the receptacle 92, while preventing oscillation of the ball 90 within the receptacle 92.

A second embodiment of the present invention will then be described. An electrically operated braking system according to this second embodiment is identical with that of the first embodiment, except for a self-servo mechanism. Therefore, only the self-servo mechanism of the second embodiment will be described in detail.

Figure 9:
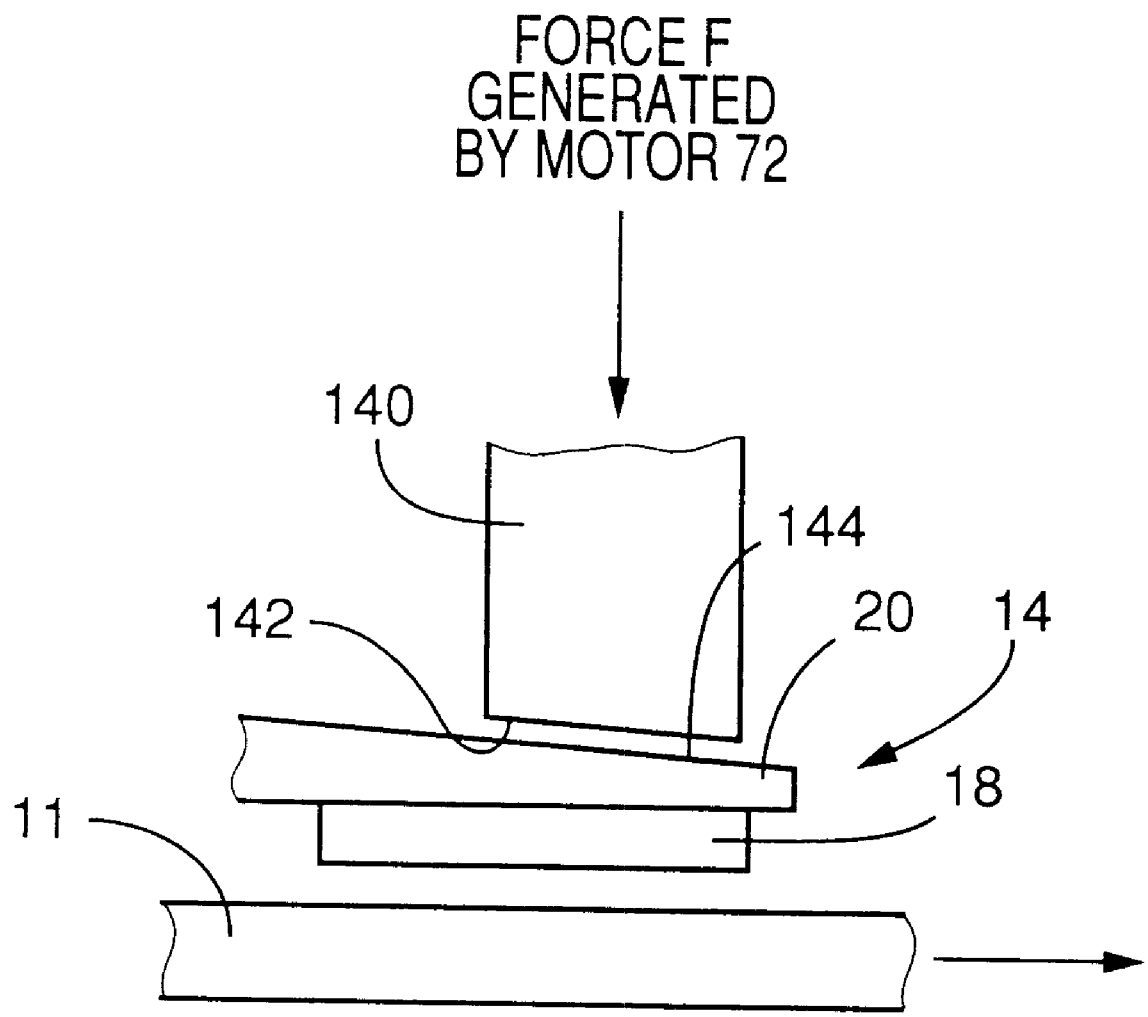
FIG. 9 is a plan view schematically showing a portion of a motor-drive disc brake of an electrically operated braking system constructed according to a second embodiment of the present invention.

In the first embodiment, the self-servo effect is provided such that the friction forces acting on the friction pads 14 in the rotating direction of the disc rotor 11 during activation of the disc brake 10 are returned to the friction pads 14 through the levers 30. In the second embodiment, on the other hand, the self-servo effect is provided owing to a wedge effect of each friction pad 14 whose backing plates 20 has a slant surface 144 engaging a slant surface 142 of a drive member 140 which is driven by the force G generated by the ultrasonic motor 72, as shown in FIG. 9. The drive member 140 may be driven directly by the ultrasonic motor 72 or through a suitable motion converting mechanism.

In this second embodiment, the drive member 140 constitutes a pressing member for pressing the friction pad 14 against the disc rotor 11, and the ultrasonic motor 72 and the drive member 140 cooperate to provide a pad pressing mechanism for pressing the friction pad 14 against the disc rotor 11. Further, the friction pad 14 having the slant surface 144 formed on the backing plate 20 to enable the friction pad 14 to function as a wedge provides a self-servo mechanism.

A third embodiment of this invention will be described by reference to FIG. 10. Like the second embodiment, this third embodiment utilizes a wedge effect of the friction pads 14 to provide the self-servo effect. The same reference signs as used in the first embodiment will be used in the third embodiment to identify the functionally corresponding components, which will not be described to avoid redundancy.

Figure 10:
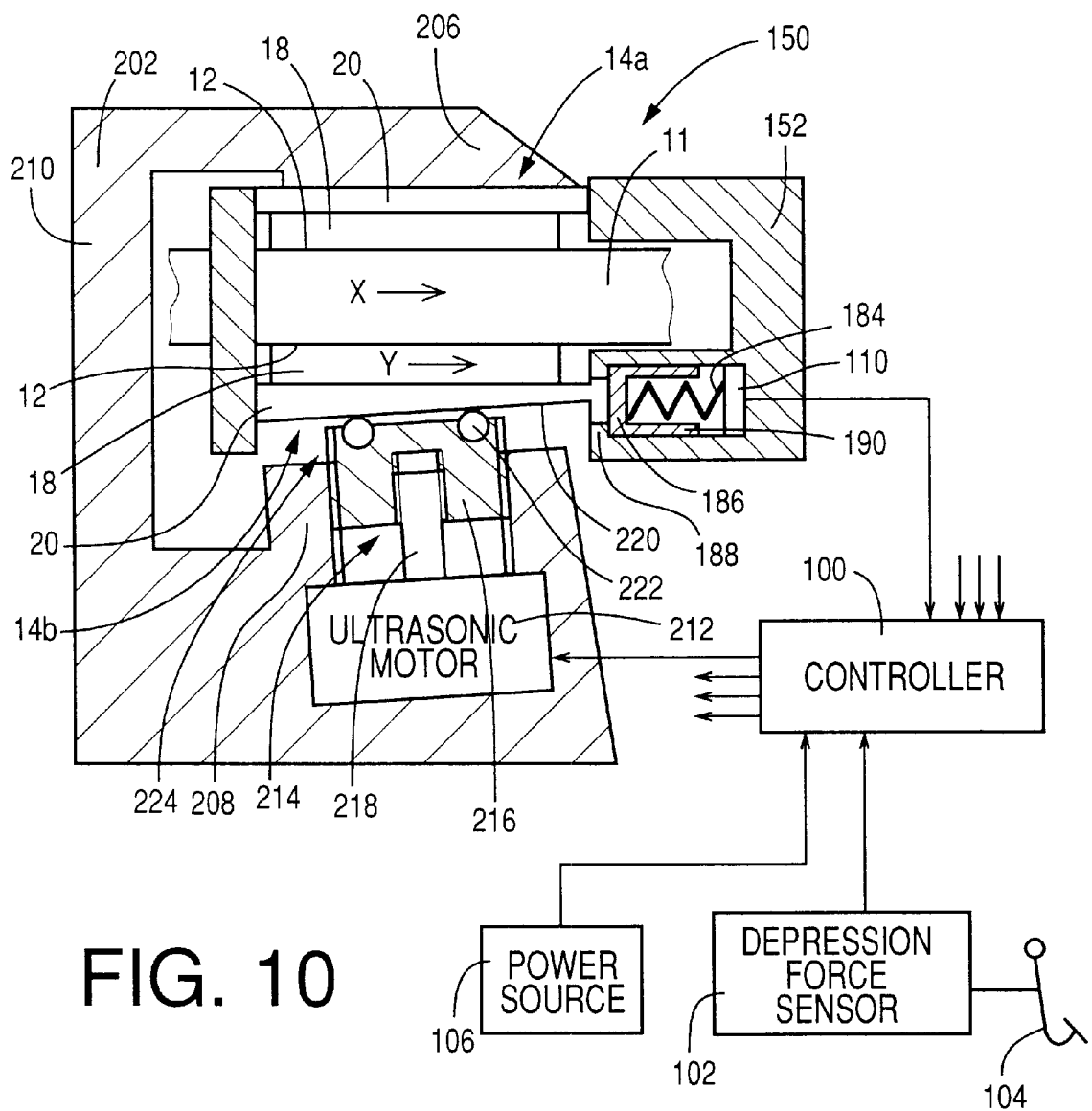
FIG. 10 is a plan view partly in cross section of a motor-driven disc brake of an electrically operated braking system according to a third embodiment of the invention.

In the third embodiment of FIG. 10, the electrically operated braking system includes a disc brake 150 for each wheel of the 4-wheel vehicle, and the controller 100, depression force sensor 102 and power supply 106 which are commonly used for the four wheels. Each disc brake 150 has a braking force sensor 110 whose output signal is fed to the controller 100.

The disc brake 150 includes a mounting member in the form of a mounting bracket 152 fixed to the vehicle body. The mounting bracket 152 includes portions for supporting the two friction pads 14a, 14b on the opposite sides of the disc rotor 11, such that the friction pads 14a, 14b are movable in the axial direction of the disc rotor 11. The mounting bracket 152 further includes portions for receiving friction forces from the friction pads 14a, 14b in frictional contact with the friction surfaces 12 of the disc rotor 11, in the rotating direction of the disc rotor 11.

Figure 11:
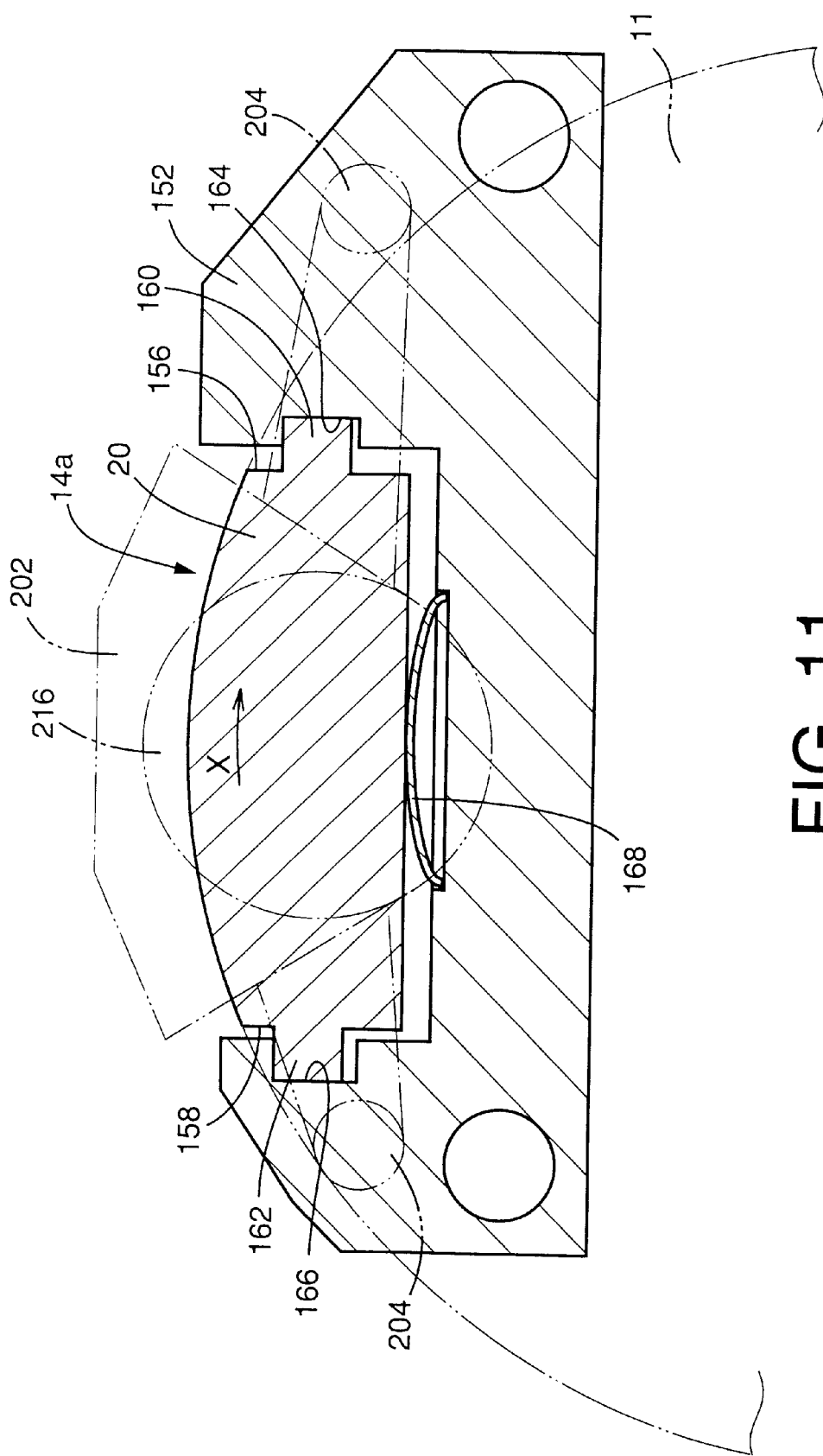
FIG. 11 is a view in cross section taken in a plane extending through and parallel to an outer pad of the disc brake of FIG. 10.

Referring to FIG. 11, there is shown the outer pad 14a as supported by the mounting bracket 152. The outer pad 14a is the friction pad 14a (upper friction pad as seen in FIG. 10) located on the outer side of the vehicle. In FIG. 11, an arrow X indicates the forward rotating direction of the disc rotor 11. The outer pad 14a has a front end face 156 facing in the forward rotating direction X, and a rear end face 158 facing in the reverse rotating direction opposite to the direction X. The outer pad 14a includes an engaging protrusion 160 and an engaging protrusion 162 which protrude from the front and rear end faces 156, 158, 35 respectively. The mounting bracket 152 has two engaging cutouts 164, 166 formed so as to extend in the axial direction of the disc rotor 11. The engaging protrusions 160, 162 of the outer pad 14a engage the respective engaging cutouts 164, 166 of the mounting bracket 152 such that the protrusions 160, 162 are slidable relative to the mounting bracket 152 in the axial direction of the disc rotor 11, and movable within the engaging cutouts 164, 166 in a direction perpendicular to the axial direction of the rotor 11. The outer pad 14a is normally held in a radially outer position by a biasing force of a spring 168, which acts on the outer pad 14a in the radially outer direction of the disc rotor 10. Thus, otherwise possible rattling movement of the outer pad 14a within the mounting bracket 152 is prevented. Further, the outer pad 14*a* is supported by the mounting bracket 152 so as to substantially prevent "dragging" of the outer pad 14*a* along with the disc rotor 11, that is, substantially prevent a movement of the outer pad 14*a* due to frictional contact with the disc rotor 11.

Figure 12:
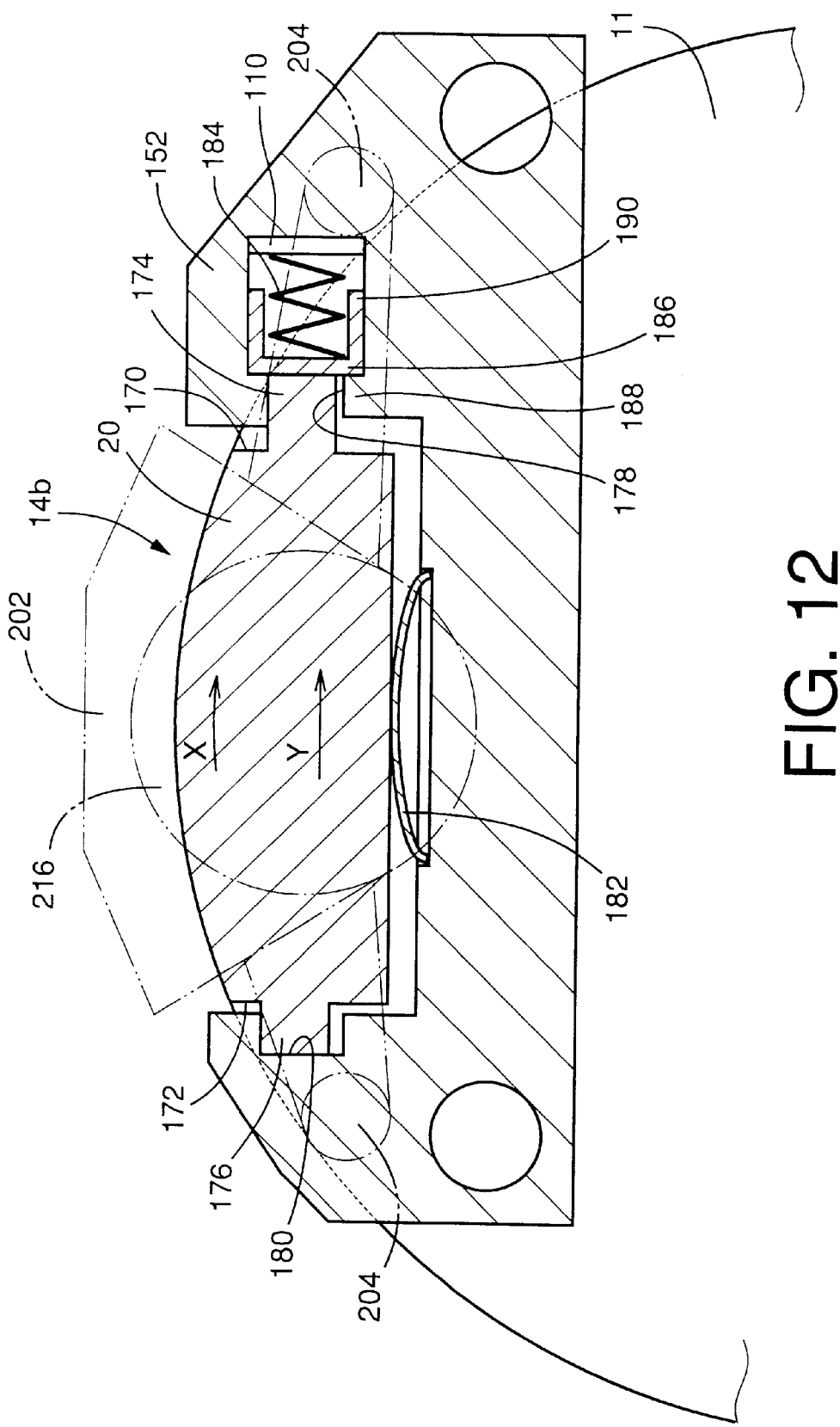
FIG. 12 is a view in cross section taken in a plane extending through and parallel to an inner pad of the disc brake of FIG. 10.

Referring next to FIG. 12, there is shown the inner pad 14*b* as supported by the mounting bracket 152. The inner pad 14*a* is the friction pad 14*b* (lower friction pad as seen in FIG. 10) located on the inner side of the vehicle. Like the outer pad 14*a*, the inner pad 14*b* has a front end face 170 facing in the forward rotating direction X, and a rear end face 172 facing in the reverse rotating direction opposite to the direction X. The inner pad 14*b* includes an engaging protrusion 174 and an engaging protrusion 176 which protrude from the front and rear end faces 170, 172, respectively. The mounting bracket 152 has two engaging cutouts 178, 180 formed so as to extend in the axial direction of the disc rotor 11. The engaging protrusions 174, 176 of the inner pad 14*b* engage the respective engaging cutouts 178, 180 of the mounting bracket 152 such that the protrusions 174, 176 are slidable relative to the mounting bracket 152 in the axial direction of the disc rotor 11, and movable within the engaging cutouts 178, 180 in the direction perpendicular to the axial direction of the rotor 11. The inner pad 14*b* is normally held in a radially outer position by a biasing force of a spring 182, which acts on the inner pad 14*b* in the radially outer direction of the disc rotor 10. Thus, otherwise possible rattling movement of the inner pad 14*b* within the mounting bracket 152 is prevented.

Unlike the outer pad 14*a*, the inner pad 14*b* is supported by the mounting bracket 152 so as to positively allow the dragging movement of the inner pad 14*b* with the disc brake 11, that is, a movement of the inner pad 14*b* due to frictional contact with the disc rotor 11. In FIG. 12, an arrow Y indicates a direction in which the inner pad 14*b* is dragged with the disc rotor 11. To allow the dragging of the inner pad 14*b*, a comparatively large gap is left in the direction Y between the front end face 170 and the opposite surface of the mounting bracket 152. Further, the bottom of the engaging cutout 178 engaging the front engaging protrusion 174 of the inner pad 14*b* is movable in the direction Y so that the depth of the cutout 178 is variable.

Described in detail, the bottom of the engaging cutout 178 is defined by a movable member 186 which is forced against the end face of the engaging protrusion 174 under a biasing action of a spring 184. Normally, the movable member 186 is held by the spring 184 in its fully retracted position which is determined by abutting contact with a stop 188. When the friction force acting between the friction surface 12 of the disc rotor 11 and the inner pad 14*b* exceeds a predetermined threshold, the inner pad 14*b* (engaging protrusion 174) is allowed to be moved with the movable member 186 by the friction force against the biasing action of the spring 184. While the friction force acting on the inner pad 14*b* is smaller than the threshold, the inner pad 14*b* is prevented by the biasing force of the spring 184 from being moved in the direction Y. Thus, the inner pad 14*b* is allowed to be dragged with the disc rotor 11 only after the friction force between the inner pad 14*b* and the disc rotor 11 exceeds the predetermined threshold. To limit the distance of dragging movement of the inner pad 14*b* due to its frictional contact with the disc rotor 11, the movable member 186 is provided with a stop 190, which inhibits the movement of the inner pad 14*b* when the distance of the movement reaches a predetermined upper limit. Thus, the stop 190 limits the distance of the dragging movement of the inner pad 14*b*, thereby limiting the self-servo effect of the inner pad 14*b*.

Referring back to FIG. 10, the disc brake 150 further includes a caliper 202 which is movable in the axial direction of the disc rotor 11 but is not movable in the rotating direction of the disc rotor 11.

As indicated by two-dot chain lines in FIGS. 11 and 12, the caliper 202 slidably engages a plurality of pins 204 which are attached to the vehicle body so as to extend in the axial direction of the disc rotor 11. The caliper 202 slidably movably supported by the pins 204 extends over the periphery of the disc rotor 11, as indicated in FIG. 10, and has two portions located opposite to the backing plates 20 of the outer and inner friction pads 14*a*, 14*b*. Described more particularly, the caliper 202 includes a reaction portion 206 disposed adjacent to the outer surface of the backing plate 20 of the outer pad 14*a*, a presser portion 208 disposed adjacent to the outer surface of the backing plate 20 of the inner pad 14*b*, and a connecting or intermediate portion 210 connecting the reaction and presser portions 206, 208.

The presser portion 208 carries a motor in the form of a ultrasonic motor 212 coaxially connected to a presser rod 216 through a motion converting mechanism in the form of a ballscrew mechanism 214. The presser rod 216 is supported by the presser portion 208 such that presser rod 216 is not rotatable about its axis but is axially movable relative to the presser portion 208. A rotary motion of a rotary shaft 218 of the ultrasonic motor 212 is converted by the ballscrew mechanism 214 into a linear motion of the presser rod 216, whereby the inner pad 14*b* is forced by the presser rod 216 against the corresponding friction surface 12 of the disc rotor 11. At the same time, a reaction force is transferred from the inner pad 14*b* to the outer pad 14*a* through the caliper 202, so that the outer pad 14*a* is forced by the reaction portion 206 against the other friction surface of the disc rotor 11.

In the present third embodiment, the caliper 202 functions as a pressing member, and cooperates with the ultrasonic motor 212, ballscrew mechanism 214 and presser rod 216 to constitute a pad presser mechanism for pressing the friction pads 14 against the disc rotor 11.

While the thickness of the backing plate 20 of the outer pad 14*a* is constant, the thickness of the backing plate 20 of the inner pad 14*b* continuously decreases in the direction Y in which the inner pad 14*b* is moved due to dragging with the disc rotor 11. In other words, the backing plate 20 of the inner pad 14*b* has a slant exposed surface 220, which is inclined with respect to the friction surfaces 12 of the disc rotor 11. The presser rod 216 is held in contact the slant surface 220 at its front end face such that the presser rod 216 and the slant surface 220 are movable relative to each other when the inner pad 14*b* is moved in the direction Y. In this arrangement, the backing plate 20 of the inner pad 14 functions as a wedge between the disc rotor 11 and the presser rod 216 when the inner pad 14*b* is dragged with the disc rotor 11 in the direction Y, whereby the inner pad 14*b* provides a self-servo effect. In the present embodiment, the axis of the presser rod 216 is perpendicular to the slant surface 220 of the backing plate 20 of the inner pad 14*b*.

To assure smooth relative movement of the presser rod 216 and the inner pad 14*b*, the presser rod 216 has a plurality of balls 222 held on its end face such that the balls 222 are arranged in an equally spaced-apart relation along a circle concentric with the circumference of the presser rod. The balls 222 are partially exposed on the end face of the presser rod 216 and can be rolled in contact with the slant surface 220. The balls 222 may be replaced by rollers. Thus, the balls 222 function as a thrust bearing as indicated at 224, which is interposed between the backing plate 20 of the inner pad 14*b* and the presser rod 216, for reducing a friction resistance between between the inner pad 14*b* and the presser rod 216. In the present embodiment, the thrust bearing 224 provides means for reducing the friction resistance between the inner pad 14*b* and the end face of the presser rod 216. This friction resistance reducing means may be provided by using a suitable material for at least the end portion of the presser rod 216 which contacts the slant surface 222 of the backing plate 20 of the inner pad 14*b*. This material should have higher degrees of wear resistance, corrosion resistance than the metal used for the backing plate 20, and a high degree of slidability with respect to the slant surface 222. For instance, the material may be selected from among silicon nitride, silicon carbide, highly wear-resistant ceramics, self-lubricating polyamide resins, and self-lubricating, highly wear-resistant fluoro-resins suitable for improving rust resistance of the presser rod 216.

In the present embodiment, the balls 222 are made of a material having a higher degree of thermal insulation property than a metallic material, for example, silicon nitride, silicon carbide, and ceramics having comparatively high thermal insulation property. The balls 222 made of such a thermally insulating material interposed between the ultrasonic motor 212 and the inner pad 14*b* are effective to minimize an amount of transfer of heat generated due to friction between the inner pad 14*b* and the disc rotor 11, to the ultrasonic motor 212 through the power transmission path, thereby restricting a rise of the temperature of the ultrasonic motor 212. Thus, the balls 222 having high thermal insulation property function as means for restricting the temperature rise of the ultrasonic motor 212, and means for restricting the heat transfer from the inner pad 14*b* to the ultrasonic motor 212. These temperature rise restricting means and the heat transfer restricting means may be provided by forming the presser rod 216 of a material having a higher degree of thermal insulation property than a metallic material.

An operation of the present braking system will then be described.

When the ultrasonic motor 212 is energized as a result of an operation of the brake pedal 104 by the vehicle operator, the presser rod 216 is moved from its retracted position to its advanced position, so that the inner pad 14*b* is forced against the disc rotor 11. Consequently, a friction force is generated between the inner pad 14*b* and the disc rotor 11. At the same time, the outer pad 14*a* is forced against the disc rotor 11, and a friction force is generated between the outer pad 14*a* and the disc rotor 11. Thus, the vehicle wheel is braked by the disc brake 150.

While the friction force of the inner pad 14*b* is not larger than a threshold determined by a set load of the spring 184, the movement of the inner pad 14*b* in the direction Y due to dragging movement with the disc rotor 11 is prevented by the spring 184, and the self-servo effect of the inner pad 14*b* is not exhibited. Therefore, the vehicle wheel is braked by only the drive force generated by the ultrasonic motor 212 while the friction force of the inner pad 14*b* is relatively small, for example, immediately after the depression of the brake pedal 104 or during an initial period of operation of the disc brake 150 with a relatively small amount of depression force acting on the brake pedal 104.

When the friction force of the inner pad 14*b* becomes larger than the threshold due to an increase in the depression force acting on the brake pedal 104, the friction force overcomes the biasing action of the spring 184, whereby the inner pad 14*b* is allowed to be moved together with the movable member 186 against the biasing force of the spring 184. As a result, the force acting between the friction surface 12 of the disc rotor 11 and the presser rod 216 is increased owing to a wedge effect of the backing plate 20 having the slant surface 220, whereby the inner pad 14*b* is forced onto the disc rotor 11 with the increased force in the axial direction of the rotor 11.

In other words, the inner pad 14*b* functions as a wedge between the disc rotor 11 and the presser rod 216, exhibiting a self-servo effect for boosting the braking force based on the drive force of the ultrasonic motor 212, when the friction force acting on the inner pad 14*b* is relatively large with the brake pedal 104 depressed with a depression force large enough to achieve the intended deceleration of the vehicle, for instance, about 0.3–0.6 G.

When the force by which the inner pad 14*b* is forced against the disc rotor 11 is increased by the self-servo effect or function of the inner pad 14*b*, the force acting on the pressure rod 216 in the axial direction is accordingly increased, so that the torque of the rotary shaft 218 of the ultrasonic motor 212 is accordingly increased. In the light of this fact, the ballscrew mechanism 214 is arranged to have a relatively small reverse efficiency, and the ultrasonic motor 212 is adapted to have a relatively high torque holding ability.

When the stop 190 of the movable member 186 comes into contact with the mounting bracket 152 as a result of a further movement of the inner pad 14*b* in the direction Y with a further increase in the friction force, a further movement of the inner pad 14*b* in the direction Y is inhibited by the stop 190, whereby an increase in the self-servo effect is inhibited. The stop 190 prevents an excessive force between the backing plate 20 of the inner pad 14*b* and the presser rod 216, which would cause local permanent deflection or deformation of the backing plate 20 and resulting permanent dragging of the inner pad 14*b* due to its failure to return to the predetermined non-operated position when the presser rod 216 is returned from the advanced or operated position to the non-operated position upon releasing of the brake pedal 104.

In the present third embodiment, the inner pad 14*b* is supported by the mounting bracket 152 such that the inner pad 14*b* can be moved in the direction Y due to frictional contact with the disc rotor 11, and the backing plate 20 of the inner pad 14*b* is provided with the slant surface 220, so that the inner pad 14*b* functions as a wedge. Thus, the inner pad 14*b* having the slant surface 220 on the backing plate 20 serves as a self-servo mechanism.

The present third embodiment is further adapted such that the front gap between the front end face 170 of the inner pad 14*b* and the opposite surface of the mounting bracket 152 while the disc brake 150 is in the non-operated position is larger than the rear gap between the rear end face 172 and the opposite surface of the mounting bracket 152. The amount of the rear gap is determined to be enough for the inner pad 14*b* to be slidably movable relative to the mounting bracket 152 in the axial direction of the disc rotor 11. In other words, the amount of the front gap is determined to be larger than this amount of the rear gap, in order to allow the inner pad 14*b* to be dragged with the disc rotor 11 due to frictional contact of the inner pad 14*b* with the disc rotor 11. Thus, the front gap cooperates with the movable member 190 and the spring 184 to constitute a mechanism for allowing the inner pad 14*b* to be dragged with the disc rotor 11. It is also noted that the spring 184 functions as an elastic member for inhibiting the self-servo mechanism from providing the self-servo effect while the friction force between the inner pad 14*b* and the disc rotor 11 is smaller than the predetermined threshold. Further, the stop 190 serves as a mechanism for inhibiting the self-servo mechanism from providing an excessive self-servo effect.

It will be understood from the above explanation of the third embodiment that the self-servo mechanism for boosting the drive force of the ultrasonic motor 212 to obtain a sufficient wheel braking force is not provided throughout a braking operation, but is provided only after the friction force between the inner pad 14*b* and the disc rotor 11 exceeds the predetermined threshold, or only during an initial period of the braking operation. The wheel braking force tends to be unstable if the self-servo mechanism is operated while the friction force between the inner pad 14*b* and the disc rotor 11 is relatively small. Thus, the present embodiment permits a sufficient increase in the wheel braking force when needed, without instability of the wheel braking force due to the self-servo effect. The present embodiment enjoys the advantage of the self-servo mechanism, with substantial elimination of its disadvantage.

There will next be described a fourth embodiment of this invention, which is similar to the third embodiment in various aspect. The same reference signs as used in the third embodiment will be used in the fourth embodiment to identify the functionally corresponding elements.

Figure 13:
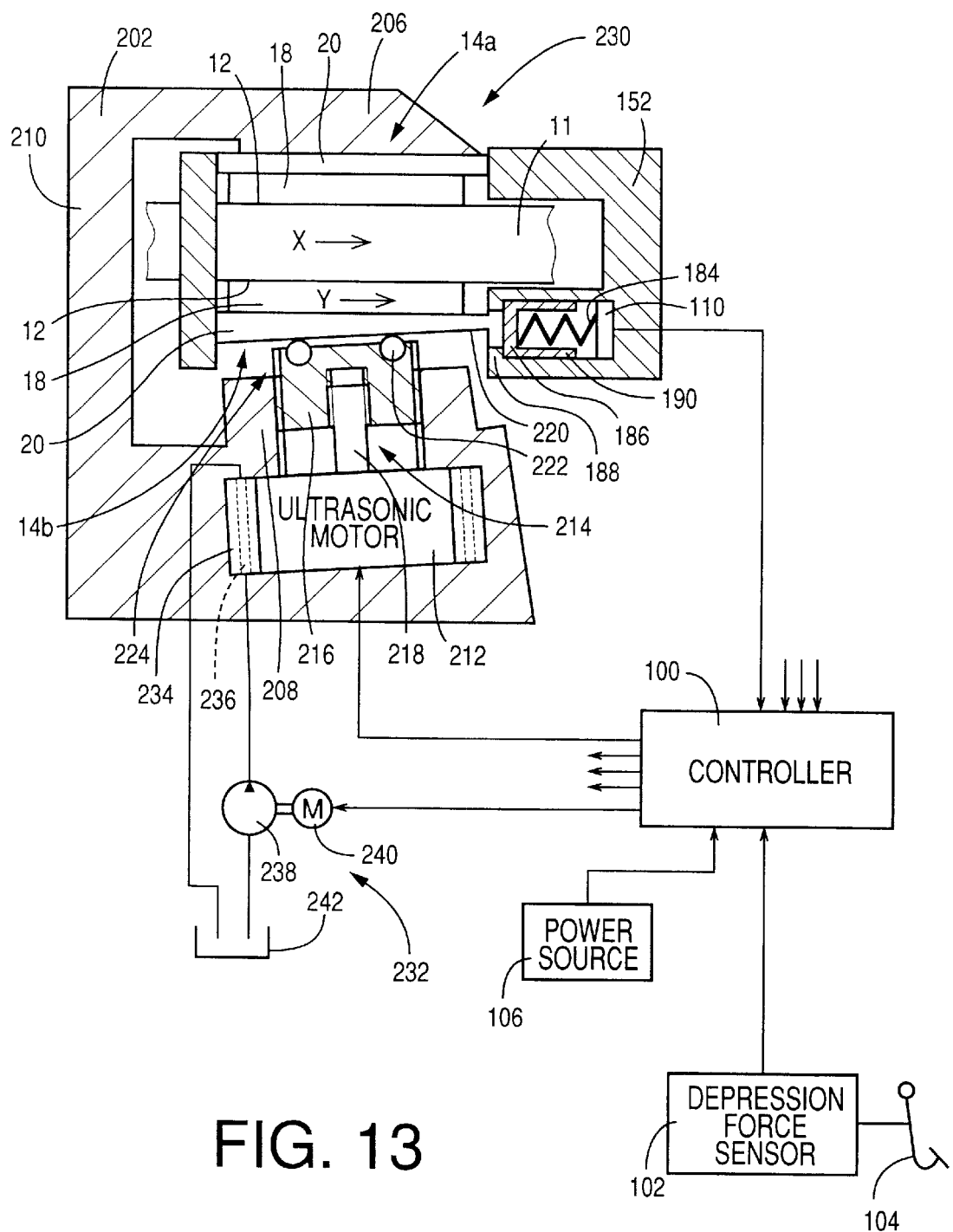
FIG. 13 is a view schematically showing an electrically operated braking system constructed according to a fourth embodiment of this invention, including a plan view of a motor-driven disc brake in the system.

A disc brake 230 constructed according to the fourth embodiment is shown in FIG. 13. The disc brake 230 is characterized by the provision of a cooling device 232 for positively cooling the ultrasonic motor 212 to thereby restrict a temperature rise of the ultrasonic motor 212. The temperature rise of the ultrasonic motor 212 may be caused by not only heat generation due to the friction between the friction pads 14*a*, 14*b* and the disc rotor 11, but also heat generation from the coil of the motor 212. Therefore, the temperature rise of the motor 212 cannot be sufficiently restricted by merely restricting the transfer of the friction heat to the motor 212. The present embodiment was developed in the light of this fact.

Figure 14:
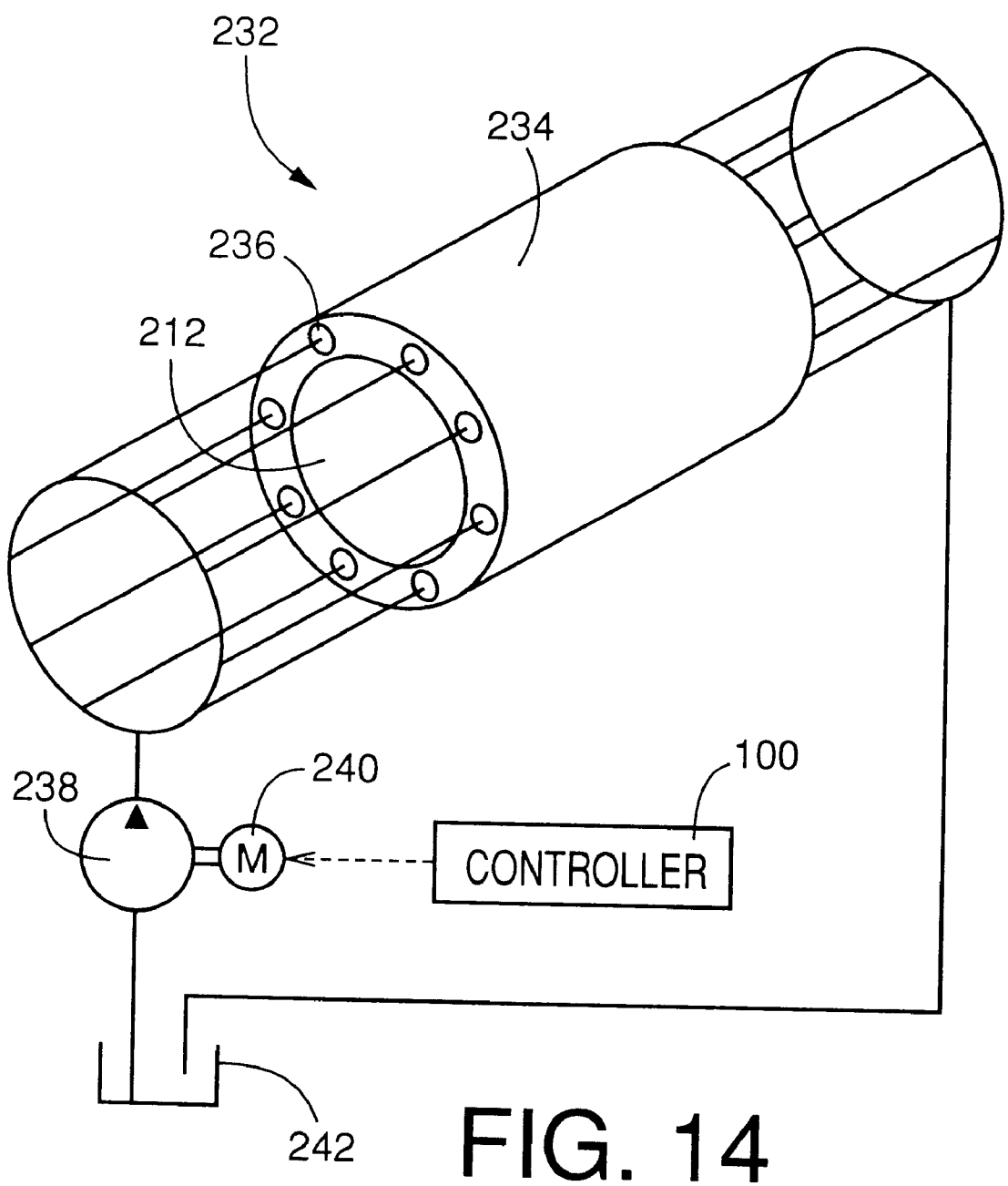
FIG. 14 is an enlarged perspective view of a cooling device in the braking system of FIG. 13.

The cooling device 232 is of a water cooling type provided with a water jacket 234 enclosing the housing of the ultrasonic motor 212. The water jacket 234 has a passage system 236 through which water or other suitable liquid is circulated by a pump 238, which is driven by a pump motor 240. The pump 238 is connected to a reservoir 242. The pump motor 240 is controlled by the controller 100 to suitably turn on and off the pump 238. The cooling device 232 is shown in FIG. 14 wherein the water jacket 234 is shown enlargement. In the present fourth embodiment, the cooling device 232 functions as the temperature rise restricting means.

In the fourth embodiment, the ultrasonic motor 212 is positively cooled by the cooling device 232 so as to effectively restrict a rise of the temperature of the motor 212, for thereby avoiding abnormalities of the motor 212 which may be caused by its temperature rise.

The cooling device 232 of the water cooling type used in the present embodiment may be replaced by an air cooling type of cooling device including a cooling fan for blowing air toward the ultrasonic motor 212, and an electric motor for driving the cooling fan. The air cooling type cooling device may be easily designed for cooling a comparatively large area of the disc brake 230, and is preferably designed to cool not only the ultrasonic motor 212 but also the friction pads 14*a*, 14*b* and the disc rotor 11, which generate heat during operation of the disc brake 230.

Figure 15:
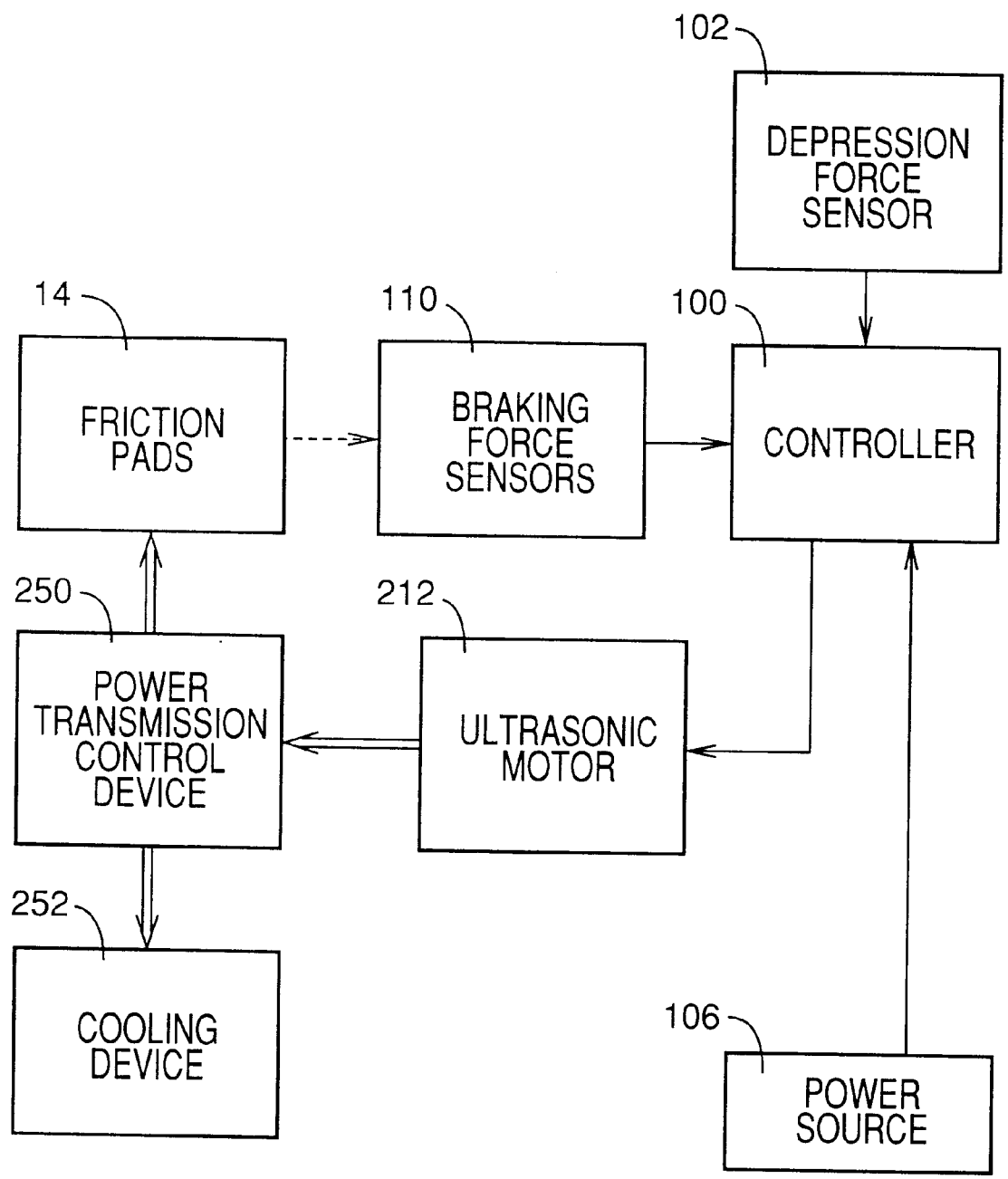
FIG. 15 is a block diagram schematically showing an arrangement of an electrically operated braking system according to a fifth embodiment of the invention.

Referring to FIG. 15, there will be described a fifth embodiment of the invention which is similar to the fourth embodiment. With the same reference signs as used in the fourth embodiment being used in FIG. 15, only a difference of the fifth embodiment from the fourth embodiment will be described in detail.

In the fourth embodiment, the ultrasonic motor 212 for braking the disc rotor 11 is cooled by the cooling device 232 which uses the electric motor 240. In the present fifth embodiment, a cooling device 252 for cooling the ultrasonic motor 212 uses this ultrasonic motor 212 as a drive source. Described more specifically, the ultrasonic motor 212 is operatively connected through a power transmission control device 250 selectively to the friction pads 14*a*, 14*b* and the cooling device 252. This cooling device 252 includes a pump or fan which is driven by the ultrasonic motor 212 through the power transmission control device 250, for producing a stream of a liquid or gas toward the ultrasonic motor 212. The power transmission control device 250 is adapted to transmit a drive force of the ultrasonic motor 212 to the friction pads 14*a*, 14*b* when the disc brake 130 is required to be activated for braking the disc rotor 11, and to transmit the drive force to the cooling device 252 during at least a portion of the period in which the activation of the disc brake 130 is not required.

Usually, the brake pedal 104 is not depressed continuously for a long time, but is alternately depressed and released with the depressing action taking place intermittently. The temperature of the ultrasonic motor 212 rises during depression of the brake pedal 104, and the drive force of the ultrasonic motor 212 can be used for other purposes while the brake pedal 104 is in the released state. Therefore, the ultrasonic motor 212 may be controlled to operate for braking the wheel only when the brake pedal 104 is depressed, and for cooling the ultrasonic motor 212 so as to effectively restrict a rise of the temperature of the ultrasonic motor 212 during intermittent braking operations.

In the light of the above finding, the power transmission control device 250 is adapted to transmit the drive force of the ultrasonic motor 212 to the friction pads 14*a*, 14*b* when the brake pedal 104 is depressed (when the output signal of the depression force sensor 102 indicates the depression of the brake pedal 104), and to the cooling device 252 when the brake pedal 104 is not depressed (when the output signal of the sensor 102 does not indicates the depression of the brake pedal 104). In the present fifth embodiment, the ultrasonic motor 212, power transmission control device 250 and cooling device 252 cooperate to constitute the temperature rise restricting means.

The cooling device provided in the fourth and fifth embodiments of FIGS. 13–15, which uses a motor as the drive source, may be used for cooling a disc brake which does not have the self-servo mechanism.

In all of the embodiments described above, the self-servo action of the friction pads for converting the friction force of the friction pads into the pressing force acting on the disc rotor through the friction pads takes place in the power transmission system through which the drive force of the ultrasonic motor is transmitted to the friction pads. On the other hand, the dragging of the friction pads or pad along with the disc rotor 11 is controlled (permitted or inhibited) at the location at which the friction force is received. Thus, the self-servo action and the control of the dragging of the friction pads or pad take place at the different locations within the disc brake. This arrangement permits simpler and more reliable mechanisms for achieving the self-servo effect and for permitting and inhibiting the dragging of the friction pads or pad, than the arrangement in which the self-servo action and the dragging control take place at one location.

Figure 16:
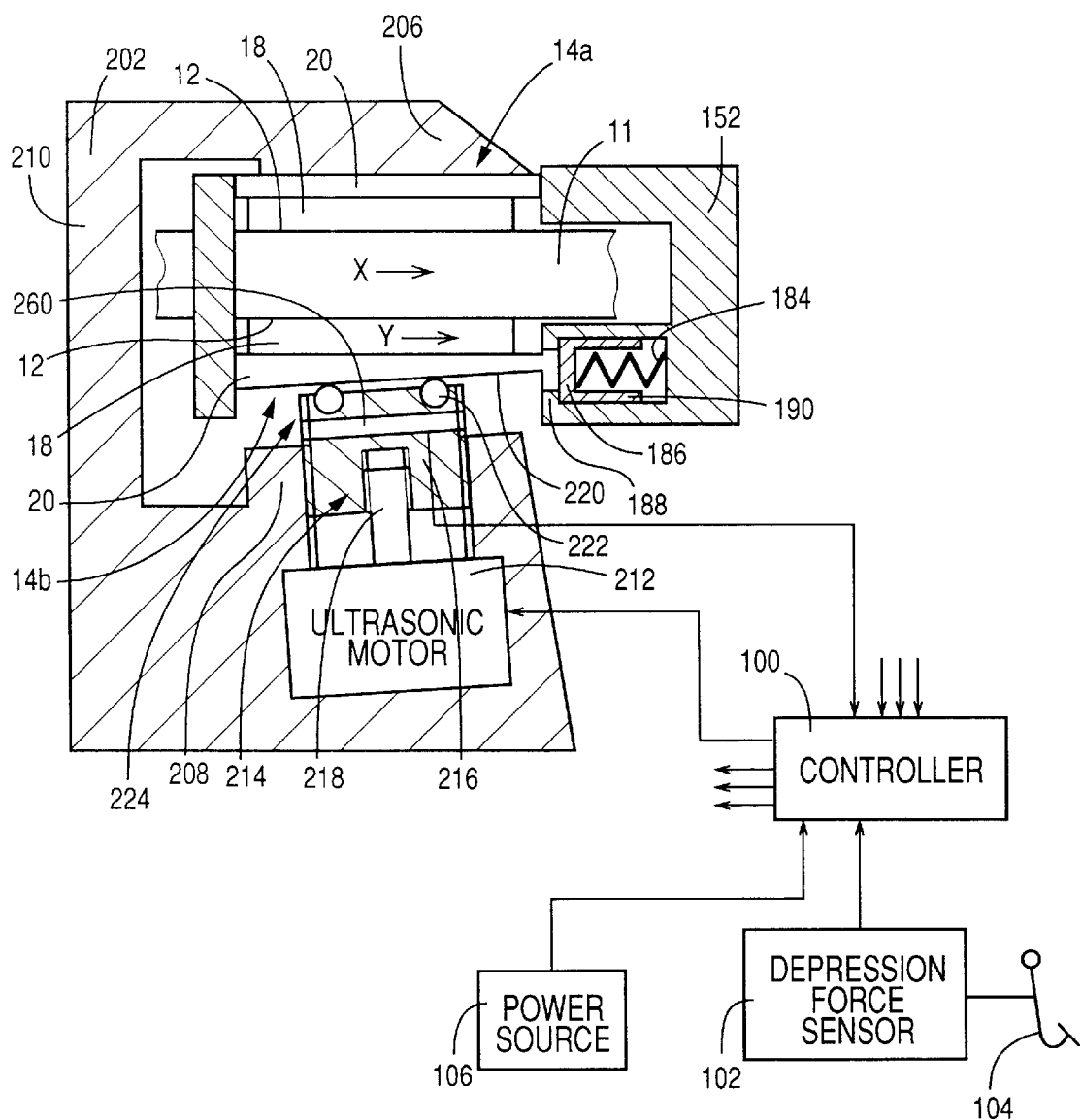
FIG. 16 is a view schematically showing an electrically operated braking system according to a sixth embodiment of the invention, including a plan view of a motor-driven disc brake in the system.
Figure 17:
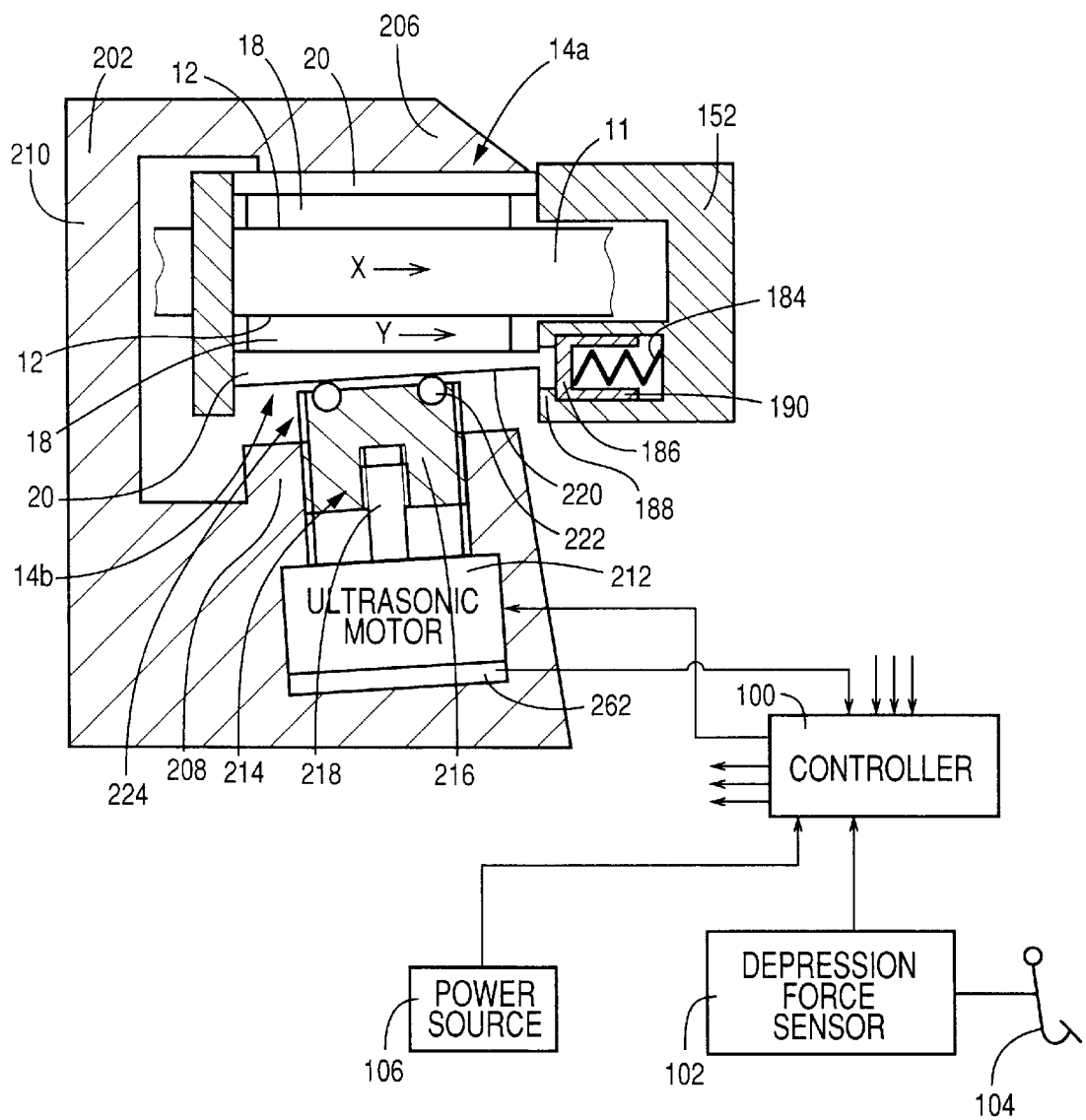
FIG. 17 is a view schematically showing an electrically operated braking system according to a seventh embodiment of the invention, including a plan view of a motor-driven disc brake in the system.
Figure 18:
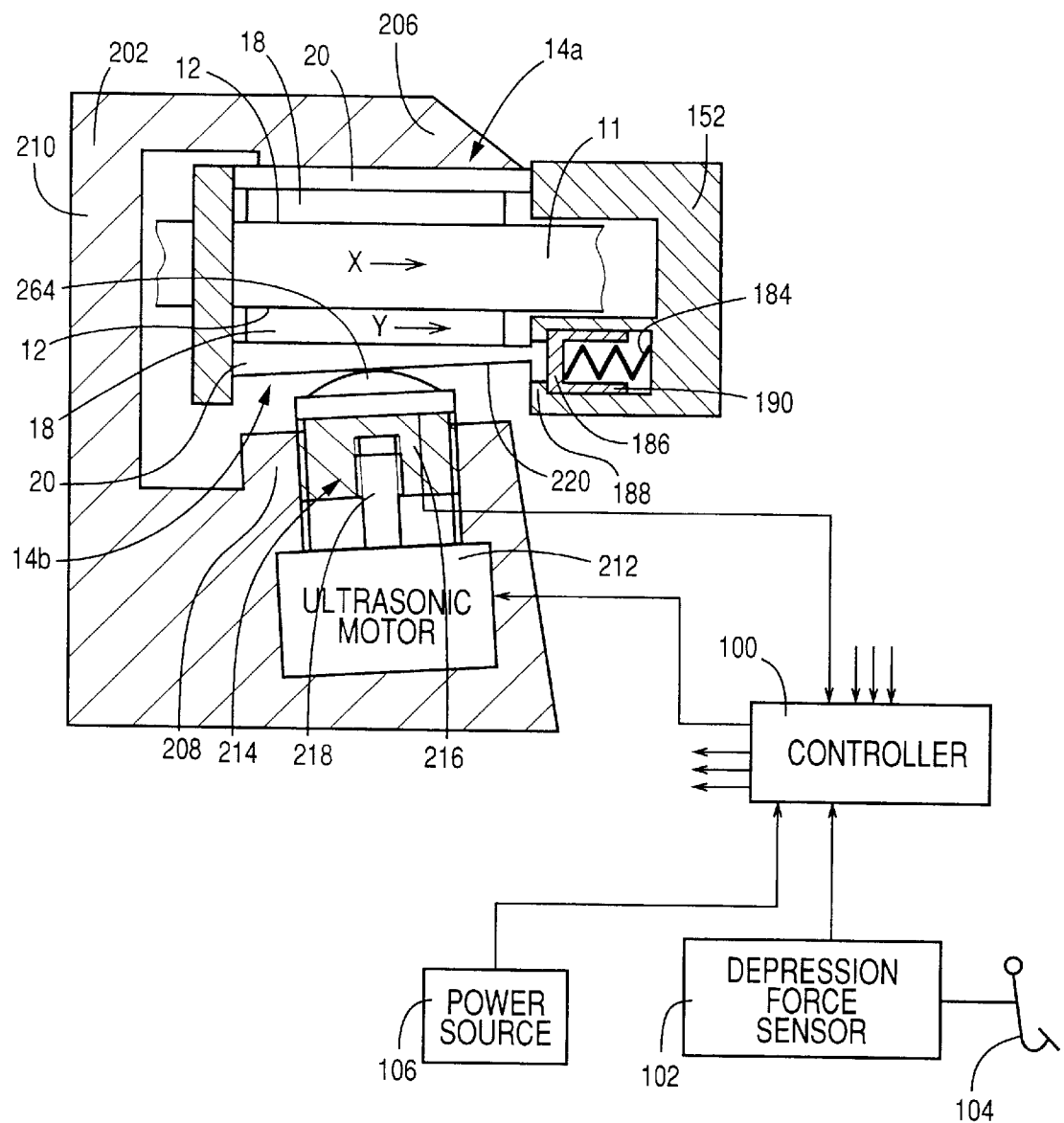
FIG. 18 is a view schematically showing an electrically operated braking system according to an eighth embodiment of the invention, including a plan view of a motor-driven disc brake in the system.

Referring next to FIGS. 16–18, sixth, seventh and eighth embodiments of this invention will be described. These embodiments are similar to the third embodiment.

In the third embodiment, the braking force sensor 110 is adapted to detect, as the braking force, the force which the mounting bracket 152 receives from the inner pad 14b. In the sixth embodiment of FIG. 16, a braking force sensor 260 is interposed between two separate portions of the presser rod 216, to detect a force which the presser rod 216 receives from the inner pad 14b. This force relates to the braking force for braking the disc rotor 11. In the seventh embodiment of FIG. 17, a braking force sensor 262 is interposed between the caliper 202 and the rear portion of the ultrasonic motor 212 remote from the presser rod 216. This sensor 262 detects a force which the ultrasonic motor 212 receives from the inner pad 14b through the presser rod 216. This force also relates to the braking force. In the eighth embodiment of FIG. 18, a braking force sensor 264 is provided on the front end of the presser rod 216. The sensor 264 has a generally part-spherical convex surface in contact with the slant back surface 220 of the backing plate 20 of the inner pad 14b. The sensor 264 detects a force which the presser rod 216 receives from the inner pad 14b. This force also relates to the braking force.

In the present embodiment of FIG. 15, the ultrasonic motor 212 for braking the disc rotor 11 is effectively cooled for improved operating stability of the motor 212, and the motor 240 used in the fourth embodiment of FIGS. 13 and 14 can be eliminated, leading to reduced cost of manufacture of the disc brake 230.

Figure 19:
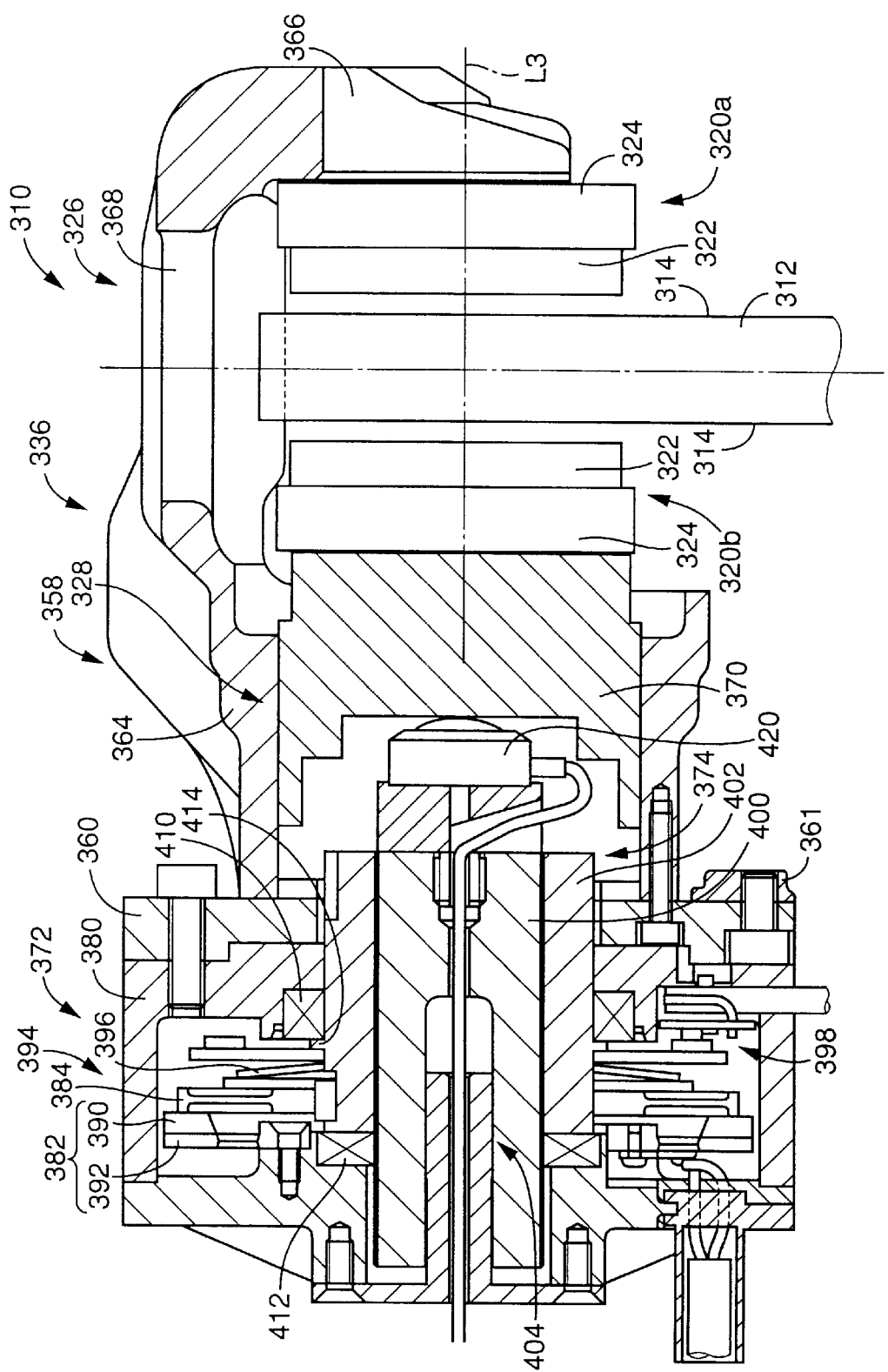
FIG. 19 is a side elevational view in cross section of a motor-driven disc brake in an electrically operated braking system according to a ninth embodiment of the invention.

Referring to FIGS. 19–33, there will be described an electrically operated braking system constructed according to a ninth embodiment of the present invention, for use on a 4-wheel automotive vehicle. The braking system has four motor-driven disc brakes for braking respective four wheels of the vehicle. In FIG. 19, only one of these four motor-driven disc brakes is shown generally at 310.

The motor-driven disc brake 310 has a disc rotor 312 functioning as a rotary member which is rotated with the wheel to be braked. The disc rotor 312 has opposite friction surfaces 314, while the disc brake 310 includes a pair of friction pads 320a, 320b disposed opposite to the respective friction surfaces 314 of the disc rotor 312. Each of these two friction pads 320 has a friction member 322, and a backing plate 324 which is fixed to the back surface of the friction member 322 and which is made of a steel material.

The disc brake 310 includes a pad support mechanism 326, a self-servo mechanism 327, and a pad presser mechanism 328.

The pad support mechanism 326 will be described first.

Figure 20:
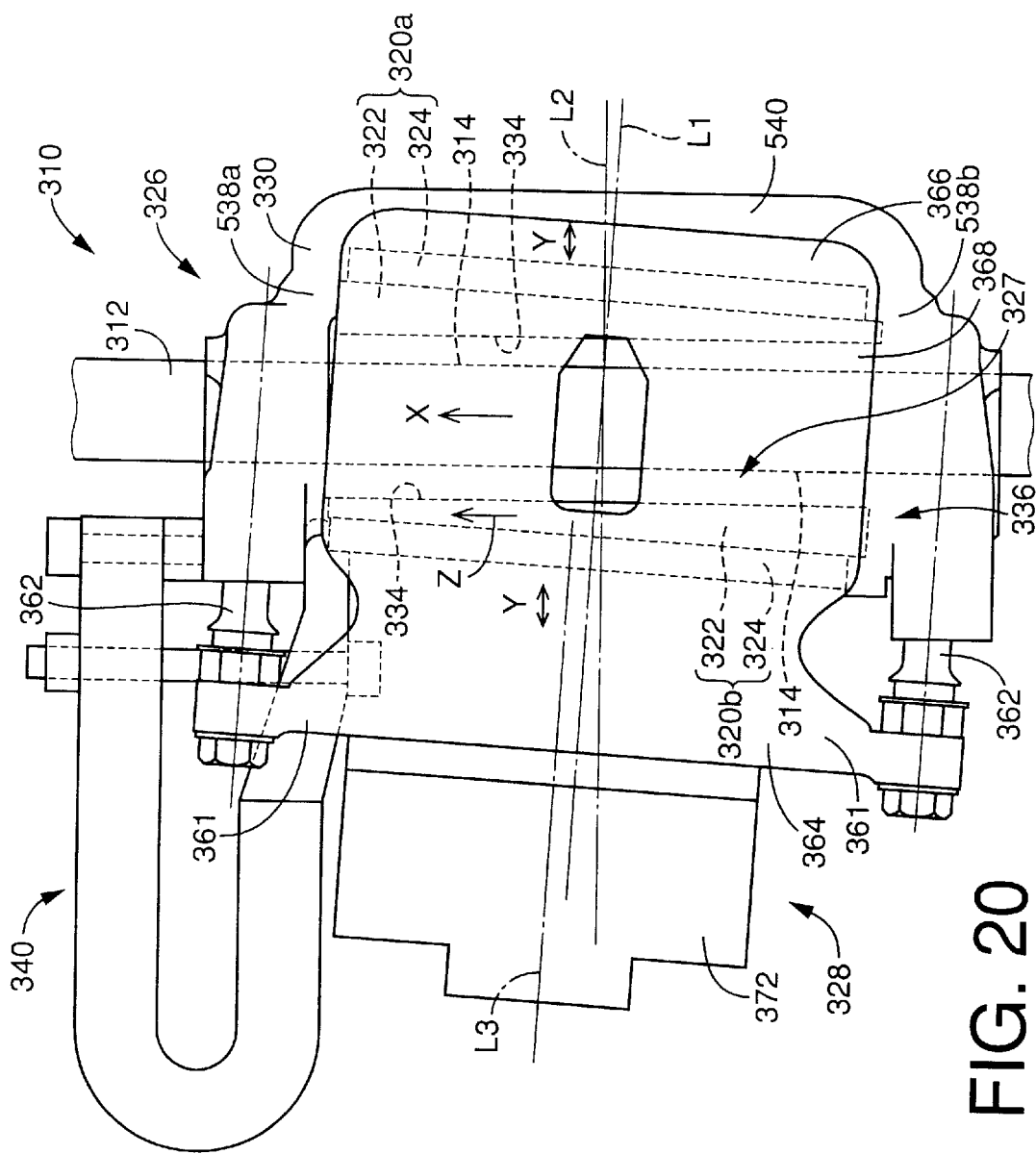
FIG. 20 is a plan view showing the motor-driven disc brake of FIG. 19.

As shown in FIG. 20, the disc brake 310 is provided with a mounting bracket 330 which is fixed to the body of the vehicle so as to extend over the periphery of the disc rotor 312. The mounting bracket 330 includes (a) portions which are located on the opposite sides of the disc rotor 312 and which support the respective friction pads 320a, 320b such that the friction pads 320 are movable in a direction intersecting the friction surfaces 314, and (b) portions functioning as a bearing member, which portions receive friction forces generated due to frictional contacts of the friction pads 320 with the friction surfaces 314 of the disc rotor 312. In FIG. 20, "X" represents a direction of rotation of the disc rotor 312 during forward running of the vehicle, while "Y" represents a direction in which each of the friction pads 320 is movable relative to the friction surfaces 314. The mounting bracket 330 is fixed to the vehicle body such that the upper portion of the mounting bracket 330 as seen in FIG. 20 is located on the front side of the vehicle while the right and left portions of the mounting bracket 330 as seen in FIG. 20 are located on the outer and inner sides of the vehicle as viewed in the lateral or transverse direction of the vehicle. Therefore, the friction pad 320a on the right side of the vehicle is referred to as an outer pad while the friction pad 320b on the left side is referred to as an inner pad.

Then, the self-servo mechanism 327 will be described.

The self-servo mechanism 327 is adapted to enable the inner pad 320b to function as a wedge which provides a self-servo effect. To this end, the inner pad 320b is supported by the mounting bracket 330 such that the inner pad 320b is positively allowed to be dragged along with the disc rotor 312 due to frictional contact of the inner pad 320b with the disc rotor 312. The structure of the mounting bracket 330 for supporting the inner pad 320b in this manner is similar to that in the third embodiment of FIGS. 10–12. In FIG. 20, "Z" represents a direction in which the inner pad 320b is dragged with the disc rotor 312 during the forward running of the vehicle. The inner pad 320b is wedge-shaped with the thickness of the friction member 322 continuously decreasing in the dragging direction "Z", namely, in the direction from the rear side toward the front side of the vehicle. Thus, the friction member 322 of the inner pad 320b has a slant surface 334 which is inclined with respect to the opposite surfaces of the backing plate 324 and which is opposed to the friction surface 314 of the disc rotor 312. With the slant surface 334 held in contact with the friction surface 314, the back surface of the backing plate 324 remote from the friction member 322 is inclined with respect to the friction surface 314. Thus, the backing plate 324 is inclined with respect to the friction surface 314. For a presser rod (which will be described) to engage the backing plate 324 such that the axis of the presser rod is perpendicular to the back surface of the backing plate 324, the mounting bracket 330 is fixed to the vehicle body such that a reference line L1 of the mounting bracket 330 is inclined with respect to an axis L2 of rotation of the disc rotor 312 so that the left portion of the mounting bracket 330 as seen in FIG. 20 is displaced toward the front portion of the vehicle. The reference line L1 is a straight line which passes the centers of the friction pads 320a, 320b and is parallel to the direction Y in which the pads 320 are movable. The reference line L1 is also parallel to the direction in which a caliper 336 engageable with the backing plates 324 of the friction pads 320 is slidably movable relative to the mounting bracket 330 to which the caliper 336 is slidably attached through pins.

The outer pad 320a is not intended to provide a self-servo effect. In this sense, the outer pad 320a need not be wedge-shaped. However, the outer pad 320a is also wedge-shaped following the angle of inclination of a caliper 336 whose direction of movement is parallel to the reference line L1 of the mounting bracket 330 which is inclined with respect to the rotation axis L2 of the disc rotor 312 by the angle of inclination of the backing plate 324 of the inner pad 320b with respect to the friction surfaces 314 of the disc rotor 312. Unlike the friction member 322 of the inner pad 320b, the friction member 322 of the outer pad 320a has a thickness which continuously increases in the dragging direction Z of the inner pad 320b or in the rotating direction X of the disc rotor 312. The wedge shape of the outer pad 320a permits its friction member 322 to contact the friction surface 314 of the disc rotor 312 without a gap or clearance therebetween over the entire area of the friction surface 314.

As described above, the mounting bracket 330 supports the inner pad 320b so as to positively allow the inner pad 320b to be moved or dragged with the disc rotor 312 due to the frictional contact therebetween. However, the mounting bracket 330 supports the outer pad 320b so as to substantially inhibit the outer pad 320a from being moved with the disc rotor 312.

Figure 21:
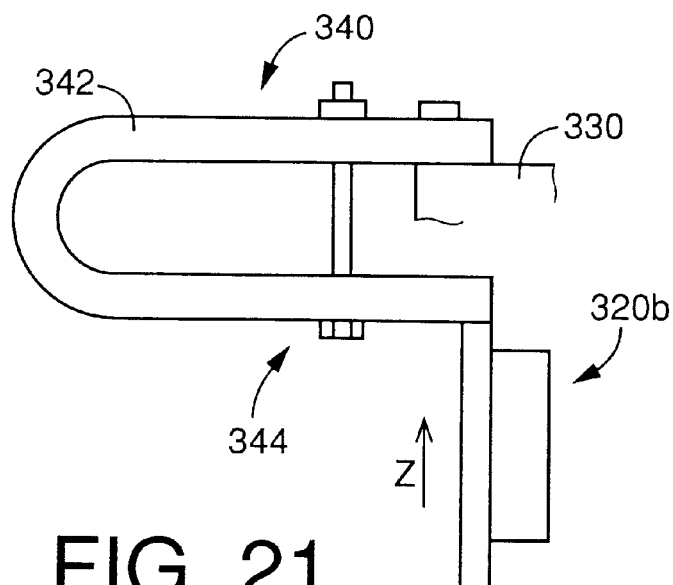
FIG. 21 is an enlarged plan view of an elastic control mechanism in the disc brake of FIG. 20.

As in the third embodiment, the inner pad 320*b* is not always allowed to be moved with the disc rotor 312. Namely, the inner pad 320*b* is supported such that the movement of the inner pad 320*b* with the disc rotor 312 is permitted only after the friction force acting on the inner pad 320*b* exceeds a predetermined threshold. Described more specifically, the inner pad 320*b* is associated with the mounting bracket 330 via an elastic control mechanism 340 as shown in FIG. 21. The elastic control mechanism 340 has an elastic member which receives a load from the inner pad 320*b*.The elastic member is not elastically deformed until the received load is smaller than the predetermined threshold, so that the inner pad 320*b* is inhibited from being moved relative to the mounting bracket 330 in the dragging direction Z, that is, inhibited from being moved with the disc rotor 312, until the load acting on the elastic member is smaller than the threshold. After the load exceeds the threshold, the elastic member of the elastic control mechanism 340 is elastically deformed, allowing the inner pad 320*b* to be moved relative to the mounting bracket 330 and moved or dragged with the disc rotor 312.

The elastic control mechanism 340 will be described in detail by reference to FIG. 21. The mechanism 340 includes (a) a U-shaped elastic member 342 having a pair of arms, and (b) an adjusting mechanism 344 for changing an initial amount of elastic deformation of the elastic member 342, to thereby adjust a pre-load acting on the elastic member 342. This pre-load is equal to the above-indicated predetermined threshold above which the inner pad 320*b* is permitted to be moved in the dragging direction Z against the biasing action of the elastic member 342. The elastic member 342 is positioned such that the pair of arms extend in the lateral or transverse direction of the vehicle. One of the arms is secured to the mounting bracket 330 while the other arm is fixed to the inner pad 320*b*.The adjusting mechanism 344 includes an adjusting bolt which extends in a direction substantially parallel to the dragging direction Z and which connects the two arms of the elastic member 342 so as to permit movements of the two arms toward each other and inhibit movements of the two arms away from each other. The adjusting bolt permits adjustment of the spacing distance between the two arms to thereby permit adjustment of the pre-load acting on the elastic member 342.

Figure 22:
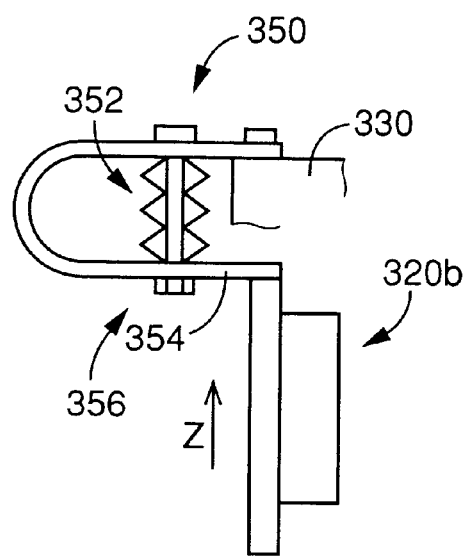
FIG. 22 is a plan view showing a modification of the elastic control mechanism of FIG. 21.

The elastic control mechanism 340 may be replaced by another elastic control mechanism 350 shown in FIG. 22. This elastic control mechanism 350 includes (a) an elastic mechanism 352 consisting of a plurality of coned disc springs coaxially superposed on each other, (b) a transmission mechanism 354 for transmit an elastic force of the elastic mechanism 352 to the inner pad 320*b*,and (c) an adjusting mechanism 356 for adjusting a pre-load acting on the elastic mechanism 352. The transmission mechanism 352 is a U-shaped elastic member having a pair of arms, which is similar to the elastic member 342 of the elastic control mechanism 340 of FIG. 21. The U-shaped elastic member of the transmission mechanism 352 is positioned such that the arms extend in the transverse direction of the vehicle. One of the arms is secured to the mounting bracket 330 while the other arm is fixed to the inner pad 320*b*.In the present elastic control mechanism 350, the elastic mechanism 352 is provided to produce an elastic force acting on the inner pad 320*b*,while the transmission mechanism 354 is provided to transmit this elastic force to the inner pad 320*b*. Accordingly, the transmission mechanism 354 need not be large-sized as compared with the U-shaped elastic member 342 of FIG. 21. The adjusting mechanism 352 includes an adjusting bolt similar to that of the adjusting mechanism 344 of FIG. 21, for adjusting a pre-load of the elastic mechanism 352 by changing an initial amount of elastic deformation of the coned disc springs.

In the present ninth embodiment, the thickness of the friction member 322 of the inner pad 320*b* continuously decreases in the rotating direction X while the thickness of the backing plate 324 of the inner pad 320*b* is constant in the rotating direction X, as indicated in FIG. 20. Thus, the slant surface 344 is provided on the friction member 322. However, the ninth embodiment may be modified such that the thickness of the friction member 322 of the inner pad 320*b* is constant while the thickness of the backing plate 324 continuously decreases in the rotating direction X, so that the slant surface is provided on the backing plate 324. This modification is also possible with respect to the outer pad 320*a*.

In this embodiment, the predetermined threshold of the friction force of the inner pad 320*b*,or the pre-load of the elastic control mechanism 340, 350 is equal to the friction force which is generated between the disc rotor 312 and the inner pad 320*b* when the deceleration of the vehicle achieved by activation of the disc brake 310 is about 0.5–0.6 G. When the deceleration of the vehicle is lower than this threshold of about 0.5–0.6 G with the brake pedal being operated in an ordinary or normal manner, the elastic control mechanism inhibits the dragging of the inner pad 320*b* with the disc rotor 312 to thereby inhibit a self-servo effect of the inner pad 320*b*.When the vehicle deceleration exceeds the threshold with the brake pedal being abruptly depressed by a relatively large amount, the elastic control mechanism allows the inner pad 320*b* to be dragged with the disc rotor 312, permitting the inner pad to achieve the self-servo effect.

It will be understood from the above explanation that the elastic control mechanism 340, 350 constitutes a mechanism for inhibiting the inner pad 320*b* from providing the self-servo effect under a predetermined condition, namely, while the friction force of the inner pad 320*b* is smaller than a predetermined threshold.

The pad presser mechanism 328 will then be explained.

Figure 23:
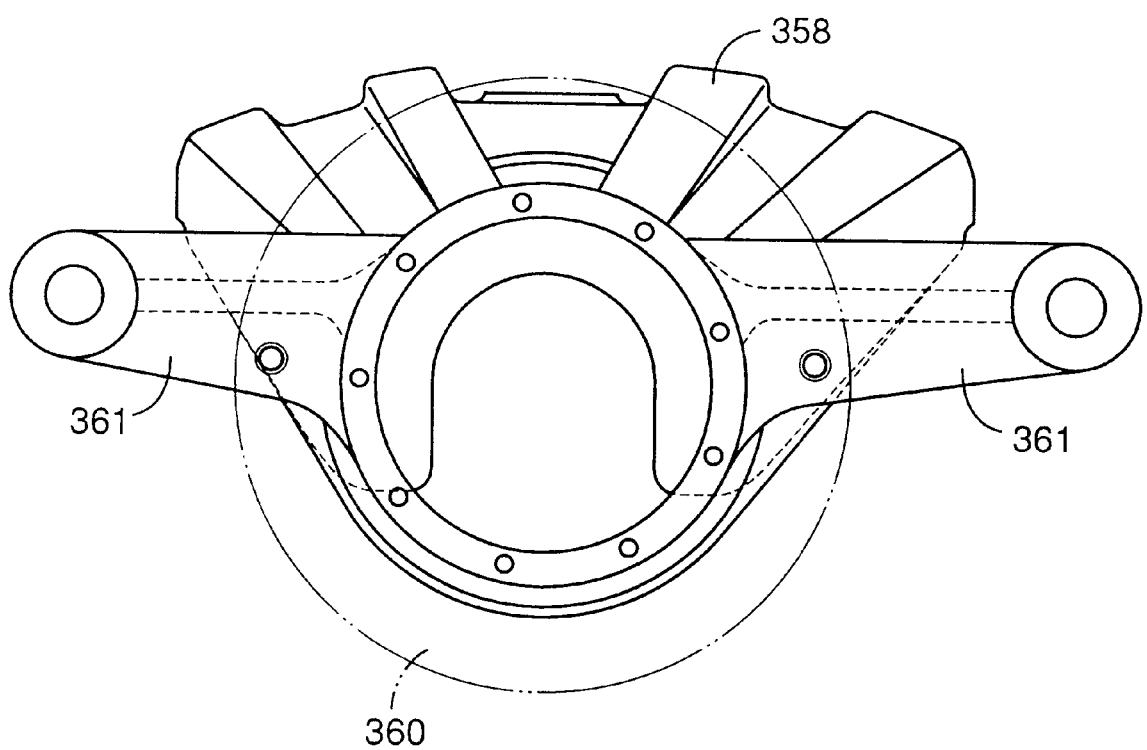
FIG. 23 is a front elevational view of the motor-drive disc brake of FIG. 19.

As indicated above, the disc brake 310 includes the caliper 336 shown in FIGS. 19 and 20. As shown in FIG. 19, the caliper 336 has a body portion 358, and a bracket 360 which is bolted to the body portion. 358. The bracket 360 is located on the inner side of the body portion 358 as seen in the transverse direction of the vehicle, for supporting an ultrasonic motor which will be described. The caliper 336 also has a pair of arms 361 which extend in the longitudinal direction of the vehicle as shown in FIG. 20 and which are bolted to the body portion 358 as shown in FIG. 23. The pair of arms 361 are also bolted to respective portions of the bracket 360 as also shown in FIG. 23. It is noted that FIG. 23 is a view of the caliper 336 taken in the left direction as seen in FIG. 20. In FIG. 23, the body portion 358 and the arms 361 are indicated by solid lines, while the bracket 360 is indicated y two-dot chain line.

While the caliper 336 consists of the separate members, namely, body portion 358, bracket 360 and arms 361 which are bolted together, the caliper may be an integral one-piece structure.

As shown in FIGS. 19 and 20, the caliper 336 is supported at the body portion 358 by the mounting bracket 330 such that the caliper 336 is slidably movable in the direction Y in which the friction pads 320 are movably supported by the mounting bracket 330. The two arms 361 are connected at their end portions to respective two pins 362 which extend in the direction Y. These two pins 362 engage the mounting bracket 330 such that the pins 362 are slidable in the direction Y. Thus, the caliper 336 are slidably supported by the mounting bracket 330, at the body portion 358 and through the two pins 362.

The body portion 358 of the caliper 336 consists of a presser portion 364 disposed adjacent to the backing plate 324 of the inner pad 320b, a reaction portion 366 disposed adjacent to the backing plate 324 of the outer pad 320a, and connecting portion 368 which extend over the periphery of the disc rotor 312 so as to connect the presser and reaction portions 364, 366.

As shown in FIG. 19, a presser rod 370 slidably engages the presser portion 364, such that the front end face of the presser rod 370 faces the backing plate 324 of the inner pad 320b, for abutting contact with this backing plate 324. On the back side of the presser rod 370, a ultrasonic motor 372 is disposed coaxially with the presser rod 370. The ultrasonic motor 372 is fixed to the bracket 360 of the caliper 336. The presser rod 370 and the ultrasonic motor 372 are disposed such that their axes are parallel to the direction Y. Further, the presser rod 370 and the ultrasonic motor 372 are operatively and coaxially connected to each other through a ballscrew mechanism 374. A common axis L3 of the presser rod 370, ultrasonic motor 372 and ballscrew mechanism 374 is parallel to the reference line L1 of the mounting bracket 330, and is offset by a suitable distance from the reference line L1 in the rotating direction X of the disc rotor 312, as indicated in FIG. 20.

It will be understood from the above description of the ninth embodiment that the inner pad 320b is interposed between the disc rotor 312 and the presser rod 370 such that the inner pad 320b can be moved with the disc rotor 312 due to the frictional contact of the slant surface 334 with the friction surface 314, with the presser rod 370 held in abutting contact with the backing plate 324 of the inner pad 320b. When the inner pad 320b is moved with the disc rotor 312, the inner pad 320b functions as a wedge, and the friction force generated between the inner pad 320b and the disc rotor 312 is converted into an axial force which acts on the disc rotor 312 and the presser rod 370 in opposite directions so as to move the presser rod 370 away from the disc rotor 312. Accordingly, the force by which the friction pads 320 are pressed against the opposite friction surfaces 314 of the disc rotor 312 is increased, whereby the friction force between the inner pad 320b and the disc rotor 312 is increased. Thus, the dragging movement of the inner pad 320b with the disc rotor 312 causes the self-servo effect.

The ultrasonic motor 372 is of a travelling-wave type. Since the principle of operation of this motor 372 is well known in the art, the motor 372 will be briefly described.

The motor 372 has a stator 382 and a rotor 384 which are coaxially disposed within a housing 380, as shown in FIG. 19. In operation, the stator 382 produces a surface wave upon application of a ultrasonic vibration thereto, and the rotor 384 is rotated with a friction force acting between the stator 382 and the rotor 384.

Figure 24:
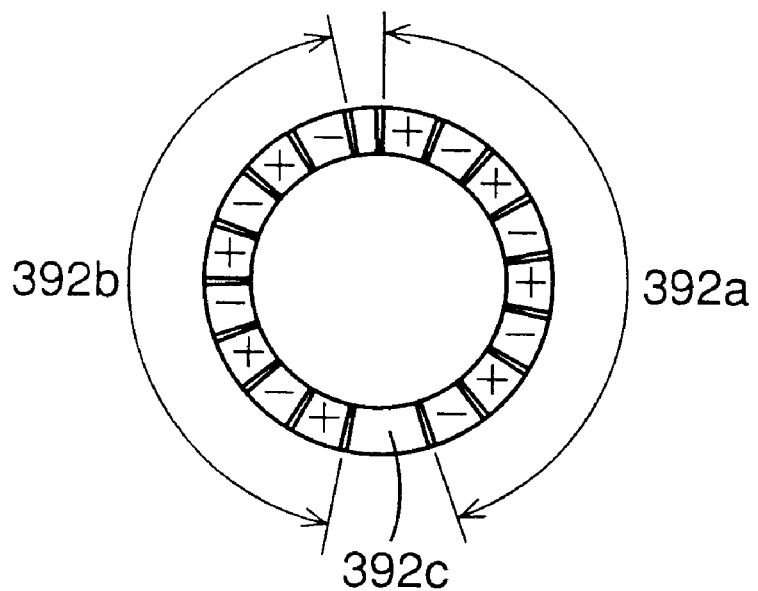
FIG. 24 is a top plan view of a piezoelectric body used in the motor-driven disc brake of FIG. 19, showing an arrangement of electrodes.
Figure 25:
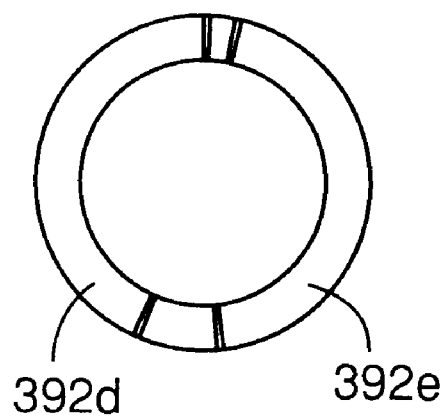
FIG. 25 is a bottom plan view of the piezoelectric body of FIG. 24, shown in an arrangement of electrodes.

The stator 382 consists of an elastic body 390 and a piezoelectric body 392 both of which take the form of a ring. The elastic and piezoelectric bodies 390, 392 are superposed on each other and bonded together. On one of the opposite surfaces of the piezoelectric body 392, two arcuate arrays of electrodes 392a, 392b are formed as shown in FIG. 24, such that the two arrays 392a, 392b have a phase difference of 90°. Each array 392 consists of a plurality of segment electrodes, for instance, nine segment electrodes, whose directions of polarization change alternately in a direction along the arc of the array. The two arcuate arrays 392a, 392b are spaced apart from each other by two areas adjacent to the opposite ends of each array 392. One of these two areas is provided with an electrode 392c having a function described below. On the other surface of the piezoelectric body 392, there are formed two common electrodes 392d, 392e, which are connected to the respective electrode arrays 392a, 292b. Namely, the common electrode 392d is connected to all of the segment electrodes of the array 392a, while the common electrode 392e is connected to all of the segment electrodes of the array 392b.

The rotor 384 is forced by a pressing contactor mechanism 394 onto the stator 382, so that there is produced a suitable amount of friction force therebetween. The rotor 384 has a friction member bonded thereto for frictional contact with the stator 382, so that a travelling-wave vibration generated by the stator 382 is transmitted to the rotor 384, whereby the rotor 384 is rotated. A certain friction force exists between the stator 382 and the rotor 384 even when the piezoelectric body 392 is in a de-energized or off state without a voltage application thereto by the pressing contactor mechanism 394. Based on this friction force, the motor 372 produces a holding torque. In the present embodiment, the pressing contactor mechanism 394 is principally constituted by a coned disc spring 396. However, the coned disc spring 396 may be replaced by a coil spring.

The ultrasonic motor 372 is provided with a rotary position sensor in the form of an encoder 398 for detecting the rotary or angular position of the rotor 394.

The ballscrew mechanism 374 indicated above includes an externally threaded member (threaded shaft) 400, an internally threaded member (nut) 402, and a plurality of balls through which the externally and internally threaded members 400, 402 engage each other. These threaded members 400, 402 are supported by a housing 380 such that the externally threaded member 400 is not rotatable but is axially movable while the internally threaded member 402 is rotatable but is not axially movable. Described in detail, the externally threaded member 400 has a splined portion 404 splined to the housing 380 such that the member 400 is not rotatable relative to the housing 380, while the internally threaded member 402 is attached to the housing 380 through a radial bearing 410 and a thrust bearing 412 such that the member 402 is rotatable relative to the housing 380. A stop 414 is provided to prevent an axial movement of the internally threaded member 402 relative to the housing 380. To this internally threaded member 402, there are attached the rotor 384 and the pressing contactor mechanism 394 such that the rotor 384 and the mechanism 394 are not rotatable relative to the housing 380. In this arrangement, forward rotation of the internally threaded member 402 by forward rotation of the rotor 384 will cause the externally threaded member 400 to move in the right direction as seen in FIG. 19, pushing the presser rod 370 to be advanced for pressing the friction pads 320 to move toward the disc rotor 312. Conversely, reverse rotation of the internally threaded member 402 by reverse rotation of the rotor 384 will cause the externally threaded member 400 to move in the left direction as seen in FIG. 19, permitting the presser rod 370 to be retracted and thereby permitting the friction pads 320 to be retracted away from the disc rotor 312.

The externally threaded member 400 is provided on its end face with a load sensor 420 concentrically attached thereto. The externally threaded member 400 is adapted to abut on the back surface of the presser rod 370 through the load sensor 420, so that the force by which the inner pad 320b is pressed by the motor 372 through the ballscrew mechanism 374 can be detected based on the output signal of the load sensor 420.

Figure 26:
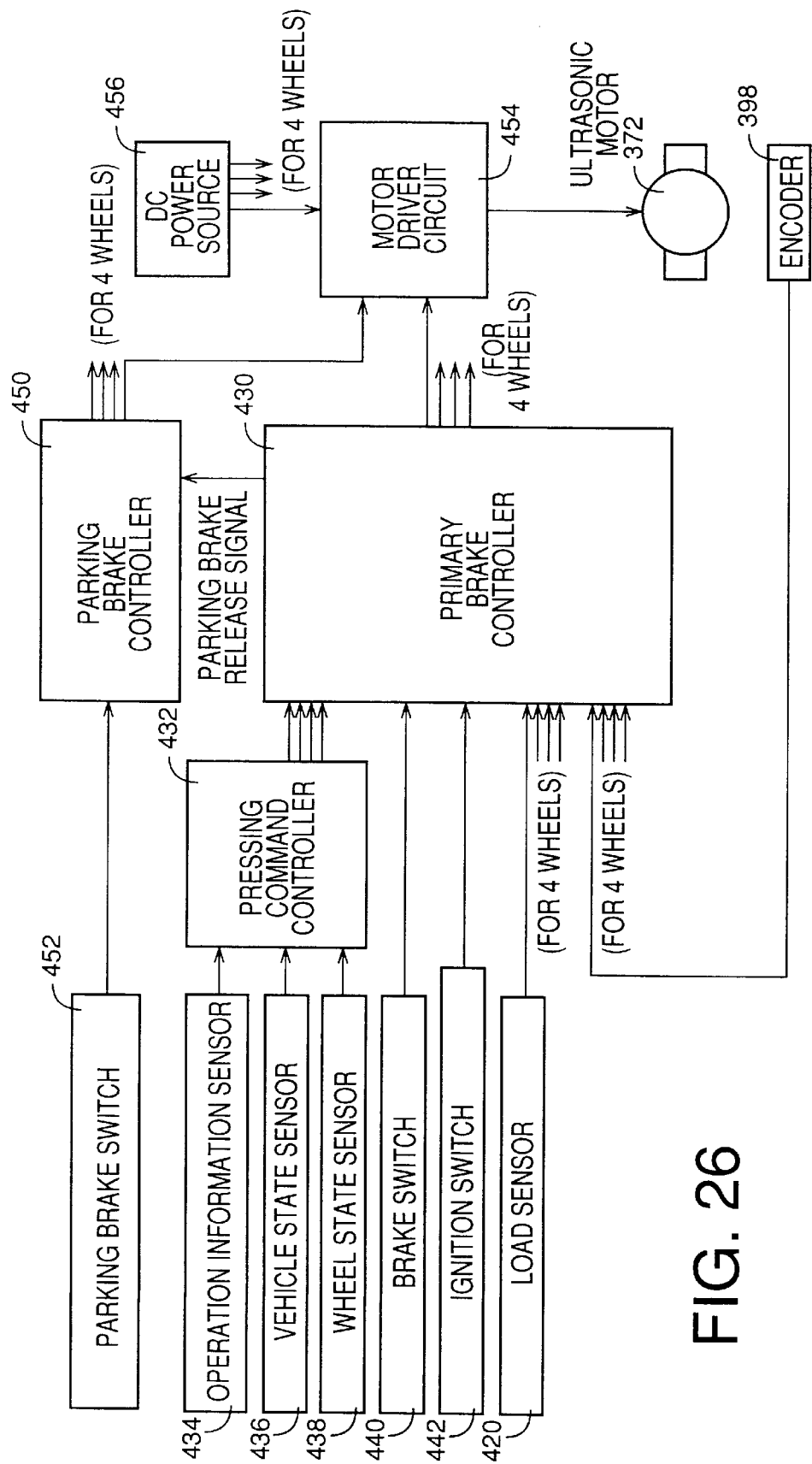
FIG. 26 is a block diagram illustrating an electrical arrangement of the braking system of FIG. 19.
Figure 27:
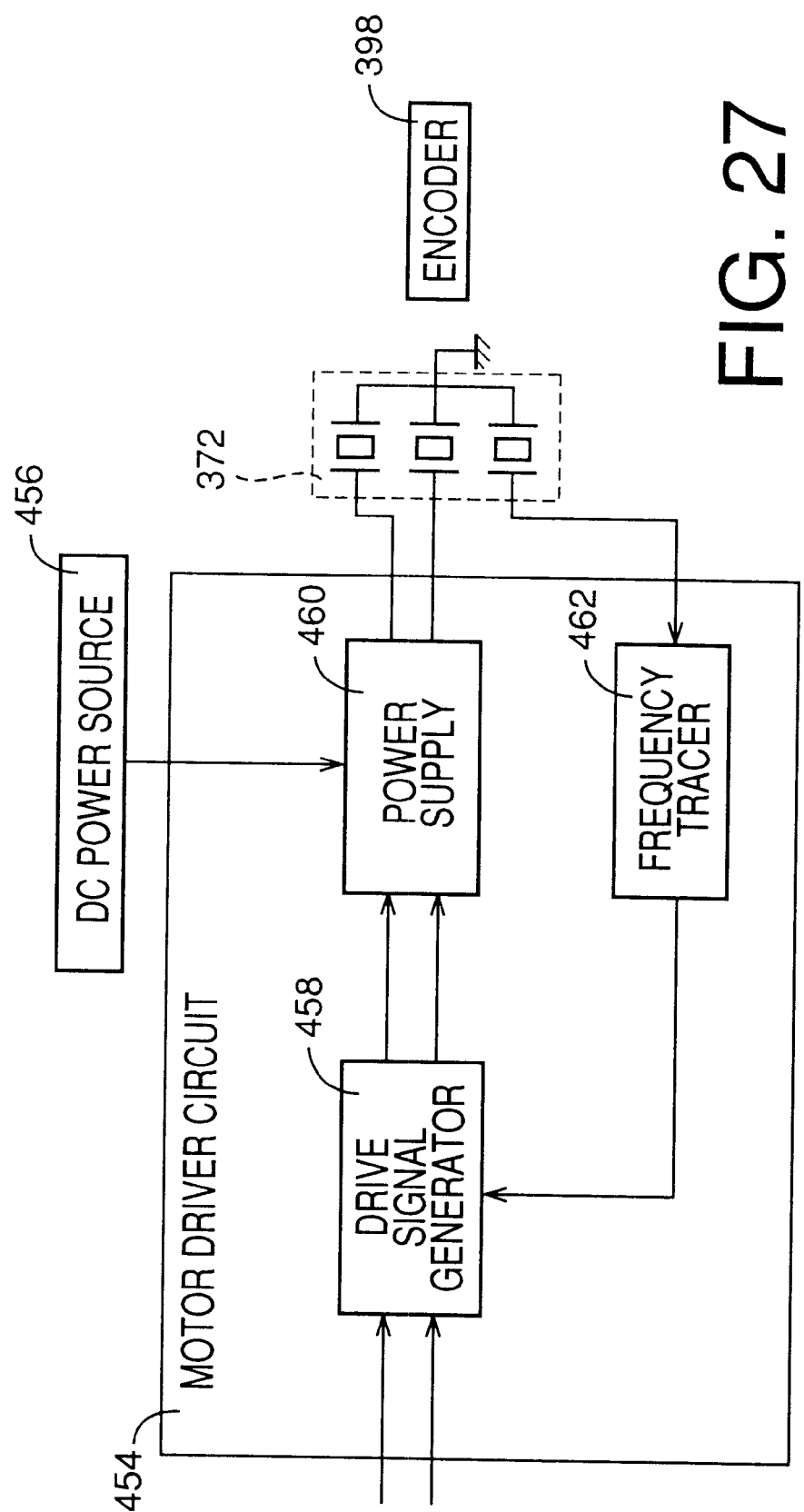
FIG. 27 is a block diagram showing details of a motor driver circuit, and connection of the motor driver circuit to a DC power source and a ultrasonic motor.

Referring to the block diagram of FIG. 26, there is shown an electric control system of the present electrically operated braking system. The control system includes a primary brake controller 420 arranged to control the motor-driven disc brake 310, more specifically, control the ultrasonic motor 372 for regulating the force by which the inner pad 320b is pressed by the motor 372. This force will be referred to simply as "pressing force of the inner pad 320b". The controller 430 is principally constituted by a computer incorporating a CPU, a ROM and a RAM.

The primary controller 430 is connected at its input interface to a pressing command controller 432 which is also principally constituted by a computer. The pressing command controller 432 is connected to an operation information sensor 434, a vehicle state sensor 436 and a wheel state sensor 438.

The operation information sensor 434 is adapted to obtain information relating to the operation of the vehicle by the vehicle operator, such as the steering angle of the steering wheel, operating state (operating force and/or amount) of the brake operating member, and operating state (operating force and/or amount) of the accelerator pedal. The present braking system includes a brake pedal (not shown) as the brake operating member to be depressed by the vehicle operator, and a device for producing a brake operating force corresponding to the operating state of the brake pedal. The operation information sensor 434 includes at least a sensor for detecting this brake operating force as the operating state of the brake operating member. The vehicle state sensor 436 is adapted to obtain information relating the state of the vehicle, such as the running speed, lateral and longitudinal acceleration values of the vehicle body, and a yaw rate and a slip angle of the vehicle body. The wheel state sensor 438 is adapted to obtain information relating to the state of each vehicle wheel, such as the rotating speed, acceleration and slip ratio of the wheel.

The pressing command controller 432 applies to the primary brake controller 430 various commands for controlling at least one of the disc brakes 310 for the four wheels, so as to effect various controls such as "braking force distribution control", "anti-lock pressure control", "traction control", "vehicle stability control" and "abrupt braking control".

In the "braking force distribution control", the pressing force of the disc brake 310 for each wheel is controlled so as to establish an optimum distribution of the braking forces for the front wheels to those for the rear wheels, to establish a deceleration value of the vehicle which corresponds to the brake operating force, and to prevent locking of the rear wheels prior to locking of the front wheels. The braking operating force is detected by the operation information sensor 434 (e.g., brake pedal depression force sensor). The "anti-lock pressure control" is initiated when a locking tendency of a wheel is detected. In the anti-lock pressure control, the pressing force of the disc brake 310 for the wheel in question is controlled so as to prevent an increase in the locking tendency of the wheel. The locking tendency of each wheel is detected based on at least the output signal of the wheel state sensor 438 (e.g., wheel speed sensors). The "traction control" is initiated when a spinning tendency of a drive wheel is detected during starting or acceleration of the vehicle. In the traction control, the pressing force of the disc brake 310 for the wheel in question is controlled so as to prevent an increase in the spinning tendency of the wheel. The spinning tendency of each drive wheel is also detected based on at least the output signal of the wheel state sensor 438 (e.g., wheel speed sensors). The "vehicle stability control" is initiated when an understeering tendency or an oversteering tendency of the vehicle is detected. In the vehicle stability control, the pressing force of at least one of the disc brakes 310 for the right and left wheels is controlled to regulate a difference between the braking forces applied to the right and left wheels, so as to prevent an increase in the understeering or oversteering tendency. The understeering or oversteering tendency is detected by the vehicle state sensor 436. The "abrupt braking control" is effected when an abrupt brake is applied to the vehicle. In the abrupt braking control, the pressing force of the disc brake 310 for each wheel is controlled so as to compensate for a shortage of the wheel braking forces corresponding to a shortage of the brake operating force. The abrupt brake application is detected based the output signal of the operation information sensor 434, more precisely, based on the output signal of a sensor for detecting the operating amount of the brake operating member. Namely, the abrupt brake application is detected when a rate of increase in the operating amount becomes higher than a predetermined upper limit, which is not reached during normal brake application.

The primary brake controller 430 is also connected at its input interface to a brake switch 440 and an ignition switch 442.

The brake switch 440 is a sensor for detecting an operation of the brake pedal as the brake operating member. The brake switch 440 is on when the brake pedal is depressed, and off when the brake pedal is not operated. The ignition switch 442 is a sensor for detecting starting of an engine of the vehicle. The ignition switch 442 is on when the engine is operating, and off when the engine is off The primary brake controller 430 is further connected at its input interface to the load sensor 420 and encoder 398 which have been described.

The present braking system further includes a parking brake controller 450, which is adapted to activate the disc brakes 310, upon operation of a parking brake, for holding the vehicle in a parked or stationary state. Like the primary brake controller 430, the parking brake controller 450 is principally constituted by a computer. The parking brake controller 450 is connected at its input interface to a parking brake switch 454, which is a sensor for detecting an operation of the parking brake. The parking brake switch 454 is on when the parking brake is operated, and off when the parking brake is in the non-operated state.

The primary brake controller 430 and the parking brake controller 450 are connected at their output interfaces to a motor driver circuit 454, which is provided for the ultrasonic motor 372 of the disc brake 310 for each wheel of the vehicle. To this motor driver circuit 454, there are connected the ultrasonic motor 372, and a DC power source 456 commonly used for the disc brakes 310 for the four wheels.

Figure 29:
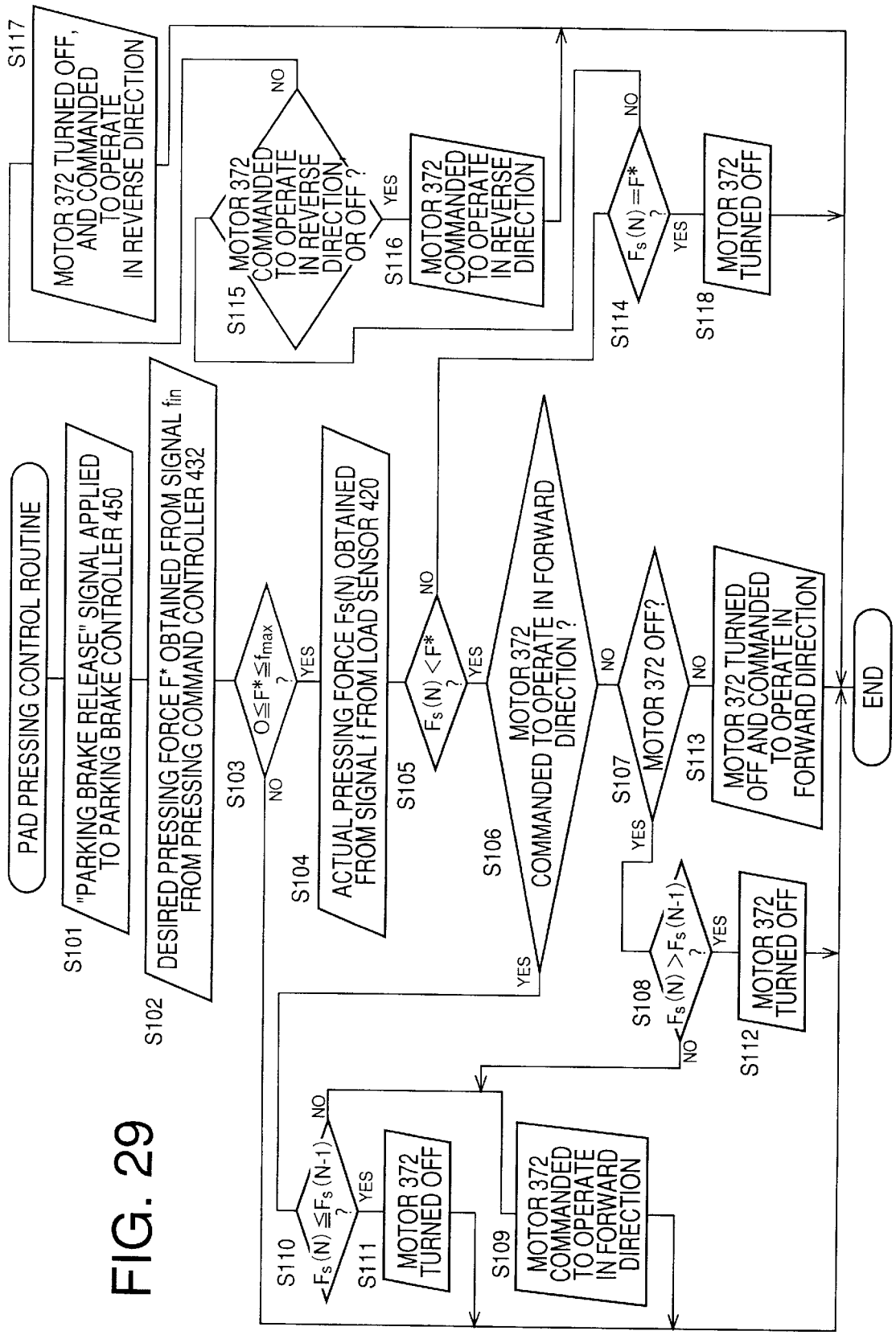
FIG. 29 is a flow chart illustrating a pad pressing control routine implemented in step S15 of the routine of FIG. 28.

Referring to the block diagram of FIG. 29, there are shown functional elements of the motor driver circuit 454. That is, the motor driver circuit 454 includes a drive signal generator 458, a power supply 460 and a frequency tracer 462.

The signal generator 458 is connected to the output interfaces of the main brake controller 430 and parking brake controller 450, to receive a motor control signal. Based on the received motor control signal, the signal generator 458 applies to the power supply 460 a drive signal which has a variable frequency. The drive signal is a high-frequency two-phase alternating signal with a phase difference of 90° between the two arrays of electrodes 392a, 392b of the ultrasonic motor 372. The power supply 460 is connected to a DC power source 456. Based on the drive signal received from the signal generator 458, the power supply 460 supplies controlled power to the electrode arrays 392a, 392b of the motor 372.

For improving the driving efficiency of the ultrasonic motor 372, the piezoelectric body 392 is preferably driven at a resonance frequency thereof or a frequency close to the resonance frequency. The resonance frequency of the piezoelectric body 392 varies with its temperature and a load of the motor 372. The frequency tracer 462 is provided to change the frequency of the drive signal generated by the signal generator 458, in response to or following a change in the resonance frequency of the piezoelectric body 392. The frequency tracer 462 is arranged to monitor the oscillating state of the stator 382, on the basis of the output signal of the electrode 392c, while utilizing f fact that the electrode 392c generates a voltage corresponding to an oscillation amplitude of the stator 382 due to a piezoelectric effect. Based on the monitored state of the stator 382, the frequency tracer 462 applies to the signal generator 458 a signal for optimizing the frequency of the drive signal to be applied to the power supply 460.

Figure 28:
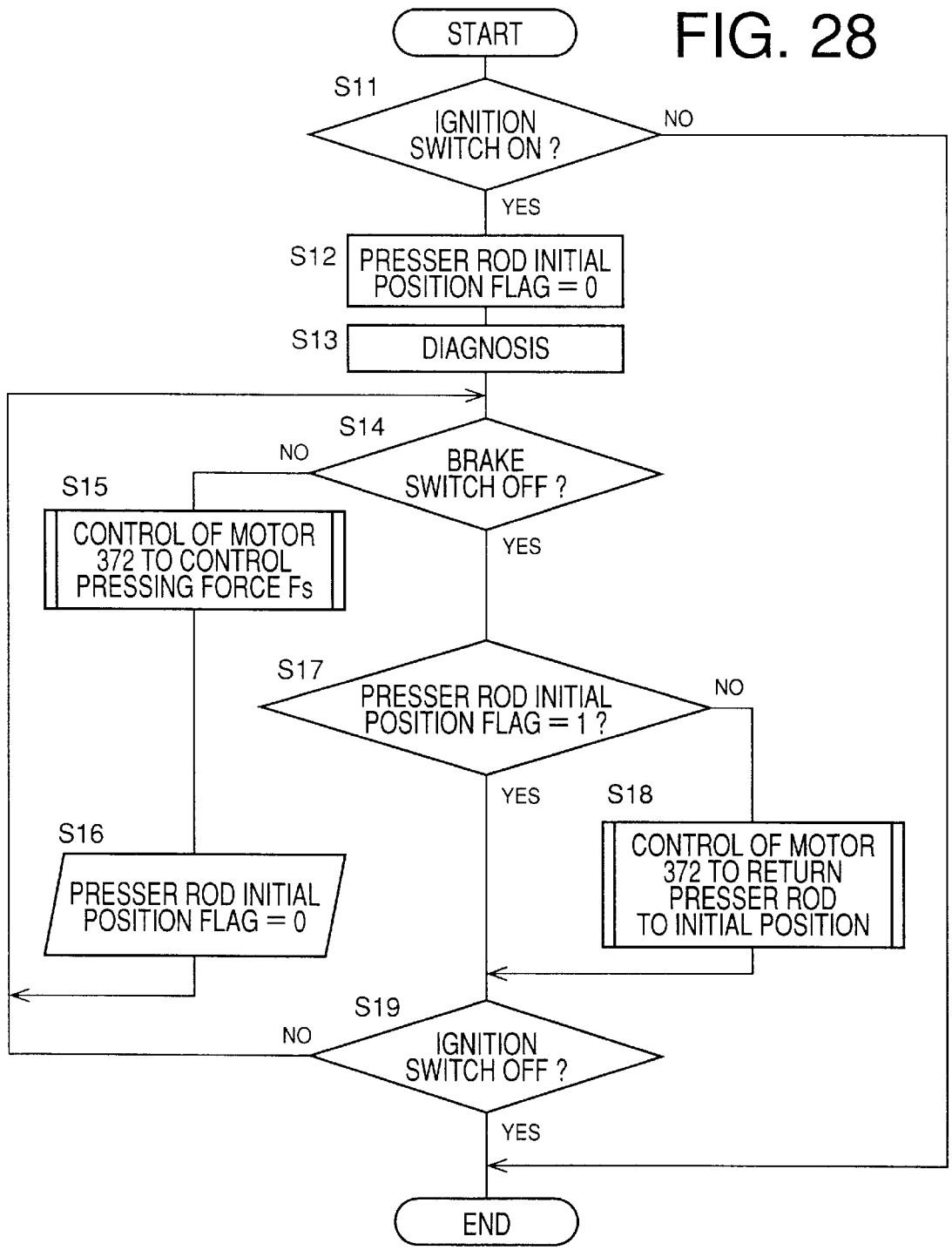
FIG. 28 is a flow chart illustrating a brake control routine executed according to a program stored in a ROM of a computer of a primary brake controller shown in FIG. 26.

The primary brake controller 430 executes a brake control routine illustrated in the flow chart of FIG. 28, according to a program stored in the ROM of the computer.

Described briefly, the brake control routine includes step S15 which is implemented upon activation of the disc brake 310 (when the brake switch 440 is turned ON), to control the ultrasonic motor 372 so that an actual pressing force Fs of the inner pad 320b is made equal to a desired or target value F*.

When the actual pressing force Fs is smaller than the desired value F*, the motor 372 is energized in a first direction with a forward drive signal applied thereto, and is rotated in a forward direction, so that the actual pressing force Fs is increased.

If an increase in the actual pressing force Fs is no longer detected even with the forward drive signal being applied to the motor 372, the motor 372 is de-energized with an OFF signal applied thereto, and the motor 372 generates the holding torque, so that the motor 372, internally and externally threaded members 402, 400 and presser rod 370 are locked. In this condition, the actual pressing force Fs is increased owing to the wedge effect of the inner pad 320b. To check if the actual pressing force Fs is not increased while the forward drive signal is applied to the motor 372, the primary brake controller 430 determines whether the amount of increase of the actual pressing force Fs(N) detected in the present cycle (of execution of the brake control routine of FIG. 28) as compared with the actual pressing force Fs(N−1) detected in the last cycle is equal to or smaller than a predetermined first reference value, which is set to be "zero", for instance. If the amount of increase is equal to or smaller than the first reference value, it is determined that the actual pressing force Fs is no longer increased even while the forward drive signal is applied to the motor 372.

If an increase in the actual pressing force Fs is continuously detected with the motor 372 turned off, that is, if the amount of increase of the present value Fs(N) from the last value Fs(N−1) is larger than a predetermined second reference value (which is set to be "zero", for example), the motor 372 is held off (held locked). If an increase in the actual pressing force is no longer detected, the forward drive signal is applied to the motor 372.

When the actual pressing force Fs is larger than the desired value F*, the motor 372 is energized in a second direction with a reverse drive signal being applied therefore, and is rotated in the reverse direction, so that the actual pressing force Fs is decreased.

When the actual pressing force Fs is equal to the desired value F*, the motor 372 is held off or de-energized with the OFF signal applied thereto.

The brake control routine of FIG. 28 also includes step S18 which is implemented when the brake operating member is released, to control the motor 372 for returning the presser rod 370 to a predetermined initial or fully retracted position.

The brake control routine will be described in detail by reference to the flow chart of FIG. 28. The brake control routine is executed for the disc brakes 310 for the four wheels, in a predetermined order, even while the ignition switch 442 is off. The following description is based on an assumption that the routine is repeatedly executed with a predetermined cycle time T for the same wheel.

The brake control routine is initiated with step S11 to determine whether the ignition switch 442 is ON. This determination is effected on the basis of the output signal of the ignition switch 442. If a negative decision (NO) is obtained in step S11, one cycle of execution of the routine is terminated.

If an affirmative decision (YES) is obtained in step S11, the control flow goes to step S12 in which a PRESSER ROD INITIAL POSITION FLAG (which will be described) is reset to "0". Step S12 is followed by step S13 to diagnose the primary brake controller 430, the ultrasonic motor 372 (brake actuator) of the disc brake 310 for the wheel in question, and the motor drive circuit 454 for the wheel in question. Then, the control flow goes to step S14 to determine whether the brake switch 440 is OFF. This determination is effected based on the output signal of the brake switch 440. If the brake switch 440 is ON, that is, if a negative decision (NO) is obtained in step S14, the control flow goes to step S15 in which the ultrasonic motor 372 is controlled to control the pressing force Fs of the disc brake 310. Step S15 is followed by step S16 in which the PRESSER ROD INITIAL POSITION flag is reset to "0". Then, the control flow goes back to step S14. Thus, steps S14–S16 are repeatedly implemented while the brake switch 440 is ON, namely, while the brake operating member is held depressed.

In step S15, a pad pressing control routine as illustrated in the flow chart of FIG. 29 is executed. This routine is repeatedly executed as steps S14–S16 are repeatedly implemented while the brake switch 440 is held ON.

The pad pressing control routine of FIG. 29 is initiated with step S101 in which a parking brake control signal for releasing the parking brake is applied to the parking brake controller 450. As a result, the parking brake by the disc brake 310 for the wheel in question is released, as described later in detail. Step S101 is followed by step S102 in which a pressing force signal $f_{in}$ corresponding to the wheel in question is received from the pressing command controller 432, and the desired value F* of the pressing force of the inner pad 320b of the disc brake 310 for the wheel in question is obtained based on the received pressing force signal $f_{in}$. Then, the control flow goes to step S103 to determine whether the desired pressing force value F* is not smaller than zero and is not larger than a predetermined upper limit $f_{max}$. That is, step S103 is implemented to determine whether the obtained desired pressing force value F* is abnormal or not. If a negative decision (NO) is obtained in step S103, one cycle of execution of the routine of FIG. 29 is terminated.

If an affirmative decision (YES) is obtained in step S103, the control flow goes to step S104 in which the actual pressing force Fs(N) is detected based on a load signal f received from the load sensor 420. The force Fs(N) detected in the present cycle of execution of the routine of FIG. 29 represents a force by which the inner pad 320b is pressed against the disc rotor 312 by the presser rod 370. Step S104 is followed by step S105 to determine whether the presently detected actual pressing force Fs(N) is smaller than the desired value F*. However, step S105 may be modified to determine whether the detected actual pressing force Fs(N) is smaller than a sum of the desired value F* and a predetermined small value Δ.

There are three possible cases, namely, a first case wherein the detected actual pressing force Fs(N) is smaller than the desired value F*, a second case wherein the detected actual pressing force Fs(N) is larger than the desired value F*, and a third case wherein the detected actual pressing force Fs(N) is equal to the desired value F*. These three cases will be described in this order.

(1) Where the detected actual pressing force Fs(N) is smaller than the desired value F*

In this case, an affirmative decision (YES) is obtained in step S105, and the control flow goes to step S106 to determine whether the forward drive signal is being applied to the motor 372, that is, whether the motor 372 is commanded to operate in the forward direction.

Figure 30:
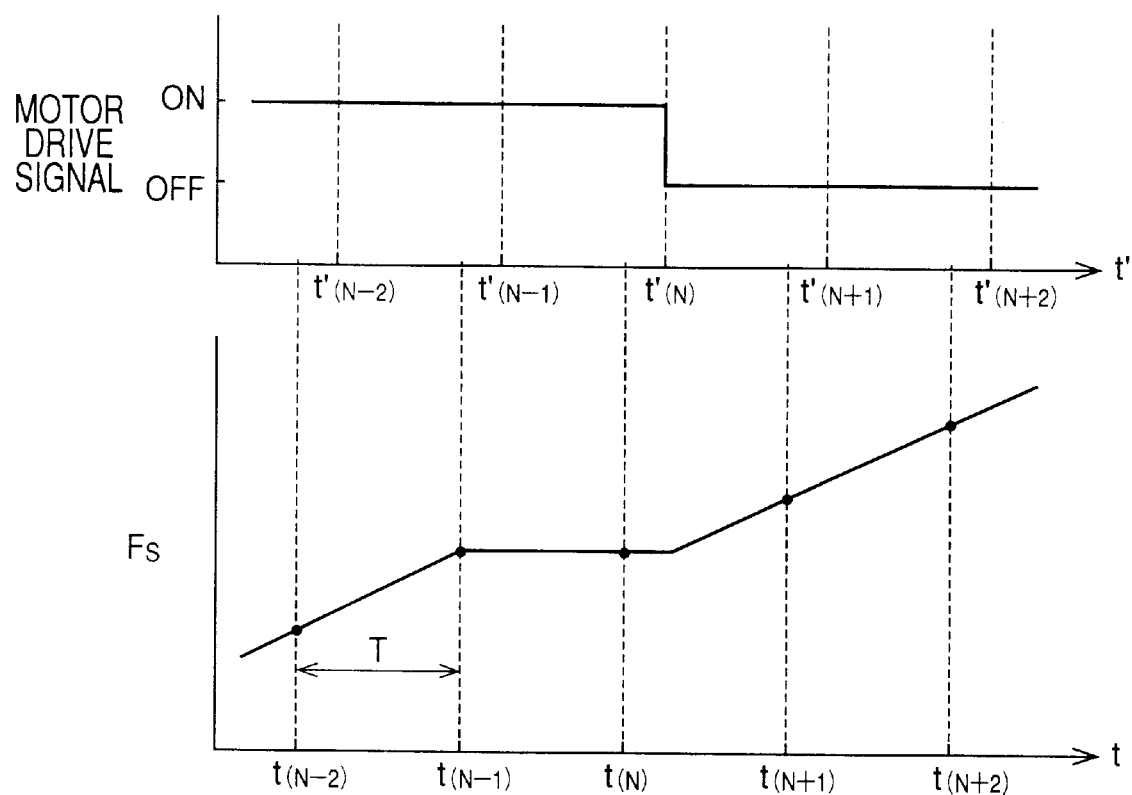
FIG. 30 is a graph indicating an example of control of a pad pressing force according to the brake control routine of FIG. 28.

The graph of FIG. 30 shows a relationship between a time t at which the actual pressing force Fs is detected by the load sensor 420, and a time t' at which the motor 372 is turned on and off. The motor drive signal is generated based on the presently detected actual pressing force Fs(N). Accordingly, the present motor drive signal is generated at a time t' (N) which is slightly later than a time t(N) at which the actual pressing force Fs(N) is detected in the present control cycle, and the next motor drive signal is generated at a time t' (N+1) which is slightly later than a time t(N+1) at which the actual pressing force Fs(N+1) is detected in the next control cycle. If a control period T is defined as a period between the times t(N) and t(N+1) at which the actual pressing force Fs is detected in the present and next control cycles, the last generated motor drive signal is effective in an initial portion of the present control period T, and the present motor drive signal is generated at a moment some time later than the beginning of the present control period T. Therefore, step S106 is provided to determine whether the last generated forward drive signal is being applied to the motor 372.

If a negative decision (NO) is obtained in step S106, the control flow goes to step S107 to determine whether the motor 372 is off. Where the forward drive signal is not applied to the motor 372 (the negative decision is obtained in step S106), either the reverse drive signal is applied to the motor 372 or the motor 372 is in the de-energized or off state. If the motor 372 is off and an affirmative decision (YES) is obtained in step S107, the control flow goes to step S108 to determine whether the actual pressing force Fs(N) detected in the present control cycle is larger than the actual pressing force Fs(N−1) detected in the last control cycle, that is, whether the actual pressing force Fs is in the process of increasing. Where the routine of FIG. 29 is executed for the first time, step S108 determines whether the actual pressing force Fs(1) detected in the first control cycle is larger than a value Fs(0) which is zero. The value Fs(0) is stored in the ROM of the primary brake controller 430.

If a negative decision (NO) is obtained in step S108, the control flow goes to step S109 in which the motor 372 is commanded to operate in the forward direction with the forward drive signal applied thereto. In this case, one cycle of execution of the routine is terminated.

If an affirmative decision (YES) is obtained in step S106 in the present control cycle following the control cycle in which the forward drive signal was applied to the motor 372 in step S109, the control flow goes to step S110 to determine whether the actual pressing force Fs(N) detected in the present control cycle is equal to or smaller than the actual pressing force Fs(N−1) detected in the last control cycle, that is, determine whether the actual pressing force Fs has increased as a result of the forward operation of the motor 372. The actual pressing force Fs will increase as a result of the forward operation of the motor 372 until the actual pressing force Fs has reached an upper limit corresponding to a maximum drive force of the motor 372. After the actual pressing force Fs has reached the upper limit, the motor 372 is not operated in the forward direction but is operated in the reverse direction even with the forward drive signal being applied to the motor 372, whereby the actual pressing force Fs is no longer increased. Thus, the determination in step S110 is effected to determine whether the actual pressing force Fs(N) has reached the upper limit. If a negative decision (NO) is obtained in step S110, that is, if the presently detected actual pressing force Fs(N) is larger than the last detected actual pressing force Fs(N1−), the control flow goes to step S109 in which the forward drive signal remains applied to the motor 372. In this case, one cycle of execution of the routine is terminated.

While the present actual pressing force Fs(N) is larger than the last actual pressing force Fs(N−1), that is, before the actual pressing force Fs(N) has increased to the upper limit owing to the self-servo effect, the negative decision (NO) is obtained in step S110, and the forward drive signal is continuously applied to the motor 372 in step S109. When the maximum drive force of the motor 372 has been reached, the actual pressing force Fs(N) no longer increases, and the presently detected actual pressing force Fs(N) becomes equal to the last detected actual pressing force Fs(N−1). In this case, an affirmative decision (YES) is obtained in step S110, and the control flow goes to step S111 in which the motor 372 is de-energized or turned off, so that the motor 372 produces the holding torque which resists a reaction force transmitted from the friction pads 320.

In the example of FIG. 30 wherein the actual pressing force Fs(N) detected at time t(N) in the present control cycle remains the same as the actual pressing force Fs(N−1) detected at time t(N−1) in the last control cycle. In this example, the OFF signal is applied to the motor 372 at time t' (N). As a result, the holding torque is produced by the motor 372, and the actual pressing force Fs increases, in the presence of the holding torque of the motor 372 resisting the reaction force of the friction pads 320.

In the control cycle executed after the motor 372 is turned off in step S111, the negative decision (NO) is obtained in step S106 while the affirmative decision (YES) is obtained in step S107, so that the control flow goes to step S108. Since the actual pressing force Fs(N) increases owing to the self-servo effect in the presence of the holding torque of the motor 372, the affirmative decision (YES) is obtained in step S108, and the control flow goes to step S112 in which the motor 372 remains in the off state.

The self-servo effect of the inner pad 320b decreases as the time passes after the motor 372 is turned off to produce the holding torque. Eventually, the presently detected actual pressing force Fs(N) remains the same as the last detected value Fs(N−1). In this case, the negative decision (NO) is obtained in step S108, and the control flow goes to step S109 in which the forward drive signal is applied to the motor 372. In this respect, it is noted that the self-servo effect may not be provided even with the motor 372 held in the off state, for some reason or other, for instance, due to a gap between the front end face of the presser rod 370 and the back surface of the inner pad 320b, which gap may be created as a result of an advancing movement of the inner pad 320b toward the disc rotor 312. In this case, the forward operation of the motor 372 with the forward drive signal being applied thereto in step S109 will cause an increase in the actual pressing force Fs(N).

The affirmative decision (YES) may be obtained in step S105 while the reverse drive signal is applied to the motor 372. In this case, the negative decision (NO) is obtained in step S106 and also in step S107, so that the control flow goes to step S113 in which the motor 372 is first turned off and then commanded to operate in the forward direction.

Figure 31:
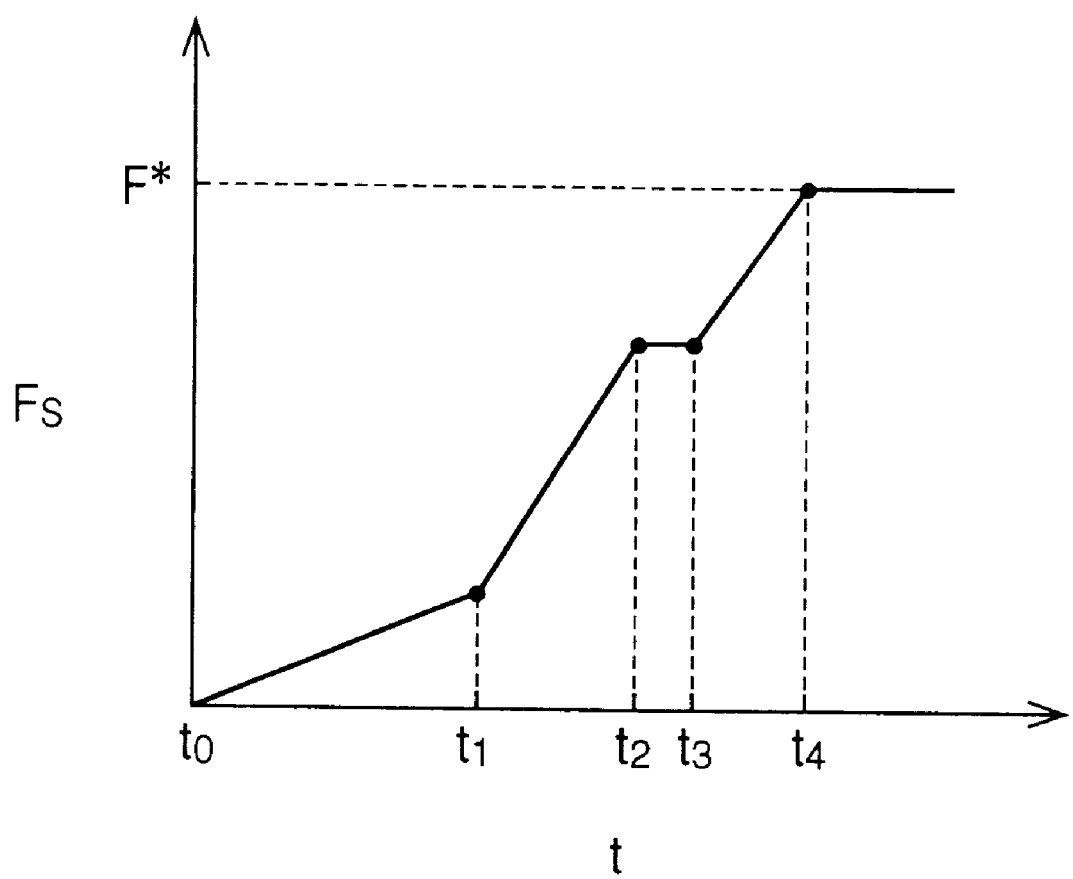
FIG. 31 is a graph indicating another example of control of the pad pressing force according to the brake control routine of FIG. 28.

Referring to the graph of FIG. 31, there is shown another example of a change in the actual pressing force Fs up to the desired value F*, upon operation of the brake operating member for activating the disc brake 310.

In the example of FIG. 31, the brake operating member is operated at time t0, and the desired value F* of the actual pressing force Fs is determined also at the time t0. As a result, the motor 372 is turned on, and the actual pressing force Fs is increased. During an initial period t0–t1, the elastic control mechanism 340 inhibits the dragging of the inner pad 320b with the disc rotor 312, for thereby inhibiting the inner pad 320b from achieving the self-servo effect.

As a result of the increase of the actual pressing force Fs during the forward rotation of the motor 372, the friction force acting on the friction pad 320b becomes larger than the predetermined threshold (determined by the elastic control mechanism 340) at the time t1, so that the inner pad 320b is dragged with the disc rotor 312, achieving the self-servo effect for rapidly increasing the actual pressing force Fs of the inner pad 320b during a period t1–t2.

The drive force of the motor 372 has reached the maximum value at the time t2, and the pressing force Fs remains constant. As a result, the motor 372 is turned off at time t3, producing the holding torque. During the following period t3–t4, the actual pressing force Fs increases again, in the presence of the holding torque. The actual pressing force Fs reaches the desired value F* at time t4. Subsequently, the motor 372 is controlled so as to maintain the actual pressing force Fs at the desired value F*, as described later.

(2) Where the detected actual pressing force Fs(N) is larger than the desired value F*

In this case, a negative decision (NO) is obtained in step S105, and the control flow goes to step S114 to determine whether the actual pressing force Fs(N) is equal to the desired value F*. Step S114 may be modified to determine whether the actual pressing force Fs(N) is not smaller than the desired value F* minus a predetermined small value Δ, and is not larger the desired value F* plus the predetermined small value Δ. In the present case wherein the actual pressing force Fs(N) is larger than the desired value F*, a negative decision (NO) is obtained in step S114, and the control flow goes to step S115 to determine whether the reverse drive signal is applied to the motor 372 or the motor 372 is off. If an affirmative decision (YES) is obtained in step S115, the control flow goes to step S116 in which the reverse drive signal is applied to the motor 372, so that the actual pressing force Fs is decreased. One cycle of execution of the routine is terminated with step S116.

If the forward drive signal is applied to the motor 372, a negative decision (NO) is obtained in step S115, and the control flow goes to step step S117 in which the motor 372 is first turned off, and then the reverse drive signal is applied to the motor 372.

(3) Where the detected actual pressing force Fs(N) is equal to the desired value F*

In this case, the negative decision (NO) is obtained in step S105 while an affirmative decision (YES) is obtained in step S114, so that step S118 is implemented to turn off the motor 372. One cycle of execution of the routine is terminated with step S118.

The operation of the primary brake controller 430 when the brake switch 440 is ON has been described above. If the brake switch 440 is OFF, an affirmative decision (YES) is obtained in step S14 in the brake control routine of FIG. 28. In this case, the control flow goes to step S17 to determine whether the PRESSER ROD INITIAL POSITION flag is set at "1". If this flag is set at "0", a negative decision (NO) is obtained in step S17, and the control flow goes to step S18 in which the presser rod initial position control routine is executed. Step S18 is followed by step S19 to determine whether the ignition switch 442 is OFF. If the ignition switch 442 is ON, that is, if a negative decision (NO) is obtained in step S19, the control flow goes back to step S14. Therefore, steps S14 and S17–S19 are repeatedly implemented while the brake switch 440 is OFF while the ignition switch 442 is ON, and the PRESSER ROD INITIAL POSITION flag s set at "0".

Figure 32:
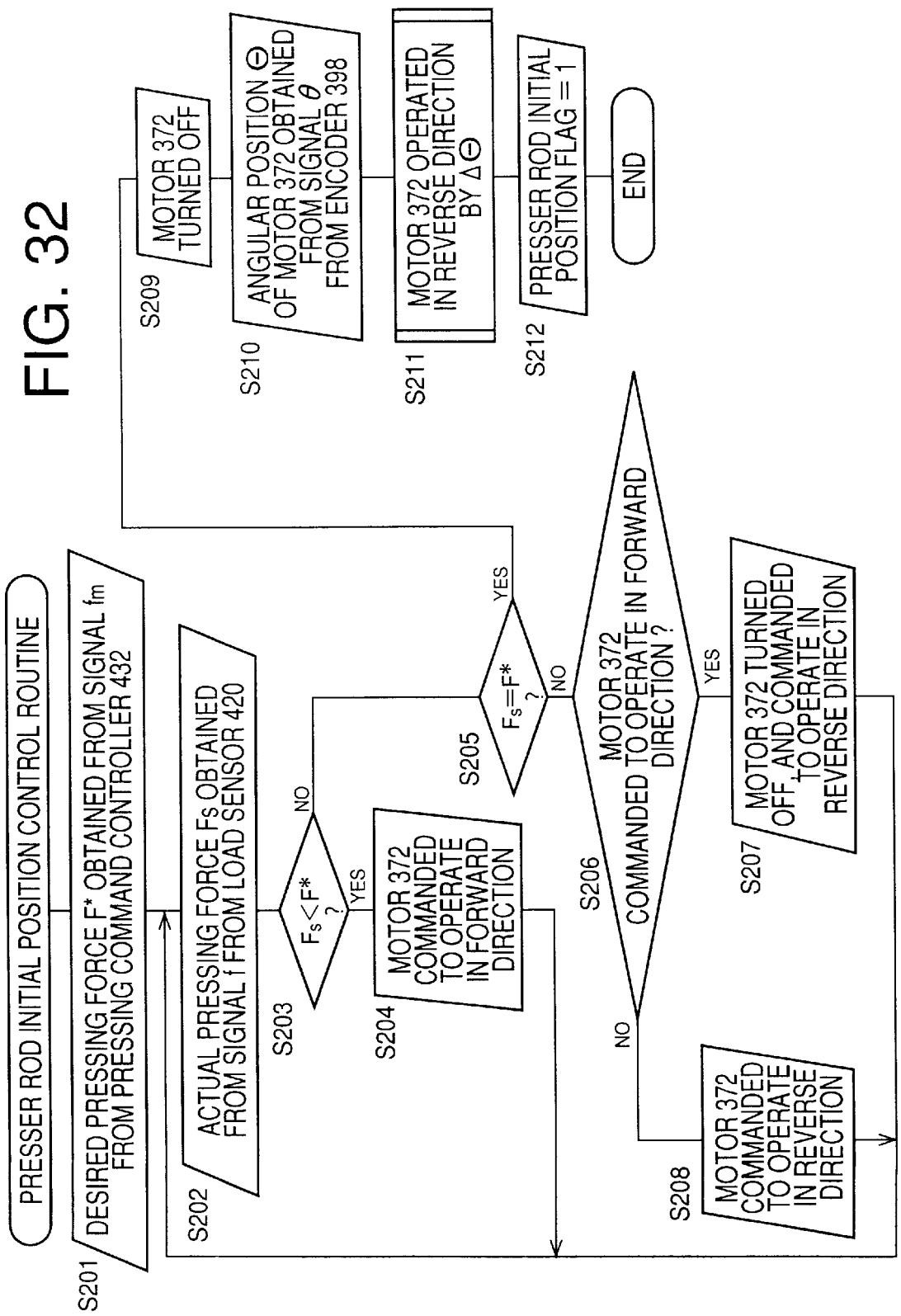
FIG. 32 is a flow chart illustrating a presser rod initial position control routine implemented in step S18 of the routine of FIG. 28.

The presser rod initial position control routine executed in FIG. 18 is illustrated in the flow chart of FIG. 32. This routine of FIG. 18 is repeatedly executed when steps S14 and S17–19 are repeatedly implemented in the brake control routine of FIG. 28.

The presser rod initial position control routine will be first described briefly.

The brake control routine of FIG. 28 may be formulated such that the presser rod 370 is returned to its predetermined initial or fully retracted position when the brake operating member is turned to its non-operated position. In other words, the initial position in which the presser rod 370 is placed while the disc brake 310 is not operated may be fixed. However, the friction members 322 of the friction pads 320 wear as it is used. If the presser rod 370 is always returned to the predetermined fixed initial or fully retracted position, the gap between the front end face of the presser rod 370 and the back surface of the inner pad 320b increases with an increase in the amount of wear of the friction pads 320. The increased gap means an unnecessarily large movement of the presser rod 370 from its initial 10 position (fully retracted or non-operated position) to the point of abutting contact with the inner pad 320b. In view of this fact, step S18 is implemented in the brake control routine of FIG. 28. Namely, the presser rod initial position control routine of FIG. 32 is executed, for changing the initial position of the presser rod 370 in accordance with a change in the position of the back surface of the inner pad 320b due to an increase in the amount of wear of the friction members 322.

Described more specifically, immediately after the brake operating member is returned to the non-operated position, the presser rod 370 is advanced from the initial position until the front end face comes into abutting contact with the back surface of the inner pad 320b. The axial position of the presser rod 370 at which this abutting contact takes place is obtained. The abutting contact of the presser rod 370 with the inner pad 320b is detected when the load detected by the load sensor 420 increases to a predetermined value. This value is the minimum load value that can be detected by the load sensor 420, or slightly larger than this minimum load value. The axial position at which the abutting contact takes place is obtained on the basis of the output signal of the encoder 398 which represents the rotary or angular position of the motor 372. It is noted that the axial position of the presser rod 370 at which the abutting contact takes place reflects not only the amount of wear of the inner pad 320b but also the amount of wear of the outer pad 320a. Then, the presser rod 370 is retracted by a predetermined distance from the axial position at which the abutting contact took place. To this end, the motor 372 is rotated in the reverse direction by a predetermined angle ΔΘ corresponding to the predetermined distance indicated above. Thus, the initial or fully retracted position of the presser rod 370 is updated in accordance with the amount of wear of the friction members 322 of the friction pads 320.

Referring to the flow chart of FIG. 32, the presser rod initial position control routine will be described in detail.

The routine of FIG. 32 is initiated with step S201 in which the desired value F* of the pressing force Fs of the inner pad 320b is obtained on the basis of a pressing force signal $f_m$ received from the pressing command controller 432. The pressing force signal $f_m$ represents the above-indicated minimum load value that can be detected by the load sensor 420. When the brake switch 440 is OFF, the pressing force signal $f_m$ is fed from the pressing command controller 432 to the primary brake controller 430.

Then, step S202 is implemented to obtain the actual pressing force Fs on the basis of the load signal f received from the load sensor 420. Step S202 is followed by step S203 to determine whether the actual pressing force Fs obtained in step S202 is smaller than the desired value F* obtained in step S201. Namely, step S203 is provided to determine whether the presser rod 370 is still spaced apart from the inner pad 320b. Step S203 may be modified to determine whether the actual pressing force Fs is smaller than the desired value F* plus a predetermined small value Δ. If an affirmative decision (YES) is obtained in step S203, that is, if the presser rod 370 has not come into abutting contact with the inner pad 320b, the control flow goes to step S204 in which the forward drive signal is applied to the motor 372, so that the presser rod 370 is advanced. Then, the control flow goes back to step S202.

When the actual pressing force Fs has reached or exceeded the desired value F*, a negative decision (NO) is obtained in step S203, and the control flow goes to step S204 to determined whether the actual pressing force Fs is equal to the desired value F*. This step S204 is provided to determine whether the presser rod 370 has been brought into abutting contact with the inner pad 320b to initiate an operation to press the inner pad 320b against the disc rotor 312. If the actual pressing force Fs has exceeded the desired value F*, a negative decision (NO) is obtained in step S205, and the control flow goes to step S206 to determine whether the forward drive signal is being applied to the motor 372. If an affirmative decision (YES) is obtained in step S206, the control flow goes to step S207 in which the motor 372 is first turned off, and then the reverse drive signal is applied to the motor 372. Then, the control flow goes back to step S202. If a negative decision (NO) is obtained in step S206, the control flow goes to step S208 in which the reverse drive signal is applied to the motor 372. In either of the above cases of steps S207 and S208, the presser rod 370 is retracted in the direction away from the inner pad 320b. Step S208 is also followed by step S202.

If the actual pressing force Fs is equal to the desired value F*, it means that the presser rod 370 has come into abutting contact with the inner pad 320b. In this case, an affirmative decision (YES) is obtained in step S205, and the control flow goes to step S209 to turn off the motor 372. Step S209 is followed by step S210 in which the rotary or angular position Θ of the rotor 384 of the motor 372 is detected on the basis of the angular position Θ detected by the encoder 398. Then, the control flow goes to step S211 in which the motor 372 is rotated in the reverse direction by the predetermined angle ΔΘ with the reverse drive signal applied thereto. The predetermined angle ΔΘ corresponds to a suitable amount of gap which is provided between the friction pads 320 and the friction surfaces 314 of the disc rotor 312 and which is necessary to avoid frictional contact or dragging of the friction pads 320 with the disc rotor 312. As a result of the reverse rotation of the motor 372 in step S211, the presser rod 370 is retracted by the predetermined distance from the point of abutting contact thereof with the inner pad 320b to the updated initial or fully retracted position. Thus, the initial position of the presser rod 370 is updated. Step S211 is followed by step S212 in which the PRESSER ROD INITIAL POSITION flag is set to "1". This flag indicates that the presser rod 370 is placed in the updated initial position when it is set at "1", and indicates that the initial position of the presser rod 370 has not been updated. One cycle of execution of the presser rod initial position control routine of FIG. 32 is terminated with step S212.

Upon one cycle of execution of the presser rod initial position control routine of FIG. 32, the control flow goes to step S19 of the brake control routine of FIG. 28 to determine whether the ignition switch 442 is OFF. If this switch 442 is ON, the negative decision (NO) is obtained in step S19, and the control flow goes back to step S14. If the brake switch 440 is OFF, the affirmative decision (YES) is obtained in step S14, and the control flow goes to step S17. Since the PRESSER ROD INITIAL POSITION flag has been set to "1" in step S212 of the presser rod initial position control routine of FIG. 32, an affirmative decision (YES) is obtained in step S17, and the control flow goes to step S19, while skipping step S18 (presser rod initial position control routine of FIG. 32). If the ignition switch 442 is turned off as the steps S14 and S17–S19 are repeatedly implemented, an affirmative decision (YES) is obtained in step S19, and one cycle of execution of the routine of FIG. 28 is terminated.

Referring to the flow chart of FIG. 33, there will be described a parking brake control routine executed by the parking brake controller 450 according to a program stored in the ROM.

Figure 33:
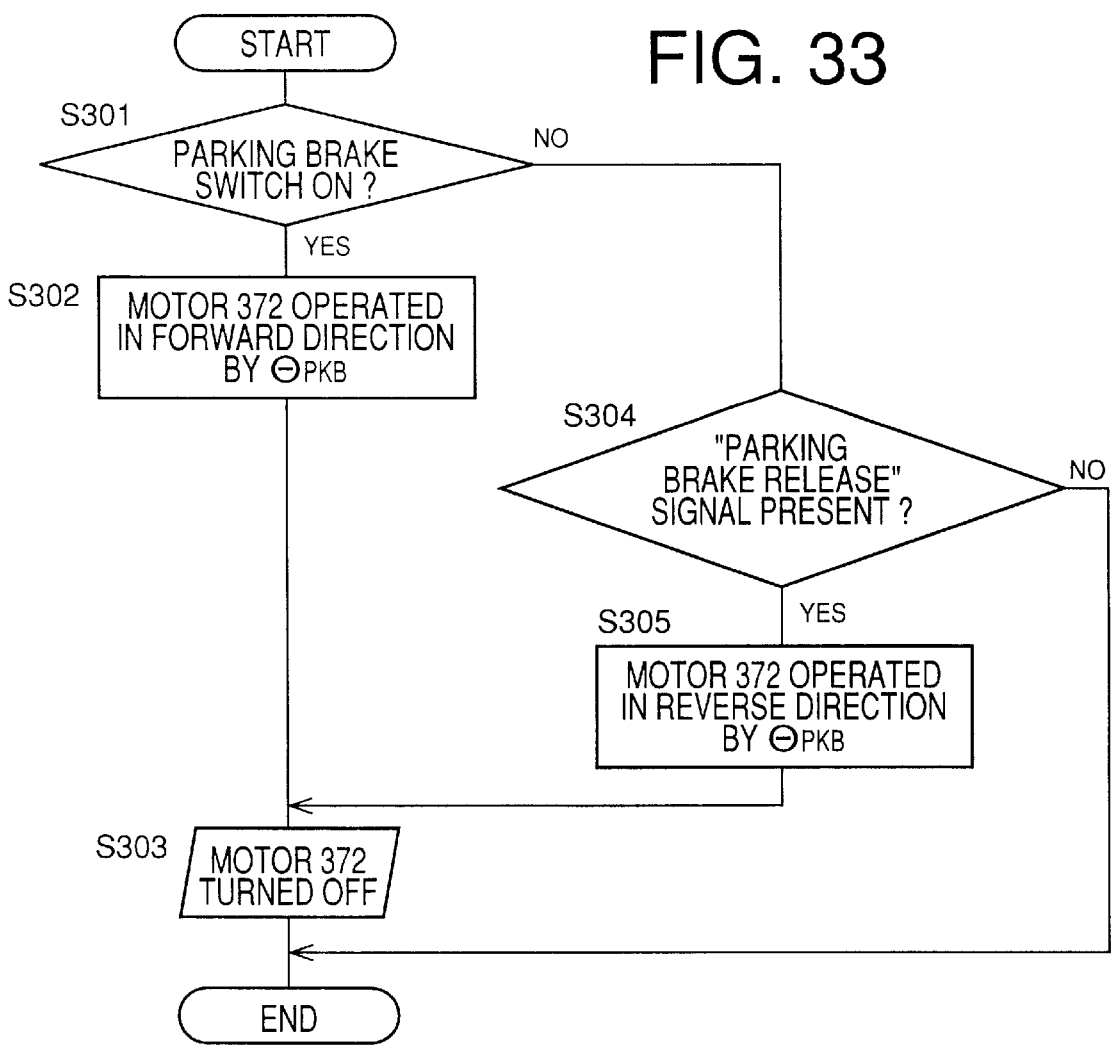
FIG. 33 is a flow chart illustrating a parking brake control routine executed according to a program stored in a ROM of a computer of a parking brake controller shown in FIG. 26.

The parking brake control routine of FIG. 33 is executed also when the ignition switch 442 is OFF. The routine is initiated with step S301 to determine whether the parking brake switch 452 is ON. If an affirmative decision (NO) is obtained in step S301, the control flow goes to step S302 in which the motor 372 is operated in the forward direction by a predetermined angle $Θ_{PKB}$ with the forward drive signal applied thereto. As a result, the presser rod 370 is advanced from the initial position, to produce the pressing force Fs necessary to apply a suitable parking brake force to the wheel in question. Step S302 is followed by step S303 to turn off the motor 372. As a result, the motor 372 produces the holding torque for maintaining the disc brake 310 in the parking brake state, so that the parked vehicle is held stationary. One cycle of execution of the routine of FIG. 33 is terminated with step S303.

If the parking brake switch 452 is OFF, a negative decision (NO) is obtained in step S301, and the control flow goes to step S304 to determine whether the parking brake release signal is present. If a negative decision (NO) is obtained in step S304, one cycle of execution of the routine is terminated. If an affirmative decision (YES) is obtained in step S304, the control flow goes to step S305 in which the motor 372 is rotated in the reverse direction with the reverse drive signal applied thereto, so that the presser rod 370 is returned to the initial position. Step S305 is followed by step S303 to turn off the motor 372, and one cycle of execution of the routine is terminated.

It will be understood from the foregoing description of the present ninth embodiment of the invention that a motor control device for controlling the ultrasonic motor 372 is constituted by the primary brake controller 430, pressing command controller 432, operation information sensor 434, vehicle state sensor 436, wheel state sensor 438, brake switch 440, ignition switch 442, load sensor 420, parking brake controller 450, parking brake switch 452, motor driver circuit 454 and encoder 398. It will also be understood that insufficient increase preventing means for preventing shortage of the amount of increase of the actual pressing force Fs is constituted by the ultrasonic motor 372, load sensor 420 and a portion of the primary brake controller 430 assigned to implement steps S106–S112 of FIG. 29, while de-energizing means for de-energizing the motor 372 to produce a holding torque are constituted by the load sensor and the portion of the primary brake controller 430 assigned to implement steps S106–S112, and that the load sensor 420 serves as a sensor for detecting a value relating to the pressing force Fs, and a pressing force sensor for detecting the pressing force Fs.

Next, a tenth embodiment of this invention will be described. This tenth embodiment, which is similar in many aspects to the ninth embodiment, is different from the ninth embodiment only in the pad pressing control routine. Further, the pad pressing control routine in the tenth embodiment is similar in many aspects from that in the ninth embodiment. Therefore, there will be described only the steps of the pad pressing control routine of the tenth embodiment which are different from those of the ninth embodiment, with the same step numbers being used to identify the same steps.

In the ninth embodiment, the affirmative decision (YES) is obtained in steps S105 and S107 while the negative decision (NO) is obtained in step S106 if the actual pressing force Fs(N) is smaller than the desired value F* while the motor 372 is in the off state. In this case, the control flow goes to step S108 to determine whether the presently detected actual pressing force Fs(N) has increased with respect to the last detected value Fs(N−1). The control flow goes to step S109 or S112 depending upon the affirmative or negative decision obtained in step S108. If the presently detected actual pressing force Fs(N) has not increased, that is, if the negative decision (NO) is obtained in step S108, it means that it is not appropriate to hold the motor 372 in the off state, so that the forward drive signal is applied to the motor 372 in step S109. If the presently detected actual pressing force Fs(N) has increased, that is, if the affirmative decision (YES) is obtained in step S108, it means that it is appropriate to hold the motor 372 in the off state, so that the motor 372 is held off in step S112.

Figure 34:
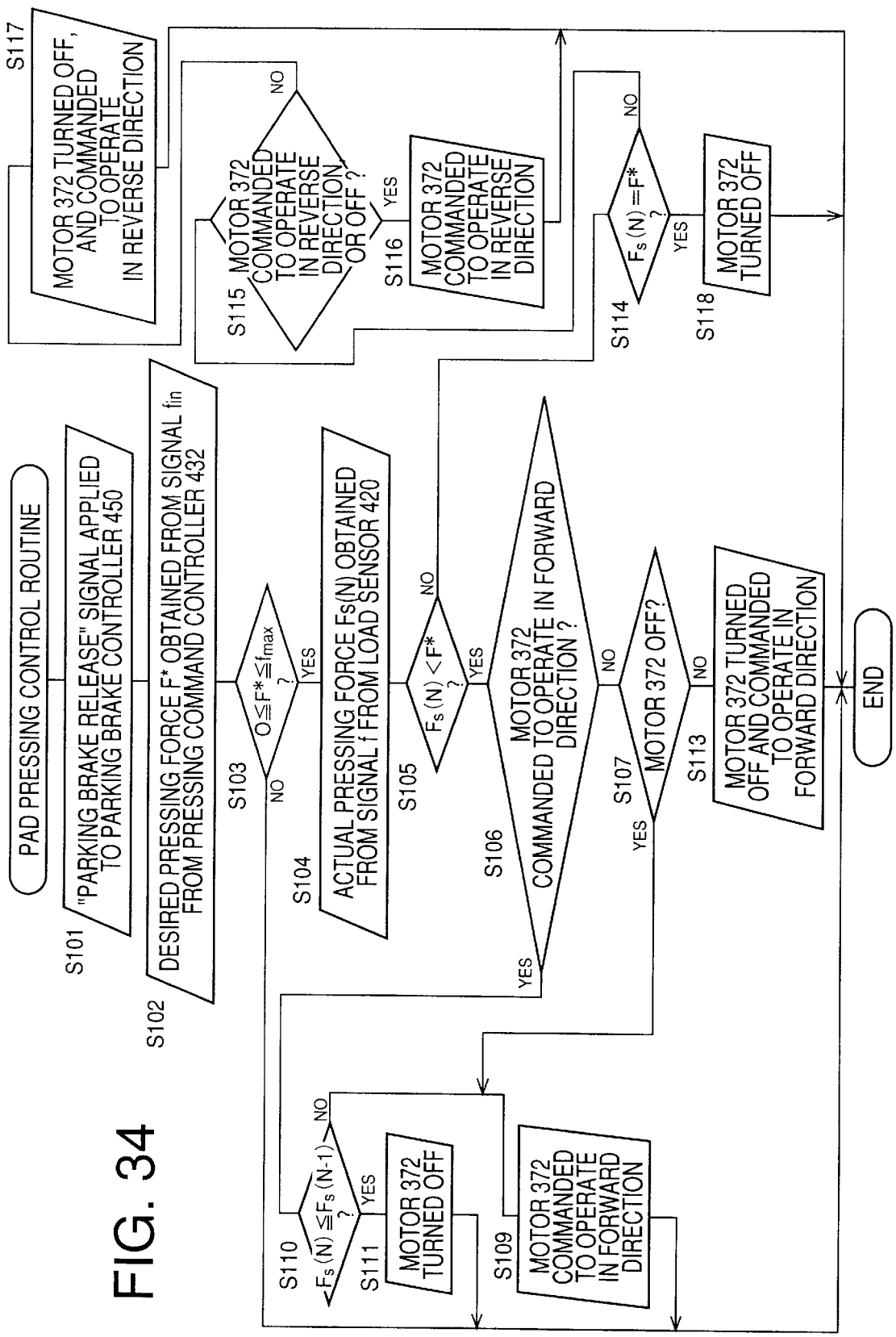
FIG. 34 is a flow chart illustrating a pad pressing control routine executed according to a program stored in a ROM of a primary brake controller in an electrically operated braking system constructed according to a tenth embodiment of this invention.

The pad pressing control routine according to the tenth embodiment is illustrated in the flow chart of FIG. 34. This routine of FIG. 34 does not include steps S108 and S112. Accordingly, if the presently detected actual pressing force Fs(N) is smaller than the desired value F* while the motor 372 is off, the affirmative decision (YES) is obtained in steps S105 and S107 while the negative decision (NO) is obtained in step S106, the control flow goes to step S109 to apply the forward drive signal to the motor 372, regardless of whether the presently detected actual pressing force Fs(N) has increased with respect to the last detected value Fs(N−1). Thus, when the affirmative decision (YES) is obtained in step S107, step S109 is necessarily implemented to apply the forward drive signal to the motor 372. In the event where the presently detected actual pressing force Fs(N) has not increased with respect to the last detected value Fs(N−1) due to inappropriate operation of the motor 372 in the forward direction, the motor 372 is subsequently turned off in the next execution of the present routine. That is, the affirmative decision (YES) is obtained not only in step S106 but also in step S110, so that step S111 is implemented to turn off the motor 372.

As described above, the present ninth embodiment of the invention is advantageous in that the pad pressing control routine of FIG. 34 is simpler than that of FIG. 29 according to the ninth embodiment.

It will be understood from the above description of the tenth embodiment that the insufficient increase preventing means for preventing shortage of the amount of increase of the pressing force is constituted by the ultrasonic motor 372, the load sensor 420 and a portion of the primary brake controller 430 assigned to implement steps S106, S107 and S109–S111 of FIG. 34, while the de-energizing means for de-energizing the motor 372 to produce a holding torque are constituted by the load sensor 420 and the portion of the primary brake controller 430 assigned to implement steps S106, S107 and S109–S111.

Then, an eleventh embodiment of this invention will be described. This eleventh embodiment, which is also similar in many aspects to the ninth embodiment, is different from the ninth embodiment in the pad pressing control routine. Further, the pad pressing control routine in the eleventh embodiment is similar in many aspects from that in the ninth embodiment. Therefore, there will be described only the steps of the pad pressing control routine of the eleventh embodiment which are different from those of the ninth embodiment, with the same step numbers being used to identify the same steps.

Figure 35:
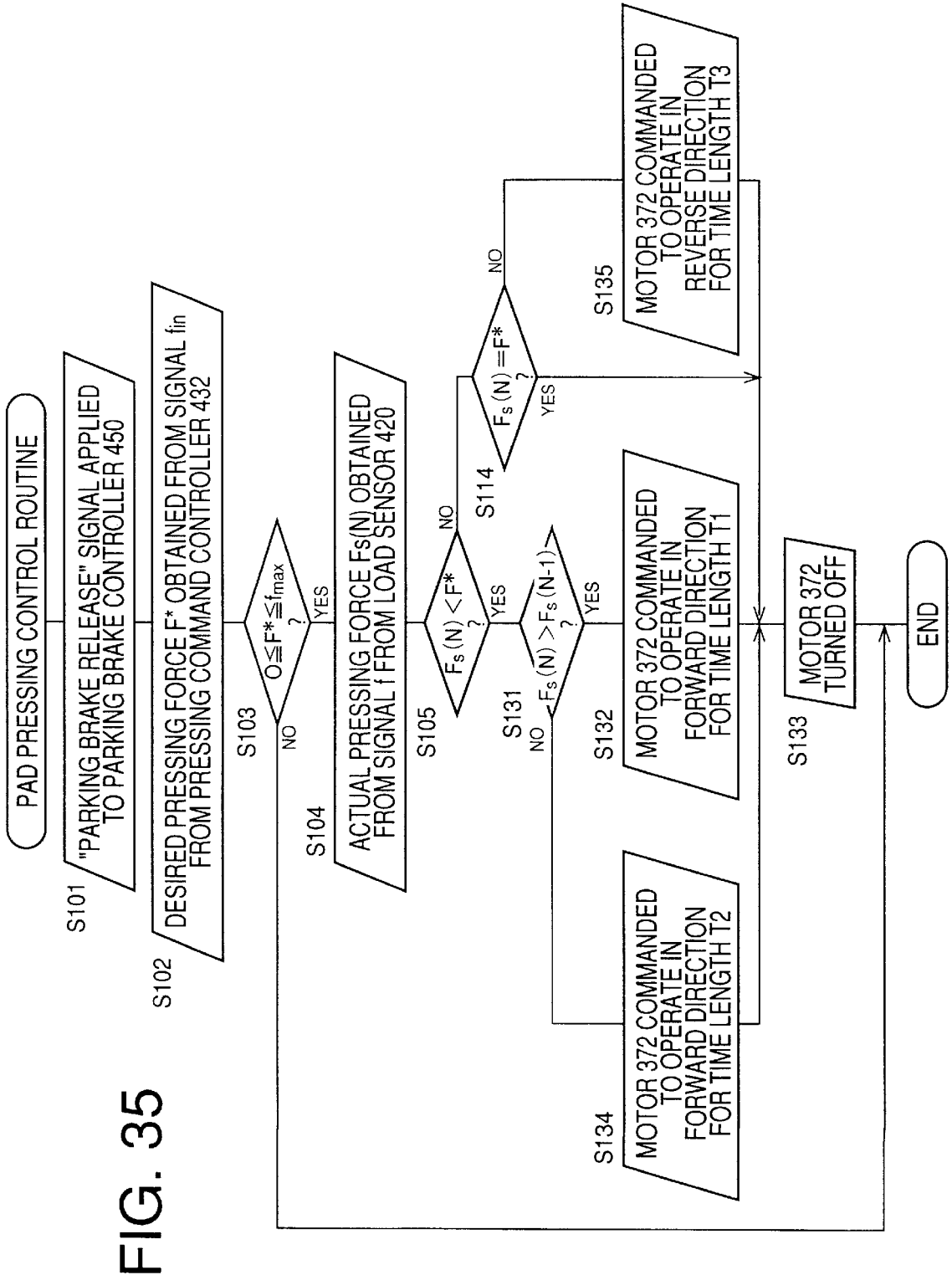
FIG. 35 is a flow chart illustrating a pad pressing control routine executed according to a program stored in a ROM of a computer of a primary brake controller in an electrically operated braking system according to an eleventh embodiment of the invention.

The pad pressing control routine according to the eleventh embodiment is illustrated in the flow chart of FIG. 35. Described briefly, the present routine is formulated such that the motor 372 is first turned on and then turned off within the same cycle of execution, irrespective of whether the drive force of the motor 372 has reached the maximum value, except in the case where the presently detected actual pressing force Fs(N) is equal to the desired value F*. According to this arrangement, the presser rod 370 is stopped after it is once advanced or retracted, except in the above-indicated case. Thus, the present routine does not require the motor 372 to be turned off each time the motor 372 is operated in the reverse direction, whereby the routine is made simpler.

Figure 36:
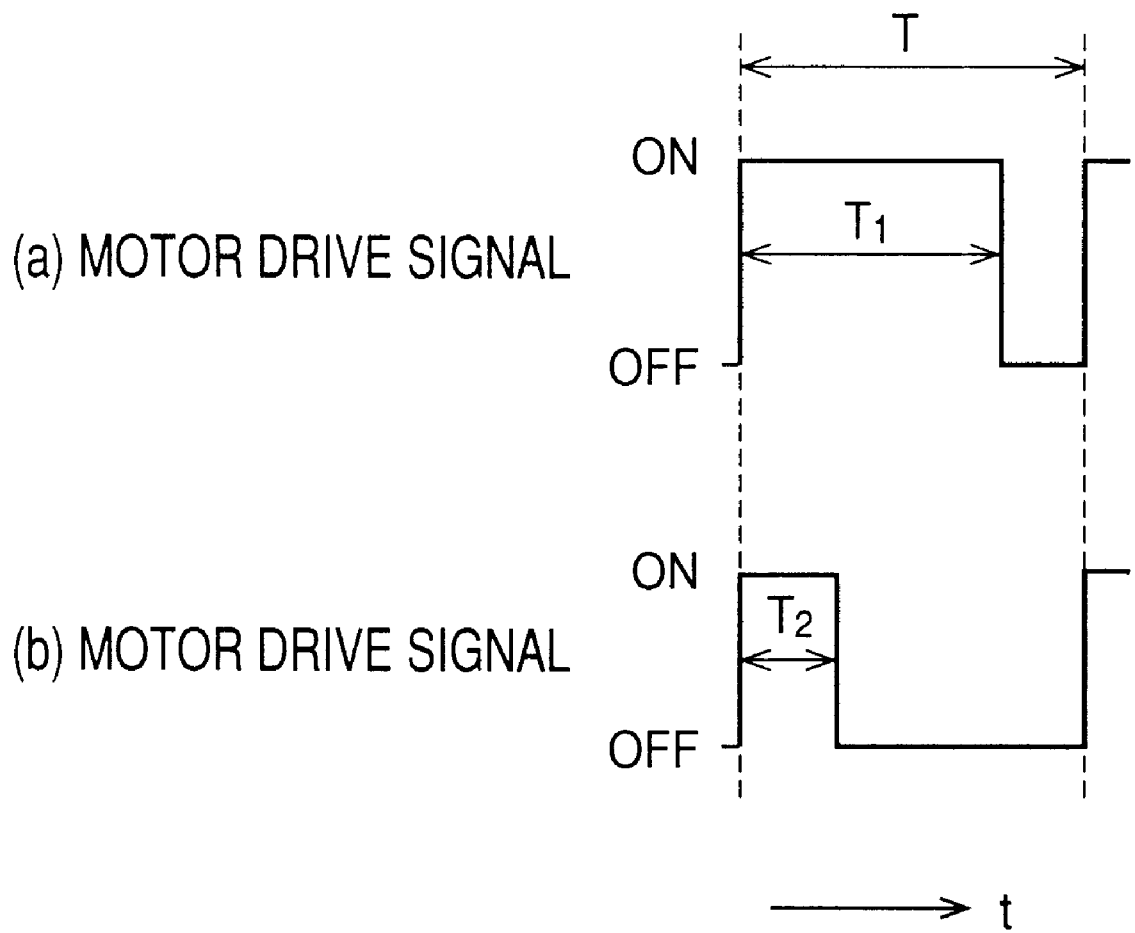
FIG. 36 is a time chart indicating a motor drive signal generated as a result of execution of the routine of FIG. 35.

The pad pressing control routine of FIG. 35 is further formulate such that the ON time of the motor 372 is changed depending upon whether the actual pressing force Fs is increasing or not, so that the presser rod 370 is positively advanced when the pressing force Fs is increasing, but is negatively advanced when the pressing force Fs is not increasing. Described in detail referring to the graphs of FIG. 36, the forward drive signal is applied to the motor 372 during an initial portion T1 of the control period T when the actual pressing force Fs is increasing, as indicated at (a) in the figure. The motor 372 is held off during the remaining portion (T−T1) of the control period T. When the actual pressing force Fs is not increasing, the forward drive signal is applied to the motor 372 during an initial portion T2 of the control period T, which portion T2 is shorter than the portion T1, as indicated at (b) in FIG. 36. The motor 372 is held off during the remaining portion (T−T2) of the control period T.

As described above, the present eleventh embodiment is adapted such that where an increase in the actual pressing force Fs is no longer detected even with the motor 372 being operated, the motor 372 is turned off for a given length of time within the control period T so that the motor 372 produces the holding torque for locking the presser rod 370, whereby the actual pressing force Fs is increased. Further, when an increase in the actual pressing force Fs is no longer detected while the motor 372 is held off, the forward drive signal is applied to the motor 372 for a given length of time within the control period T, so that the presser rod 370 is advanced with the forward rotation of the motor 372, whereby the friction pads 320 are forced against the disc rotor 312 by the presser rod 370, and the actual pressing force Fs is increased.

The pad pressing control routine according to the eleventh embodiment of the invention will be described in detail referring to the flow chart of FIG. 35.

The routine of FIG. 35 is initiated with step S101, which is followed by steps S102–S105. These steps S101–S105 are identical with those in the ninth embodiment of FIG. 29. If the presently detected actual pressing force Fs(N) is smaller than the desired value F*, that is, if the affirmative decision (YES) is obtained in step S105, the control flow goes to step S131 to determine whether the presently detected actual pressing force Fs(N) is larger than the last detected value Fs(N−1), namely, whether the actual pressing force Fs is increasing. If an affirmative decision (YES) is obtained in step S131, the control flow goes to step S132 in which the forward drive signal is applied to the motor 372 for the time length T1. Step S132 is followed by step S133 in which the motor 372 is turned off. One cycle of execution of the routine is terminated with step S133.

If a negative decision (NO) is obtained in step S131, the control flow goes to step S134 in which the forward drive signal is applied to the motor 372 for the time length T2. Step S134 is followed by step S133 to turn off the motor 372, and one cycle of execution of the routine is terminated.

If the detected actual pressing force Fs(N) is larger than the desired value F*, a negative decision (NO) is obtained in step S105 and also in step S114, and the control flow goes to step S135 in which the reverse drive signal is applied to the motor 372 for the time length T3, which may be equal to the time length T1. Step S135 is followed by step S133, and one cycle of execution of the routine is terminated.

If the detected actual pressing force Fs(N) is equal to the desired value F*, the negative decision (NO) is obtained in step S105, and an affirmative decision (YES) is obtained in step S114. In this case, the motor 372 is turned off in step S133, and one cycle of execution of the routine is terminated.

It will be understood from the above description of the eleventh embodiment that the insufficient increase preventing means for preventing shortage of the amount of increase of the pressing force Fs is constituted by the ultrasonic motor 372, the load sensor 420 and a portion of the primary brake controller 430 assigned to implement steps S131–S134 of FIG. 35, while the de-energizing means for de-energizing the motor 372 to produce a holding torque are constituted by the load sensor 420 and the portion of the primary brake controller 430 assigned to implement steps S131–S134.

There will next be described a twelfth embodiment of this invention, which is also similar in various aspects to the ninth embodiment. This twelfth embodiment is different from the ninth embodiment only in the pad pressing control routine. Further, the pad pressing control routine in the twelfth embodiment is similar in some aspects from that in the ninth embodiment. Therefore, there will be described only the steps of the pad pressing control routine of the twelfth embodiment which are different from those of the ninth embodiment, with the same step numbers being used to identify the same steps.

In the ninth embodiment, the motor 372 is turned off when an increase of the pressing force Fs is no longer detected. In the present twelfth embodiment, however, the motor 372 is turned off upon detection of the self-servo effect provided by the inner pad 320b, without determining whether the presently detected actual pressing for Fs(N) is larger than the last detected value Fs(N−1). To detect the self-servo effect, the ROM of the primary brake controller 430 stores a program for executing a self-servo effect monitoring routine for determining whether the self-servo effect is presently provided. This determination is effected by determining whether the rate of increase of the actual pressing force Fs is higher than a predetermined threshold. This threshold is determined such that the rate of increase does not exceed the threshold while the self-servo effect is not provided.

Figure 37:
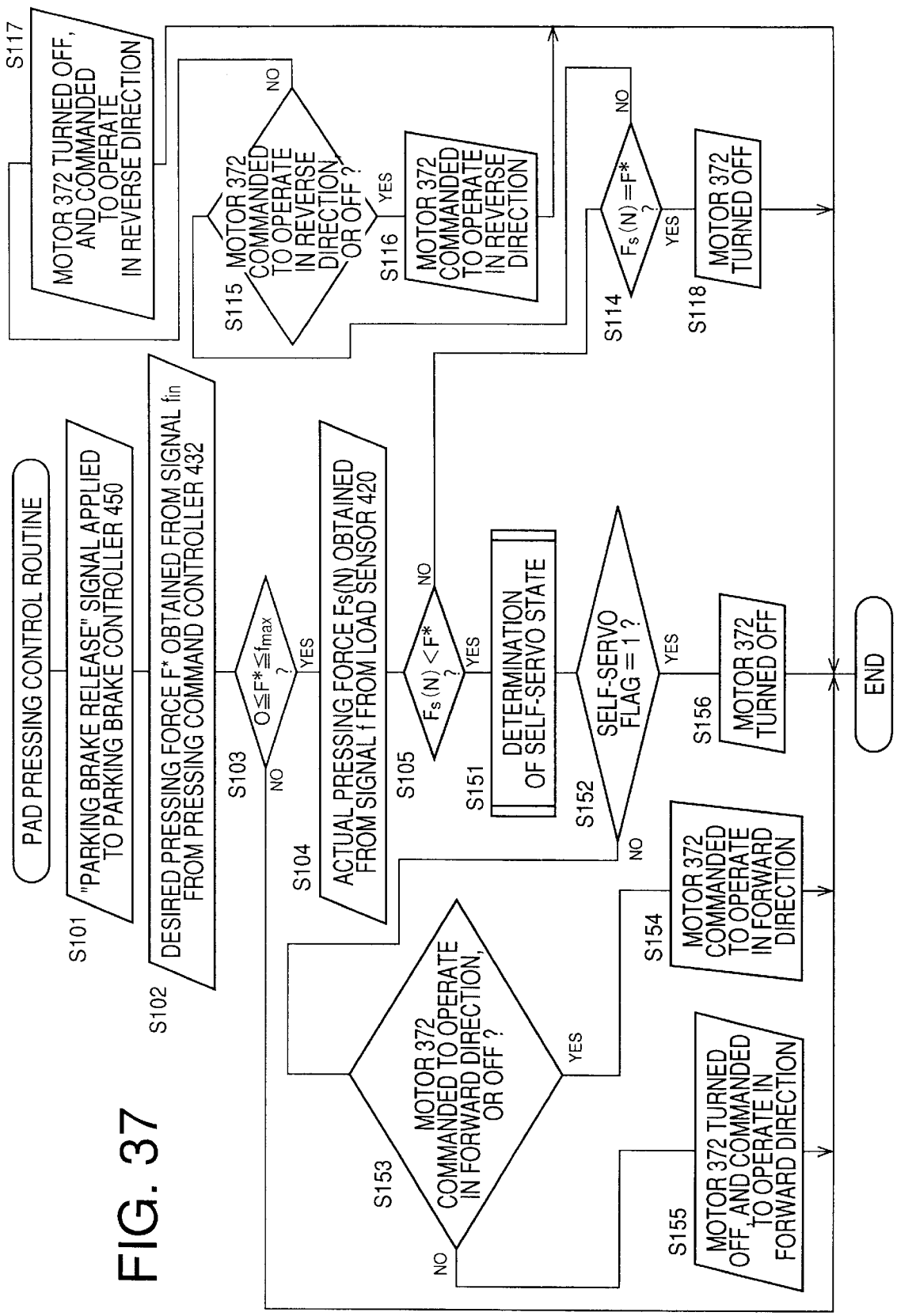
FIG. 37 is a flow chart illustrating a pad pressing control routine in a brake control routine executed according to a program stored in a ROM of a computer of a primary brake controller in an electrically operated braking system according to a twelfth embodiment of the invention.

The pad pressing control routine executed in the present twelfth embodiment is illustrated in the flow chart of FIG. 37. This routine, which is repeatedly executed, is initiated with step S101 followed by steps S102–S105, as in the routine of FIG. 29 of the ninth embodiment.

If the affirmative decision (YES) is obtained in step S105 with the actual pressing force Fs(N) being larger than the desired value F*, the control flow goes to step S151 to execute the self-servo effect monitoring routine indicated above.

Figure 38:
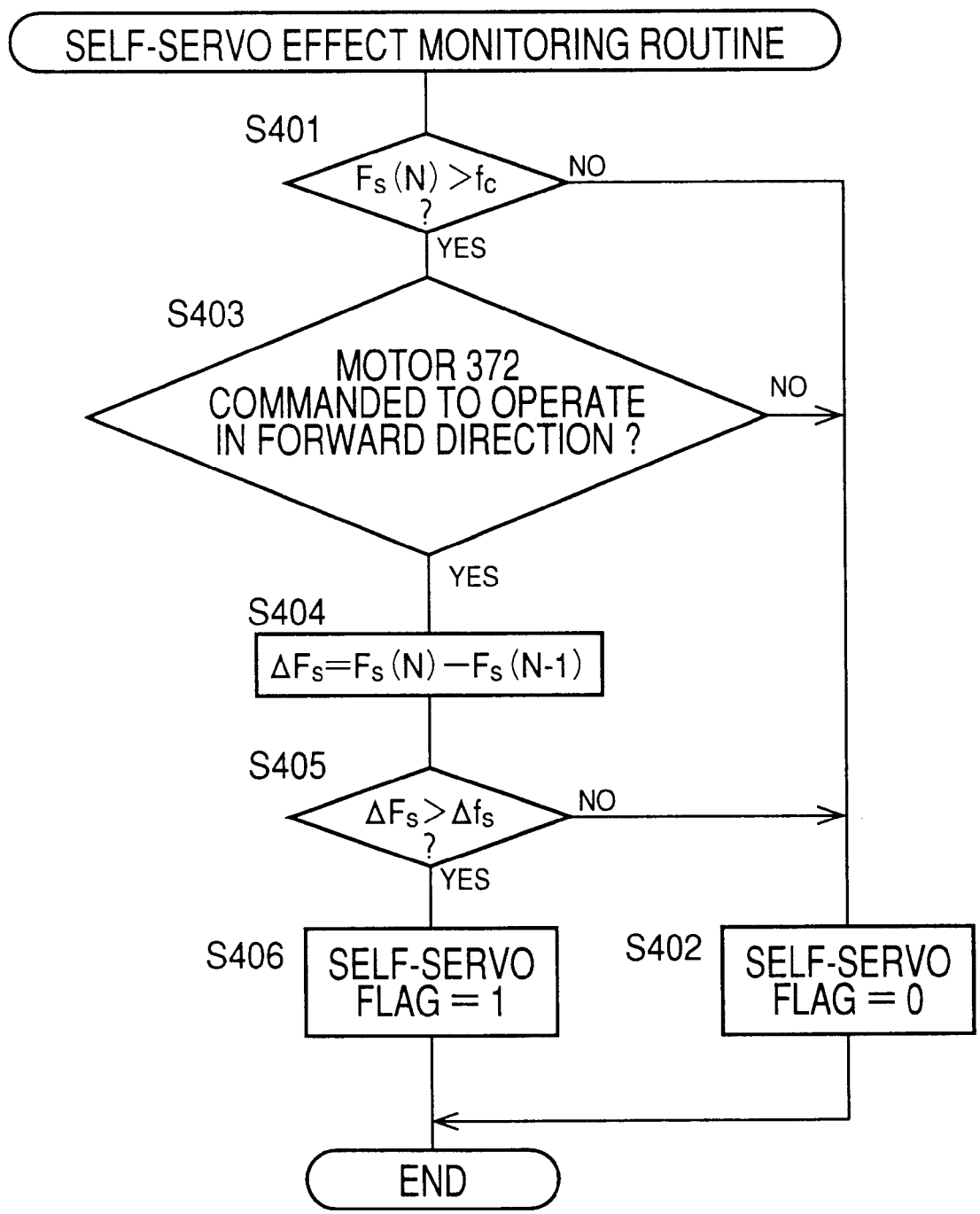
FIG. 38 is a flow chart illustrating a self-servo effect monitoring routine implemented in step S151 of the routine of FIG. 37.

The self-servo effect monitoring routine is illustrated in the flow chart of FIG. 38.

This self-servo effect monitoring routine is initiated with step S401 to determine whether the actual pressing force Fs(N) is larger than a reference value $f_c$ which corresponds to the pre-load of the elastic control mechanism 350. This reference value $f_c$ is a pressing force value Fs at which the self-servo effect begins to be provided. If the actual pressing force Fs(N) is not larger than the reference value $f_c$, that is, if a negative decision (NO) is obtained in step S401, the control flow goes to step S402 in which a SELF-SERVO flag is reset to "0". One cycle of execution of the routine of FIG. 38 is terminated with step S402.

If the actual pressing force Fs(N) is larger than the reference value $f_c$, that is, if an affirmative decision (YES) is obtained in step S401, the control flow goes to step S403 to determine whether the forward drive signal is being applied to the motor 372. If a negative decision (NO) is obtained in step S403, the control flow goes to the step S402 described above. If an affirmative decision (YES) is obtained in step S403, the control flow goes to step S404 to calculate an amount of change ΔFs of the presently detected actual pressing force Fs(N) with respect to the last detected value Fs(N−1). Step S404 is followed by step S405 to determine whether the calculated amount of change ΔFs is larger than a predetermined reference value $\Delta f_s$. This reference value $\Delta f_s$ is an amount of increase of the actual pressing force Fs during the cycle time of the routine of FIG. 38, which takes place due to an advancing movement of the presser rod 370 by the forward rotation of the motor 372 while the self-servo effect is not provided. If an affirmative decision (YES) is obtained in step S405, the control flow goes to step S406 in which the SELF-SERVO flag is set to "1". One cycle of execution of the routine is terminated with step S406. If a negative decision (NO) is obtained in step S405, the control flow goes to the step S402 to reset the flag to "0" as described above.

The self-servo effect monitoring routine of FIG. 38 may be modified to effect only one of the two determinations of steps S401 and S405, for detecting the self-servo effect when the affirmative decision is obtained in the determination effected. However, the present routine of FIG. 38 adapted to effect both of the determinations of steps S401 and S405 permits higher accuracy of determination of the self-servo effect. That is, the state of the disc brake 310 in which the self-servo effect is provided is detected only when the actual pressing force Fs(N) is larger than the reference value $f_c$ and when the amount of increase ΔFs of the force Fs is larger than the reference value $\Delta f_s$.

Upon completion of the self-servo effect monitoring routine in step S151 of the pad pressing control routine of FIG. 37, the control flow goes to step S152 to determine whether the SELF-SERVO flag is set at "1". If a negative decision (NO) is obtained in step S152, it means that the self-servo effect is not provided. In this case, the control flow goes to step S153 to determine whether the forward drive signal is being applied to the motor 372 or the motor 372 is off. If an affirmative decision (YES) is obtained in step S153 with the motor 372 being off, the control flow goes to step S154 in which the forward drive signal is applied to the motor 372. If the reverse drive signal is being applied to the motor 372, a negative decision (NO) is obtained in step S153, and the control flow goes to step S156 in which the motor 372 is first turned off, and the forward drive signal is then applied to the motor 372. One cycle of execution of the routine of FIG. 37 is terminated with step S154 or S155.

If the self-servo effect has been detected in the self-servo effect monitoring routine of FIG. 38, that is, if the SELF-SERVO flag has been set to "1" in step S406, an affirmative decision (YES) is obtained in step S152. In this case, the control flow goes to step S156 to turn off the motor 372, and one cycle of execution of the routine is terminated. Unlike the routine of FIG. 29 of the ninth embodiment, the routine of FIG. 37 of the present twelfth embodiment does not include steps corresponding to the S107, S107 and S113. In this respect, it is noted that the self-servo effect monitoring routine of FIG. 38 is formulated to set the SELF-SERVO flag to "1" only when the forward drive signal is present. Therefore, it is known that the forward drive signal is present when the affirmative decision (YES) is obtained in step S152 of the pad pressing control routine of FIG. 37. The reverse drive signal is not present when the affirmative decision is obtained in step S152. Accordingly, the steps S107, S107 and S113 of the routine of FIG. 29 are not necessary in the routine of FIG. 37.

While the operation according to the routine of FIG. 37 where the actual pressing force Fs(N) is larger than the desired value F* has been described above, the operation where the force Fs(N) is equal to or smaller than the desired value F* is the same as in the ninth embodiment.

Figure 39:
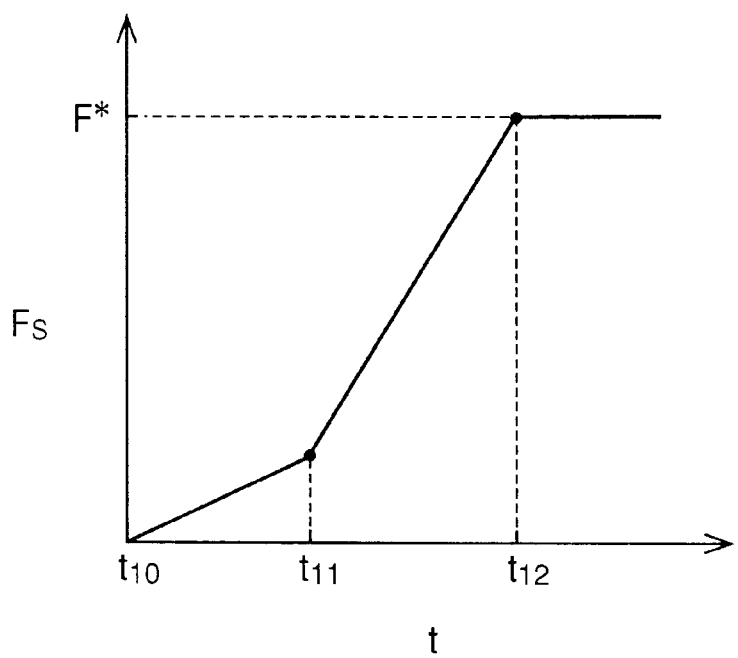
FIG. 39 is a graph indicating an example of control of a pad pressing force according to the pad pressing control routine of FIG. 37.

Referring to the graph of FIG. 39, there is indicated a change of the actual pressing force Fs when the motor 372 is operated in the forward direction. As in the example of FIG. 31, the brake operating member is operated at point of time t10, and the desired value F* of the pressing force Fs is determined. Subsequently, the actual pressing force Fs increases up to the desired value F*.

During the period between the points of time t10 and t11, the dragging movement of the inner pad 320b with the disc rotor 312 is inhibited by the elastic control mechanism 340, to inhibit the inner pad 320b from providing the self-servo effect. The actual pressing force Fs is increased as the motor 372 is operated in the forward direction. At the point of time t11, the friction force of the inner pad 320b becomes larger than the pre-load or initial biasing force of the elastic control mechanism 340, and the inner pad 320b is dragged with the disc rotor 312, providing the self-servo effect.

When the self-servo effect is detected, the motor 372 is turned off, irrespective of whether the actual drive force of the motor 372 has reached its maximum value. As a result, the actual pressing force Fs is continuously increased owing to the holding torque of the motor 372 and the edge effect of the inner pad 320b, until the force Fs has reached the desired value F* at point of time t12. Then, the motor 372 is controlled so as to maintain the actual pressing force Fs at the desired value F*.

It will be understood from the above description of the twelfth embodiment that the insufficient increase preventing means for preventing shortage of the amount of increase of the pressing force Fs is constituted by the ultrasonic motor 372, the load sensor 420 and a portion of the primary brake controller 430 assigned to implement steps S151–S156 of FIG. 37, while the de-energizing means for de-energizing the motor 372 to produce a holding torque are constituted by the load sensor 420 and the portion of the primary brake controller 430 assigned to implement steps S151–S156. It will also be understood that self-servo effect monitoring means for monitoring the self-servo effect of the inner pad 320b is constituted by a portion of the primary brake controller 430 assigned to execute the self-servo effect monitoring routine of FIG. 38 (implement step S151 of the routine of FIG. 37).

In the ninth through twelfth embodiments described above, the motor 372 is turned off to produce the holding force for increasing the actual pressing force F. When it becomes necessary to reduce the desired value F* of the pressing force Fs while the motor 372 is off, the drive signal is applied to the motor 372. In this case, the motor 372 may not be operated with a sufficiently high response. Where it is important to prevent such a delayed operation of the motor 372, it is desirable to keep applying the forward drive signal to the motor 372 rather than turn off the motor for producing the holding torque, even when it is necessary to increase the actual pressing force Fs.

A thirteenth embodiment of this invention will be described next. This thirteenth embodiment, which is similar in many aspects to the ninth embodiment, is different from the ninth embodiment only in the pad pressing control routine. Further, the pad pressing control routine in the thirteenth embodiment is similar in some aspects from that in the ninth embodiment. Therefore, there will be described only the steps of the pad pressing control routine of the thirteenth embodiment which are different from those of the ninth embodiment, with the same step numbers being used to identify the same steps.

The actual pressing force Fs is increased with the self-servo effect, by either operating the motor 372 in the forward direction before the maximum drive force of the motor 372 is reached, or turning off the motor 372 after the maximum drive force of the motor is reached. According to this arrangement, the rate of increase of the actual pressing force Fs is comparatively high. Therefore, where an amount of shortage ΔF of the actual pressing force Fs with respect to the desired value F* is relatively small, the actual pressing force Fs may be rapidly increased to a value considerably exceeding the desired value F* where the force Fs is increased by turning off the motor 372.

The actual pressing force Fs is decreased by operating the motor 372 in the reverse direction while the self-servo effect is provided. The rate of decrease of the actual pressing force Fs is comparatively high like the rate of increase indicated above. Therefore where an amount of excess ΔF' of the actual pressing force Fs with respect to the desired value F* is relatively small, the actual pressing force Fs may be rapidly decreased to a value considerably smaller than the desired value F* where the force Fs is decreased by operating the motor 372 in the reverse direction.

While the self-servo effect is not provided, the actual pressing force Fs is maintained at the same value by turning off the motor 372 with the inner pad 320b held in contact with the disc rotor 312. While the self-servo effect is provided, on the other hand, the actual pressing force Fs is increased with the self-servo effect, even with the motor 372 being off. According, some measure should be taken to maintain the actual pressing force Fs while the self-servo effect is provided.

In the light of the above analysis, the present thirteenth embodiment employs force increasing control means, force decreasing control means and force holding control means for controlling the rate of change of the actual pressing force Fs, for increasing, decreasing and maintaining the actual pressing force Fs, respectively, while the self-servo effect is provided.

As described above, the motor driver circuit 454 is adapted such that the drive frequency of the drive signal supplied to the motor 372 is controlled so as to follow a change in the resonance frequency of the stator 382. In the present thirteenth embodiment, the drive frequency of the motor 372 is controlled in the manner described below.

The frequency tracer 462 and the drive signal generator 458 cooperate to repeatedly detect an optimum drive frequency of the motor 372 during operation of the motor 372, by first raising the drive frequency to a level which is higher by a suitable amount than an expected value of the optimum drive frequency, and then lowering the drive frequency from that level to the optimum level.

Figure 40:
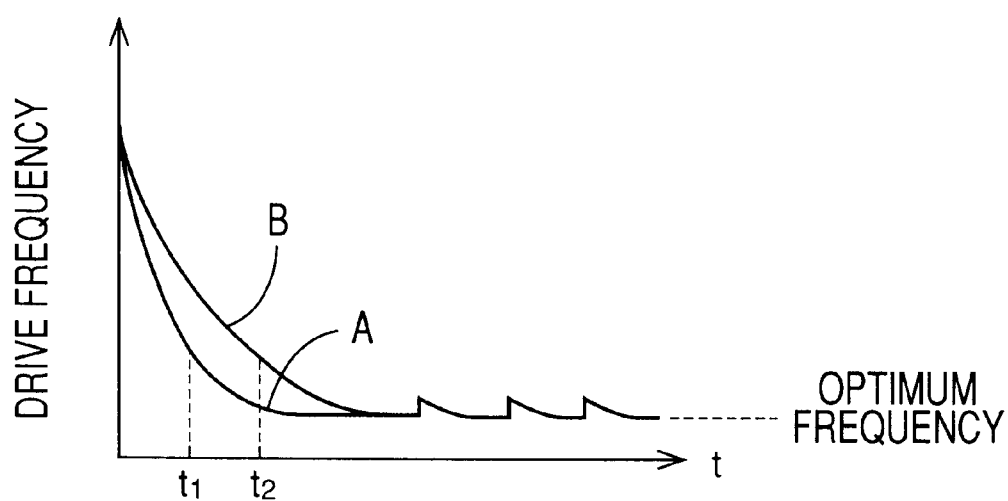
FIG. 40 is a graph indicating a change in ultrasonic motor drive frequency, which is effected by a frequency tracer in a motor driver circuit in an electrically operated braking system according to a thirteenth embodiment of the invention.

In a first step of detection, the drive frequency of the motor 372 is raised to a level which is too high to operate the motor 372. Then, the drive frequency is lowered at a predetermined rate from that level down to the expected optimum value, as indicated in the graph of FIG. 40. In the first step, a predetermined initial value is used as this expected optimum value. If the drive torque of the motor 372 exceeds a starting torque while the drive frequency is lowered, the motor 372 is started. During the lowering of the drive frequency, the stator 382 is monitored to check if its oscillating state coincides with a reference state (e.g., resonance state), depending upon the output signal of the electrode 392c. If the reference state of the stator 382 is detected, the lowering of the drive frequency is terminated, and the drive frequency at that time is determined as the next expected optimum value. Namely, the expected optimum value of the drive frequency is updated.

In a second step of detection, the drive frequency is first raised to a level which is higher by a given amount than the updated expected optimum value, and is then lowered by the predetermined rate to that expected optimum value. As in the first step, the stator 382 is monitored during the lowering of the drive frequency, on the basis of the output signal of the electrode 392c, to determine if the oscillation state coincides with the reference state. If the reference state is detected, the lowering of the drive frequency is terminated, and the drive frequency at that time is determined as the next expected optimum value.

The second step described above is repeated until the motor 372 is turned off, so that the drive frequency of the motor 372 is controlled to the optimum value which changes with variations in the temperature of the stator 382, load acting on the motor 372, etc. Therefore, the motor 372 can always be operated with high efficiency.

Generally, the motor 372 has a characteristic that its drive torque increases with a decrease in the drive frequency, when the drive frequency is higher than the resonance frequency of the stator 382. Accordingly, immediately after the beginning of the first detection step, the drive torque of the motor 372 is too small to rotate the motor 372, even with the drive signal being applied to the motor 372. If the rate of lowering of the drive frequency is reduced, the rate of increase of the drive torque is accordingly reduced, and the period for which the drive torque is small is elongated. In the graph of FIG. 40, a relatively high rate of initial lowering of the drive frequency in the first detection step is indicated at A, while a relatively low rate of initial lowering of the drive frequency is indicated at B. Where the drive frequency is lowered at the relatively high rate, the motor 372 is started at a point of time t1. Where the drive frequency is initially lowered at the relatively low rate, the motor 372 is stared at a point of time t2.

Therefore, when it is required to reduce the actual pressing force Fs at a relatively high rate, the motor 372 is operated in the reverse direction, and the drive frequency of the motor 372 is initially lowered at a normal rate V0. When it is required to reduce the actual pressing force Fs at a relatively low rate, the motor 372 is operated in the reverse direction, and the drive frequency is initially lowered at a first rate V1 which is lower than the normal rate V0.

When it is required to increase the actual pressing force Fs at a relatively high rate with the self-servo effect, the motor 372 is turned off. If the motor 372 is operated in the reverse direction with the drive frequency being initially lowered at the normal rate V0 in order to increase the actual pressing force Fs at a relatively low rate, the actual pressing force is in fact reduced. Hence, when it is required to increase the actual pressing force Fs at a relatively low rate, the motor 372 is operated in the reverse direction, and the drive frequency is initially lowered at a second rate V2 which is lower than the normal rate V0. The second rate V2 may or may not be equal to the first rate V1.

When it is required to maintain the actual pressing force Fs, this force Fs is in fact increased if the motor 372 is held off while the self-servo effect is provided. The actual pressing force Fs is decreased if the motor 372 is operated in the reverse direction with the drive frequency being initially lowered at the normal rate V0. The actual pressing force Fs is slightly decreased if the motor 372 is operated in the reverse direction with the drive frequency being initially lowered at the second rate V2. Therefore, when it is required to maintain the actual pressing force Fs, the motor 372 is operated in the reverse direction with the drive frequency being initially lowered at a third rate V3 which s lower than the second rate V2.

In the present thirteenth embodiment, a pad pressing control routine is formulated in the light of the above-indicated finding. This routine is illustrated in the flow chart of FIG. 41, and includes step S160 in which a force decreasing control routine is executed to control the drive frequency of the motor 372 when the actual pressing force Fs is decreased. The force decreasing control routine is illustrated in the flow chart of FIG. 42. The pad pressing control routine incorporates steps for controlling the drive frequency of the motor 372 when the actual pressing force Fs is increased and maintained.

Figure 41A:
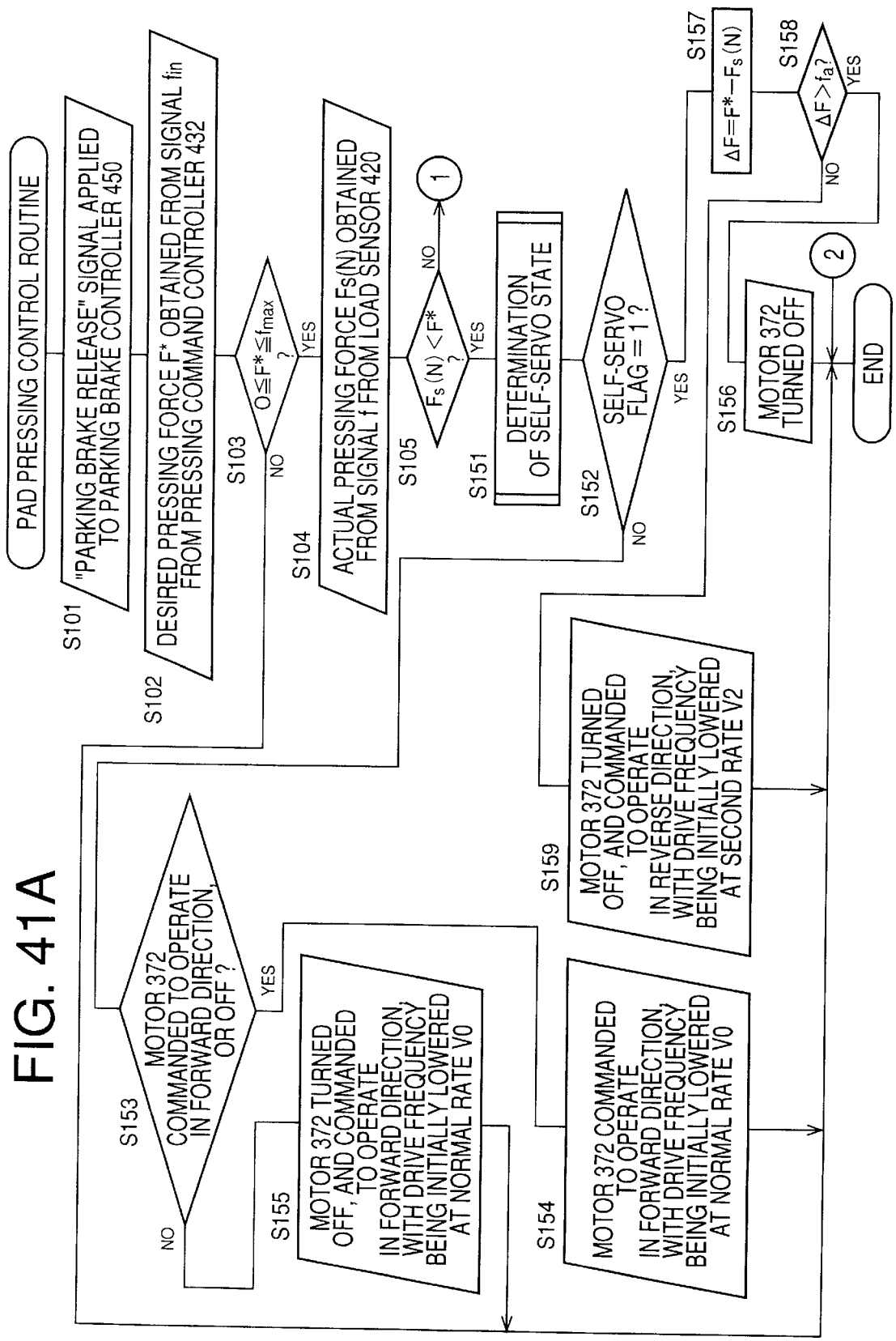
FIG. 41 is a flow chart illustrating a pad pressing control routine in a brake control routine executed according to a program stored in a ROM of a computer of a primary brake controller in the braking system of FIG. 40.
Figure 41B:
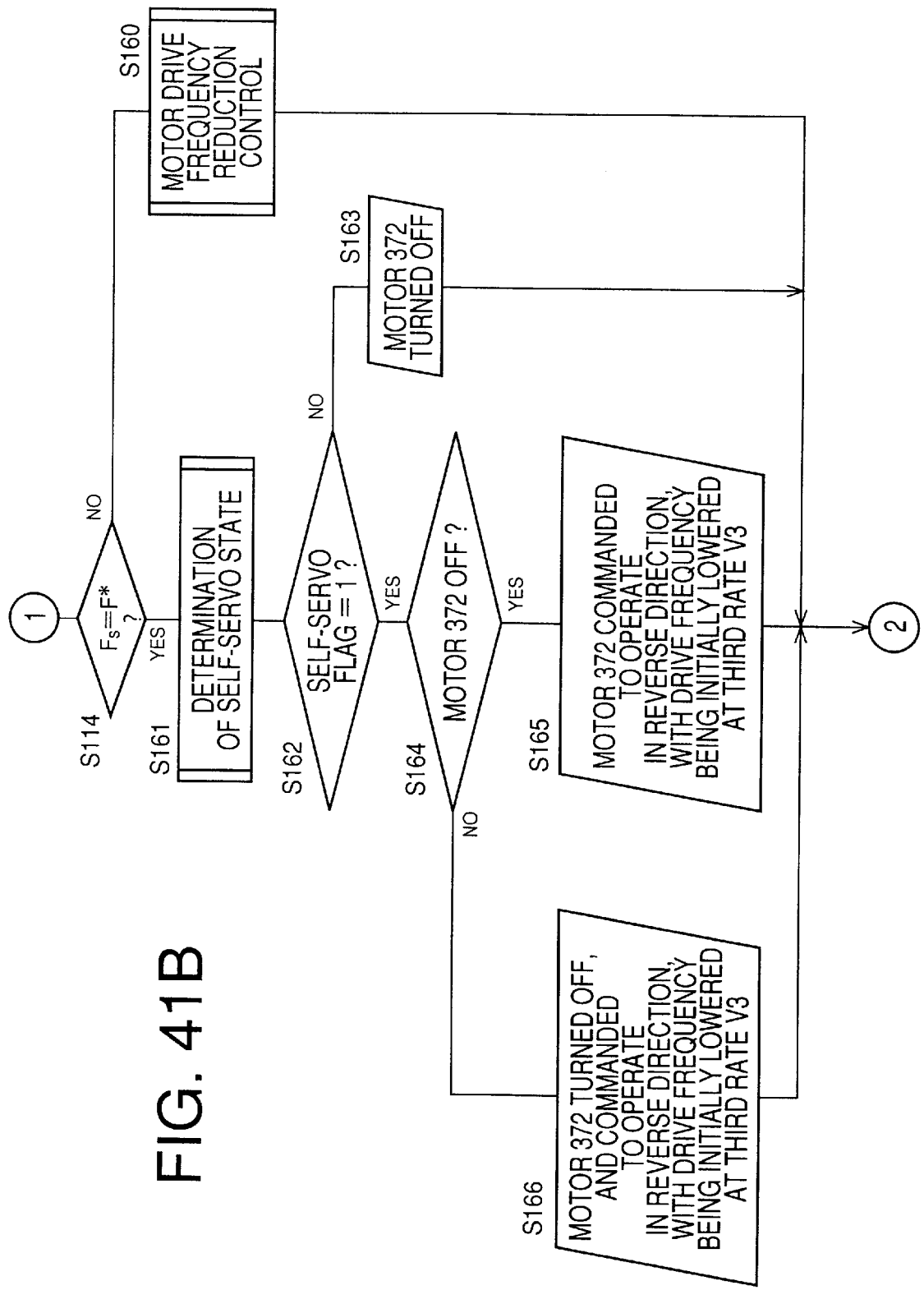

The pad pressing control routine of FIG. 41 is repeatedly executed, and includes the steps S101–S105 described above with respect to the ninth embodiment of FIG. 29 (twelfth embodiment of FIG. 37).

If the actual pressing force Fs(N) is smaller than the desired value F*, that is, if the affirmative decision (YES) is obtained in step S105, the control flow goes to step S151 in which the self-servo effect monitoring routine of FIG. 38 is executed. Step S151 is followed by step S152 to determine whether the SELF-SERVO flag is set at "1". If the flag is set at "0", that is, if the negative decision (NO) is obtained in step S142, the control flow goes to steps S153–S155 described above with respect to the routine of FIG. 37. If the affirmative decision (YES) is obtained in step S153 with the motor 372 being off, the drive frequency of the motor 372 is initially lowered at the normal rate V0 in step S154. Namely, the initial rate of lowering of the drive frequency is set to V0. If the affirmative decision (YES) is obtained in step S153 with the forward drive signal being applied to the motor 372, the drive frequency is initially lowered at the normal rate V0 in step S155, as in step S154. One cycle of execution of the routine of FIG. 41 is terminated with step S154 or S155.

If the SELF-SERVO flag is set at "1" and the affirmative decision (YES) is obtained in step S152, the control flow goes to step S157 to calculate the amount of shortage ΔF of the actual pressing force Fs(N) with respect to the desired value F*. Step S157 is followed by step S158 to determine whether the calculated amount of shortage ΔF is larger than a predetermined reference value $f_a$. If an affirmative decision (YES) is obtained in step S158, the control flow goes to step S156 to turn off the motor 372 so that the actual pressing force Fs is rapidly increased. If a negative decision (NO) is obtained in step S158, the control flow goes to step S159 in which the motor 372 is first turned off, and the motor 372 is commanded to operate in the reverse direction with the reverse drive signal applied thereto. In this case, the drive frequency of the motor 372 is initially lowered at the second rate V2. That is, the initial rate of lowering of the drive frequency is set to V2 in step S159. As a result, the actual pressing force Fs is slowly increased. One cycle of execution of the routine is terminated with step S156 or S159.

Figure 42:
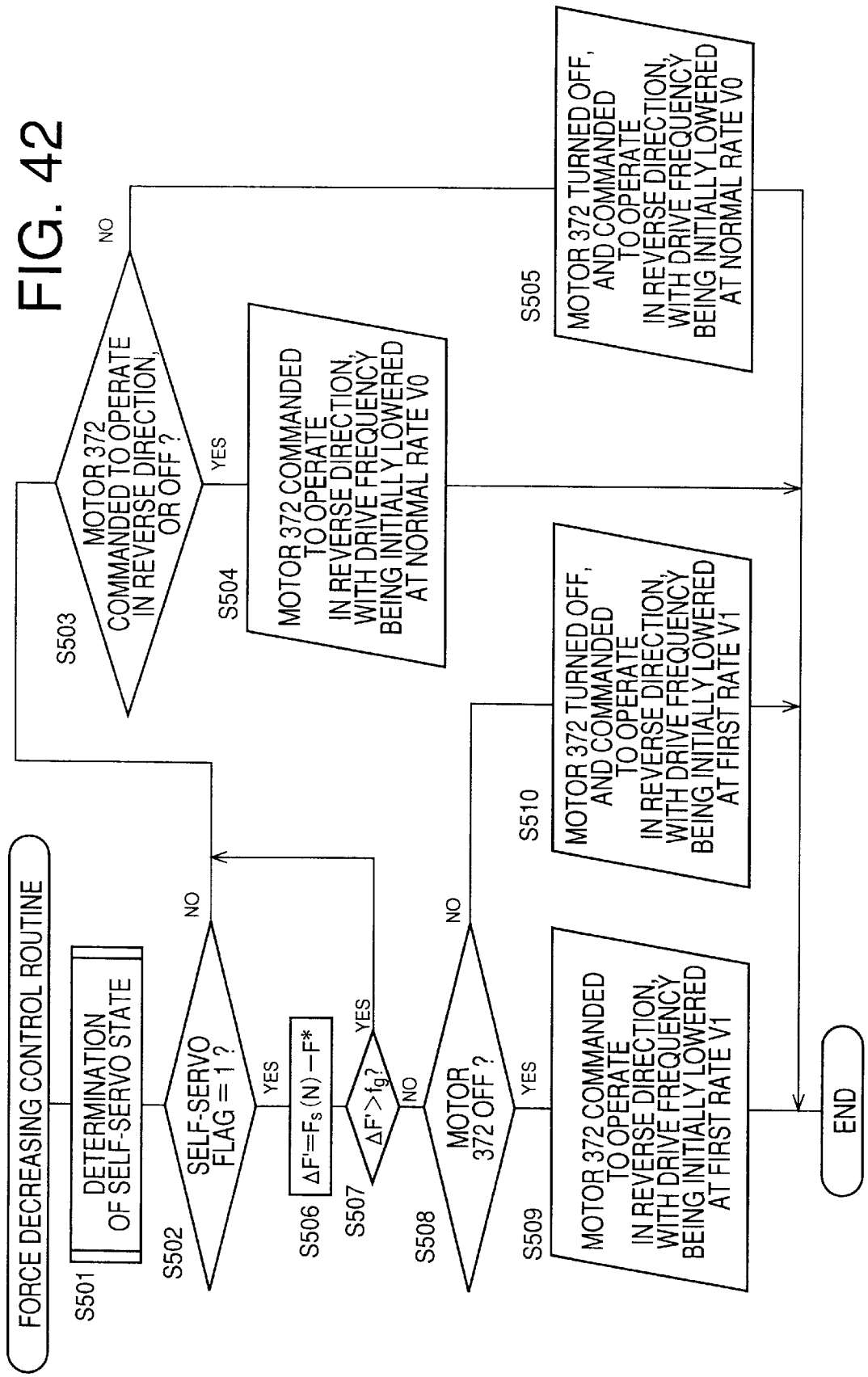
FIG. 42 is a flow chart illustrating a force decreasing control routine implemented in step S160 of the routine of FIG. 41.

If the actual pressing force Fs(N) is smaller than the desired value F*, the negative decision (NO) is obtained in step S105, and a negative decision (NO) is obtained in step S114, so that step S160 is implemented to execute the force decreasing control routine illustrated in the flow chart of FIG. 42.

The force decreasing control routine of FIG. 42 is initiated with step S501 in which the self-servo effect monitoring routine is executed as illustrated in FIG. 38. Step S501 is followed by step S502 to determine whether the SELF-SERVO flag is set at "1". If the negative decision (NO) is obtained in step S502, the control flow goes to step S503 to determine whether the reverse drive signal is being applied to the motor 372 or the motor 372 is off. If the affirmative decision (YES) is obtained in step S403, the control flow goes to step S504 in which the reverse drive signal is applied to the motor 372, with the drive frequency being initially lowered at the normal rate Vo. That is, the initial rate of lowering of the drive frequency is set to V0 if the reverse drive signal is applied to the motor 372 or if the motor 372 is in the off state. If the forward drive signal is being applied to the motor 372 and the negative decision (YES) is obtained in step S503, the control flow goes to step S505 in which the motor 372 is first turned off, and the reverse drive signal is then applied to the motor 372. In this case, too, the initial rate of lowering of the drive frequency is set to V0. One cycle of execution of the routine of FIG. 42 is terminated with step S504 or S505.

When the self-servo effect is provided with the SELF-SERVO flag set at "1", an affirmative decision (YES) is obtained in step S502, and the control flow goes to step S506 to calculate the amount of excess ΔF' of the actual pressing force Fs(N) with respect to the desired value F*. Step S506 is followed by step S507 to determine whether the calculated amount of excess ΔF' is larger than a predetermined reference value $f_g$. If an affirmative decision (YES) is obtained in step S507, the control flow goes to steps S503–S505 described above, and the drive frequency of the motor 372 is initially lowered at the normal rate V0, so that the actual pressing force Fs is rapidly decreased. If the amount of excess ΔF' is not larger than the reference value $f_g$, a negative decision (NO) is obtained in step S507, and the control flow goes to step S508 to determine whether the motor 372 is off. If an affirmative decision (YES) is obtained in step S508, the control flow goes to step S509 in which the reverse drive signal is applied to the motor 372, with the drive signal being initially lowered at the first rate V1, so that the actual pressing force Fs is slowly decreased. If the negative decision (NO) is obtained in step S508, the control flow goes to step S510 in which the motor 372 is first turned off, and the reverse drive signal is then applied to the motor 372 with the drive frequency being initialled lower at the first rate V1, so that the actual pressing force Fs is slowly decreased. One cycle of execution of the routine of FIG. 42 is terminated with step S509 or S510.

Where the actual pressing force Fs(N) is equal to the desired value F*, the negative decision (NO) is obtained in step S105 of the pad pressing control routine of FIG. 41, and the affirmative decision (YES) is obtained in step S114, so that step S161 is implemented to execute the self-servo effect monitoring routine of FIG. 38. Step S161 is followed by step S162 to determine whether the SELF-SERVO flag is set at "1". If the negative decision (NO) is obtained in step S162, the control flow goes to step S163 to turn off the motor 372, and one cycle of execution of the routine of FIG. 41 is terminated.

If the affirmative decision (YES) is obtained in step S162, the control flow goes to step S164 to determine whether the motor 372 is off. If the affirmative decision (YES) is obtained in step S164, the control flow goes to step S164 in which the reverse drive signal is applied to the motor 372, with the drive frequency being initially lowered at the third rate V3. If the negative decision (NO) is obtained in step S164, the control flow goes to step S166 in which the motor 372 is first turned off, and the reverse drive signal is then applied to the motor 372 with the drive frequency being initially lowered at the third rate V3. In these cases of steps S165 and S166, the actual pressing force Fs is maintained. One cycle of execution of the routine of FIG. 41 is terminated with step S165 or S166.

It will be understood from the above description of the thirteenth embodiment that the insufficient increase preventing means for preventing shortage of the amount of increase of the pressing force Fs is constituted by the ultrasonic motor 372, the load sensor 420 and a portion of the primary brake controller 430 assigned to implement steps S151–S159 of FIG. 41. It will also be understood that the self-servo effect monitoring means is constituted by a portion of the primary brake controller 430 assigned to implement step S151, S161 and S501 (execute the self-servo effect monitoring routine of FIG. 38).

The illustrated embodiments are adapted to determine whether it is necessary to control the ultrasonic motor 372 for increasing the actual pressing force Fs. This determination is effected by utilizing: the technique wherein a determination as to whether the amount of increase of the actual pressing force Fs becomes smaller than a first threshold value in the first state of the motor 372 is effected to determine whether the drive force of the motor has reached the maximum value; and the technique wherein a determination as to whether at least one predetermined condition including a condition that the amount of increase of the actual pressing force Fs becomes larger than a third threshold value in the first state of the motor 372 is satisfied is effected to determine whether the operation of the self-servo mechanism is initiated. However, these techniques may be utilized for other purposes.

A fourteenth embodiment of this invention will be described next. This fourteenth embodiment is structurally similar in many aspects to the twelfth embodiment of FIGS. 37–39 whose structural arrangement is shown in FIG. 19. With the same reference signs and step numbers as used in the ninth and twelfth embodiments being used in this fourteenth embodiment, only a difference of the fourteenth embodiment from the twelfth embodiment will be described in detail.

Figure 43:
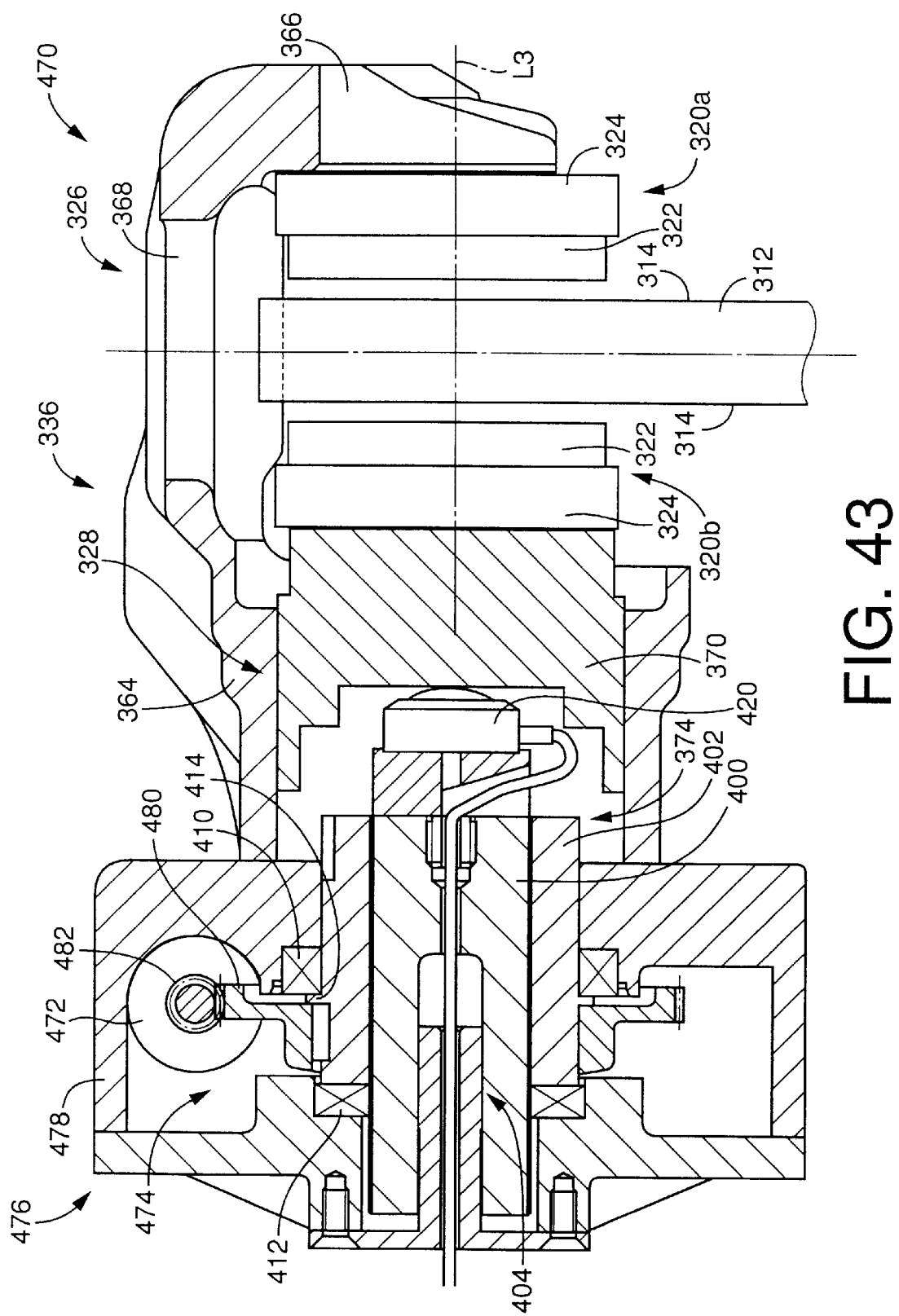
FIG. 43 is a side elevational view in cross section of a motor-driven disc brake in an electrically operated braking system according to a fourteenth embodiment of the invention.

Referring to FIG. 43, there is shown a motor-driven disc brake 470 used in an electrically operated braking system for a 4-wheel automotive vehicle, which is constructed according to the fourteenth embodiment of the invention. The disc brake 470 is different from the disc brake 310 shown in FIG. 19, in that the disc brake 470 uses (a) a DC motor 472 in place of the ultrasonic motor 372, and (b) a torque transmission mechanism in the form of a worm gear 474 disposed between the DC motor 472 and a motion converting mechanism in the form of the ballscrew mechanism 374. Except for the provision of the DC motor 472 and the worm gear 474, the disc brake 470 is identical with the disc brake 310 shown in FIG. 19.

The caliper 336 carries a drive device 476 on the back side (left side as seen in FIG. 43) of the inner pad 320*b*. The drive device 476 has a housing 478 at which the drive device 476 is fixed to the caliper 336. The externally threaded member 402 (rotary member of the motion converting mechanism) of the ballscrew mechanism 374 is supported by the housing 478 through the radial and thrust bearings 410, 412. The internally threaded member 402 is rotatable relative to the housing 478, and an axial movement of the member 402 is restricted by the stop 414. The DC motor 472 and the worm gear 474 are accommodated within the housing 478.

The worm gear 474 consists of a worm wheel 480 and a worm 482 which rotatably engage each other, as well known in the art. The axis of the worm wheel 480 and the axis of the worm 482 are perpendicular to each other. The worm wheel 480 is fixedly mounted on the internally threaded member 402 such that the worm wheel 480 is coaxial and rotatable with the member 402. On the other hand, the worm 482 is supported by the housing 478 such that the worm 482 is rotatable relative to the housing 478 while an axial movement of the worm 482 is limited. Radial and thrust loads acting on the worm 482 are received by respective radial and thrust bearings (not shown). To the worm 482, there is fixed a rotary shaft of the DC motor 472 such that the worm 482 is coaxial and rotatable with the rotary shaft. The axes of the worm 482 and the DC motor 472 are perpendicular to the plane of the view of FIG. 43.

In the disc brake 470, the DC motor 472 is operated in the forward direction with a forward drive signal applied thereto, and the worm 482 is rotated in the forward direction, causing the worm wheel 480 and the internally threaded member 402 to be rotated in the forward direction. The forward rotation of the internally threaded member 402 causes the externally threaded member 400 (axially movable member of the motion converting mechanism) to be advanced, so that the presser rod 370 is advanced to press the pair of friction pads 320*a*, 320*b* against the opposite friction surfaces 314 of the disc rotor 312.

In the present embodiment, the reverse efficiency of the worm gear 474 is set to be zero, so that the torque of the DC motor 472 is transmitted to the internally threaded member 402, but the torque of the internally threaded member 402 is totally received by the worm gear 474 and is not transmitted to the DC motor 472. Accordingly, even when the torque of the internally threaded member 402 based on the reaction force of the inner pad 320*b* due to the self-servo effect is larger than the drive torque of the DC motor 472, none of the worm wheel 480, worm 482 and DC motor 472 are rotated in the reverse direction, and these members 480, 482, 472 are held in the same angular position. In this arrangement, the presser rod 370 is held locked resisting the reaction force received from the inner pad 320*b*, and the pressing force acting on the friction pads 320 is made larger than the drive torque of the DC motor 472, owing to a considerably large self-servo effect of the inner pad 320*b*.

While the disc brake 470 is providing the self-servo effect, the worm gear 474 is capable of maintaining the actual pressing force of the inner pad 320*b*.

During operation of the brake operating member, the DC motor 472 may generate a large amount of heat if the DC motor 472 is held in the energized state while the rotation of the DC motor 472 is restricted. Further, this condition of the DC motor 472 results in an increase in the power consumption. In the light of this fact, the present braking system is adapted such that the DC motor 472 is held off while the self-servo effect is provided during activation of the disc brake 470. The DC motor 472 is also held off after the presser rod 370 is advanced to apply the parking brake.

Figure 44:
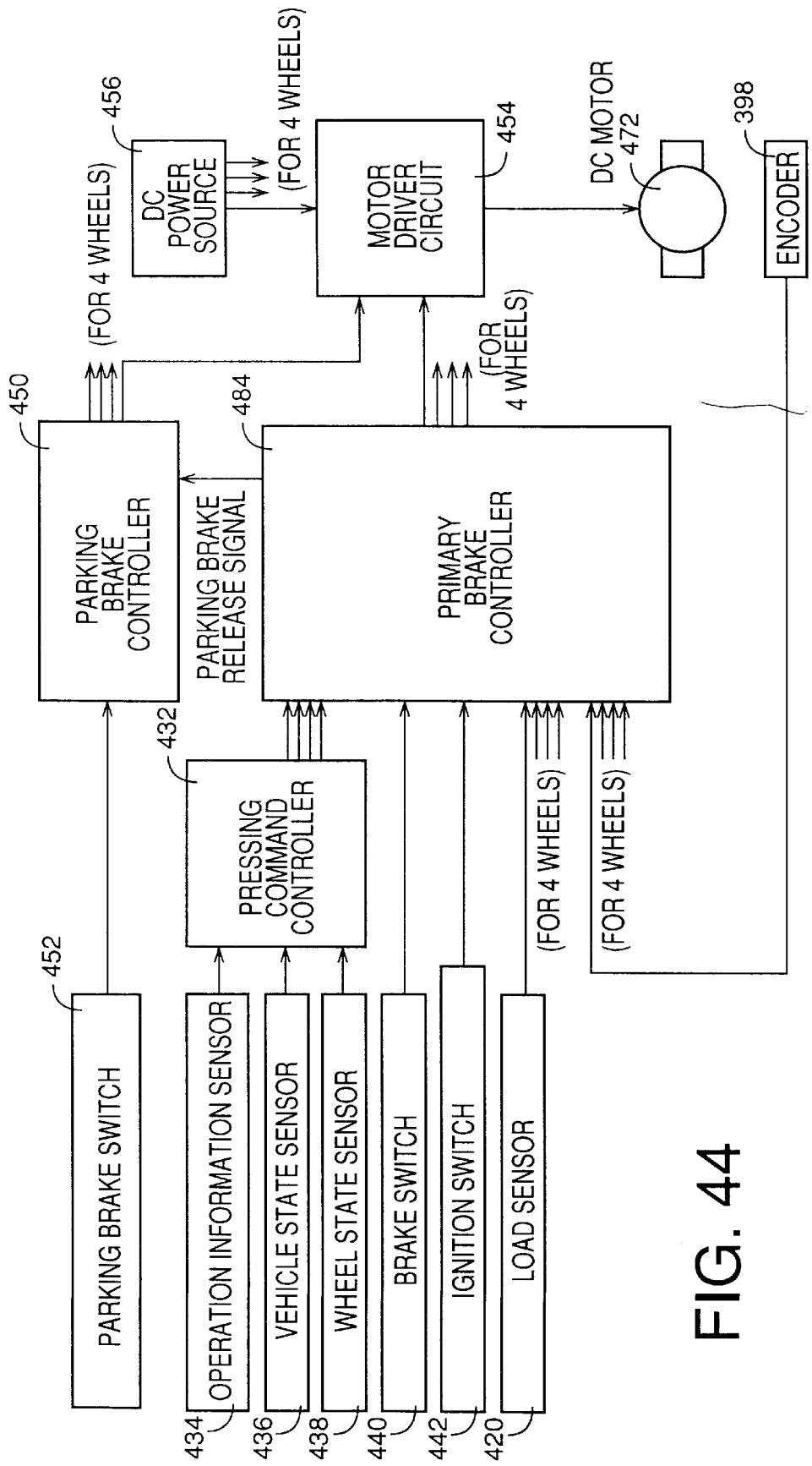
FIG. 44 is a block diagram indicating an electrical arrangement of the braking system of FIG. 43.

Referring to the block diagram of FIG. 44, there is shown an electric control system for the present electrically operated braking system. The electric control system includes a primary brake controller 484 to which is connected the DC motor 472 through the motor driver circuit 454. This primary brake controller 484 is basically similar to the primary brake controller 430 used in the twelfth embodiment, and includes a computer adapted to execute a pad pressing control routine different from the routine of FIG. 37 of the twelfth embodiment.

Figure 45:
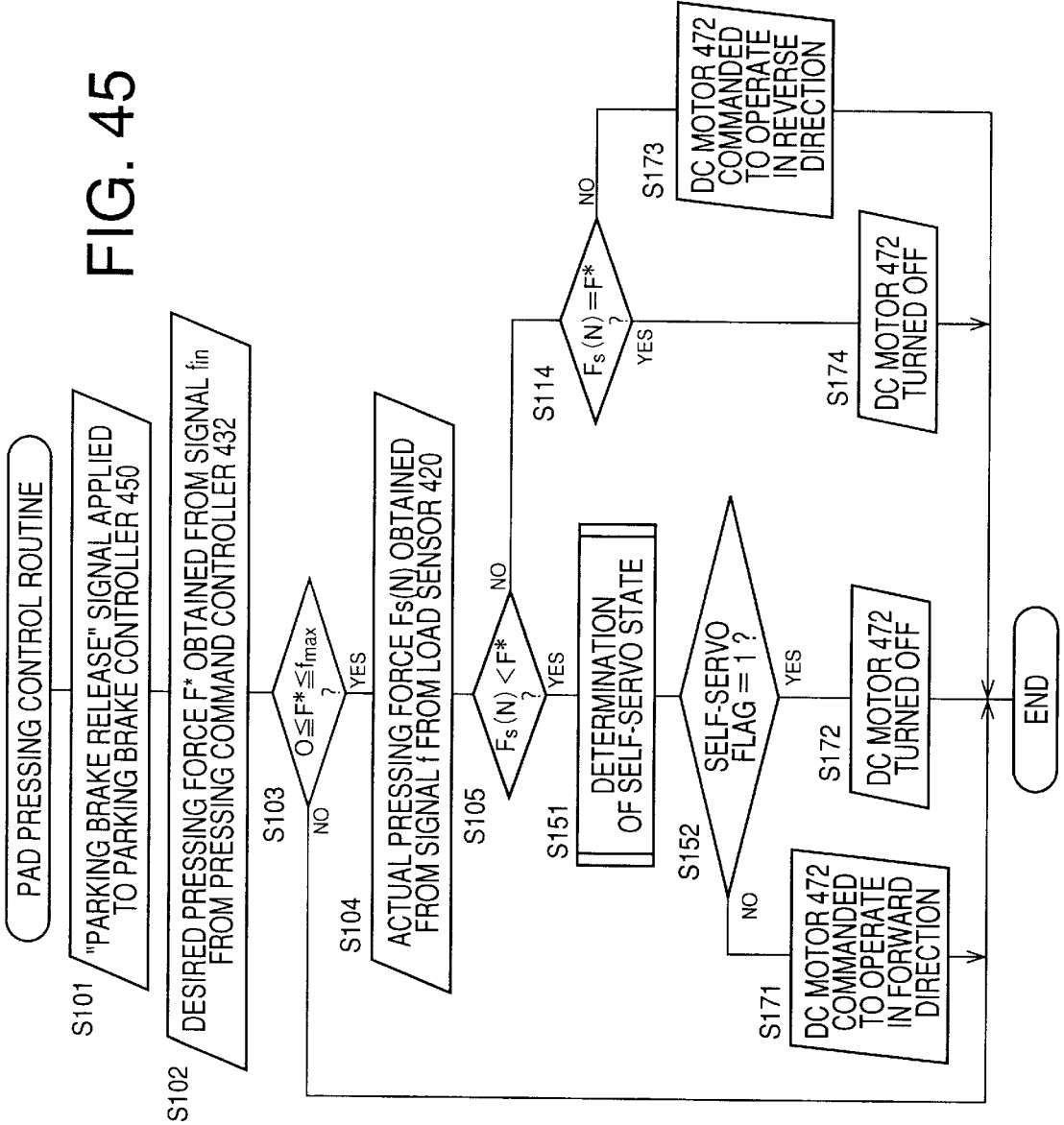
FIG. 45 is a flow chart illustrating a pad pressing control routine in a brake control routine executed according to a program stored in a ROM of a computer of a primary brake controller shown in FIG. 44.

The pad pressing control routine according to the fourteenth embodiment of the invention is illustrated in the flow chart of FIG. 45. The same step numbers as used in FIG. 37 are used in FIG. 45, to identify the same steps as in FIG. 37.

If the actual pressing force Fs(N) is smaller than the desired value F*, that is, if the affirmative decision (YES) is obtained in step S105, the control flow goes to step S151 in which the self-servo effect monitoring routine is executed in the same manner as in the twelfth embodiment, namely, as illustrated in the flow chart of FIG. 38. If the self-servo effect is not provided, that is, if the negative decision (NO) is obtained in step S152, the control flow goes to step S171 in which the forward drive signal is applied to the DC motor 472. If the self-servo effect is provided and the affirmative decision (YES) is obtained in step S152, the control flow goes to step S172 to turn off the DC motor 472. One cycle of execution of the routine of FIG. 45 is terminated with step S171 or S172.

If the actual pressing force Fs(N) is larger than the desired value F*, the negative decision (NO) is obtained in step S105 and in step S114, and the flow control goes to step S173 in which the reverse drive signal is applied to the DC motor 472. If the actual pressing force Fs(N) is equal to the desired value F*, the negative decision (NO) is obtained in step S104 while the affirmative decision (YES) is obtained in step S114, so that step S174 is implemented to turn off the DC motor 472. One cycle of execution of the routine is terminated with step S173 or S174.

It will be understood from the above description of the present fourteenth embodiment of the invention that the insufficient increase preventing means for preventing shortage of the amount of increase of the pressing force Fs is constituted by the worm gear 474, load sensor 420 and a portion of the primary controller 484 assigned to implement steps S151, S152, S171 and S172 of FIG. 45. It will also be understood that the self-servo effect monitoring means is constituted by a portion of the controller 484 assigned to implement step S151 of FIG. 45 (execute the self-servo effect monitoring routine of FIG. 38).

It is further noted that the present embodiment is arranged to determine whether the self-servo effect is provided or not, and turn off the DC motor 472 when the self-servo effect is provided, in order to prevent the generation of heat by the DC motor 472 and minimize the unnecessary power consumption by the DC motor 472. However, this arrangement is not essential. That is, the DC motor 472 may be held on even while the self-servo effect is provided.

Although the transmission or transfer of the reaction force of the inner pad 320b to the DC motor 472 is prevented by the worm gear 474 even when the reaction force is larger than the drive force of the DC motor 472. However, this function of the worm gear 474 may be achieved by a suitable screw mechanism provided as the motion converting mechanism, whose reverse efficiency is substantially zero.

Next, a fifteenth embodiment of the invention will be described. This fifteenth embodiment is similar in many aspects to the ninth embodiment, and is different from the ninth embodiment in the elastic control mechanism, which will be described in detail.

Figure 47:
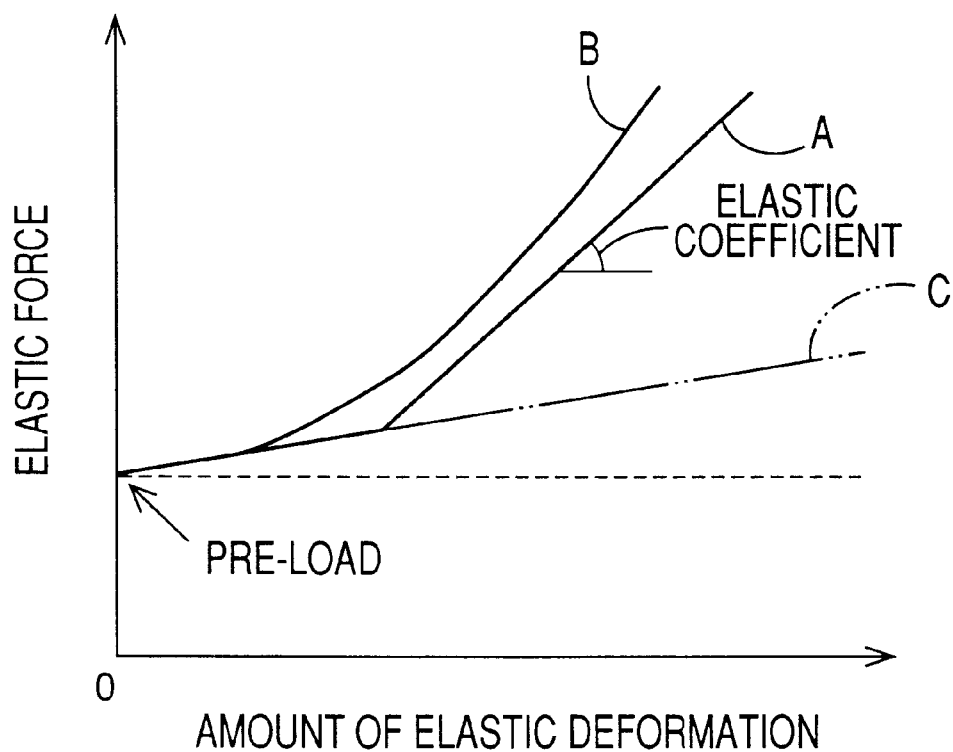
FIG. 47 is a graph indicating elastic characteristics of the elastic control mechanism of FIG. 46.

In the ninth embodiment, the elastic control mechanism 340 shown in FIG. 21 has an elastic coefficient which is extremely small. The elastic coefficient is an elastic force of the elastic member 342 divided by an amount of elastic deformation of the elastic member 342. The elastic force of the elastic member 342 is equal to a load which the elastic member 342 receives from the inner pad 320b, while the amount of elastic deformation of the elastic member 342 is equal to an amount of displacement of the inner pad 320b which occurs due to the dragging of the inner pad 320b with the disc rotor 312). Since the elastic coefficient of the elastic control mechanism 340 is extremely small, the amount of elastic deformation of the elastic member 342 suddenly increases with a result of a sudden increase of the amount of displacement of the inner pad 320b due to its dragging with the disc rotor 312, after the elastic force of the elastic member 342 has increased to the set load or pre-load of the elastic member 342, as indicated by broken line in the graph of FIG. 47. The amount of elastic deformation is held zero, preventing the dragging of the inner pad 320b with the disc rotor 312, until the elastic force has increased to the pre-load value.

Generally, the actual pressing force Fs of the inner pad 320b tends to be increased at an excessively high rate owing to the self-servo effect. To prevent the excessively high rate of increase of the actual pressing force, the pre-load of the elastic control mechanism 340 may be set to be relatively large, for example. However, while the relatively large pre-load of the elastic control mechanism 340 is effective to restrict the rate of increase of the actual pressing force, it causes a drawback that the dragging of the inner pad 320b with the disc rotor 320b is delayed, whereby the initiation of the self-servo effect of the inner pad 320b is accordingly delayed. On the other hand, a relatively small pre-load of the elastic control mechanism 340 permits the self-servo effect to be initiated at a relatively early point of time, but tends to cause an excessively high rate of increase of the actual pressing force.

In the light of the above analysis, the present fifteenth embodiment uses an elastic control mechanism, which is designed such that the elastic force generated increases with an increase in the amount of deformation. For instance, the elastic control mechanism may be designed such that the elastic force increases non-linearly with respect to the amount of deformation. Two examples of the non-linear relationship are indicated by solid lines A and B in the graph of FIG. 47. The solid line A represents a first non-linear relationship wherein the elastic coefficient changes in two steps. Described more specifically, the first non-linear relationship provides a first comparatively low elastic coefficient while the amount of elastic deformation is comparatively small, and a second comparatively high elastic coefficient while the amount of elastic deformation is comparatively large. The solid line B represents a second non-linear relationship wherein the elastic coefficient continuously increases with an increase in the amount of elastic deformation. The elastic control mechanism may also be designed such that the elastic force increases linearly with respect to the amount of deformation. An example of the linear relationship is indicated by a two-dot chain line C in the graph of FIG. 47.

Figure 46:
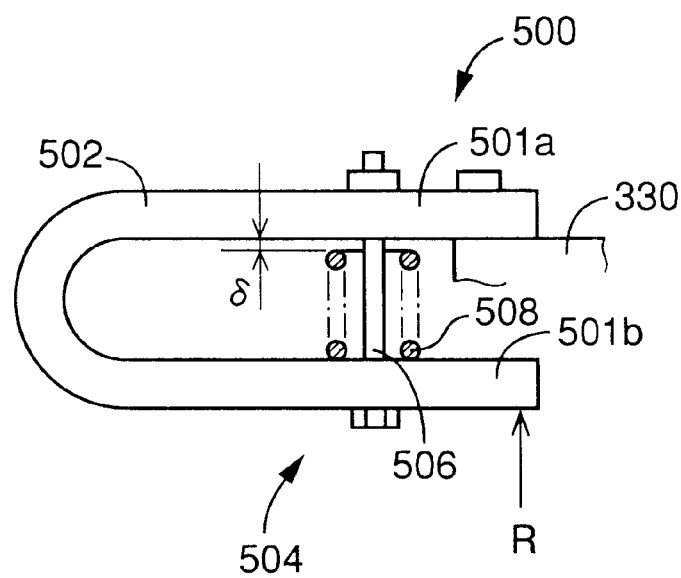
FIG. 46 is a plan view of an elastic control mechanism of a motor-driven disc brake in an electrically operated braking system according to a fifteenth embodiment of the invention.

The elastic control mechanism according to the present fifteenth embodiment may be constructed as shown in FIG. 46, in which the mechanism is indicated generally at 500. Like the elastic control mechanism 340, the elastic control mechanism 500 includes (a) a first elastic member in the form of a U-shaped spring 502 having a pair of arms 501a, 501b, and (b) an adjusting mechanism 504 for adjusting the pre-load of the U-shaped spring 502 by changing the amount of deformation of the U-shaped spring 502. The adjusting mechanism 504 includes an adjusting bolt 506 which extends in the direction Z in which the inner pad 320b is dragged with the disc rotor 312. The adjusting bolt 506 connects the pair of arms 501a, 501b of the U-shaped spring 502 such that the two arms 501 are movable toward each other, but not movable away from each other. The pre-load of the U-shaped spring 502 can be adjusted by operating the adjusting bolt 506 to change the initial amount of elastic deformation of the U-shaped spring 502.

The elastic control mechanism 500 further includes a second elastic member in the form of a coil spring 508 which is disposed between the two arms 501 of the U-shaped spring 502 and through which the adjusting bolt 506 extends coaxially therewith. The length of the coil spring 508 in a free state thereof is determined such that there is left a suitable clearance δ between one of the opposite ends of the coil spring 508 and the inner surface of the corresponding one of the two arms 501a, 501b. With a force R being applied from the inner pad 320b to the arm 501b (on the side of the inner pad 320b), only the U-shaped spring 502 undergoes elastic deformation while the force R is relatively small, that is, while the amount of dragging movement of the inner pad 320b with the disc rotor 312 is relatively small. When the force R has exceeded a given threshold with an increase in the amount of dragging movement of the inner pad 320b, the coil spring 508 begins to undergo elastic deformation, with the continuing elastic deformation of the U-shaped spring 502. Consequently, the elastic control mechanism 500 exhibits the first non-linear relationship represented by the solid line A in FIG. 47.

Figure 48:
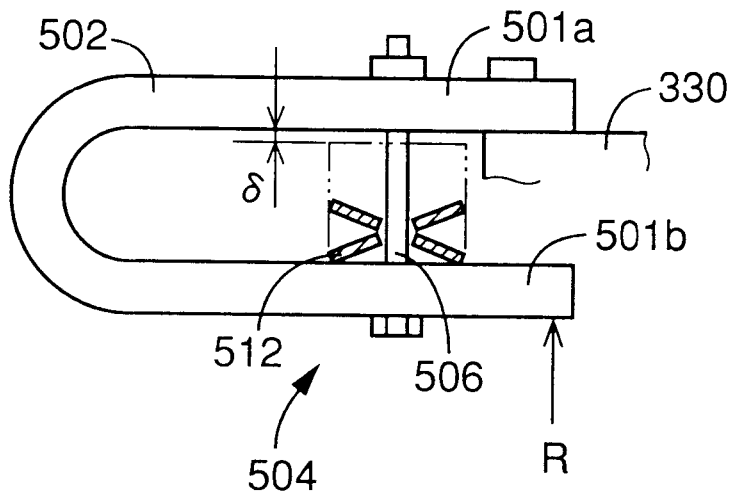
FIG. 48 is a plan view showing one modification of the elastic control mechanism of FIG. 46.
Figure 49:
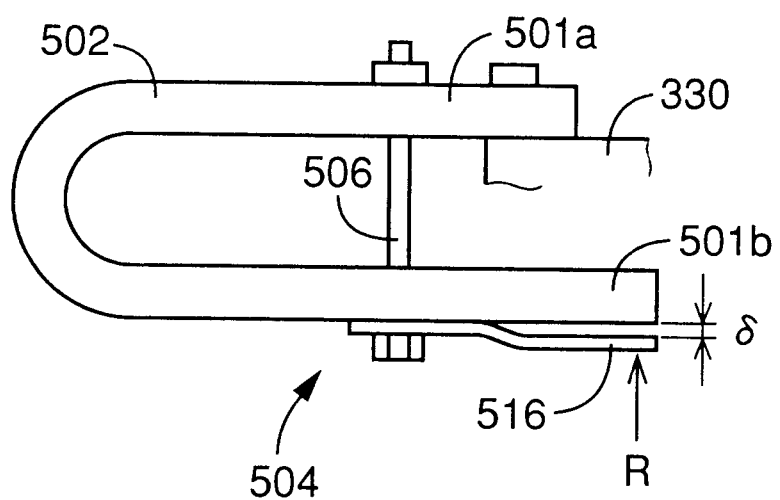
FIG. 49 is a plan view showing another modification of the elastic control mechanism of FIG. 46.

Various changes or modifications may be made to the elastic control mechanism 500. For instance, the coil spring 508 may be replaced by a plurality of coned disc springs 512 as shown in FIG. 48, or by a sheet spring 156 as shown in FIG. 49. The sheet spring 156 is fixed at one end thereof to the arm 501b (movable arm) on the side of the inner pad 320b, such that there is left a suitable clearance δ between the free end of the sheet spring 156 and the outer surface of the arm 501b.

The elastic control mechanism of FIG. 48 is similar in the principle of operation to the elastic control mechanism of FIG. 46, in that only one of the two elastic members disposed in parallel undergoes elastic deformation while the amount of deformation is relatively small, and both of the two elastic members simultaneously undergo elastic deformation while the amount of elastic deformation is relatively large, so that the elastic coefficient increases when the amount of elastic deformation exceeds a certain threshold. On the other hand, the elastic control mechanism of FIG. 49 is adapted such that both of the two elastic members disposed in series simultaneously undergo elastic deformation while the amount of elastic deformation of the mechanism is relatively small, and only one of the two elastic members undergoes elastic deformation while the amount of elastic deformation is relatively large, so that the elastic coefficient increases with the amount of elastic deformation.

Further modifications of the elastic control mechanism 500 may include the provision of: a cylindrical rubber member disposed radially outwardly of the coil spring 508 or an assembly of the coned disc springs 512; a rubber member or members disposed in a gap or gaps corresponding to the clearance δ between one or both ends of the coil spring 508 or the assembly of the coned disc spring 512 and one or both of the arms 501a, 501b; and a rubber member or members interposed between the adjacent turns of the coil spring 508 or between the adjacent coned disc springs 512. These modified arrangements provide the second non-linear relationship represented by the solid line B in FIG. 47. Where the rubber member or members is/are interposed between the adjacent turns of the coil spring 508, the clearances between the adjacent turns may or may not be increased from the nominal value. In other words, the coil spring 508 may be provided with a relatively large amount of clearances between the adjacent turns, for the purpose of providing the rubber member or members in the clearances. Where the rubber member or members is/are provided between the adjacent coned disc springs 512, the rubber members and the coned disc springs 512 are alternately superposed on each other.

It will be understood from the above description of the fifteenth embodiment of the invention that the elastic control mechanism 500 functions as an elastic member and constitutes a mechanism for controlling the rate of increase of the pressing force of the inner pad 320b.

A sixteenth embodiment of this invention will now be explained. This sixteenth embodiment is similar in many aspects to the third embodiment of FIGS. 10–12, but is different from the third embodiment only in some part of the disc brake. The same reference signs as used in FIGS. 10–12 will be used in this sixteenth embodiment to identify the commonly used elements, and only this part of the disc brake of the present embodiment will be described.

In the disc brake 150 of the third embodiment of FIGS. 10–12, the inner pad 14b functions as a wedge to provide the self-servo effect. In a disc brake 520 according to the present sixteenth embodiment, on the other hand, the outer pad 14a functions as a wedge to provide the self-servo effect, as is apparent from FIG. 50.

In the disc brake 520, the inner pad 14b is not supported by the mounting bracket 152 so as to positively allow the inner pad 14b to be dragged along with the disc rotor 11. In the inner pad 14b, both the friction member 18 and the backing plate 20 have a constant thickness. The presser rod 216 and the ultrasonic motor 212 are disposed in the disc brake 520 such that the axes of the presser rod 216 and the motor 212 are perpendicular to the friction surfaces 12 of the disc rotor 11.

On the other hand, the outer pad 14a is supported by the mounting bracket 152 so as to positively allow the outer pad 14a to be dragged with the disc rotor 11. In the outer pad 14a, the friction member 18 has a constant thickness while the backing plate 20 has a thickness which continuously decreases in the dragging direction Y. Namely, the backing plate 20 has a slant back surface 524 which is inclined with respect to the friction surfaces 12 of the disc rotor 11. Like the disc brake 150 of the third embodiment, the disc brake 520 has the elastic member 184, movable member 186 and stop 190 for controlling the dragging movement of the outer pad 14a with the disc rotor 11. The reaction portion 206 of the caliper 202 has a support surface 526 for supporting the backing plate 20 of the outer pad 14a at its slant surface 524 such that the outer pad 14a can be moved due to its friction contact with the disc rotor 11. This support surface 526 is also inclined with respect to the friction surfaces 12 of the disc rotor 11. Between the support surface 526 and the outer pad 14a, there is provided friction reducing means in the form of a thrust bearing 528, which includes a plurality of rolling members in the form of balls arranged along a circle.

Figure 51:
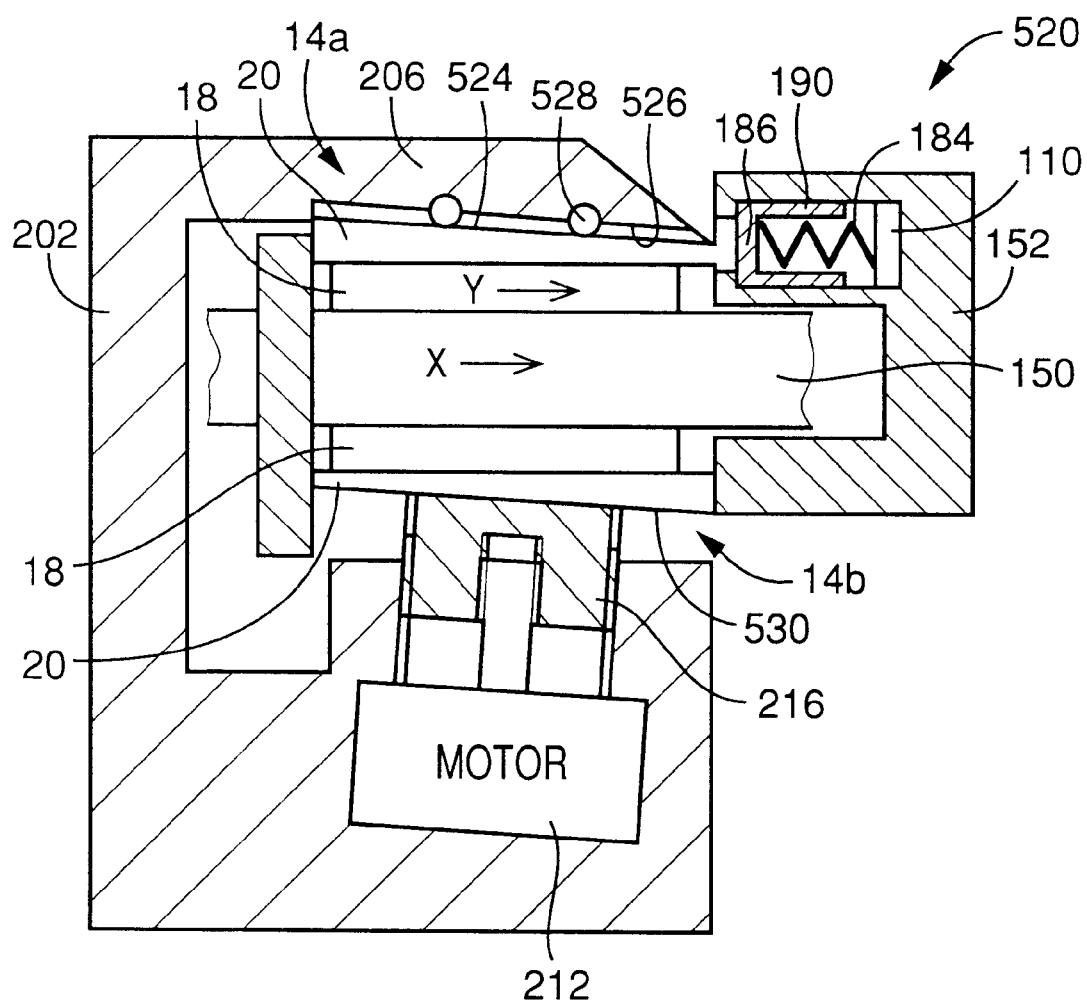
FIG. 51 is a plan view partly in cross section showing one modification of the sixteenth embodiment of FIG. 50.

Various modifications may be made to the sixteenth embodiment of the invention. For instance, the inner pad 14b is also provided with a slant surface 530 as indicated in FIG. 51. In this case, however, the inner pad 14b does not function as a wedge.

Next, a seventeenth embodiment of this invention will be described. This embodiment is similar in many aspects to the sixteenth embodiment, and is different from the sixteenth embodiment only in the self-servo effect inhibiting mechanism. The same reference signs as used in the sixteenth embodiment will be used in this seventeenth embodiment to identify the commonly used elements, and only the self-servo effect inhibiting mechanism.

In the conventional disc brake, the mounting bracket generally includes (a) a pair of portions between which the outer pad is disposed in the rotating direction of the disc rotor, and (b) a bridging portion which extends behind the outer pad so as to connect the pair of portions. In FIG. 20, the pair of portions are indicated at 538a, 538b, and the bridging portion is indicated at 540.

Figure 52:
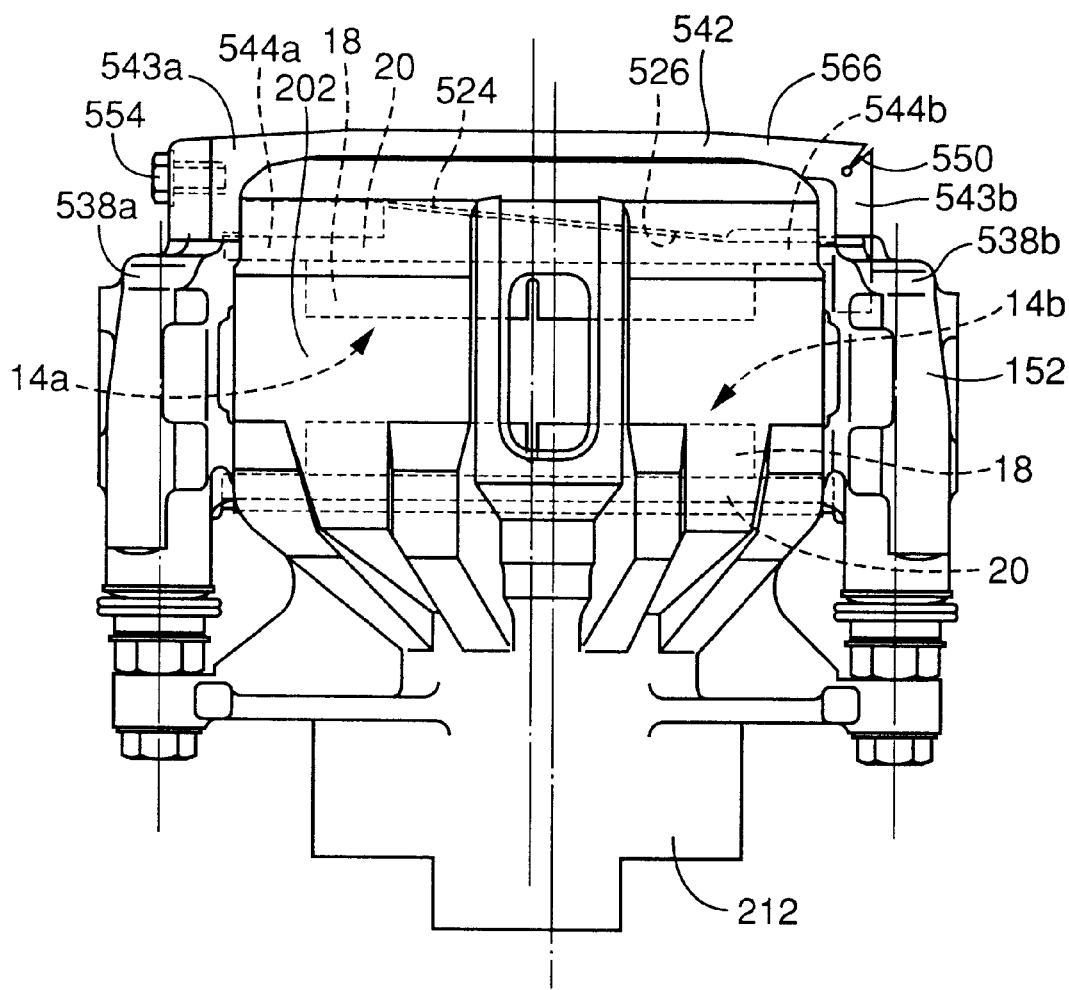
FIG. 52 is a plan view of a motor-driven disc brake in an electrically operated braking system according to a seventeenth embodiment of the invention.
Figure 53:
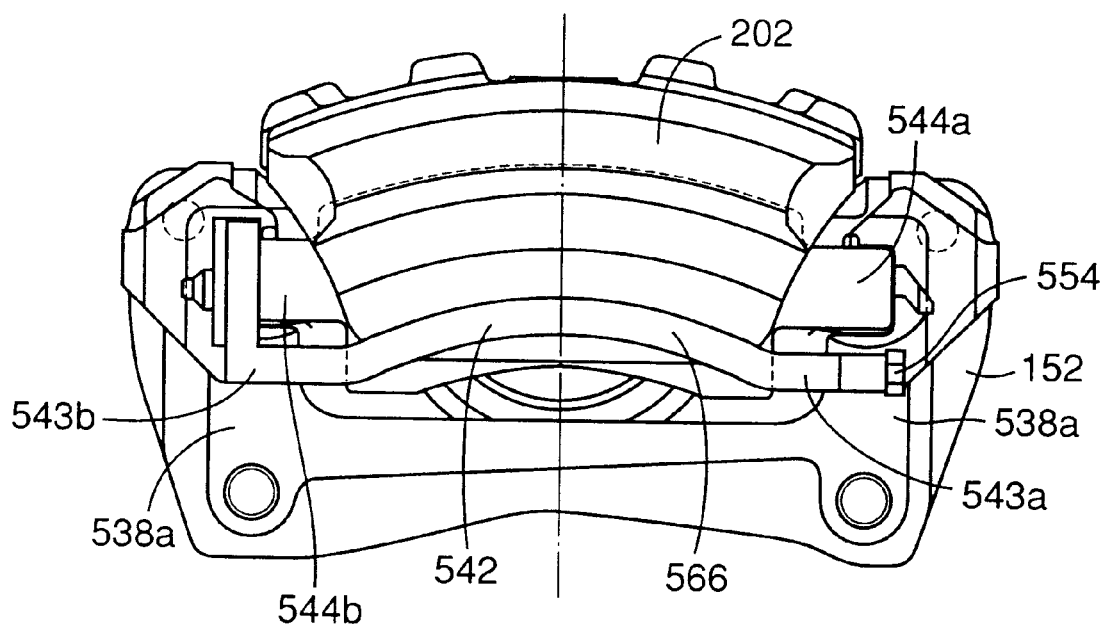
FIG. 53 is a front elevational view of the disc brake of FIG. 52.

In the present seventeenth embodiment, the bridging portion 540 is replaced by an elastic member 542, as shown in FIGS. 52 and 53. The elastic member 542 is a generally rod-shaped member having opposite end portions 543a, 543b, while the outer pad 14a has opposite end portions 544a, 544b which are opposite to each other in the rotating direction X of the disc rotor. During forward running of the vehicle, the outer pad 14a is dragged with the disc rotor in the direction from the end portion 544a toward the end portion 544b. The end portion 543b of the elastic member 542 is associated with the end portion 544b of the outer pad 14a, while the end portion 543a is associated with the portion 538a of the mounting bracket 330 which is remote from the end portion 544b of the outer pad 14a.

The end portion 543b of the elastic member 542 engages a surface of the end portion 544b of the outer pad 14a, which surface faces in the dragging direction of the outer pad 14a.

The end portion 543b receives a force from that surface of the end portion 544b, which force acts in the dragging direction. The elastic member 542 undergoes elastic deformation due to this force, so that the elastic property of the elastic member 542 is optimized so as to suitably determine the point of initiation of the dragging movement of the outer pad 14a, namely, the point of initiation of the self-servo effect of the outer pad 14a.

Figure 54:
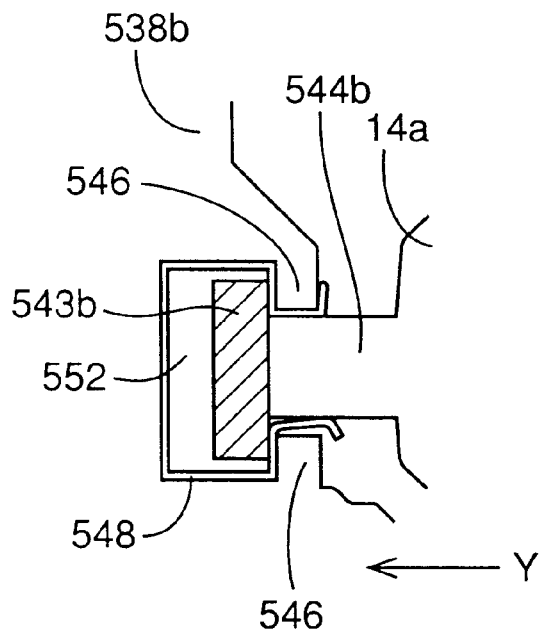
FIG. 54 is an enlarged front elevational view partly in cross section showing an end portion 544b shown in FIG. 53.
Figure 55:
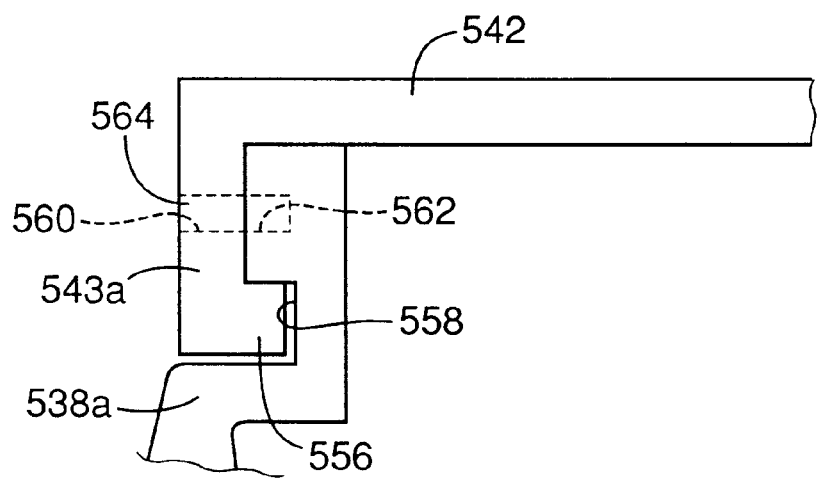
FIG. 55 is a plan view for explaining one modification of a connection between end portion 543a and portion 538a shown in FIG. 52.

Referring to FIG. 54 showing the end portions 543b and 544b in enlargement, the portion 538b of the mounting bracket 152 is formed with a stop 546 which limits an amount of displacement of the end portion 543b of the elastic member 542 toward the end portion 544b of the outer pad 14a. This stop 546 is effective to establish a predetermined initial amount of clearance between the end portion 543b of the elastic member 542 and the end portion 544b of the outer pad 14a. The end portion 543b and the portion 538b are held in contact with each other through a support 548. That is, the support 548 prevents direct contact of the end portions 543b and the portion 538b when the outer pad 14a is dragged due to frictional contact with the disc rotor.

The elastic member 542 has an elastic property similar to the non-linear relationship as described above with respect to the fifteenth embodiment. The end portion 543b of the elastic member 542 has a cutout 550 as shown in FIG. 52. When the load or force transmitted from the outer pad 14a to the end portion 543b is small enough for the cutout 550 to exist, the elastic member 542 has a small minimum modulus of section and exhibits a relatively small elastic coefficient. After the above-indicated load or force has increased to an extent that causes the cutout 550 to disappear, the minimum modulus of section of the elastic member 542 is increased, and the elastic coefficient is accordingly increased. In this arrangement, the elastic member 542 having the cutout 550 exhibits a non-linear relationship based on a difference in its minimum modulus of section when the cutout 550 exists and when the cutout 550 does not exist.

As shown in FIG. 54, there exists a gap between the end portion 543b of the elastic member 542 and the portion 538b of the mounting bracket 152. The amount of this gap decreases as the outer pad 14a is dragged with the disc rotor. The gap may be filled with a second elastic member 552 made of a rubber material. In this case, the elastic member 542 cooperates with the second elastic member 552 to constitute the elastic member whose elastic coefficient continuously varies so as to provide a non-linear relationship between the elastic force and the amount of elastic deformation.

Figure 56:
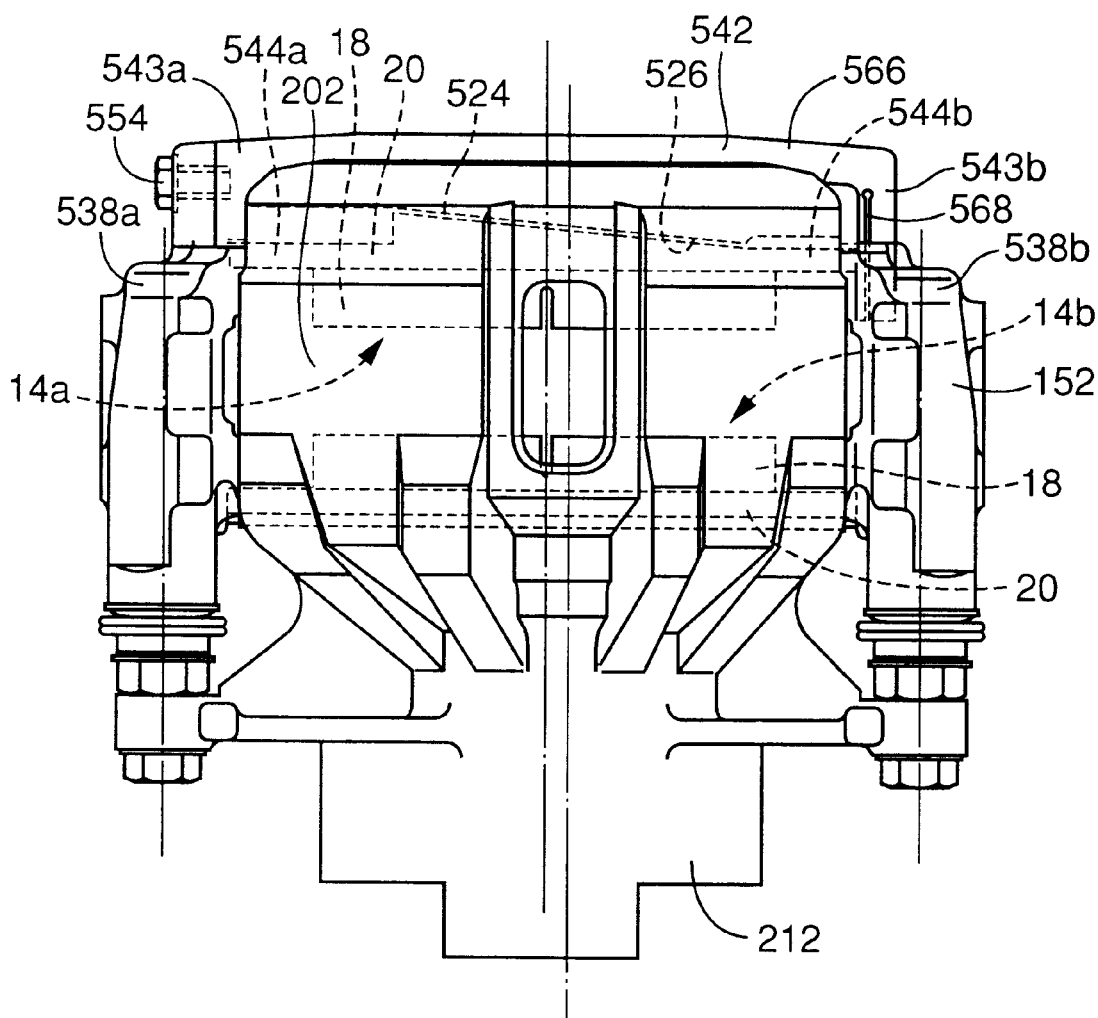
FIG. 56 is a plan view showing one modification of elastic member 542 shown in FIG. 52.
Figure 57:
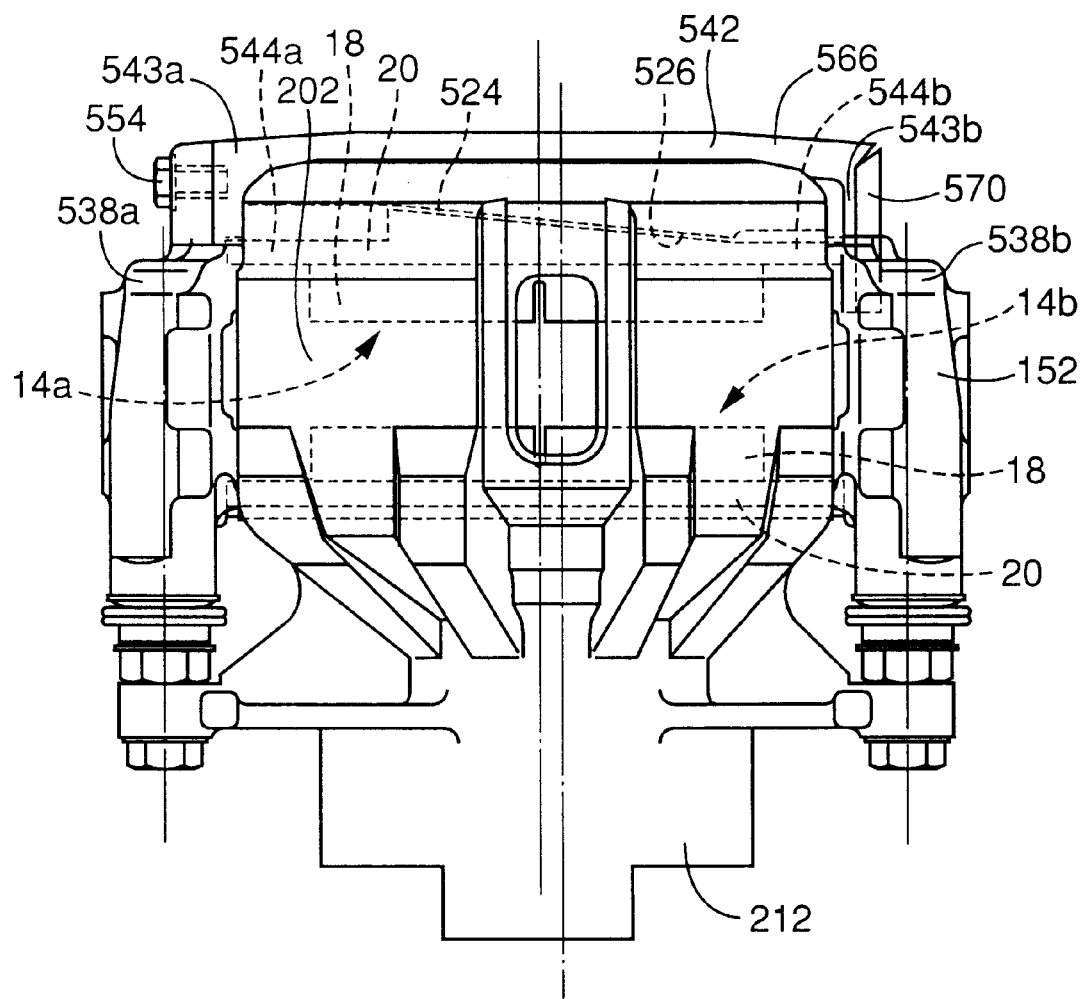
FIG. 57 is a plan view showing another modification of the elastic member 542.

The end portion 543a of the elastic member 542 is fixed by a bolt 554 to the portion 538a of the mounting bracket 142. However, the fixing of the end portion 543a to the portion 538a by the bolt 554 is not essential. The end portion 543a and the portion 538a may be associated with each other such that a relative movement of the end portion 543a and the portion 538a in a first direction is prevented by a first structure in which a protrusion engages a groove, while a relative movement of the end portion 543a and the portion 538a in a second direction perpendicular to the first direction is prevented by a second structure in which a pin engages a hole. Examiners of the first and second structures are illustrated in FIG. 56, wherein the end portion 543a has a protrusion 556 which engages a groove 558 formed in the portion 538a and which cooperates with the protrusion 556 to constitute the first structure indicated above. Further, the end portion 543a and the portion 538a have respective holes 560, 562 aligned with each other, and a pin 564 is inserted through these two holes 560, 562. The pin 564 and the holes 560, 562 constitute the second structure indicated above.

While the mounting bracket 152 of the disc brake according to the present seventeenth embodiment does not have the bridging portion 540, the mounting bracket 152 may have the bridging portion 540 disposed adjacent and parallel to the elastic member 542 described above. The pin 564 may be replaced by a bolt or screw.

In the embodiment of FIG. 52, the cutout 550 is formed in the outer surface of the elastic member 542, at a junction between the end portion 543b and an intermediate portion 566 of the elastic member 542 which are connected to each other at right angles. The cutout 550 has a depth corresponding to a half of the thickness of the elastic member 542 as seen in FIG. 52. However, the cutout 550 may replaced by a cutout 568 which is formed in the end portion 543b so as to extend toward the disc rotor, as shown in FIG. 56. Further, a second elastic member 570 may be attached to the end portion 543b of the elastic member 542, such that the force received from the outer pad 14a due to its dragging with the disc rotor acts on only the elastic member 542 and does not act on the second elastic member 570 while the force is relatively small, and acts on both of the elastic member 542 and the second elastic member 570 while the force exceeds a certain limit.

It will be understood that the elastic member 542 functions as the elastic member, which acts as the mechanism for controlling the rate of increase of the pressing force of the outer pad 14a.

There will be described an eighteenth embodiment of this invention, which is similar in many aspects to the sixteenth embodiment. The same reference signs as used in the sixteenth embodiment will be used in the present eighteenth embodiment to identify the common used elements.

Only a difference of the eighteenth embodiment from the sixteenth embodiment will be used.

Figure 50:
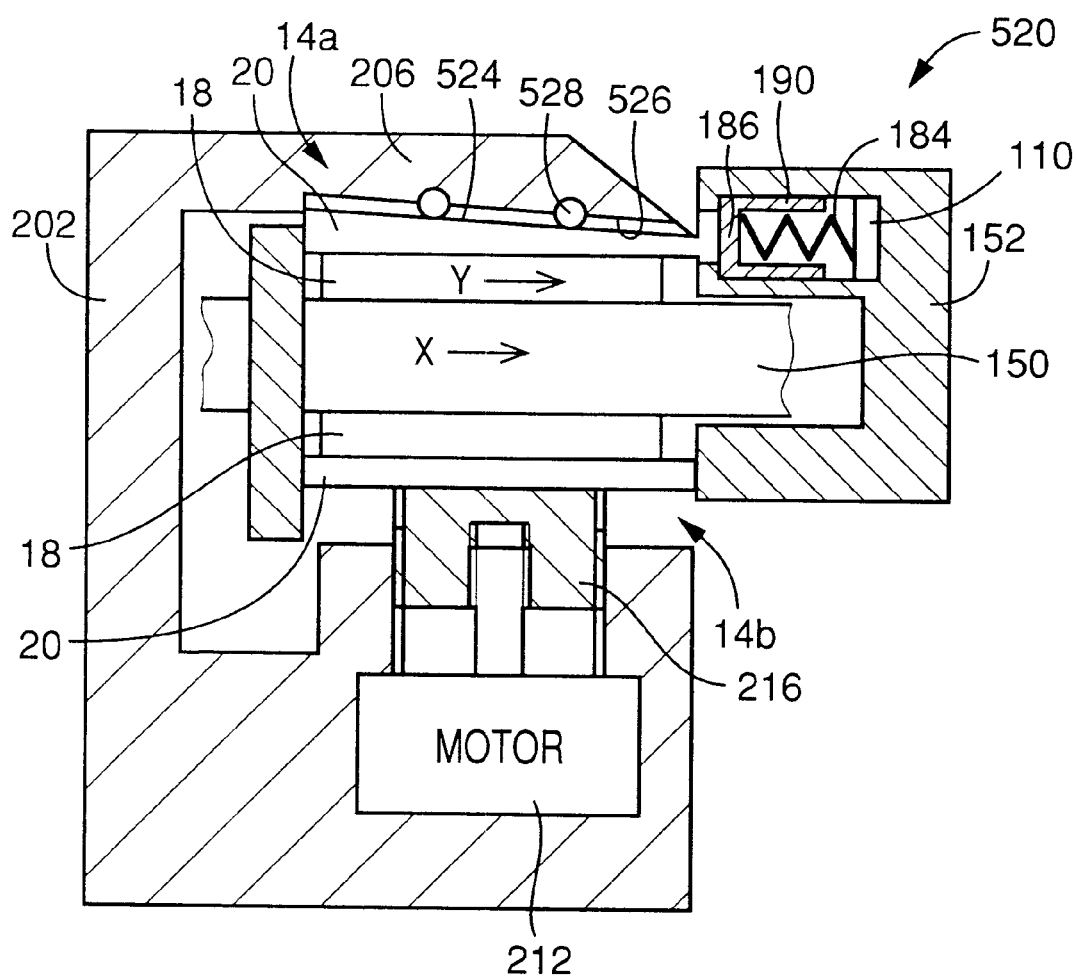
FIG. 50 is a fragmentary plan view in cross section of a motor-driven disc brake in an electrically operated braking system according to a sixteenth embodiment of the invention.
Figure 58:
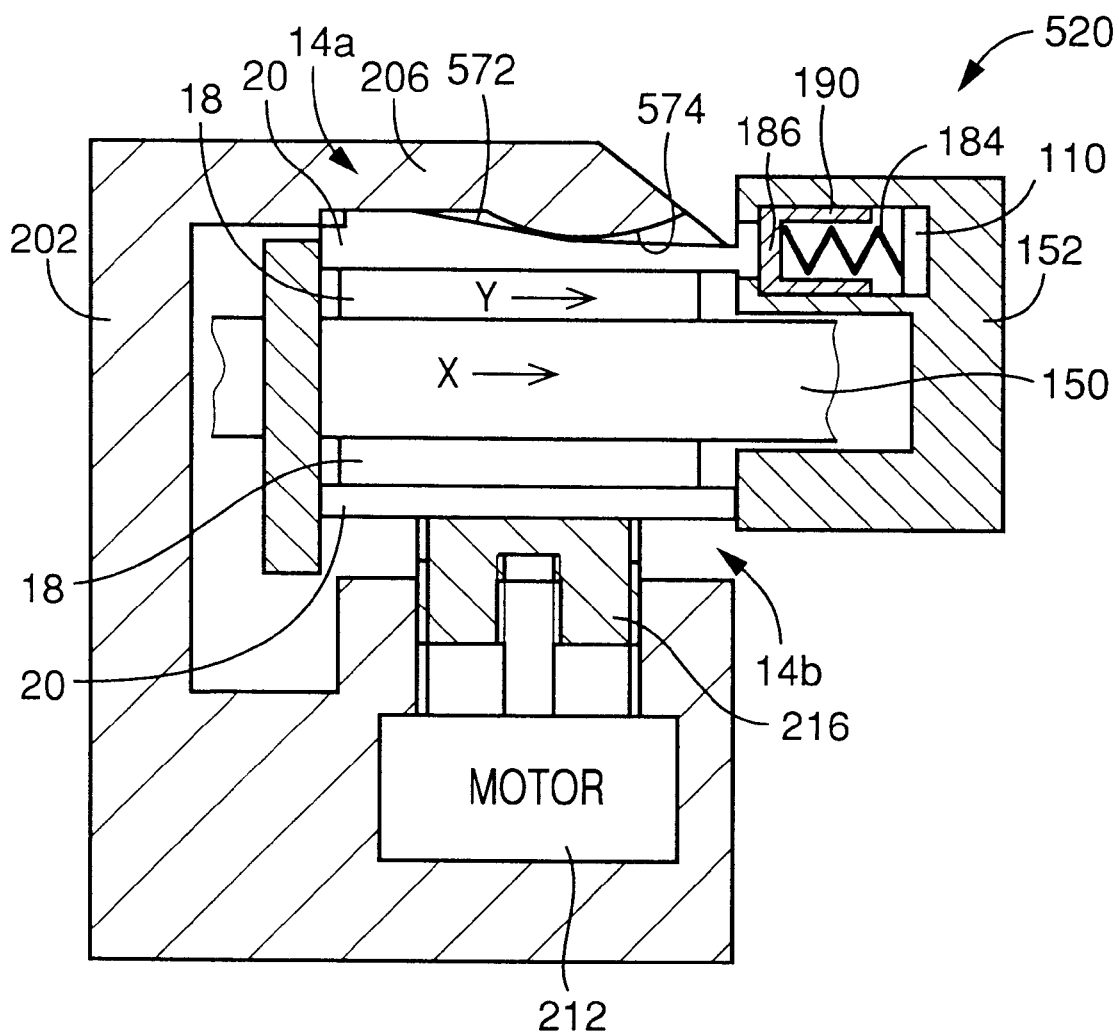
FIG. 58 is a front elevational view partly in cross section of a motor-driven disc brake in an electrically operated braking system according to an eighteenth embodiment of the invention.

In the sixteenth embodiment, the backing plate 30 of the outer pad 14a has the slant back surface 524, as shown in FIG. 50. The slant back surface 524 lies in a single plane and has a constant angle of inclination with respect to the friction surface 12 of the disc rotor 11. In the present eighteenth embodiment, the backing plate 20 of the outer pad 14a has a slant back surface 572 as shown in FIG. 58. The reaction portion 206 has a support surface 574 which has a part-spherical projection for contact with the slant back surface 572 of the backing plate 20.

Figure 59:
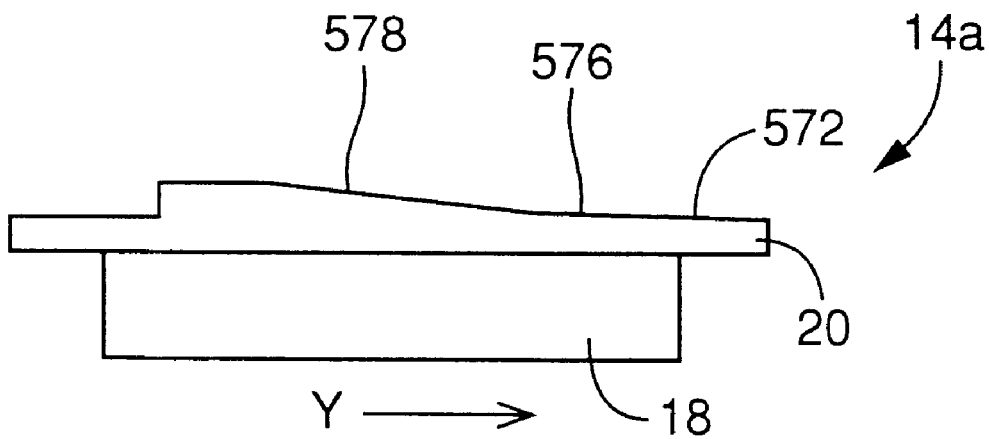
FIG. 59 is an enlarged side elevational view of outer pad 14a in the disc brake of FIG. 58.

The outer pad 14a provided in the eighteen embodiment is shown in enlargement in FIG. 59. As shown in this figure. the slant back surface 572 of the backing plate 20 of the outer pad 14a has a first slightly inclined part 576, and a second inclined part 578 whose angle of inclination is larger than that of the first slightly inclined part 576. These first and second inclined parts 576, 578 are arranged in this order in a direction opposite to the dragging direction of the outer pad 14a. As the outer pad 14a is dragged due to its frictional contact with the disc rotor 11, the part-spherical projection of the support surface 574 of the reaction portion 206 first contacts the first slightly inclined part 576 and then comes into contact with the second inclined part 578. The first and second inclined parts 576, 578 lie in respective two planes which are not parallel to each other.

Before the outer pad 14a provides the self-servo effect, the support surface 574 of the reaction portion 206 contacts the first inclined part 576, which has a relatively small angle of inclination and therefore permits easy dragging movement of the outer pad 14a with the disc rotor 11. In other words, the first inclined part 576 of the slant back surface 572 of the backing plate 20 permits easy initiation of the self-servo effect. After the initiation of the self-servo effect, the support surface 574 contacts the second inclined part 578 whose angle of inclination is large enough for the self-servo effect to be sufficient.

It will be understood that the slant surface 572 of the backing plate 20 of the outer pad 14a functions as the mechanism for controlling the rate of increase of the pressing force of the outer pad 14a.

Figure 60:
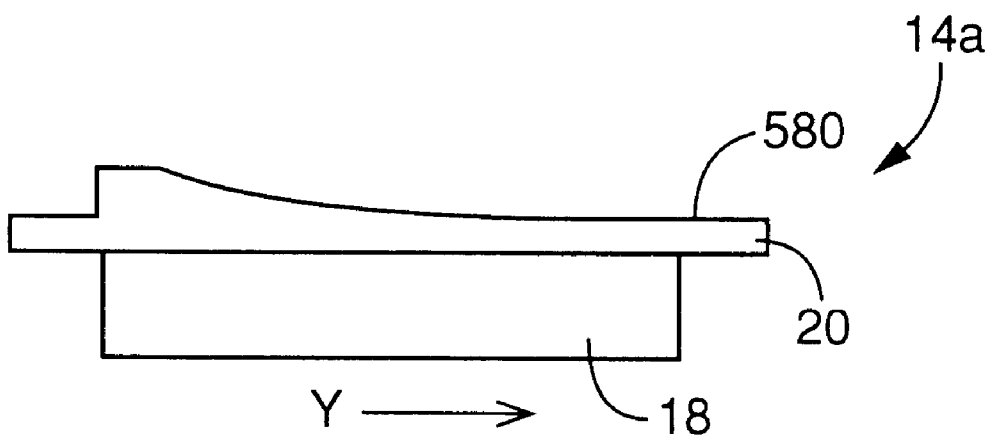
FIG. 60 is an enlarged side elevational view of outer pad of a motor-driven disc brake in an electrically operated braking system according to a nineteenth embodiment of the invention.
Figure 61:
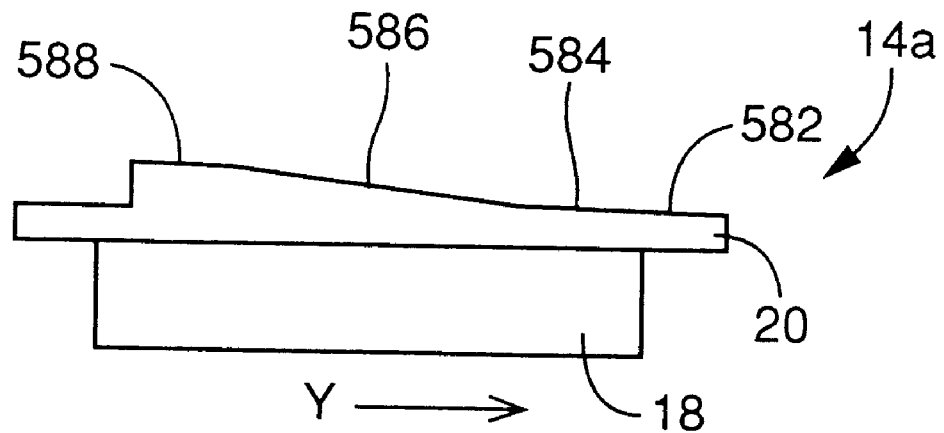
FIG. 61 is an enlarged side elevational view of outer pad of a motor-driven disc brake in an electrically operated braking system according to a twentieth embodiment of the invention.
Figure 62:
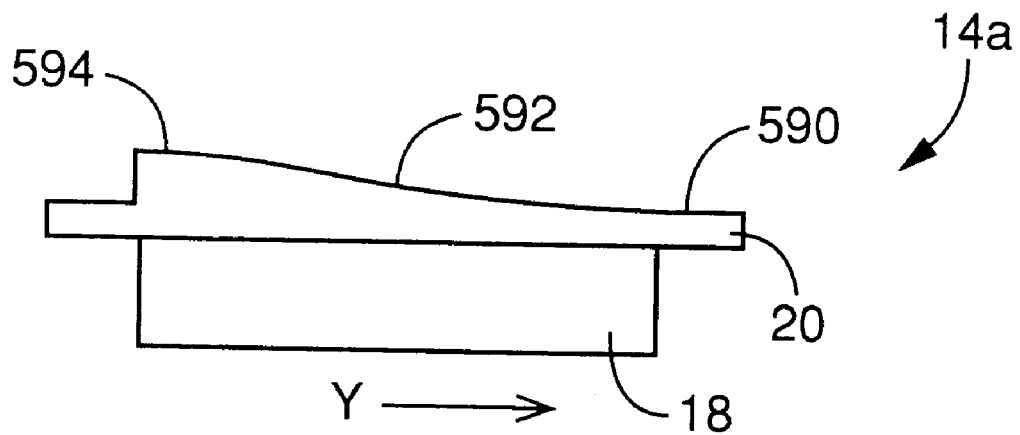
FIG. 62 is an enlarged side elevational view of a motor-driven disc brake in an electrically operated braking system according to a twenty-first embodiment of the invention.

Referring to FIGS. 60–62, there will be described nineteenth, twentieth and twenty-first embodiments of this invention, which are identical with the eighteenth embodiment except for the slant surface of the outer pad 14a which will be described.

In the nineteenth embodiment of FIG. 60, the backing plate 20 of the outer pad 14a has a concave slant surface 580. That is, the back surface 580 of the backing plate 20 follows a circular arc as seen in cross section in a plane parallel to the plane of FIG. 60 which is parallel to the dragging direction Y. Thus, the concave slant surface 580 has a first inclined part whose angle of inclination is relatively small, and a second inclined part whose angle of inclination is relatively large. Before the self-servo effect is provided, the support surface 574 of the reaction portion 206 contacts the first inclined part. After the self-servo effect is initiated, the support surface 574 contacts the second inclined part. Accordingly, the outer pad 14a of the nineteenth embodiment has substantially the same advantage as that of the eighteenth embodiment of FIG. 59. The concave slant surface 580 functions as the mechanism for controlling the rate of increase of the pressing force of the outer pad 14a.

In the twentieth embodiment of FIG. 61, the backing plate 20 of the outer pad 14a has a slant back surface 582 consisting of a first inclined part 584 whose angle of inclination is relatively small, a second inclined part 586 whose angle of inclination is larger than that of the first inclined part 584, and a third inclined part 588 whose angle of inclination is smaller than that of the second inclined part 586. These three inclined parts 584, 586, 588 are arranged in this order in the direction opposite to the dragging direction of the outer pad 14a, and lie in respective three planes. In this arrangement, the support surface 574 of the reaction portion 306 contacts the first inclined part 548 before the self-servo effect is provided. The relatively small angle of inclination of the first inclined part 584 permits easy initiation of the self-servo effect. After the initiation of the self-servo effect, the support surface 574 contacts the second inclined part 586 whose angle of inclination is large enough for the self-servo effect to be sufficient. Before the self-servo effect becomes excessively large, the support surface 574 comes into contact with the third inclined part 588 whose angle of inclination is smaller than that of the second inclined part 586, so that the excessive self-servo effect is prevented. The slant back surface 584 functions as the mechanism for controlling the rate of increase of the pressing force of the outer pad 14a.

In the twenty-first embodiment shown in FIG. 62, the backing plate 20 of the outer pad 14a has a slant back surface 590 consisting of a concave first inclined part 592 and a convex second inclined part 594, which are arranged in this order in the direction opposite to the dragging direction Y of the outer pad 14a. The first or concave part 594 consists of a first section whose angle of inclination is relatively small, and a second section whose angle of inclination is larger than that of the first section. Before the self-servo effect is provided, the support surface 574 of the reaction portion 206 contacts the first section of the concave part 592. The relatively small angle of inclination of the first section permits easy initiation of the self-servo effect. After the initiation of the self-servo effect, the support surface 574 comes into contact with the second section of the convex part 594 whose angle of inclination is large enough for the self-servo effect to be sufficient. Before the self-servo effect becomes excessively large, the support surface 574 comes into contact with the second or convex part 594 whose angle of inclination is smaller than that of the concave part 592, so that the excessive self-servo effect is prevented. The slant back surface 590 functions as the mechanism for controlling the rate of increase of the pressing force of the outer pad 14a.

A twenty-second embodiment of the present invention will be described. This embodiment is similar in many aspect to the first embodiment. The same reference signs as used in the first embodiment will be used in this twenty-second embodiment, and only a difference of the twenty-second embodiment from the first embodiment will be described.

In the first embodiment, the drive force of the ultrasonic motor 72 is boosted by the pair of levers 30, 30, and the boosted force is transmitted to the pair of friction pads 14, 14 to force these friction pads 14 onto the disc rotor 11, so that the braking force applied to the vehicle wheel in question is considerably larger than the drive force as produced the ultrasonic motor 72. However, the boosting of the drive force of the motor 72 can be achieved without the self-servo effect being provided by levers.

Figure 63:
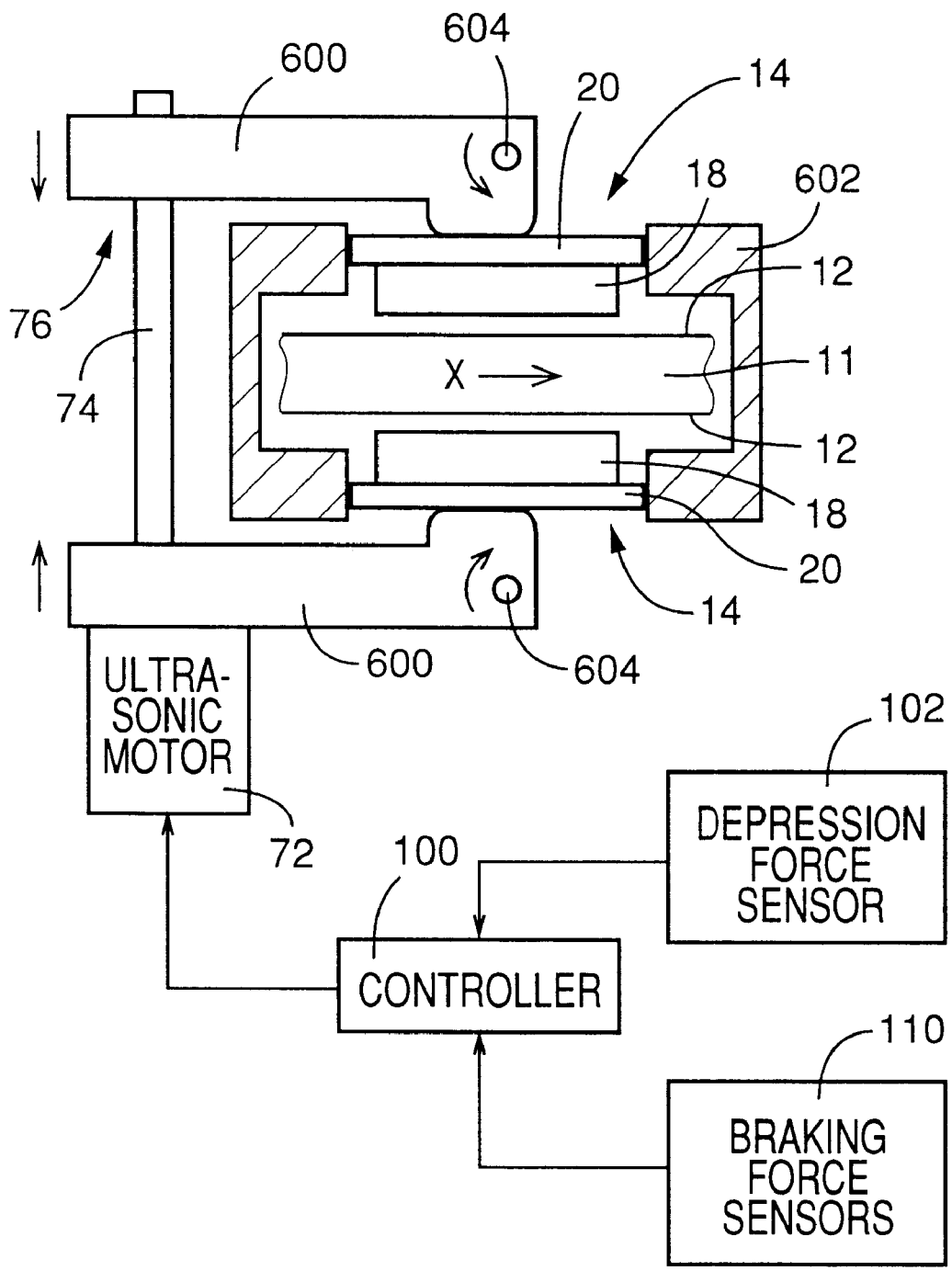
FIG. 63 is a plan view partly in cross section of a motor-driven disc brake in an electrically operated braking system according to a twenty-second embodiment of the invention.

In the light of the above, the twenty-second embodiment shown in FIG. 63 is adapted such that a pair of levers 600 are supported by a mounting member 602 through respective pins 604 such that the levers 600 are pivotable about respective axes which are perpendicular to the axis of rotation of the disc rotor 11. Each lever 600 is adapted to boost the drive force of the ultrasonic motor 72 according to its lever ratio, so that the boosted drive force acts on the corresponding friction pad 14 at its backing plate 20. The mounting member 602 functions not only as a support member for pivotally supporting the levers 600, but also as a support member for supporting the pair of friction pads 14 such that the friction pads 14 are slidably movable toward and away from the disc rotor 11, and as a member for receiving the friction force from each friction pad 14.

As in the first embodiment, the ultrasonic motor 72 is controlled in a feedback fashion by the controller 100, on the basis of the output signals received from the depression force sensor 102 and the braking force sensor 110, so that the braking force acting on the vehicle wheel in question is controlled depending upon the operating force acting on the brake pedal.

In the embodiment of FIG. 63, the drive force of the ultrasonic motor 72 is transmitted to the friction pads 14 through a simple mechanism including the levers 600 as major elements. The disc brake is capable of producing a wheel braking force considerably larger than the drive force of the motor 72, without suffering from complicated construction.

Then, a twenty-third embodiment of this invention will be described by reference to FIG. 64.

Figure 64:
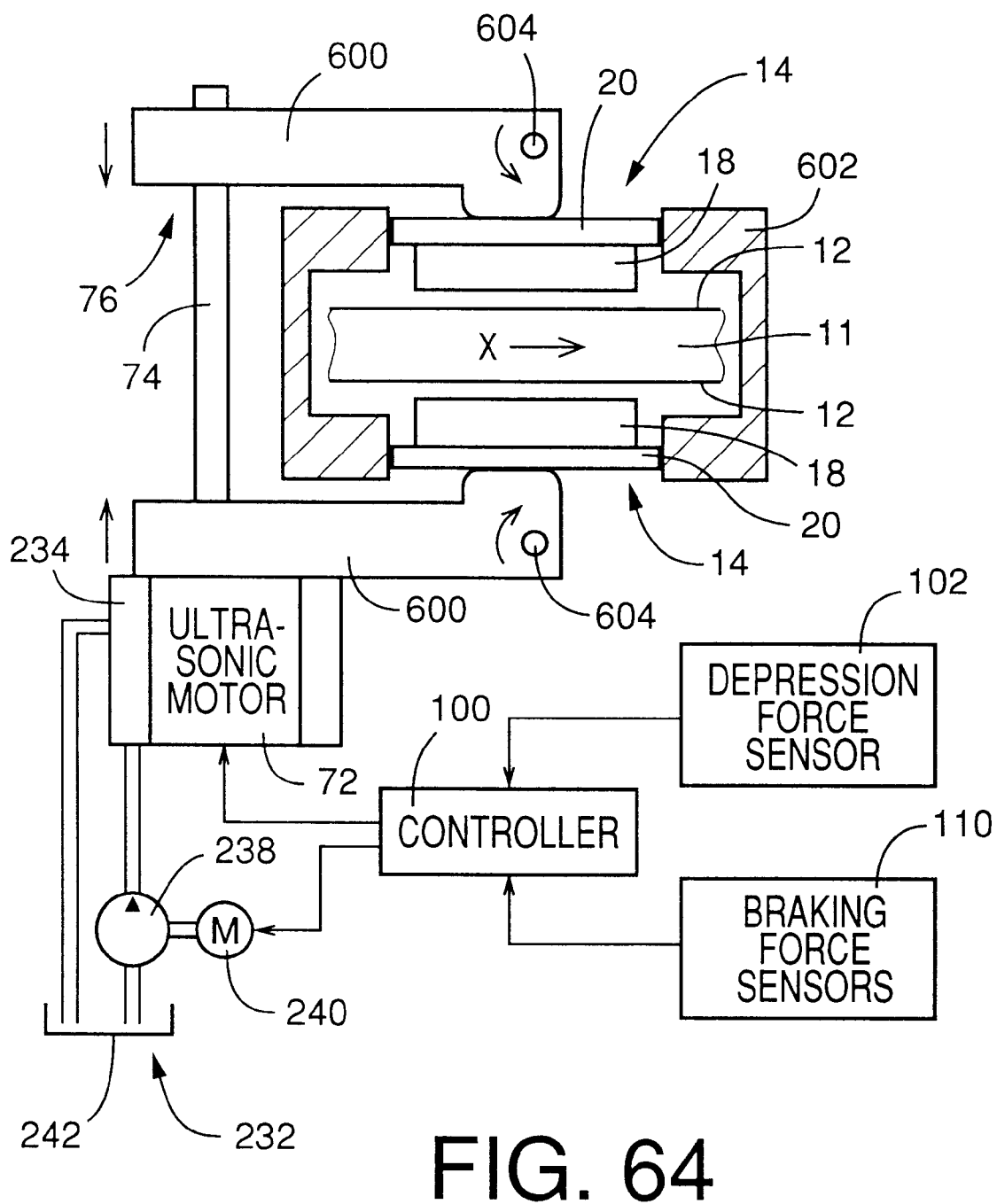
FIG. 64 is a plan view partly in cross section of a motor-driven disc brake in an electrically operated braking system according to a twenty-third embodiment of the invention.

The electrically operated braking system of this embodiment of FIG. 64 is identical with that of the twenty-second embodiment of FIG. 63, except for the provision of the cooling device 232 used in the fourth embodiment of FIGS. 13–14. The same reference signs as used in FIGS. 13, 14 and 64 are used in FIG. 64 to identify the commonly used elements. In the present braking system wherein the drive force produced by the ultrasonic motor 72 and boosted by the levers 600 is transmitted to the friction pads 14, the ultrasonic motor 72 is positively cooled by the cooling device 232, to assure improved operating stability of the motor 72 with a reduced adverse thermal influence.

There will next be described a twenty-fourth embodiment of this invention, which is similar in many aspects to the ninth embodiment.

Figure 65:
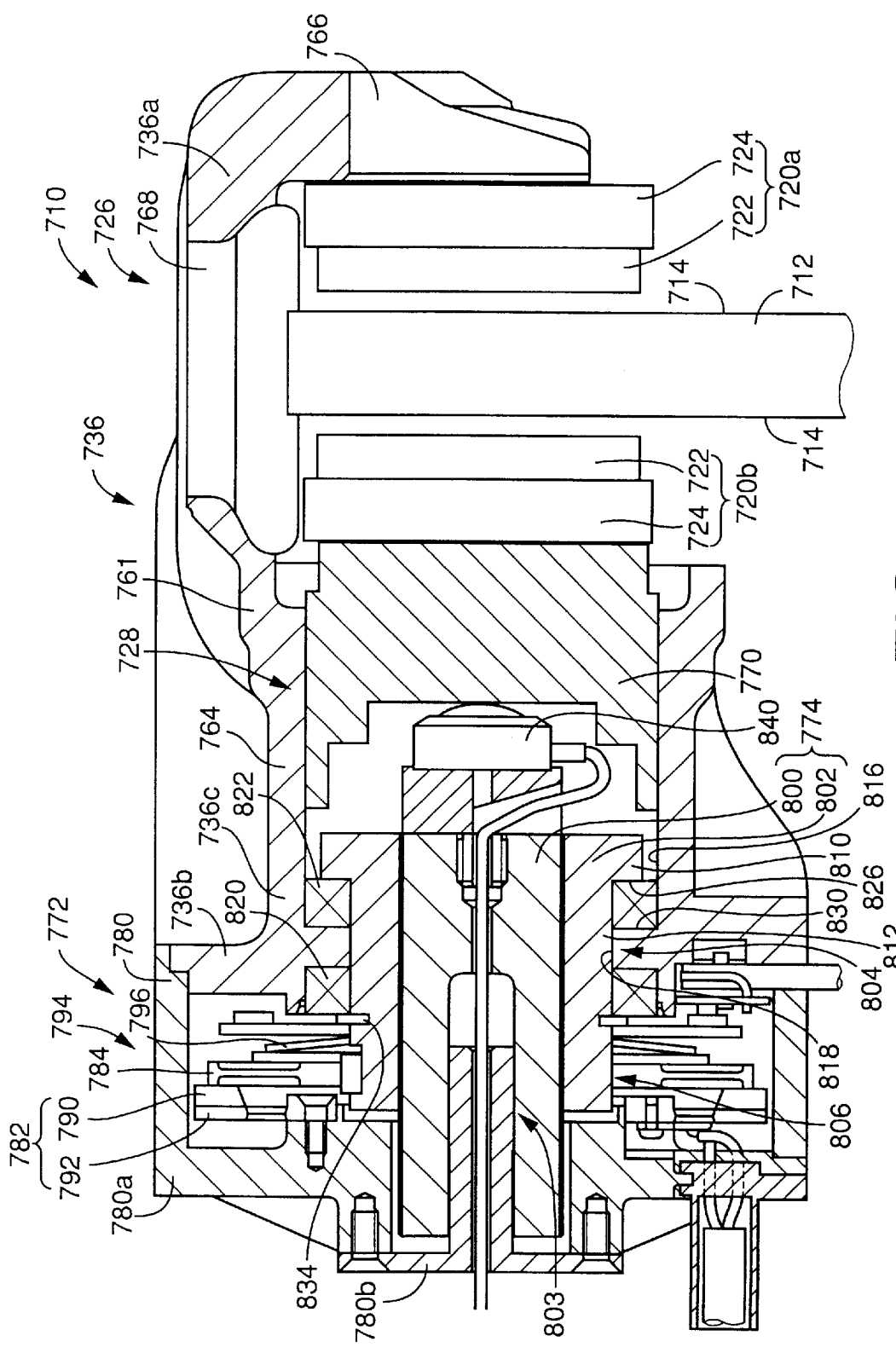
FIG. 65 is a side elevational view in cross section of a motor-driven disc brake in an electrically operated braking system according to a twenty-fourth embodiment of the invention.

Referring to FIG. 65, there is shown an electrically operated braking system constructed according to the twenty-fourth embodiment, which includes a motor-driven disc brake 710.

The motor-drive disc brake 710 has a disc rotor 712 functioning as a rotary member which is rotated with a vehicle wheel to be braked. The disc rotor 712 has opposite friction surfaces 714, while the disc brake 710 includes a pair of friction pads 720a, 720b disposed opposite to the respective friction surfaces 714 of the disc rotor 712. Each of these two friction pads 720 has a friction member 722, and a backing plate 724 which is fixed to the back surface of the friction member 722 and which is made of a steel material.

The disc brake 710 includes a pad support mechanism 726, a self-servo mechanism 727, and a pad presser mechanism 728.

The pad support mechanism 726 will be described first.

Figure 66:
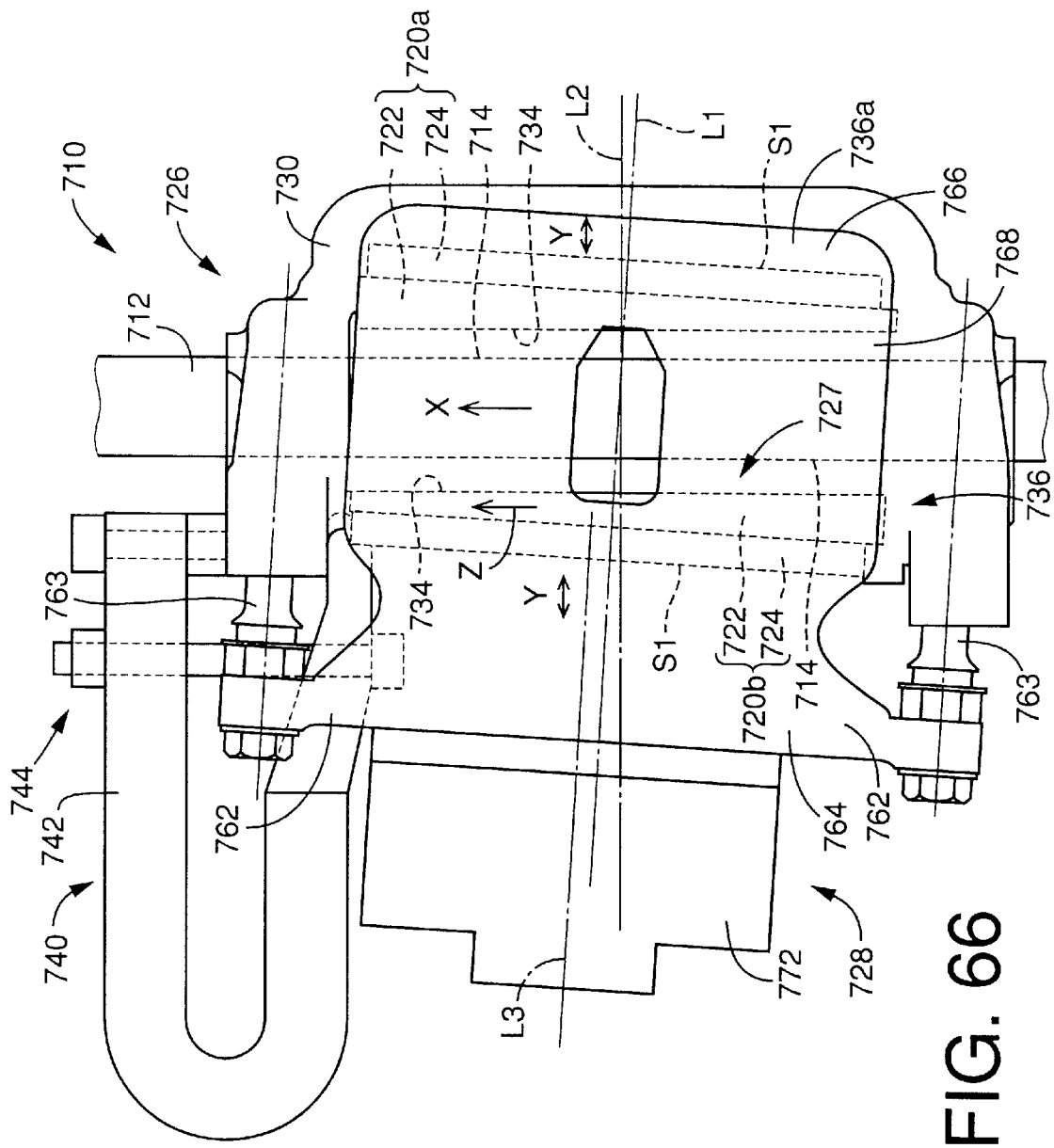
FIG. 66 is a plan view of the disc brake of FIG. 65.

As shown in FIG. 66, the disc brake 710 is provided with a mounting bracket 730 which is fixed to the body of the vehicle, in a cantilever fashion, so as to extend over the periphery of the disc rotor 712. The mounting bracket 730 includes (a) portions which are located on the opposite sides of the disc rotor 712 and which support the respective friction pads 720a, 720b such that the friction pads 720 are movable in a direction intersecting the friction surfaces 714, and (b) portions functioning as a bearing member, which portions receive friction forces generated due to frictional contacts of the friction pads 720 with the friction surfaces 714 of the disc rotor 712. In FIG. 66, "X" represents a direction of rotation of the disc rotor 712 during forward running of the vehicle, while "Y" represents a direction in which each of the friction pads 720 is movable relative to the friction surfaces 714. The direction Y is perpendicular to the friction surfaces 714. The mounting bracket 730 is fixed to the vehicle body such that the upper portion of the mounting bracket 730 as seen in FIG. 66 is located on the front side of the vehicle while the right and left portions of the mounting bracket 730 as seen in FIG. 66 are located on the outer and inner sides of the vehicle as viewed in the lateral or transverse direction of the vehicle. Therefore, the friction pad 720a on the right side of the vehicle is referred to as an outer pad while the friction pad 720b on the left side is referred to as an inner pad.

Then, the self-servo mechanism 727 will be described.

The self-servo mechanism 727 is adapted to enable the inner pad 720b to function as a wedge which provides a self-servo effect. To this end, the inner pad 720b is supported by the mounting bracket 730 such that the inner pad 720b is positively allowed to be dragged along with the disc rotor 712 due to frictional contact of the inner pad 720b with the disc rotor 712. The structure of the mounting bracket 730 for supporting the inner pad 720b in this manner is similar to that in the third embodiment of FIGS. 10–12. In FIG. 66, "Z" represents a direction in which the inner pad 720b is dragged with the disc rotor 712 during the forward running of the vehicle. The inner pad 720b is wedge-shaped with the thickness of the friction member 722 continuously decreasing in the dragging direction "Z", namely, in the direction from the rear side toward the front side of the vehicle. Thus, the friction member 722 of the inner pad 720b has a slant surface 734 which is inclined with respect to the opposite surfaces of the backing plate 724 and which is opposed to the friction surface 714 of the disc rotor 712. With the slant surface 734 held in contact with the friction surface 714, the back surface of the backing plate 724 remote from the friction member 722 is inclined with respect to the friction surface 714. Thus, the backing plate 724 is inclined with respect to the friction surface 714. For a presser rod (which will be described) to engage the backing plate 724 such that the axis of the presser rod is perpendicular to the back surface of the backing plate 724, the mounting bracket 730 is fixed to the vehicle body such that a reference line L1 of the mounting bracket 730 is inclined with respect to an axis L2 of rotation of the disc rotor 712 so that the left portion of the mounting bracket 730 as seen in FIG. 66 is displaced toward the front portion of the vehicle. The reference line L1 is a straight line which passes the centers of the friction pads 720a, 7320b and is parallel to the direction Y in which the pads 720 are movable. The reference line L1 is also parallel to the direction in which a caliper 736 engageable with the backing plates 724 of the friction pads 720 is slidably movable relative to the mounting bracket 730 to which the caliper 736 is slidably attached through pins.

The outer pad 720a is not intended to provide a self-servo effect. In this sense, the outer pad 720a need not be wedge-shaped. However, the outer pad 720a is also wedge-shaped following the angle of inclination of the caliper 726 whose direction of movement is parallel to the reference line L1 of the mounting bracket 730 which is inclined with respect to the rotation axis L2 of the disc rotor 712 by the angle of inclination of the backing plate 724 of the inner pad 720b with respect to the friction surfaces 714 of the disc rotor 712. Unlike the friction member 722 of the inner pad 720b, the friction member 722 of the outer pad 720a has a thickness which continuously increases in the dragging direction Z of the inner pad 720b or in the rotating direction X of the disc rotor 712. The wedge shape of the outer pad 720a permits its friction member 722 to contact the friction surface 714 of the disc rotor 712 without a gap or clearance therebetween over the entire area of the friction surface 714.

As described above, the mounting bracket 730 supports the inner pad 720b so as to positively allow the inner pad 720b to be moved or dragged with the disc rotor 712 due to the frictional contact therebetween. However, the mounting bracket 730 supports the outer pad 720b so as to substantially inhibit the outer pad 720a from being moved with the disc rotor 712.

The inner pad 720b is not always allowed to be dragged with the disc rotor 712. Namely, the inner pad 720b is supported such that the dragging movement of the inner pad 720b with the disc rotor 712 is permitted only after the friction force acting on the inner pad 720b exceeds a predetermined threshold. Described more specifically, the inner pad 720b is associated with the mounting bracket 730 via an elastic control mechanism 740. The elastic control mechanism 740 has an elastic member which receives a load from the inner pad 720b. The elastic member is not elastically deformed until the received load is smaller than the predetermined threshold, so that the inner pad 720b is inhibited from being moved relative to the mounting bracket 730 in the dragging direction Z, that is, inhibited from being moved with the disc rotor 712, until the load acting on the elastic member is smaller than the threshold. After the load exceeds the threshold, the elastic member of the elastic control mechanism 740 is elastically deformed, allowing the inner pad 720b to be moved relative to the mounting bracket 730 and dragged with the disc rotor 712.

The elastic control mechanism 740 provided in the present embodiment includes (a) a U-shaped elastic member 742 having a pair of arms, and (b) an adjusting mechanism 744 for changing an initial amount of elastic deformation of the elastic member 742, to thereby adjust a pre-load acting on the elastic member 742. This pre-load is equal to the above-indicated predetermined threshold above which the inner pad 720b is permitted to be moved in the dragging direction Z against the biasing action of the elastic member 742. The elastic member 742 is positioned such that the pair of arms extend in the lateral or transverse direction of the vehicle. One of the arms is secured to the mounting bracket 730 while the other arm is fixed to the inner pad 720b. The adjusting mechanism 744 includes an adjusting bolt which extends in a direction substantially parallel to the dragging direction Z and which connects the two arms of the elastic member 742 so as to permit movements of the two arms toward each other and inhibit movements of the two arms away from each other. The adjusting bolt permits adjustment of the spacing distance between the two arms to thereby permit adjustment of the pre-load acting on the elastic member 742.

In this twenty-fourth embodiment, the predetermined threshold of the friction force of the inner pad 720b, or the pre-load of the elastic control mechanism 740 is equal to the friction force which is generated between the disc rotor 712 and the inner pad 720b when the deceleration of the vehicle achieved by activation of the disc brake 710 is about 0.5–0.6 G. When the deceleration of the vehicle is lower than this threshold of about 0.5–0.6 G with the brake pedal being operated in an ordinary or normal manner, the elastic control mechanism inhibits the dragging of the inner pad 720b with the disc rotor 712 to thereby inhibit a self-servo effect of the inner pad 720b. When the vehicle deceleration exceeds the threshold with the brake pedal being abruptly depressed by a relatively large amount, the elastic control mechanism allows the inner pad 720b to be dragged with the disc rotor 712, permitting the inner pad to achieve the self-servo effect.

The pad presser mechanism 728 will then be explained.

The disc brake 710 includes the caliper 736 shown in FIG. 65 and 66. As shown in FIG. 65, the caliper 736 has a body portion 761, and a motor housing 780 which will be described. The body portion 761 includes a pad presser portion 736a, a motor mounting portion 736b and a support portion 736c, which are integral with each other. The body portion 761 and the motor housing 780 are bolted together. As shown in FIG. 66, the body portion 761 further includes a pair of arms 762 extending in the longitudinal direction of the vehicle, as shown in FIG. 66. The arms 762 are also formed integrally with the body portion 761.

The body portion 761 of the caliper 736 is supported at the pad presser portion 736a by the mounting bracket 730 such that the body portion 761 is slidably movable in the direction Y in which the friction pads 720 are movably supported by the mounting bracket 730. It will be understood that the caliper 736 is a floating caliper. The two arms 762 are connected at their end portions to respective two pins 763 which extend in the direction Y. These two pins 763 engage the mounting bracket 730 such that the pins 763 are slidable in the direction Y. Thus, the body portion 761 are slidably supported by the mounting bracket 730, at the pad presser portion 736a and through the two pins 763.

The pad presser portion 736a of the body portion 761 of the caliper 736 consists of (a) a presser portion 764 disposed adjacent to the backing plate 724 of the inner pad 720b, (b) a reaction portion 766 disposed adjacent to the backing plate 724 of the outer pad 720a, and (c) a connecting portion 768 which extend over the periphery of the disc rotor 712 so as to connect the presser and reaction portions 764, 766.

As shown in FIG. 65, a presser rod 770 slidably engages the presser portion 764, such that the front end face of the presser rod 770 faces the backing plate 724 of the inner pad 720b, for abutting contact with the back surface of this backing plate 724. The caliper 736 serves as a presser member for pressing the outer pad 720a. On the back side of the presser rod 770, a ultrasonic motor 772 is disposed coaxially with the presser rod 770. The presser rod 370 and the ultrasonic motor 372 are disposed such that their axes are parallel to the direction Y. Further, the presser rod 370 and the ultrasonic motor 372 are operatively and coaxially connected to each other through a ballscrew mechanism 774. A common axis L3 of the presser rod 770, ultrasonic motor 772 and ballscrew mechanism 774 is parallel to the reference line L1 of the mounting bracket 730, and is offset by a suitable distance from the reference line L1 in the rotating direction X of the disc rotor 712, as indicated in FIG. 66.

It will be understood from the above description of the twenty-fourth embodiment that the inner pad 720b is interposed between the disc rotor 712 and the presser rod 770 such that the inner pad 720b can be moved with the disc rotor 712 due to the frictional contact of the slant surface 734 with the friction surface 714, with the presser rod 770 held in abutting contact with the backing plate 724 of the inner pad 720b. When the inner pad 720b is moved with the disc rotor 712, the inner pad 720b functions as a wedge, and the friction force generated between the inner pad 720b and the disc rotor 712 is converted into an axial force which acts on the disc rotor 712 and the presser rod 770 in opposite directions so as to move the presser rod 770 away from the disc rotor 712. Accordingly, the force by which the friction pads 720 are pressed against the opposite friction surfaces 714 of the disc rotor 712 is increased, whereby the friction force between the inner pad 720b and the disc rotor 712 is increased. Thus, the dragging movement of the inner pad 720b with the disc rotor 712 causes the self-servo effect.

The ultrasonic motor 772 is of a travelling-wave type. As well known in the art, the motor 772 has a stator 782 and a rotor 784 which are coaxially disposed within a motor housing 780, as shown in FIG. 65. In operation, the stator 782 produces a surface wave upon application of a ultrasonic vibration thereto, and the rotor 784 is rotated with a friction force acting between the stator 782 and the rotor 784.

The motor housing 780 consists of a body portion 780a and a closure portion 780b which closes a through-hole formed through the bottom wall of the body portion 780a. These body portion 780a and the closure portion 780b are initially separate members which are screwed to each other. The motor housing 780 is screwed at its open end to the motor mounting portion 736b of the caliper 736.

The stator 782 consists of an elastic body 790 and a piezoelectric body 792 both of which take the form of a ring. The elastic and piezoelectric bodies 790, 792 are superposed on each other and bonded together.

The rotor 784 is forced by a pressing contactor mechanism 794 onto the stator 382, so that there is produced a suitable amount of friction force therebetween. The rotor 784 has a friction member bonded thereto for frictional contact with the stator 782, so that a travelling-wave vibration generated by the stator 782 is transmitted to the rotor 784, whereby the rotor 784 is rotated. A certain friction force exists between the stator 782 and the rotor 784 even when the piezoelectric body 792 is in a de-energized or off state without a voltage application thereto by the pressing contactor mechanism 794. In the present embodiment, the pressing contactor mechanism 794 is principally constituted by a coned disc spring 796. However, the coned disc spring 796 may be replaced by a coil spring.

The ballscrew mechanism 774 indicated above includes an externally threaded member (threaded shaft) 800, an internally threaded member (nut) 802, and a plurality of balls through which the externally and internally threaded members 800, 802 engage each other. The externally threaded member 800 is not rotatable but is axially movable while the internally threaded member 802 is rotatable but is not axially movable. In the present embodiment, the externally threaded member 800 functions as a movable member, while the internally threaded member 802 functions as a rotatable member.

The externally threaded member 800 has a splined portion 803 splined to the motor housing 780 such that the member 800 is not rotatable relative to the motor housing 780. The splined portion 803 is fixed to the motor housing 780.

To the internally threaded member 802, there are fixed the rotor 784 and the pressing contactor mechanism 794 such that the rotor 784 and the mechanism 794 are not rotatable relative to the motor housing 780. In this arrangement, forward rotation of the internally threaded member 802 by forward rotation of the rotor 784 will cause the externally threaded member 800 to move in the right direction as seen in FIG. 65, pushing the presser rod 770 to be advanced for pressing the friction pad 720*b* to move toward the disc rotor 712. Conversely, reverse rotation of the internally threaded member 702 by reverse rotation of the rotor 784 will cause the externally threaded member 800 to move in the left direction as seen in FIG. 65, permitting the presser rod 770 to be retracted and thereby permitting the friction pad 720*b* to be retracted away from the disc rotor 712.

The internally threaded member 802 has a front portion 804 located on one side of the rotor 784 nearer to the inner pad 720*b*, and a rear portion 806 on the other side of the rotor 784 remote from the inner pad 720*b*. The front portion 804 is supported by the above-indicated support portion 736*c* of the caliper 736, which is located at the boundary between the body portion 761 and the motor housing 780. Thus, the front portion 804 extends between the body portion 761 of the caliper 736 and the motor housing 780. A part of the front portion 804 which corresponds to the body portion 761 is stepped having a large-diameter shaft portion 810 nearer to the inner pad 720*b*, and a small-diameter shaft portion 812 remote from the inner pad 720*b*. The body portion 761 has a stepped part in which the front portion 804 is fitted. This stepped part has a large-diameter hole 816 corresponding to the large-diameter shaft portion 810, and a small-diameter hole corresponding to the small-diameter shaft portion 812.

The internally threaded member 802 is rotatably supported by the support portion 736*c* of the body portion 761 through a radial bearing 820 and a radial thrust bearing 822, which are spaced apart from each other in the axial direction. The radial bearing 820 is adapted to receive a radial load acting on the internally threaded member 802. The radial bearing 820 includes an outer ring an inner ring, which are rotatable relative to each other through a plurality of rolling elements. On the other hand, the radial thrust bearing 822 is adapted to receive both radial and thrust loads acting on the internally threaded member 802. The radial thrust bearing 822 includes a plurality of cups which are rotatable relative to each other through a plurality of rolling elements. The radial thrust bearing 822 may be a tapered roller bearing or a self-aligning roller bearing.

Described more specifically, the radial bearing 820 and the radial thrust bearing 822 are mounted on the front portion 804 of the internally threaded member 802 such that the radial bearing 820 is located on the side of the rotor 784 while the radial thrust bearing 822 is located on the side of the inner pad 820*b*. The radial bearing 820 is interposed between the internally threaded member 802 and the support portion 736*c* such that the outer ring is fixedly fitted on the surface of the small-diameter hole 928 while the inner ring is fixedly fitted on the surface of the small-diameter shaft portion 812. On the other hand, the radial thrust bearing 822 is interposed between the internally threaded member 802 and the support portion 736*c* such that the cup of the bearing 822 nearest to the inner pad 720*b* is fixed to an annular shoulder surface 826 of the front portion 804, which is located between the large-diameter and small-diameter shaft portions 810, 812 and which faces in the rear direction toward the rotor 784. Further, the cup of the radial thrust bearing 822 nearest to the rotor 784 is fixed to an annular shoulder surface 826 of the body portion 761 of the caliper 736, which is located between the large-diameter and small-diameter holes 816, 918 and which faces in the front direction toward the inner pad 720*b*.

The internally threaded member 802 has a groove formed in its outer circumferential surface, and fixing means in the form of a retainer ring 834 is fixed in this groove. Between the retainer ring 834 and the large-diameter shaft portion 810, there are sandwiched the radial bearing 820, motor mounting portion 736*b* and radial thrust bearing 822, so as to substantially prevent an axial movement of the internally threaded member 802. However, the disc brake 710 may be designed so as to allow the axial movement of the internally threaded member 802 over a predetermined distance, so that the amount of gap between the stator 782 and the rotor 784 is larger when the disc brake 710 is not operated than when the disc brake 710 is operated. In this arrangement, the force by which the stator 782 is pressed onto the rotor 784 is made comparatively small, facilitating the oscillation of the stator 782 upon operation of the disc brake 710, to thereby permit a smooth rise of the drive torque of the motor 772.

The externally threaded member 800 is provided on its end face with a load sensor 840 concentrically attached thereto. The externally threaded member 800 is adapted to abut on the back surface of the presser rod 770 through the load sensor 720, so that the force by which the inner pad 720*b* is pressed by the motor 772 through the ballscrew mechanism 774 can be detected based on the output signal of the load sensor 840.

Figure 67:
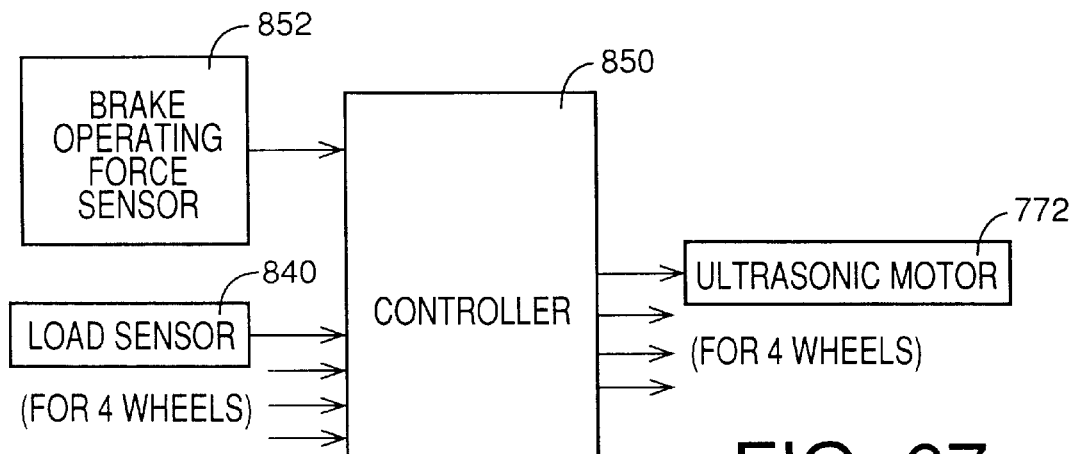
FIG. 67 is a block diagram indicating an electrical arrangement of the braking system of FIG. 65.

Referring to the block diagram of FIG. 67, there is shown an electric control system of the present electrically operated braking system including the motor-driven disc brake 710. The control system includes a controller 850 arranged to control the motor-driven disc brake 710, more specifically, control the ultrasonic motor 772 for regulating the pressing force by which the inner pad 720*b* is pressed by the motor 772. The controller 850 is principally constituted by a computer incorporating a CPU, a ROM and a RAM.

To the input interface of the controller 850, there is connected a brake operating force sensor 852 for detecting an operating force or amount of the brake operating member in the form of a brake pedal operated by the operator of the vehicle. The brake pedal is operatively connected to a brake operating device adapted to generate a brake operating force according to the operation of the brake pedal. The output signal of the brake operating force sensor 852 represents this brake operating force. The load sensor 840 indicated above is also connected to the input interface of the controller 850.

To the output interface of the controller 850 is the ultrasonic motor 772 through a motor driver circuit (not shown).

Figure 68:
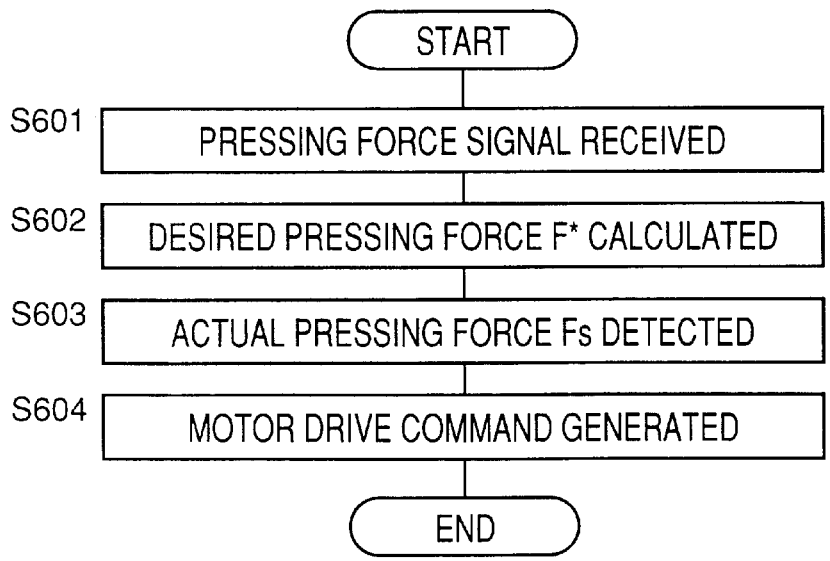
FIG. 68 is a flow chart illustrating a brake control routine executed according to a program stored in a ROM of a computer of a controller shown in FIG. 67.

The controller 850 is adapted to execute a brake control routine illustrated in the flow chart of FIG. 68, according to a program stored in the ROM.

When the brake pedal is depressed, the brake control routine of FIG. 68 is executed to control the ultrasonic motor 772 so that the actual pressing force Fs of the inner pad 720*b* of the disc brake 710 for each wheel of the vehicle coincides with the desired value F*. In the present embodiment, the ratio of the total front braking force to the total rear braking force is suitably determined, and the braking force for each wheel is determined for braking the vehicle so as to brake achieve the desired deceleration value of the vehicle and so as to prevent locking of the rear wheels prior to that of the front wheels.

The brake control routines of FIG. 68 are executed sequentially for the four wheels, and the routine for each wheel is repeatedly executed with a predetermined cycle time T.

The brake control routine is initiated with step S601 in which a pressing force signal indicative of the brake operating force f is received from the brake operating force sensor 852. Step S601 is followed by step S602 to calculate the brake pressing force f on the basis of the pressing force signal, and calculate the desired value F* of the pressing force Fs of the disc brake 710 for the wheel in question, so that the braking forces for the front and rear wheels are suitably distributed. Then, the control flow goes to step S603 to receive the load signal from the load sensor 840, and calculate the actual pressing force Fs on the basis of the load signal. The control flow then goes to step S604 in which a motor drive command signal for controlling the motor 772 is obtained on the basis of the calculated actual pressing force Fs and the calculated desired value F*, and the obtained motor drive command signal is applied to the motor 772. As a result, the motor 772 is controlled such that the pressing force Fs of the inner pad 720*b* of the disc brake 710 for each wheel is equal to the desired value F8. Thus, one cycle of execution of the brake control routine of FIG. 68 is terminated.

It will be understood from the above description of the twenty-fourth embodiment of this invention that the radial bearing 820 and the radial thrust bearing 822 which are adapted to receive at least the radial load of the internally threaded member 802 are spaced apart from each other in the axial direction of the internally threaded member 902, so as to minimize the inclination of the internally threaded member 802 with respect to the body portion 761 of the caliper 736 and the motor housing 780, even when the member 802 receives an offset load or unevenly distributed load during activation of the disc brake 710. This arrangement is effective to minimize the local load concentration of the internally threaded member 802 within the body portion 761 and motor housing 780, which local load concentration would increase a resistance to the rotary motion of the internally threaded member 802.

Further, the radial and radial thrust bearings 820, 822 are effective to minimize the inclination of the stator 784 with respect to the stator 782 due to the offset load acting on the internally threaded member 802 during activation of the disc brake 710, so that the oscillation of the stator 782 can be normally transmitted to the rotor 784, with a minimum amount of reduction of the drive torque of the motor 772 due to the above-indicated inclination.

The present embodiment is further advantageous in that the thrust load of the internally threaded member 802 is transmitted to the body portion 761 through a reaction force transmitting portion in the form of the shoulder surface 826 and a reaction force receiving portion in the form of the shoulder surface 830. That is, the thrust force is not transmitted from the internally threaded member 802 to the motor housing 780.

The above arrangement makes it possible to improve the response of the disc brake 710 to the operation of the ultrasonic motor 772, by simply increasing the rigidity of the body portion 761, without having to increase the rigidity of the motor housing 780. Therefore, the motor housing 780 may be made of a synthetic resin or may have a relatively small wall thickness, while permitting the disc brake 710 to have a sufficiently high degree of operating response. In other words, it is not necessary to increase the size and weight of the motor housing 780 in order to improve the operating response of the disc brake 710.

The present embodiment is also advantageous in that the pad presser portion 736*a* and the support portion 736*c* are both integral parts of the caliper 736, resulting in a higher degree of rigidity of the caliper 736 than where those portions 736*a*, 736*c* are separate members screwed to the caliper 736. In this respect, too, the operating response of the disc brake 710 is improved.

The radial thrust bearing 822 used in the present embodiment is adapted to receive both the radial load and the thrust load of the internally threaded member 802. The use of this radial thrust bearing 822 makes it possible to reduce the required number of the bearings, that is, to use only two bearings, permitting the disc brake 710 to be manufactured compact at a reduced cost with reduced size and weight.

It will be understood that the shoulder surface 826 of the internally threaded member 802 and the shoulder surface 830 of the support portion 736*c* cooperate with the radial bearing 820 and the radial thrust bearing 822 to constitute a rotary support mechanism for rotatably supporting the internally threaded member 802. It will also be understood that the disc brake 710 has a first structure in which the internally threaded member 802 is supported the support portion 736*c* through the radial bearing 820 and the radial thrust bearing 822 which are spaced apart from each other in the axial direction of the internally threaded member 802. The disc brake 710 further has a second structure in which the stepped internally threaded member 802 is supported by the support portion 736*c* through the radial thrust bearing 822. It will further be understood that the elastic control mechanism 740 constitutes the self-servo effect inhibiting means.

Referring next to FIGS. 69–73, there will be described twenty-fifth through twenty-ninth embodiments of the present invention, which are similar in many aspects to the twenty-fourth embodiment but are different from the twenty-fourth embodiment in the structure for supporting the internally threaded member. The same reference signs as used in the twenty-fourth embodiment will be used in the embodiments of FIGS. 69–73 to identify the commonly used elements, and the following description refers to only the structures for supporting the internally threaded member.

Figure 69:
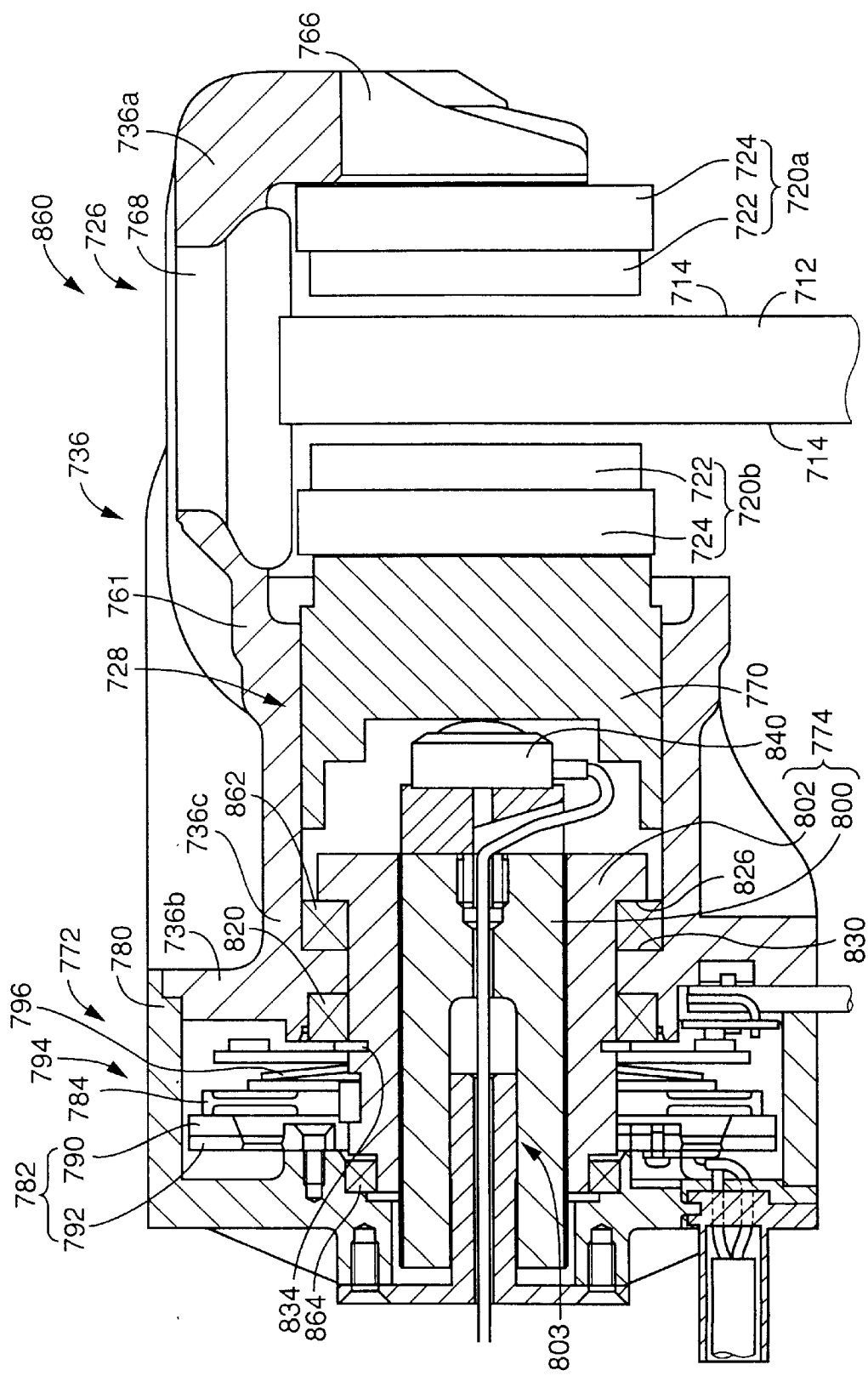
FIG. 69 is a side elevational view in cross section of a motor-driven disc brake in an electrically operated braking system according to a twenty-fifth embodiment of the invention.

In the twenty-fifth embodiment of FIG. 69, the electrically operated braking system includes a motor-driven disc brake 860.

The disc brake 860 uses a thrust bearing 862 for receiving the thrust load of the internally threaded member 802, in place of the radial thrust bearing 822 used in the twenty-fourth embodiment. Further, the disc brake 860 uses another thrust bearing 864 in addition to the radial bearing 820 used in the twenty-fourth embodiment. Like the radial thrust bearing 822, the thrust bearing 862 is disposed between the shoulder surfaces 826 and 830. On the other hand, the radial bearing 864 is disposed between the rear portion 806 of the internally threaded member 802 and the motor housing 780. In the present embodiment, the two radial bearings 820, 864 are provided on the opposite sides of the rotor 784.

In the present embodiment, too, the bearings 820, 862, 864 function to minimize the inclination of the internally threaded member 802 and the rotor 784 during operation of the disc brake 860, and assure a high degree of operating response of the disc brake 860 without increasing the rigidity of the motor housing 780.

It will be understood from the above description of the twenty-fifth embodiment that the shoulder surface 826 of the internally threaded member 802 and the shoulder surface 830 of the support portion 736c cooperate with the radial bearings 820, 864 and the radial thrust bearing 862 to constitute a rotary support mechanism for rotatably supporting the internally threaded member 802. It will also be understood that the disc brake 860 has a first structure in which the internally threaded member 802 is supported the support portion 736c through the radial bearings 820, 864 which are spaced apart from each other in the axial direction of the internally threaded member 802. The disc brake 860 further has a second structure in which the stepped internally threaded member 802 is supported by the support portion 736c through the thrust bearing 862.

Figure 70:
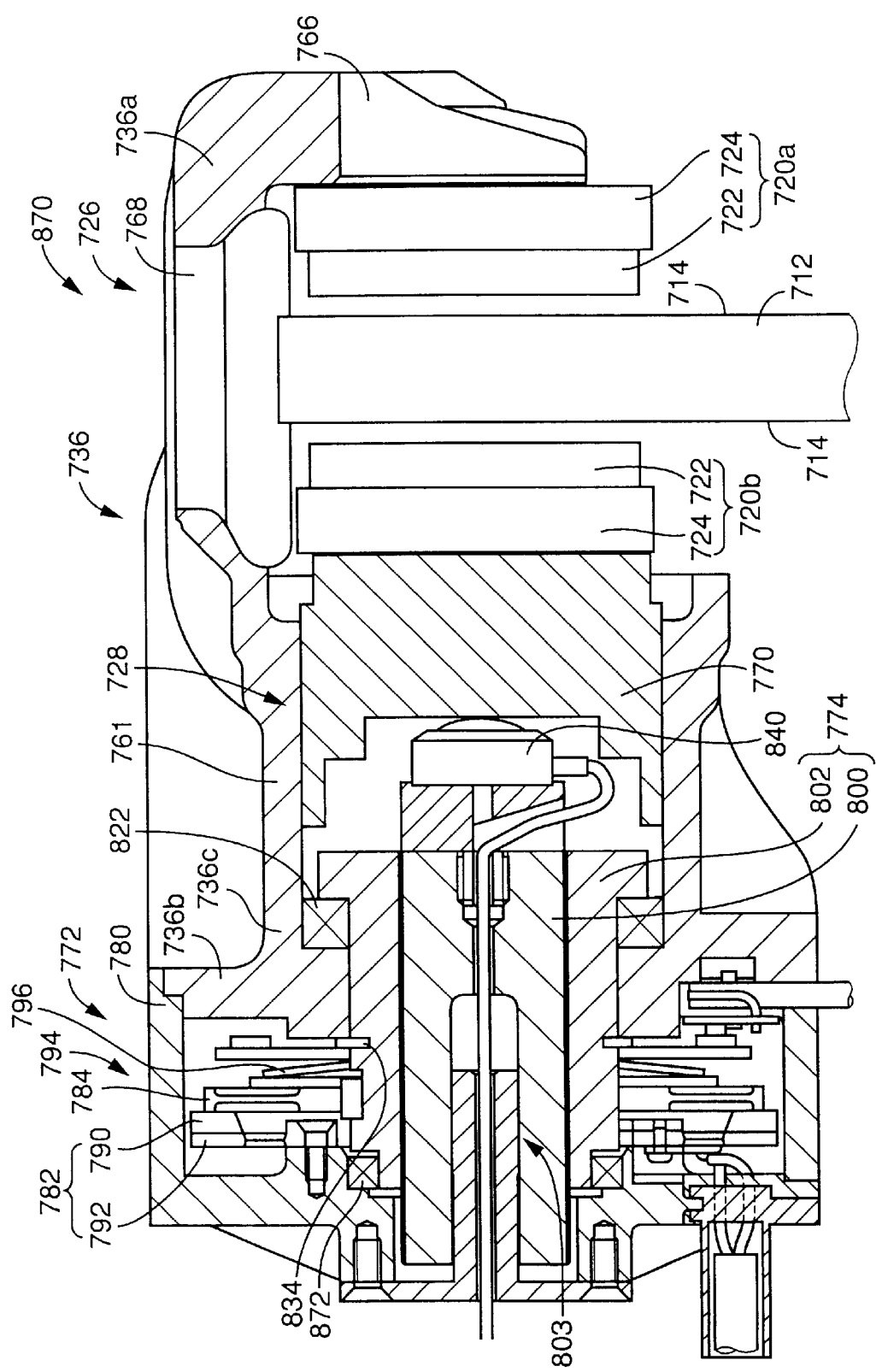
FIG. 70 is a side elevational view in cross section of a motor-driven disc brake in an electrically operated braking system according to a twenty-sixth embodiment of the invention.

In the twenty-sixth embodiment of FIG. 70, the electrically operated braking system includes a motor-driven disc brake 870.

The disc brake 870 uses a radial bearing 872 in place of the radial bearing 820 used in the twenty-fourth embodiment. The radial bearing 872 is disposed between the rear portion 806 of the internally threaded member 802 and the motor housing 780.

In the present embodiment, the bearings 822, 872 function to minimize the inclination of the internally threaded member 802 and the rotor 784 during operation of the disc brake 870, and assure a high degree of operating response of the disc brake 870 without increasing the rigidity of the motor housing 780. Further, the required number of the bearings is relatively small.

Further, the inclination of the internally threaded member 802 can be more effectively prevented by the two bearings 822 and 872 which are disposed near the opposite axial ends of the member 802, for receiving at least the radial load of the member 802.

It will be understood from the above description of the twenty-sixth embodiment that the shoulder surface 826 of the internally threaded member 802 and the shoulder surface 830 of the support portion 736c cooperate with the radial bearing 872 and the radial thrust bearing 822 to constitute a rotary support mechanism for rotatably supporting the internally threaded member 802. It will also be understood that the disc brake 860 has a first structure in which the internally threaded member 802 is supported the support portion 736c through the radial thrust bearing 822 and the radial bearing 872 which are spaced apart from each other in the axial direction of the internally threaded member 802. The disc brake 860 further has a second structure in which the stepped internally threaded member 802 is supported by the support portion 736c through the radial thrust bearing 822.

Figure 71:
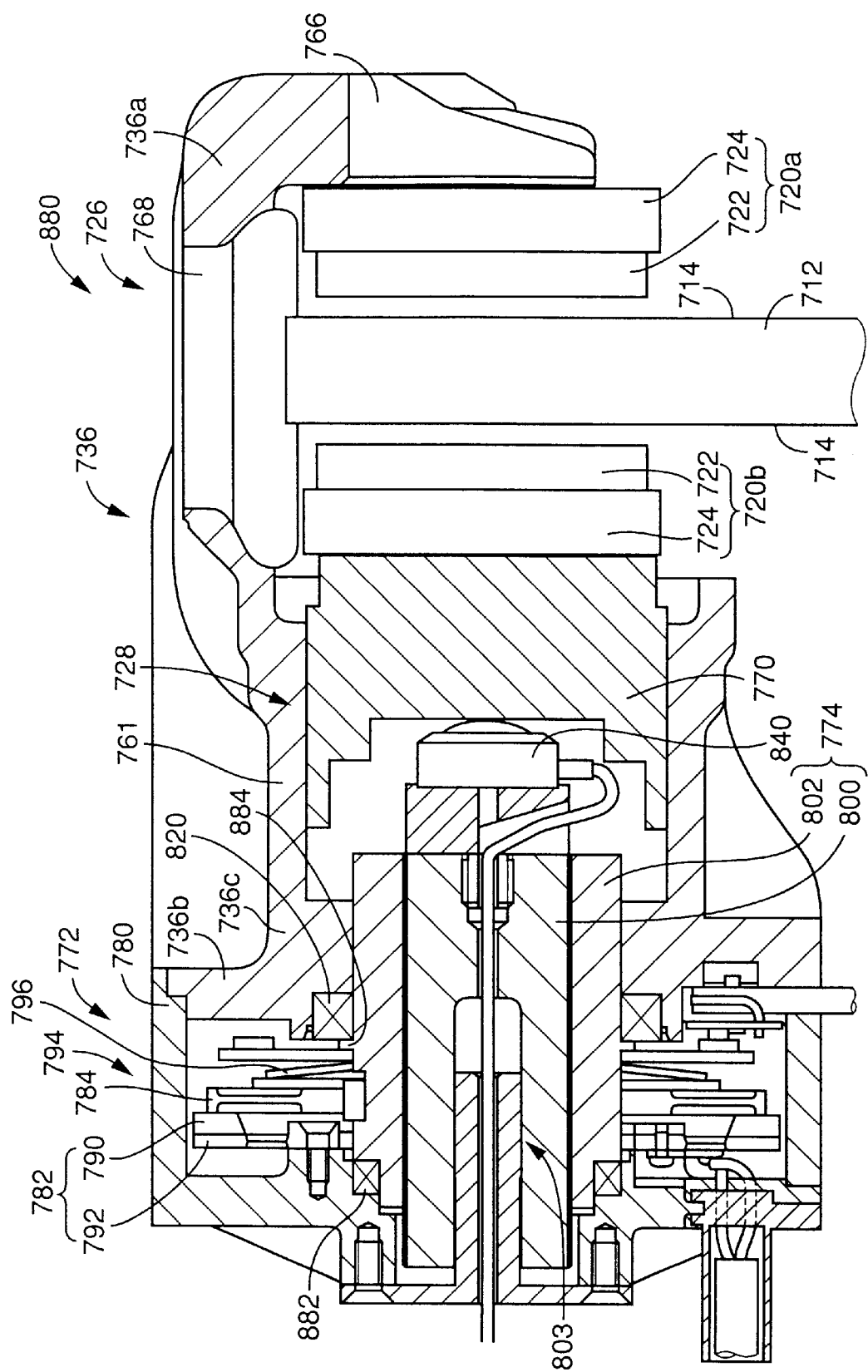
FIG. 71 is a side elevational view in cross section of a motor-driven disc brake in an electrically operated braking system according to a twenty-seventh embodiment of the invention.

In the twenty-seventh embodiment of FIG. 71, the electrically operated braking system includes a motor-driven disc brake 880.

Unlike the disc brake 710 of the twenty-fourth embodiment, the disc brake 880 is adapted such that the thrust load of the internally threaded member 802 is transmitted through the motor housing 780 to the body portion 761 of the caliper 736. The disc brake 880 uses a radial thrust bearing 882 in place of the radial thrust bearing 822 used in the twenty-fourth embodiment. The radial thrust bearing 882 is disposed between the internally threaded member 802 and the motor housing 780.

The front portion 804 of the internally threaded member 802 has an intermediate part with a stop 884 formed on its outer circumferential surface. The stop 884 functions to limit the axial movement of the internally threaded member 802.

In the disc brake 880, the bearings 820, 882 for receiving at least the radial load of the internally threaded member 802 are spaced apart from each other in the axial direction of the member 802, and therefore function to prevent the inclination of the member 802 and the rotor 784 during operation of the disc brake.

Further, the radial thrust bearing 882 used in the present embodiment is adapted to receive both the radial load and the thrust load of the internally threaded member 802. The use of this radial thrust bearing 882 makes it possible to reduce the required number of the bearings, that is, to use only two bearings in the disc brake 880.

It will be understood that the radial bearing 820 and the radial thrust bearing 882 constitute a rotary support mechanism for rotatably supporting the internally threaded member 802. It will also be understood that the disc brake 880 has a first structure in which the internally threaded member 802 is supported the support portion 736c through the radial bearing 820 and the radial thrust bearing 882 which are spaced apart from each other in the axial direction of the internally threaded member 802.

Figure 72:
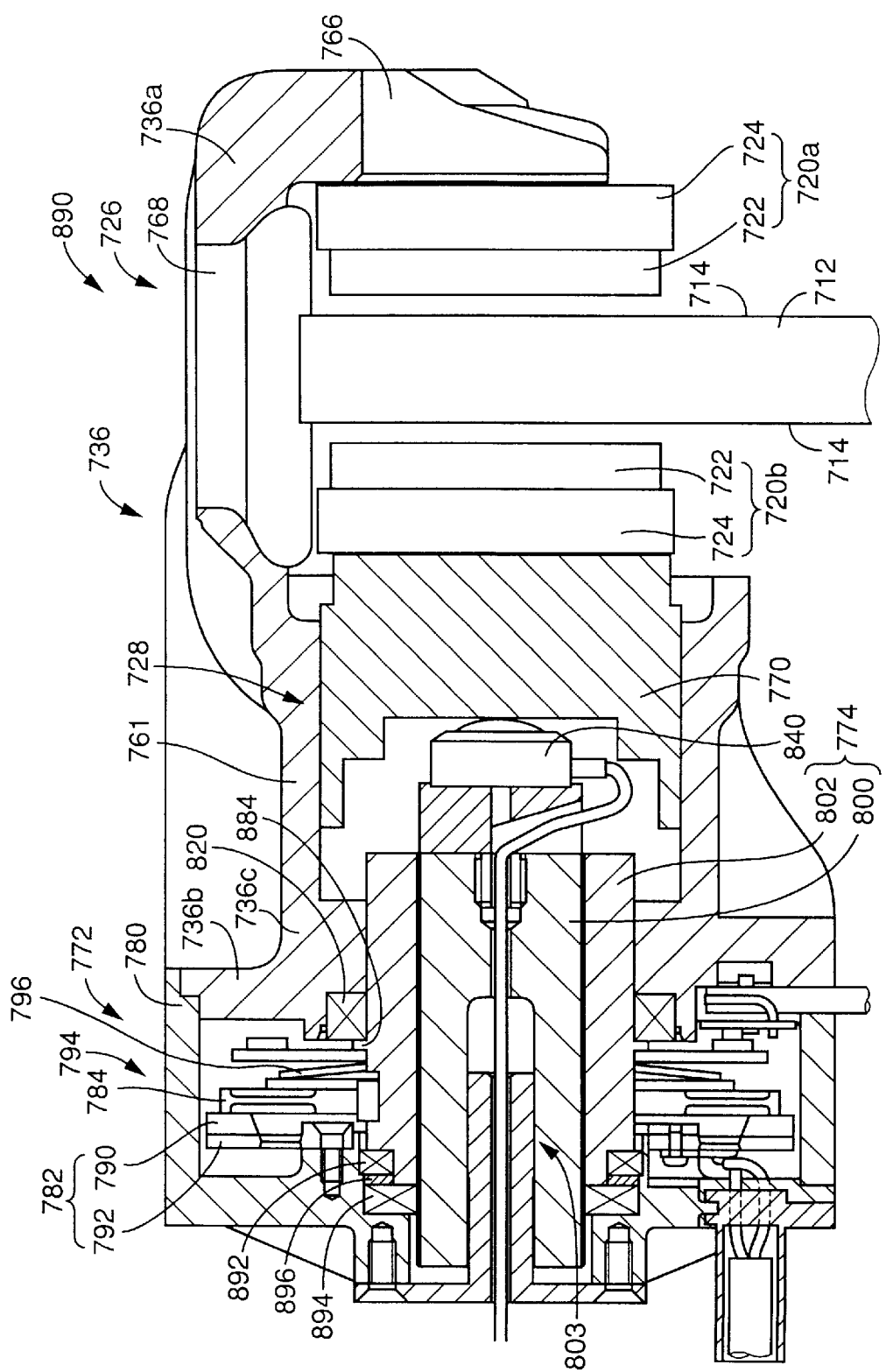
FIG. 72 is a side elevational view in cross section of a motor-driven disc brake in an electrically operated braking system according to a twenty-eighth embodiment of the invention.

In the twenty-eighth embodiment of FIG. 72, the electrically operated braking system includes a motor-driven disc brake 890.

Unlike the disc brake 710 of the twenty-fourth embodiment, the disc brake 890 is adapted such that the thrust load of the internally threaded member 802 is transmitted through the motor housing 780 to the body portion 761 of the caliper 736. The disc brake 890 uses a radial bearing 892 and a radial thrust bearing 894 in place of the radial thrust bearing 822 used in the twenty-fourth embodiment. These bearings 892, 894 are both disposed between the rear portion 806 of the internally threaded member 802 and the motor housing 780. An annular spacer 896 is interposed between the bearings 892, 894.

In the disc brake 890, the bearings 820, 892 for receiving at least the radial load of the internally threaded member 802 are spaced apart from each other in the axial direction of the member 802, and therefore function to prevent the inclination of the member 802 and the rotor 784 during operation of the disc brake.

It will be understood that the radial bearings 820, 892 and the radial thrust bearing 894 constitute a rotary support mechanism for rotatably supporting the internally threaded member 802. It will also be understood that the disc brake 890 has a first structure in which the internally threaded member 802 is supported the support portion 736c through the radial bearings 820, 882 which are spaced apart from each other in the axial direction of the internally threaded member 802.

Figure 73:
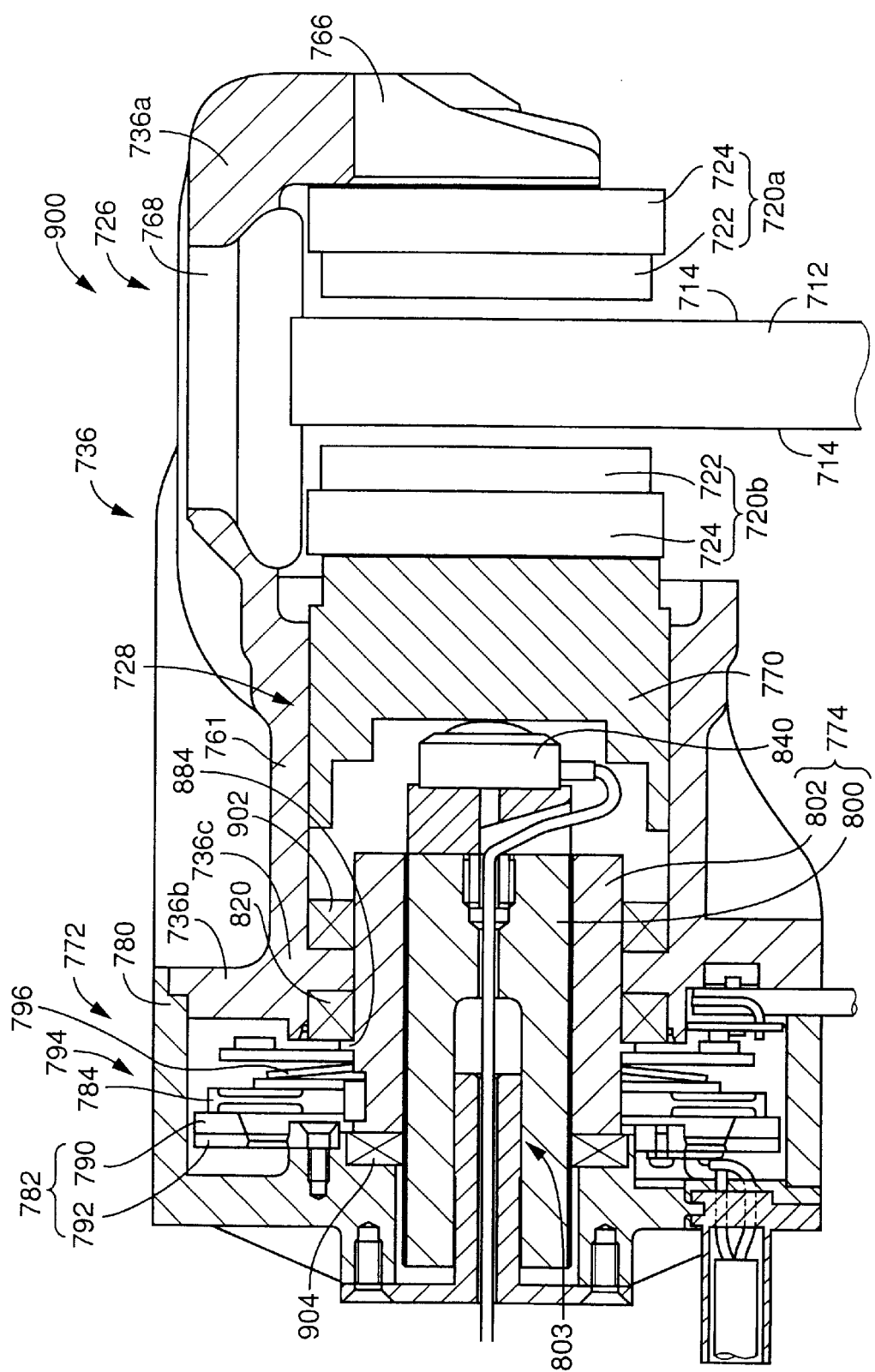
FIG. 73 is a side elevational view in cross section of a motor-driven disc brake in an electrically operated braking system according to a twenty-ninth embodiment of the invention.

In the twenty-ninth embodiment of FIG. 73, the electrically operated braking system includes a motor-driven disc brake 900.

Unlike the disc brake 710 of the twenty-fourth embodiment, the disc brake 900 is adapted such that the thrust load of the internally threaded member 802 is transmitted through the motor housing 780 to the body portion 761 of the caliper 736. The disc brake 900 uses a radial bearing 902 and a thrust bearing 904 in place of the radial thrust bearing 822 used in the twenty-fourth embodiment. The radial and thrust bearings 902, 904 are disposed at the between the front and rear portions 804, 806 of the internally threaded member 802, respectively.

In the disc brake 900, the bearings 820, 902 for receiving at least the radial load of the internally threaded member 802 are spaced apart from each other in the axial direction of the member 802, and therefore function to prevent the inclination of the member 802 and the rotor 784 during operation of the disc brake.

It will be understood that the radial bearings 820, 902 and the thrust bearing 904 constitute a rotary support mechanism for rotatably supporting the internally threaded member 802. It will also be understood that the disc brake 900 has a first structure in which the internally threaded member 802 is supported the support portion 736c through the radial bearings 820, 902 which are spaced apart from each other in the axial direction of the internally threaded member 802.

In all of the twenty-fourth through twenty-ninth embodiments of the invention, the two or more bearings for receiving at least the radial load of the internally threaded member 802 are spaced apart from each other in the axial direction of the member 802, so as to prevent the inclination of the member 802 during operation of the disc brake. However, the same object may be achieved by using a single radial bearing wherein at least one of the outer and inner rings has a considerably large axial dimension.

While the present invention has been described in its presently preferred embodiments, for illustrative purpose only, it is to be understood that the present invention may be otherwise embodied.

In all of the illustrated embodiments, the disc brakes using the ultrasonic motor or DC motor as the drive source are used as an ordinary vehicle brake for braking the wheels during running of a vehicle, the disc brakes may be used not only as the normal vehicle brakes but also as a parking brake for braking the vehicle to hold it stationary, or may be used exclusively as the parking brake.

The techniques disclosed herein to overcome the drawbacks regarding the self-servo effect of the disc brake are applicable to both an electrically or motor-driven operated disc brake and a mechanically or hydraulically operated disc brake.

It is to be understood that the present invention may be embodied with various other changes, modifications and improvements, which may occur to those skilled in the art, without departing from the scope of the invention defined in the following claims.

What is claimed is:

1. An electrically operated braking system comprising a motor-driven disc brake including an electric motor as a drive source for braking a wheel of an automotive vehicle, and a motor control device for controlling said electric motor, said motor-driven disc brake further including:
  a disc rotor having a friction surface and rotating with said wheel;
  a friction pad movable for contact with said friction surface to restrict rotation of said disc rotor;
  a pad support mechanism for supporting said friction pad such that said friction pad is movable in a direction intersecting said friction surface;
  a pad pressing mechanism comprising said electric motor and a pressing member, said electric motor producing a drive force for moving said pressing member to force said friction pad against said friction surface of said disc rotor;
  a self-servo mechanism for providing a self-servo effect of boosting a friction force generated between said friction surface and said friction pad, on the basis of the friction force; and
  a self-servo effect inhibiting mechanism for inhibiting said self-servo mechanism from providing said self-servo effect while a braking force between said wheel and a road surface is smaller than a predetermined first value, said self-servo effect inhibiting mechanism including means for inhibiting a movement of said friction pad due to said friction force.

2. An electrically operated braking system according to claim 1, wherein said self-servo mechanism provides said self-servo effect by utilizing said movement of said friction pad with said disc rotor due to said friction force therebetween, such that said self-servo effect changes with an amount of said movement of said friction pad, said self-servo effect inhibiting mechanism including an elastic member whose elastic force inhibits the movement of said friction pad with said disc rotor, said elastic force increasing non-linearly with an increase in an amount of elastic deformation of said elastic member.

3. An electrically operated braking system according to claim 2, wherein a rate of increase of said elastic force of said elastic member with said amount of elastic deformation is higher when said amount of elas tic deformation is relatively large than when said amount is relatively small.

4. An electrically operated braking system comprising a motor-driven disc brake including an electric motor as a drive source for braking a wheel of an automotive vehicle, and a motor control device for controlling said electric motor, said motor-driven disc brake further including:
  a disc rotor having a friction surface and rotating with said wheel;
  a friction pad movable for contact with said friction surface to restrict rotation of said disc rotor;
  a pad support mechanism for supporting said friction pad such that said friction pad is movable in a direction intersecting said friction surface;
  a pad pressing mechanism comprising said electric motor and a pressing member, said electric motor producing a drive force for moving said pressing member to force said friction pad against said friction surface of said disc rotor;
  a self-servo mechanism for providing a self-servo effect of boosting a friction force generated between said friction surface and said friction pad, on the basis of the friction force; and
  a mechanism including an elastic member for mechanically controlling a rate of change of said self-servo effect of said self-servo mechanism with a change in said drive force of said electric motor.

5. An electrically operated braking system comprising a motor-driven disc brake including an electric motor as a drive source for braking a wheel of an automotive vehicle, and a motor control device for controlling said electric motor, said motor-driven disc brake further including:
  a disc rotor having a friction surface and rotating with said wheel;
  a friction pad movable for contact with said friction surface to restrict rotation of said disc rotor;
  a pad support mechanism for supporting said friction pad such that said friction pad is movable in a direction intersecting said friction surface;
  a pad pressing mechanism comprising said electric motor and a pressing member, said electric motor producing a drive force for moving said pressing member to force said friction pad against said friction surface of said disc rotor;

a self-servo mechanism for providing a self-servo effect of boosting a friction force generated between said friction surface and said friction pad, on the basis of the friction force; and a self-servo effect inhibiting mechanism for inhibiting said self-servo mechanism from providing said self-servo effect while a braking force between said wheel and a road surface is smaller than a predetermined first value, and wherein said self-servo-mechanism provides said self-servo effect by utilizing a movement of said friction pad with said disc rotor due to said friction force therebetween, such that said self-servo effect changes with an amount of said movement of said friction pad, said self-servo effect inhibiting mechanism including an elastic member whose elastic force inhibits the movement of said friction pad with said disc rotor, and wherein said pad support mechanism includes a stationary member having a pair of portions for supporting said friction pad at opposite end portions thereof which are opposite to each other in a rotating direction of said disc rotor, and said elastic member having opposite end portions one of which is associated with one of said opposite end portions Qf said friction pad toward which said friction pad is moved with said disc rotor during forward running of said automotive vehicle, the other of said opposite end portions of said elastic member being associated with one of said pair of portions of said stationary member which is remote from said one end portion of said friction pad.

6. An electrically operated braking system comprising a motor-driven disc brake including an electric motor as a drive source for braking a wheel of an automotive vehicle, and a motor control device for controlling said electric motor, said motor-driven disc brake further including:

a disc rotor having a friction surface and rotating with said wheel;

a friction pad movable for contact with said friction surface to restrict rotation of said disc rotor;

a pad support mechanism for supporting said friction pad such that said friction pad is movable in a direction intersecting said friction surface;

a pad pressing mechanism comprising said electric motor and a pressing member, said electric motor producing a drive force for moving said pressing member to force said friction pad against said friction surface of said disc rotor;

a self-servo mechanism for providing a self-servo effect of boosting a friction force generated between said friction surface and said friction pad, on the basis of the friction force; and an excessive self-servo effect inhibiting mechanism for inhibiting said self-servo effect inhibiting mechanism for inhibiting an increase of said self-servo effect of said self-servo mechanism after a braking force between said wheel and a road surface exceeds a predetermined second value.

7. An electrically operated braking system according to claim 1, wherein said motor-driven disc brake further includes temperature rise restricting means for restricting a rise of a temperature of said electric motor, said temperature rise restricting means comprising a waterjacket enclosing a housing of said electric motor and having a fluid passage system extending therethrough, and further comprising a pump operable to circulate a cooling fluid through said fluid passage system, for cooling said electric motor.

8. An electrically operated braking system according to claim 1, wherein said self-servo mechanism includes said friction pad which has a slant surface for contact with said pressing member, said slant surface having an inclination with respect to said friction surface, an angle of said inclination of said slant surface changing in a direction in which said friction pad is moved with said disc rotor due to said friction force therebetween.

9. An electrically operated braking system according to claim 1, wherein said motor-driven disc brake includes a pair of friction pads disposed on opposite sides of said disc rotor, respectively, one of said friction pads being movable with said disc rotor due to said friction force therebetween, while the other of said friction pads being immovable with said disc rotor due to said friction force, and wherein said pad pressing mechanism includes a caliper extending over a periphery of said disc rotor and movable in said direction intersecting said friction surface, said caliper comprising a reaction portion engageable with said one of said friction pads, and a presser portion for pressing said other of said friction pads against said friction surface, said pad pressing mechanism further including a presser rod which is supported by said presser portion such that said presser rod is movable by said drive force of said electric motor in said direction intersecting said friction surface, said caliper functioning as said pressing member for said one of said friction pads, while said presser rod functioning as said pressing member for said other of said friction pads.

10. An electrically operated braking system comprising a motor-driven disc brake including an electric motor as a drive source for braking a wheel of an automotive vehicle, and a motor control device for controlling said electric motor, said motor-driven disc brake further including:

a disc rotor having a friction surface and rotating with said wheel a friction pad movable for contact with said friction surface to restrict rotation of said disc rotor;

a pad support mechanism for supporting said friction pad such that said friction pad is movable in a direction intersecting said friction surface;

a pad pressing mechanism comprising said electric motor and a pressing member, said electric motor producing a drive force for moving said pressing member to force said friction pad against said friction surface of said disc rotor; and a self-servo mechanism for providing a self-servo effect of boosting a friction force generated between said friction surface and said friction pad, on the basis of the friction force, and wherein said electric motor has a non-energized off state, a first energized state for forward rotation thereof, and a second energized state for reverse rotation thereof, said pressing member being moved to press said friction pad toward said friction surface of said disc rotor when said electric motor is placed in said first energized state, and wherein said motor control device controls said electric motor such that an actual value of a pressing force by which said friction pad is forced against said friction surface is equal to a desired value, said electrically operated braking system further comprising:

insufficient increase preventing means for preventing a shortage of increase of said actual value of said pressing force by locking said pressing member against a reaction force transferred from said friction pad to said pressing member, so as to prevent a shortage of increase of said actual value of said pressing force, when said actual value is required to be increased during operation of said self-servo mechanism.

11. An electrically operated braking system according to claim 10, wherein said electric motor consists of an ultrasonic motor, and said motor control device comprises de-energizing means for de-energizing said ultrasonic motor for thereby enabling said ultrasonic motor to produce a holding torque for locking said pressing member, said insufficient increase preventing means comprising said de-energing means.

12. An electrically operated braking system according to claim 11, wherein said de-energizing means comprises means for de-energizing said ultrasonic motor when an amount of increase of said actual value of said pressing force is smaller than a predetermined first threshold while said ultrasonic motor is placed in said first energized state.

13. An electrically operated braking system according to claim 11, wherein said de-energizing means comprises means for de-energizing said ultrasonic motor depending upon whether an operation of said self-servo mechanism has been initiated.

14. An electrically operated braking system according to claim 13, wherein said means for de-energizing said ultrasonic motor depending upon an operation of said self-servo mechanism has been initiated comprises a sensor for detecting a value relating to said actual value of said pressing force, and self-servo effect monitoring means for determining, on the basis of an output signal of said sensor, that the operation of said self-servo mechanism has been initiated, if each of at least one predetermined condition is satisfied, said at least one predetermined condition including a condition that an amount of increase of said actual value of said pressing force exceeds a predetermined second threshold while said ultrasonic motor is placed in said first energized state.

15. An electrically operated braking system comprising a motor-driven disc brake including an electric motor as a drive source for braking a wheel of an automotive vehicle, and a motor control device for controlling said electric motor, said motor-driven disc brake further including:
   a disc rotor having a friction surface and rotating with said wheel;
   a friction pad movable for contact with said friction surface to restrict rotation of said disc rotor;
   a pad support mechanism for supporting said friction pad such that said friction pad is movable in a direction intersecting said friction surface;
   a pad pressing mechanism comprising said electric motor and a pressing member, said electric motor producing a drive force for moving said pressing member to force said friction pad against said friction surface of said disc rotor; and
   a self-servo mechanism for providing a self-servo effect of boosting a friction force generated between said friction surface and said friction pad, on the basis of the friction force,
   and wherein said electric motor includes a stator, a rotor and a motor housing in which said stator and said rotor are accommodated, and said pad pressing mechanism includes:
      a rotatable member rotatable about an axis thereof by said electric motor;
      a linearly movable member disposed rearwardly of said pressing member such that said movable member is linearly movable in said direction intersecting said friction surface of said disc rotor;
      a motion converting mechanism for converting a rotary motion of said rotatable member into a linear motion of said linearly movable member, to move said pressing member for forcing said friction pad against said friction surface;
      a caliper including a portion functioning as said motor housing, and supporting said linearly movable member such that said linearly movable member is linearly movable; and
      a rotary support mechanism for supporting said rotatable member rotatably relative to said caliper, said rotary support mechanism enabling said caliper to receive as a thrust load a reaction force from said rotatable member while said friction pad is forced against said friction surface,
   and wherein said rotary support mechanism includes a support structure for reducing an influence of at least one of a first reaction force and a second reaction force upon said electric motor, said first reaction force being received as an offset load by said rotatable member from said linearly movable member during an operation of said motor-driven disc brake, and said second reaction force being received by said caliper from said rotatable member during the operation of said motor-driven disc brake,
   and further wherein said support structure includes a first structure for restricting an inclination of said axis of said rotatable member by said first reaction force during the operation of said motor-driven disc brake.

16. An electrically operated braking system according to claim 15, wherein said rotatable member is coaxially fixed to said rotor for rotation therewith, and said first structure includes a structure for restricting the inclination of the axis of said rotatable member to thereby restrict an inclination of an axis of said rotor with respect to an axis of said stator.

17. An electrically operated braking system according to claim 15, wherein said first structure includes a plurality of radial bearings for rotatably supporting said rotatable member, said radial bearings being spaced apart from each other in an axial direction of said rotatable member and receiving a radial load from said rotatable member.

18. An electrically operated braking system according to claim 15, wherein said support structure includes a second structure inhibiting said second reaction force from being transmitted to said electric motor.

19. An electrically operated braking system according to claim 18, wherein said rotatable member has a first surface which faces in an axial direction of said rotatable member from said friction pad toward said rotatable member and which transmits said second reaction force to said caliper, and said caliper has a second surface formed at a portion thereof between said portion thereof functioning as said motor housing and a portion thereof corresponding to said first surface, said second surface being opposed to said first surface in the axial direction of said rotatable member and receiving said second reaction force from said first surface, said second structure including said first and second surfaces and a bearing which is interposed between said first and second surfaces and between said rotatable member and said caliper such that said bearing rotatably supports said rotatable member so as to receive at least a thrust load from said rotatable member.

20. An electrically operated braking system according to claim 1, wherein said self-servo effect inhibiting mechanism inhibits an operation of said self-servo mechanism while a friction force between said friction pad and said friction surface of said disc rotor is smaller than a predetermined threshold.

21. An electrically operated braking system according to claim 1, wherein said self-servo effect inhibiting mechanism inhibits an operation of said self-servo mechanism while a deceleration value of said automotive vehicle braking braked by said motor-driven disc brake is smaller than a predetermined threshold selected within a range of 0.5–0.6 G.

22. An electrically operated braking system according to claim 1, wherein said self-servo effect inhibiting mechanism inhibits an operation of said self-servo mechanism while an amount of operation of a brake operating member manually operable to operate said motor-driven disc brake is smaller than a predetermined threshold.

23. An electrically operated braking system according to claim 1, wherein said motor-driven disc brake further includes temperature rise restricting means for restricting a rise of a temperature of said electric motor, said temperature rise restricting means comprises a cooling fan for blowing air toward said electric motor.

* * * * *